June 15, 1954   J. T. FERRY ET AL   2,681,145
MACHINE FOR SEQUENTIAL FILE MERGING
Filed July 19, 1947   54 Sheets-Sheet 1

INVENTORS
JOHN T. FERRY
RALPH V. BENNETT
OTTO E. KASE
THEODORE B. McGIRR
BY
ATTORNEY

June 15, 1954 J. T. FERRY ET AL 2,681,145
MACHINE FOR SEQUENTIAL FILE MERGING
Filed July 19, 1947 54 Sheets-Sheet 3

INVENTOR
JOHN T. FERRY
RALPH V. BENNETT
OTTO E. KASE
THEODORE B. McGIRR
BY John L. Sterling
ATTORNEY

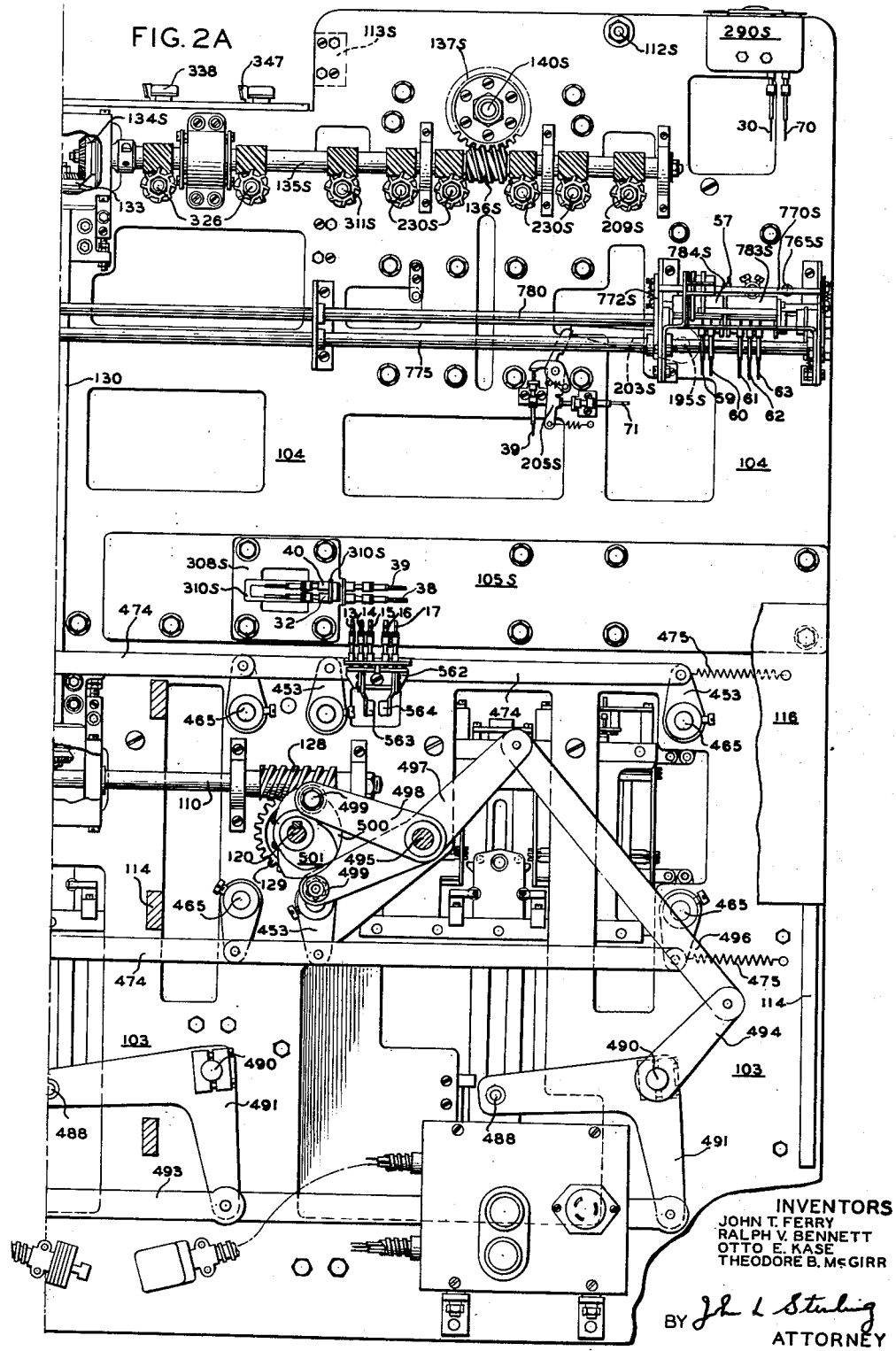

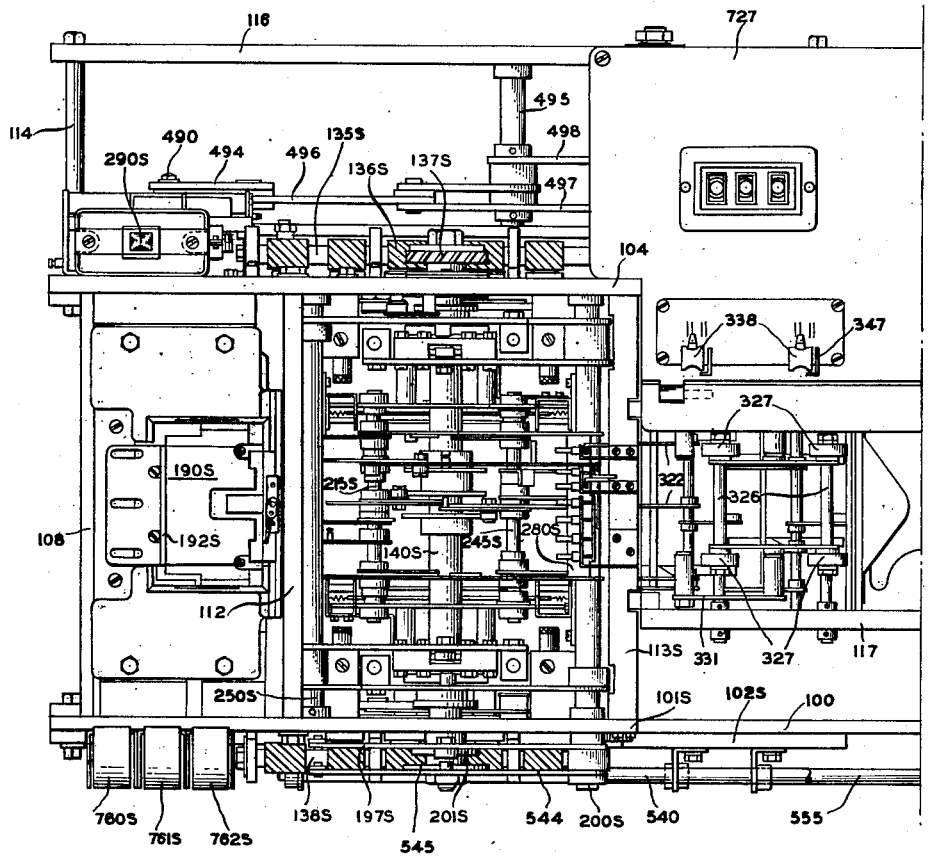

June 15, 1954

J. T. FERRY ET AL 2,681,145

MACHINE FOR SEQUENTIAL FILE MERGING

Filed July 19, 1947

INVENTORS
JOHN T. FERRY
RALPH V. BENNETT
OTTO E. KASE
THEODORE B. McGIRR

BY John L Sterling
ATTORNEY

INVENTORS
JOHN T. FERRY
RALPH V. BENNETT
OTTO E. KASE
THEODORE B. McGIRR
BY J.L. Sterling
ATTORNEY

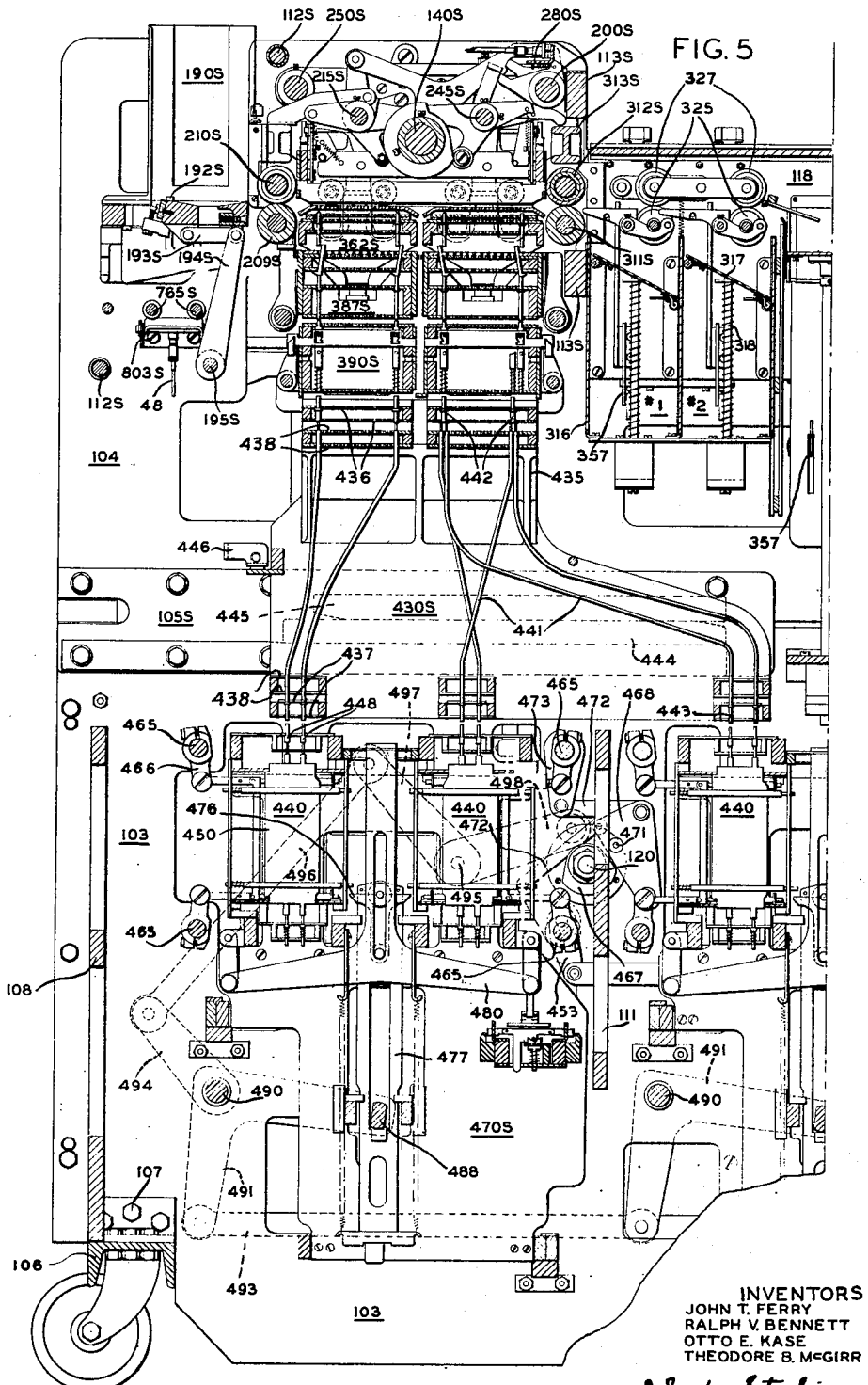

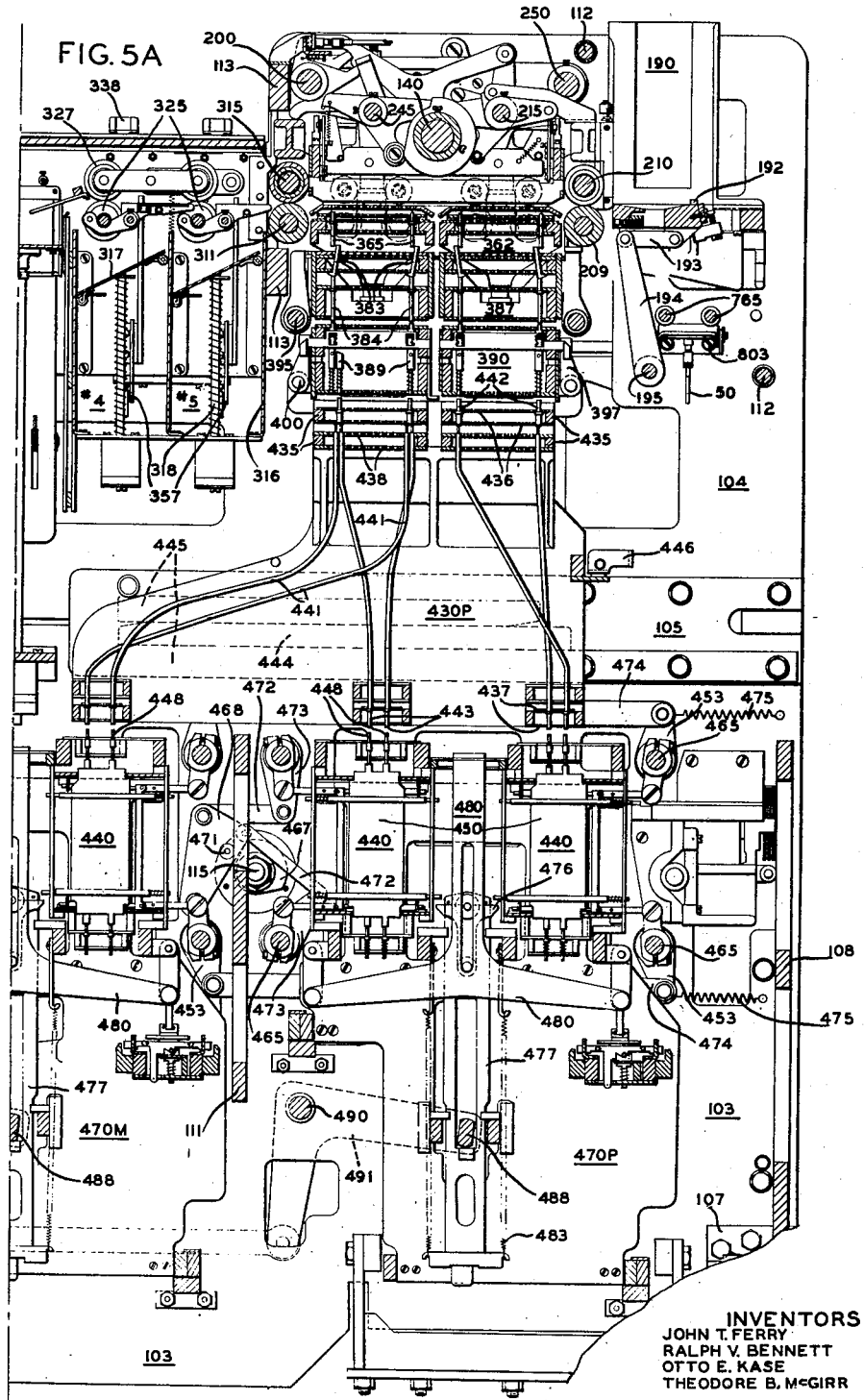

June 15, 1954  J. T. FERRY ET AL  2,681,145
MACHINE FOR SEQUENTIAL FILE MERGING
Filed July 19, 1947  54 Sheets-Sheet 10

INVENTORS
JOHN T. FERRY
RALPH V. BENNETT
OTTO E. KASE
THEODORE B. McGIRR
BY John L. Sterling
ATTORNEY

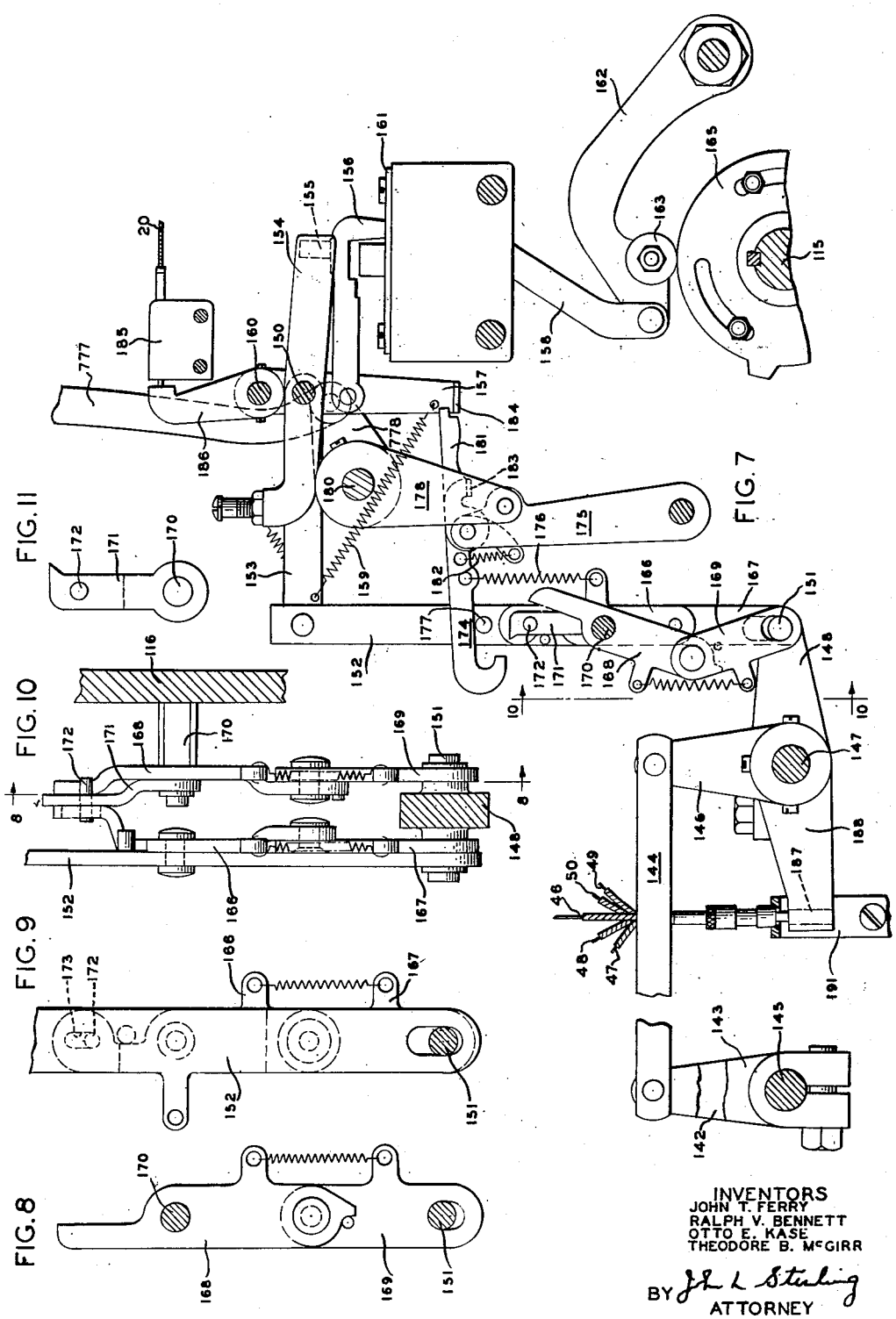

June 15, 1954   J. T. FERRY ET AL   2,681,145
MACHINE FOR SEQUENTIAL FILE MERGING
Filed July 19, 1947   54 Sheets-Sheet 12

INVENTORS
JOHN T. FERRY
RALPH V. BENNETT
OTTO E. KASE
THEODORE B. McGIRR
BY *J. L. Sterling*
ATTORNEY

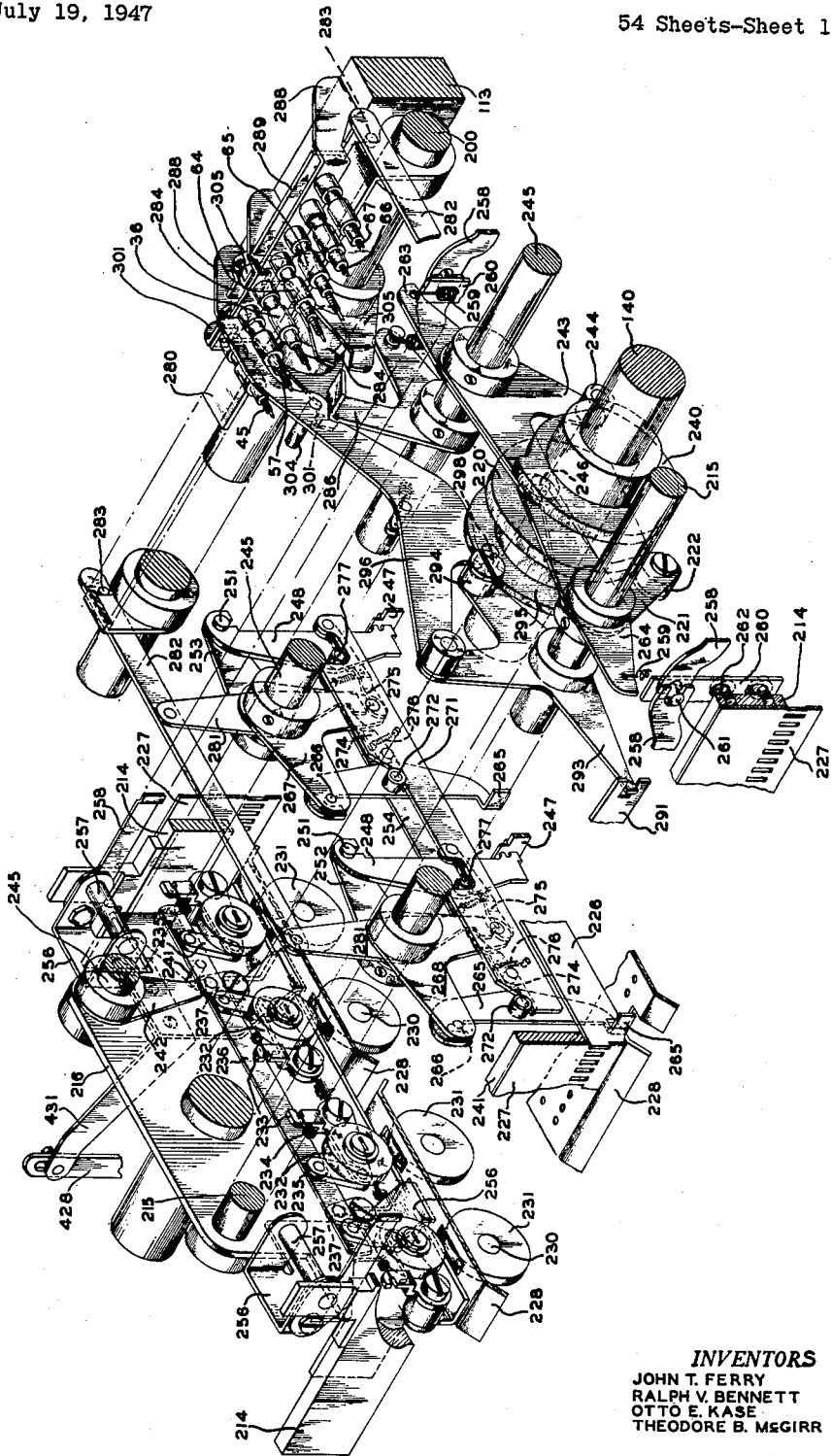

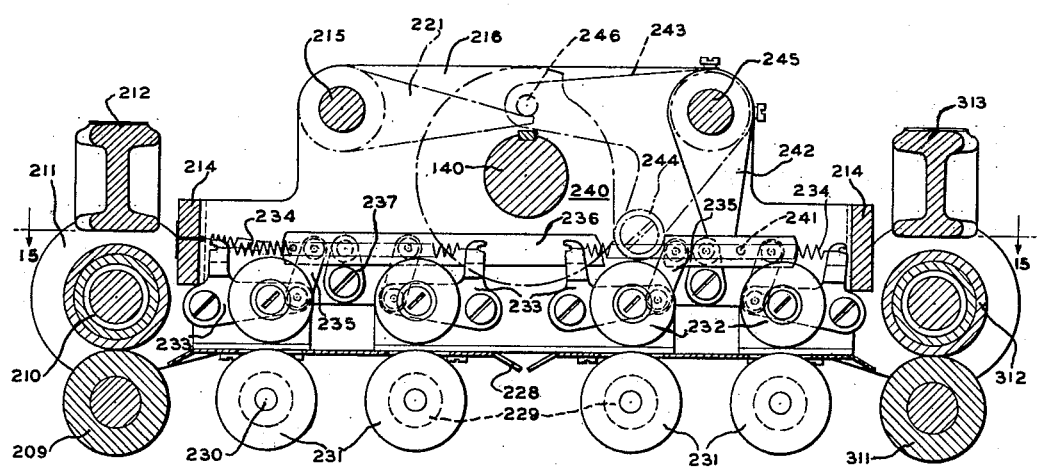

June 15, 1954   J. T. FERRY ET AL   2,681,145
MACHINE FOR SEQUENTIAL FILE MERGING
Filed July 19, 1947   54 Sheets-Sheet 15

INVENTORS
JOHN T. FERRY
RALPH V. BENNETT
OTTO E. KASE
THEODORE B. McGIRR
BY
ATTORNEY

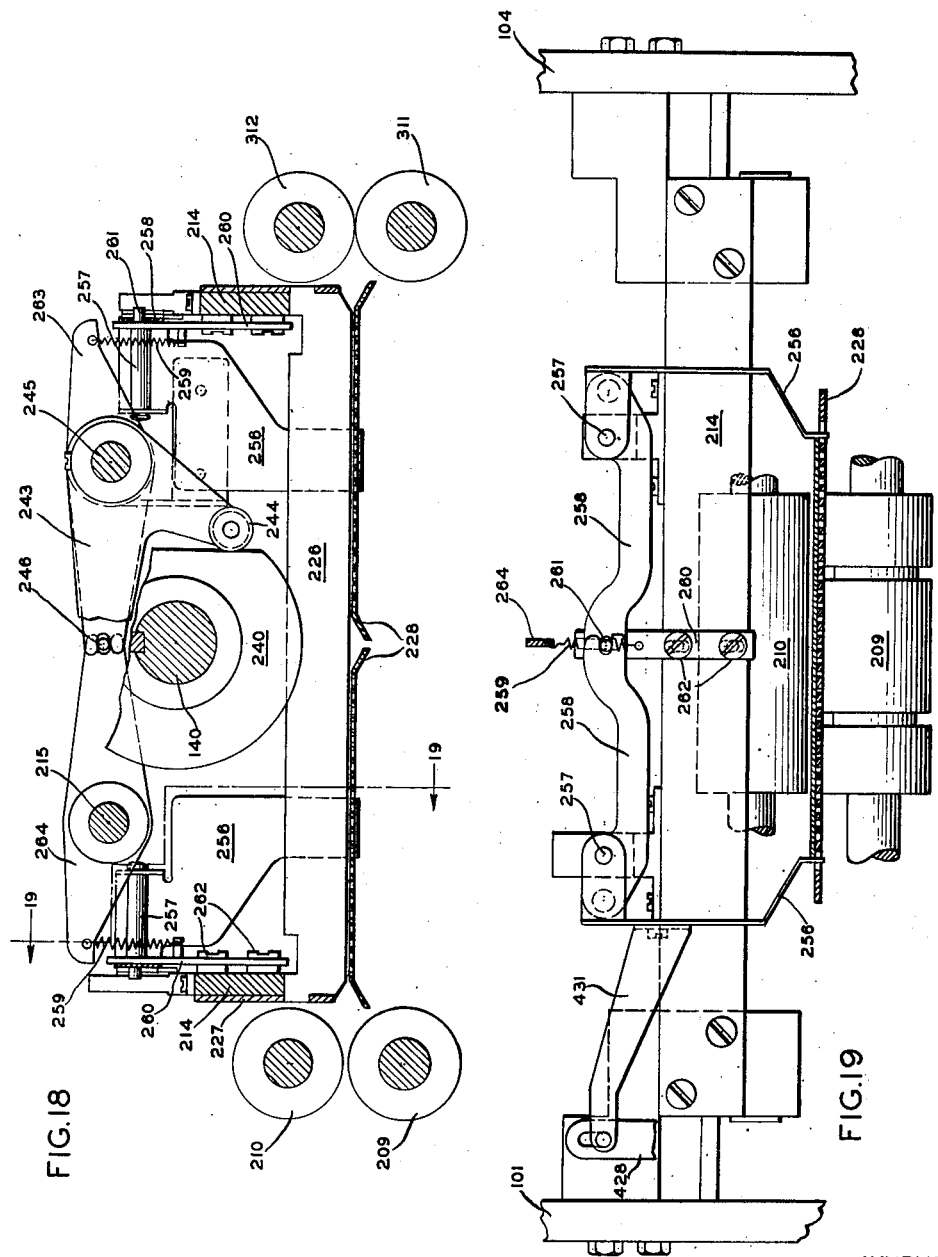

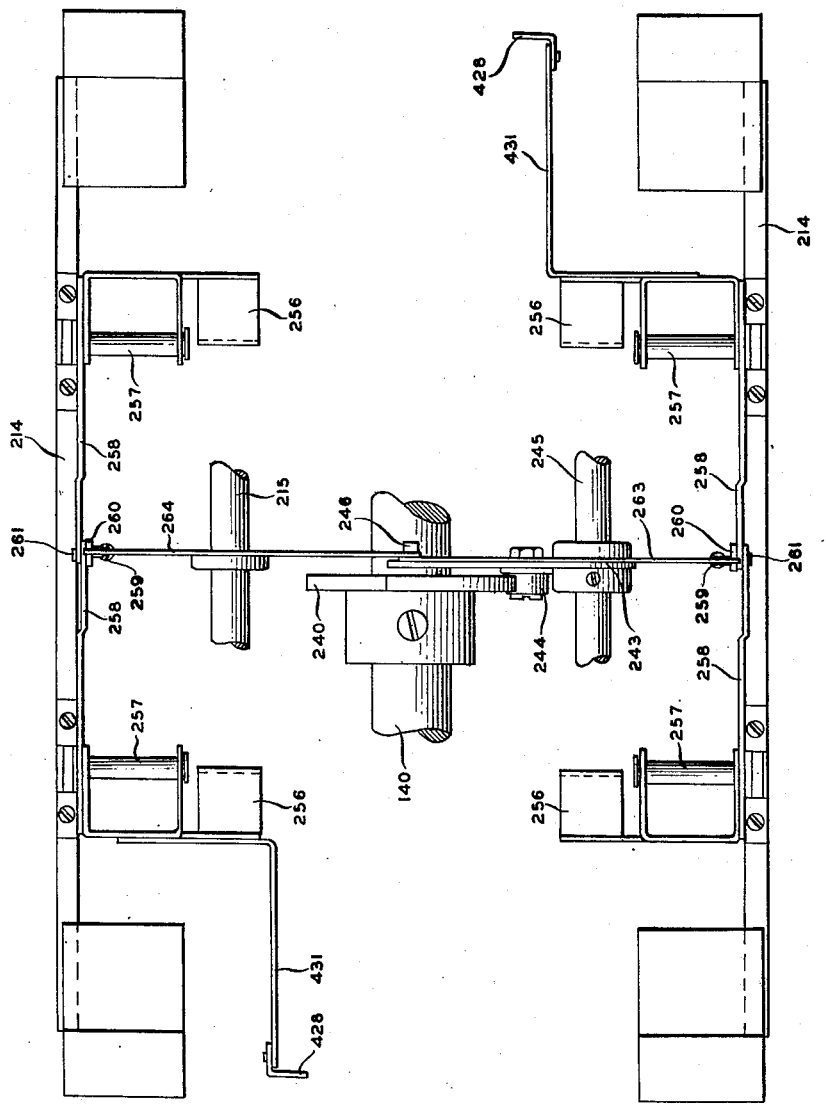

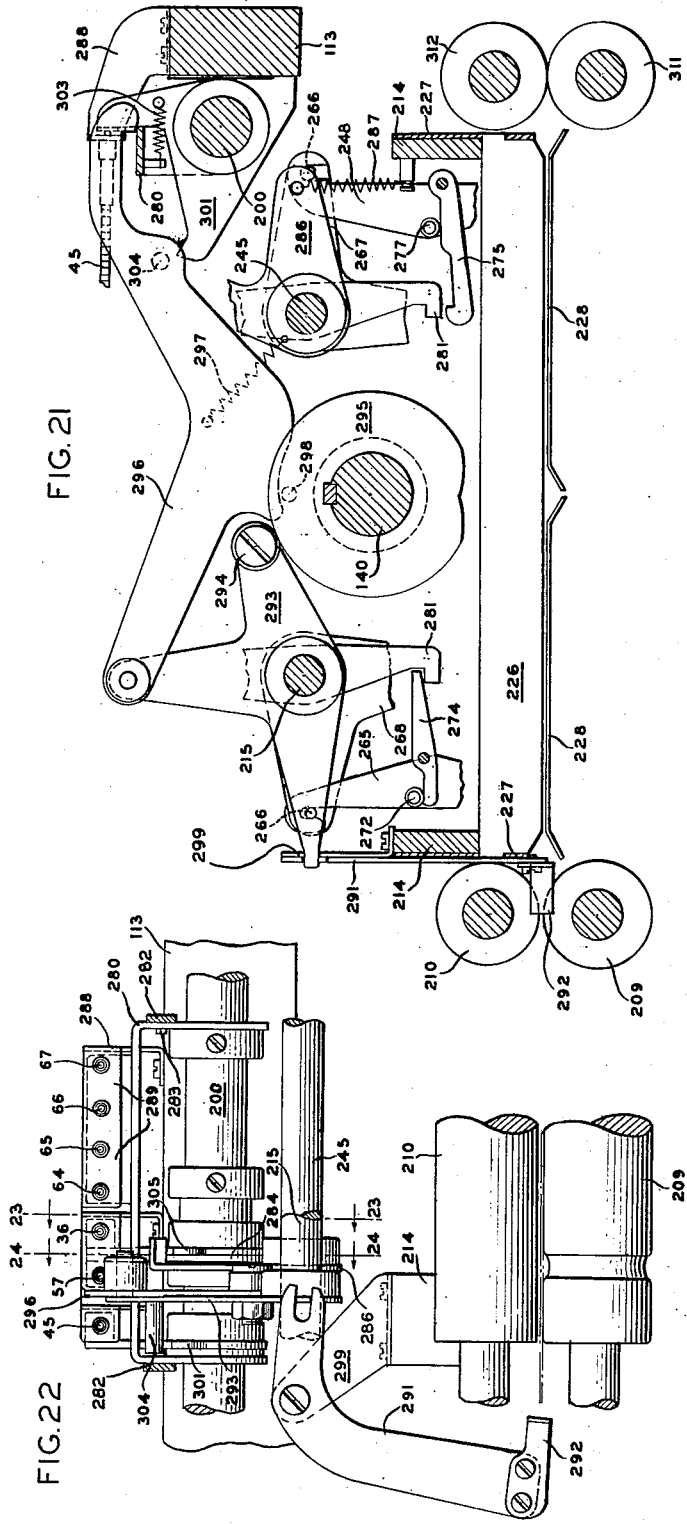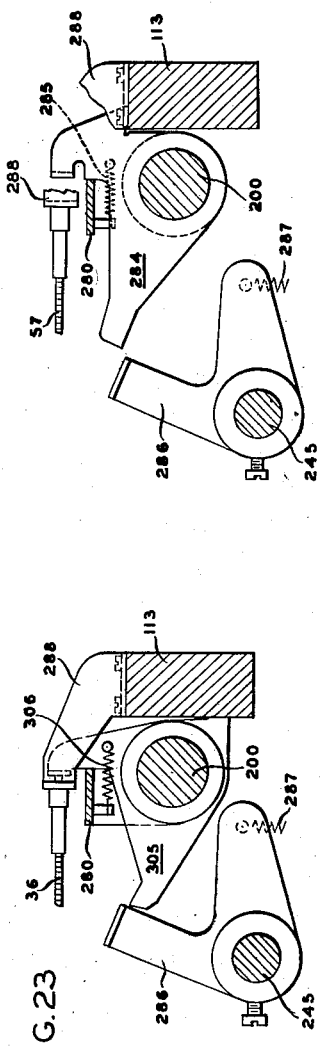

June 15, 1954   J. T. FERRY ET AL   2,681,145
MACHINE FOR SEQUENTIAL FILE MERGING
Filed July 19, 1947   54 Sheets-Sheet 19

INVENTORS
JOHN T. FERRY
RALPH V. BENNETT
OTTO E. KASE
THEODORE B. McGIRR
BY
ATTORNEY

June 15, 1954   J. T. FERRY ET AL   2,681,145
MACHINE FOR SEQUENTIAL FILE MERGING
Filed July 19, 1947   54 Sheets-Sheet 20
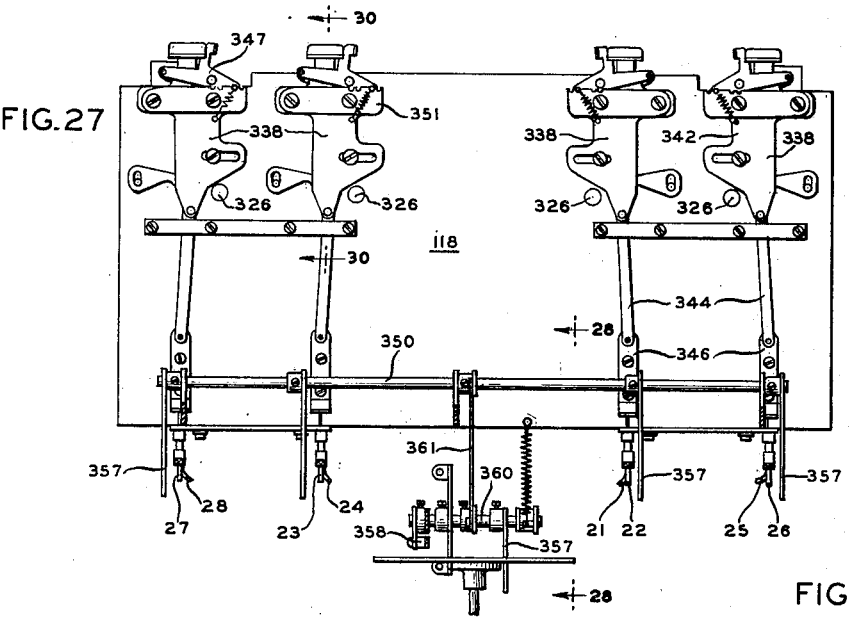
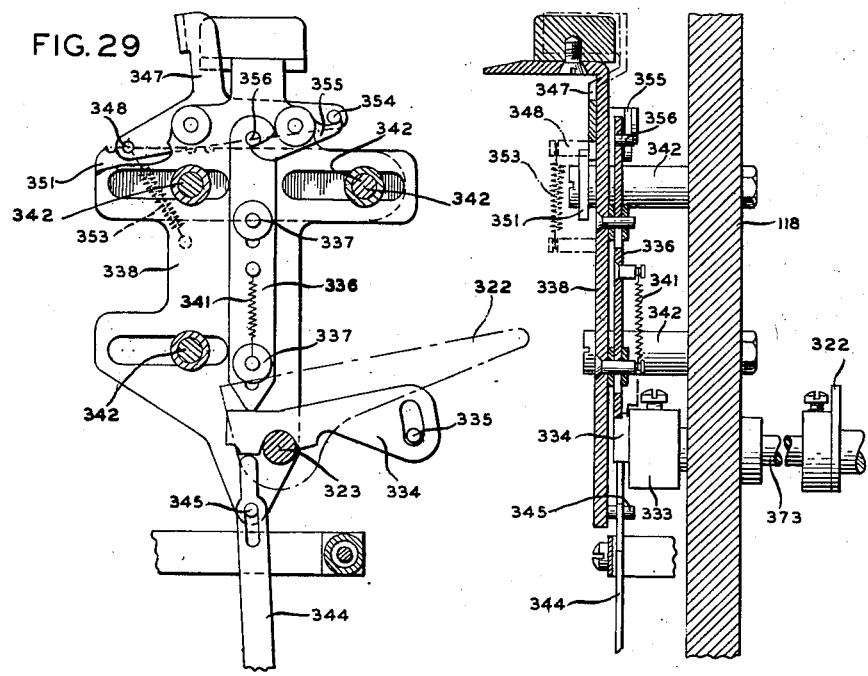
*INVENTORS*
JOHN T. FERRY
RALPH V. BENNETT
OTTO E. KASE
THEODORE B. McGIRR
BY *[signature]*
ATTORNEY

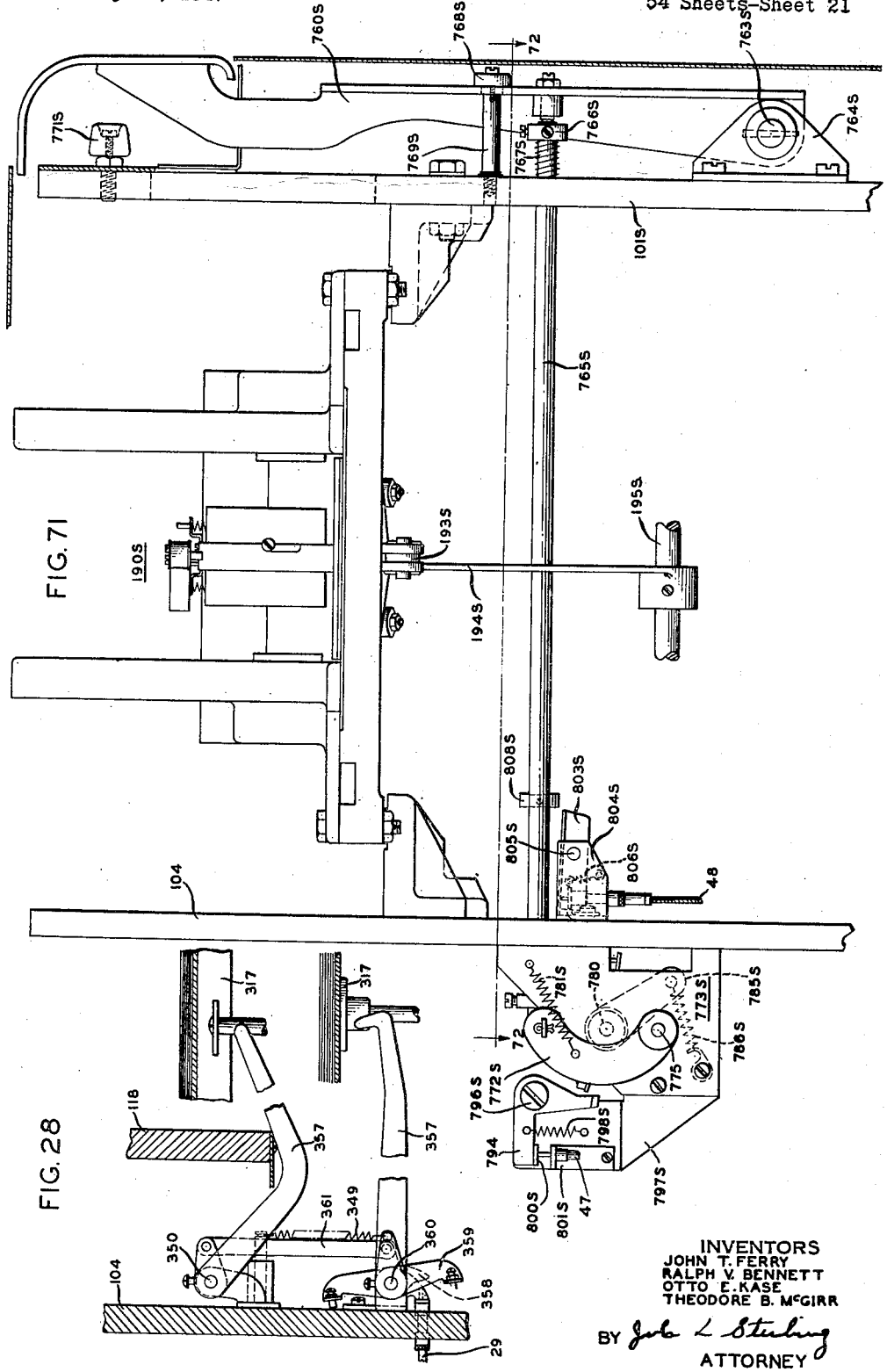

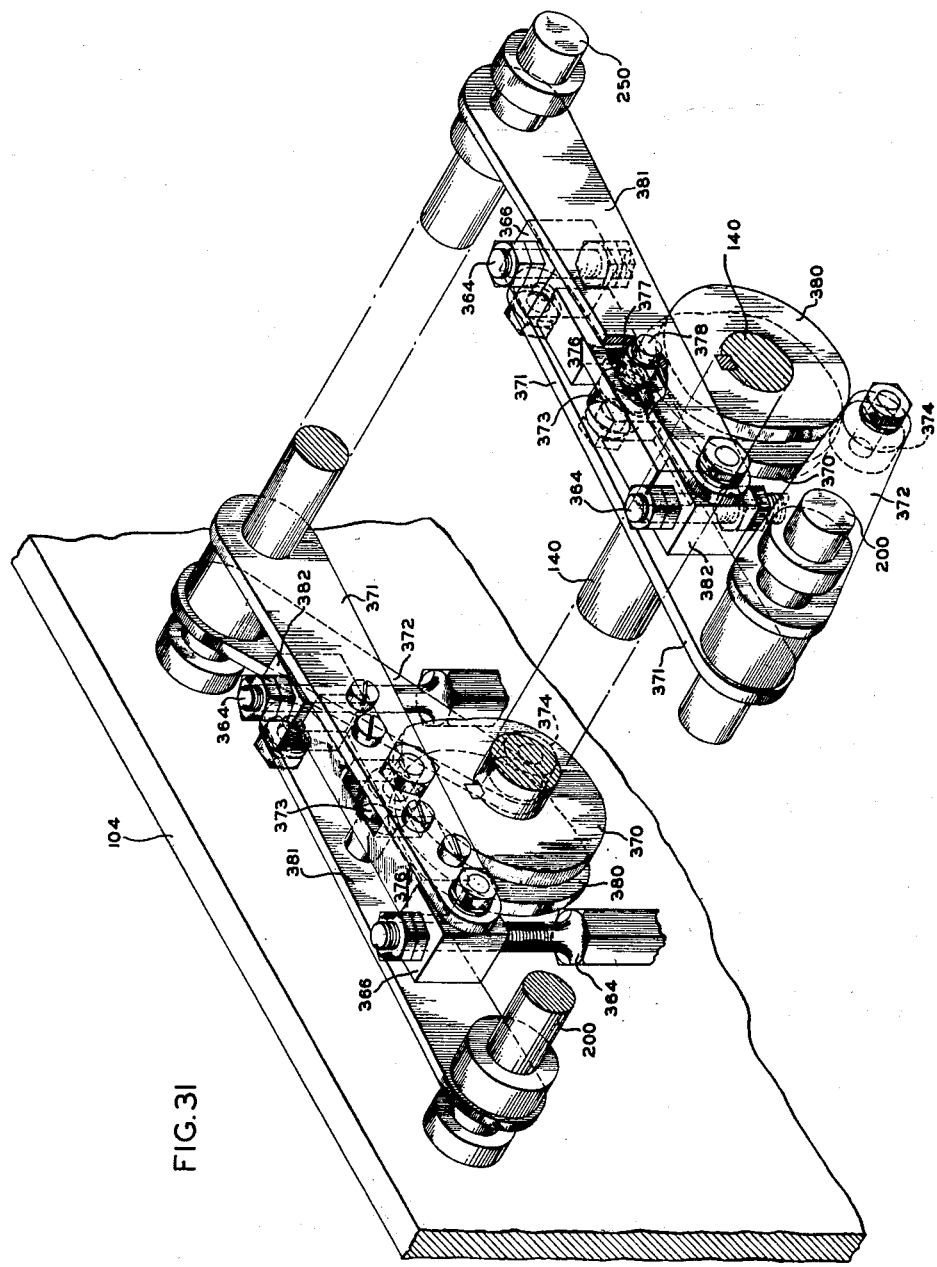

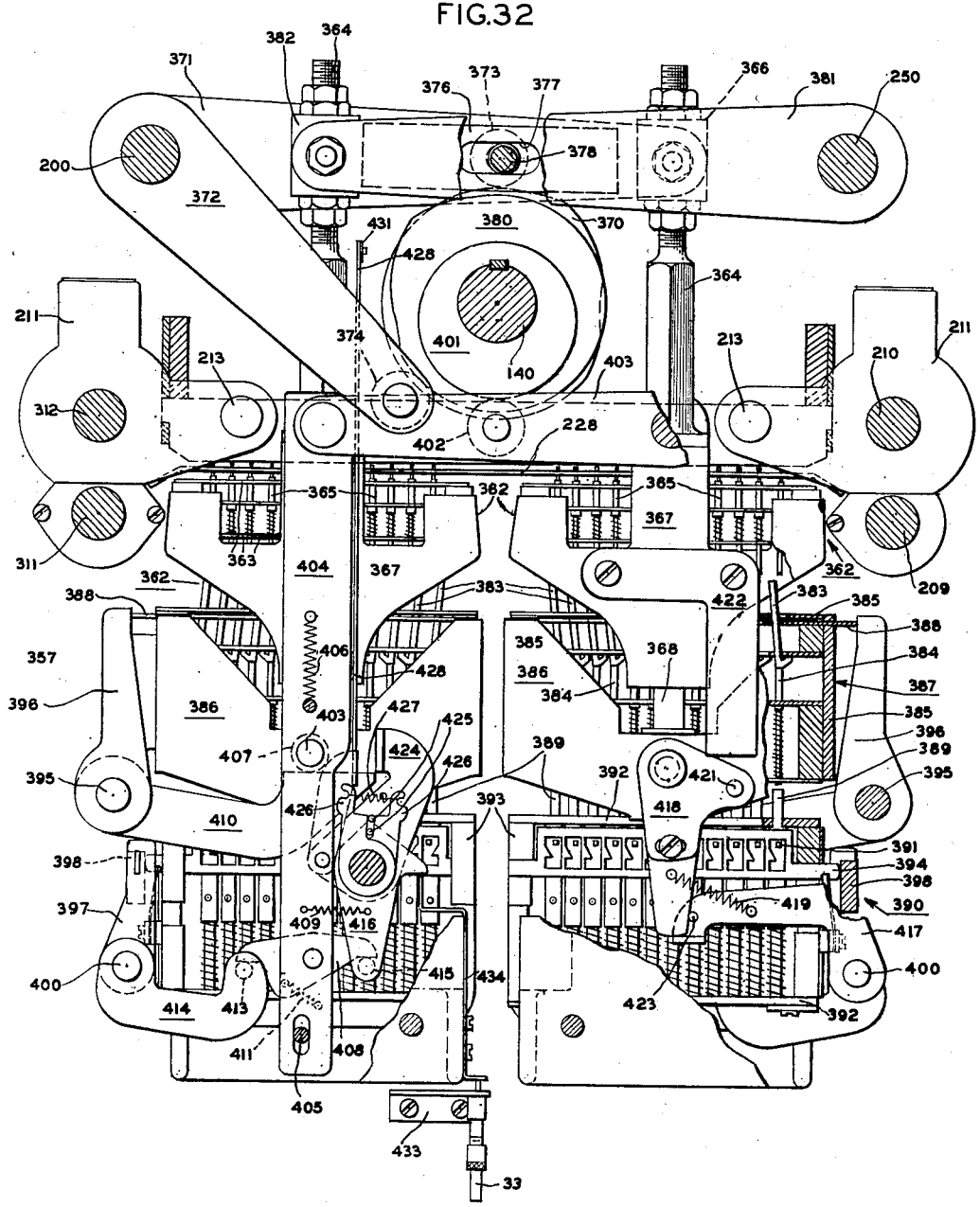

June 15, 1954  J. T. FERRY ET AL  2,681,145
MACHINE FOR SEQUENTIAL FILE MERGING
Filed July 19, 1947  54 Sheets-Sheet 27

INVENTORS
JOHN T. FERRY
RALPH V. BENNETT
OTTO E. KASE
THEODORE B. McGIRR
BY
ATTORNEY

INVENTORS
JOHN T. FERRY
RALPH V. BENNETT
OTTO E. KASE
THEODORE B. McGIRR
BY *J. L. Sterling*
ATTORNEY June 15, 1954  J. T. FERRY ET AL  2,681,145
MACHINE FOR SEQUENTIAL FILE MERGING
Filed July 19, 1947  54 Sheets-Sheet 29
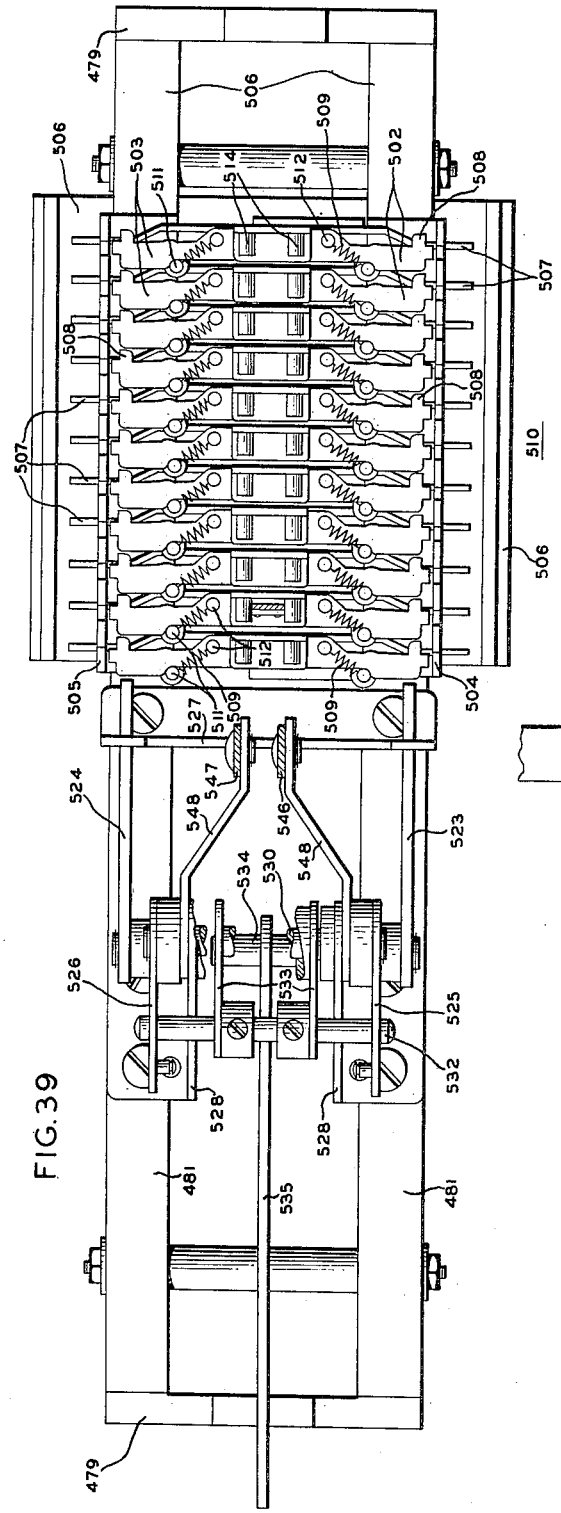
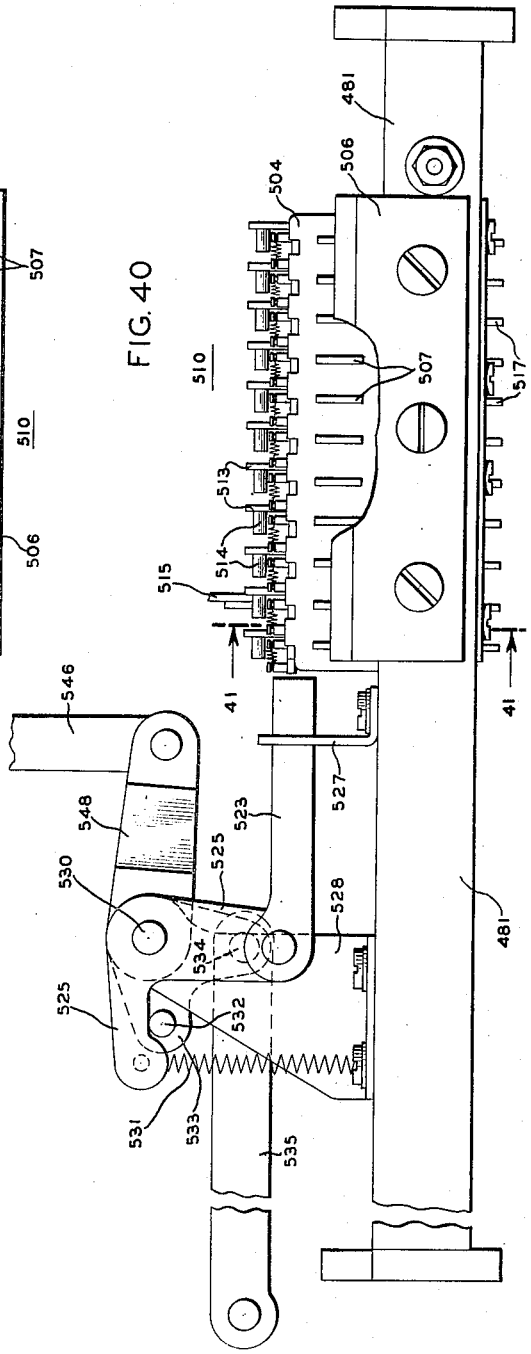
INVENTORS
JOHN T. FERRY
RALPH V. BENNETT
OTTO E. KASE
THEODORE B. McGIRR
BY J. L. Sterling
ATTORNEY June 15, 1954   J. T. FERRY ET AL   2,681,145
MACHINE FOR SEQUENTIAL FILE MERGING
Filed July 19, 1947   54 Sheets-Sheet 30
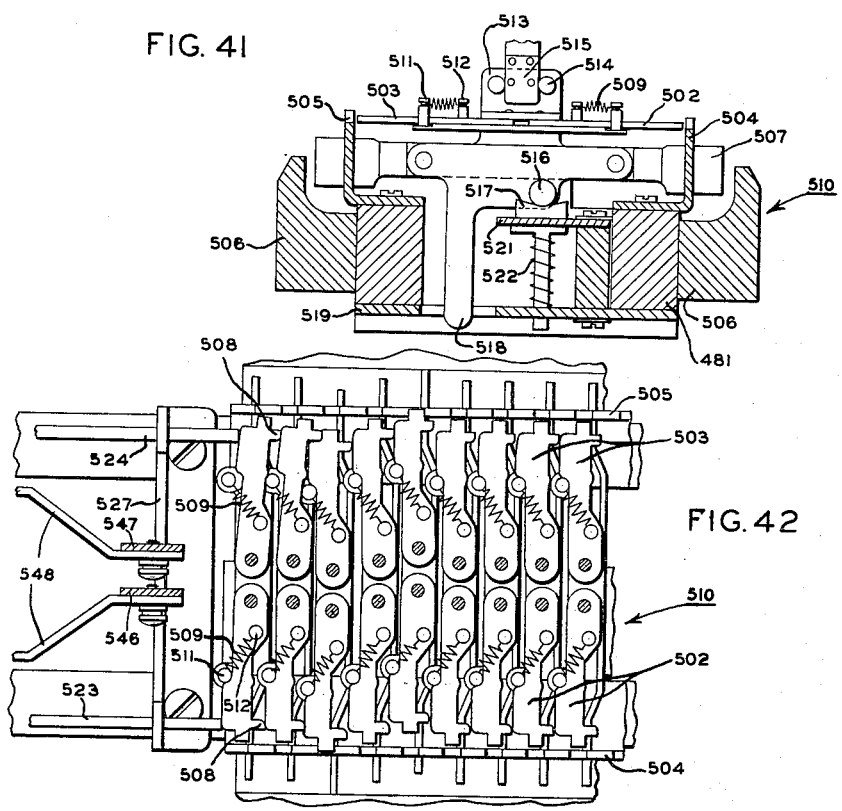
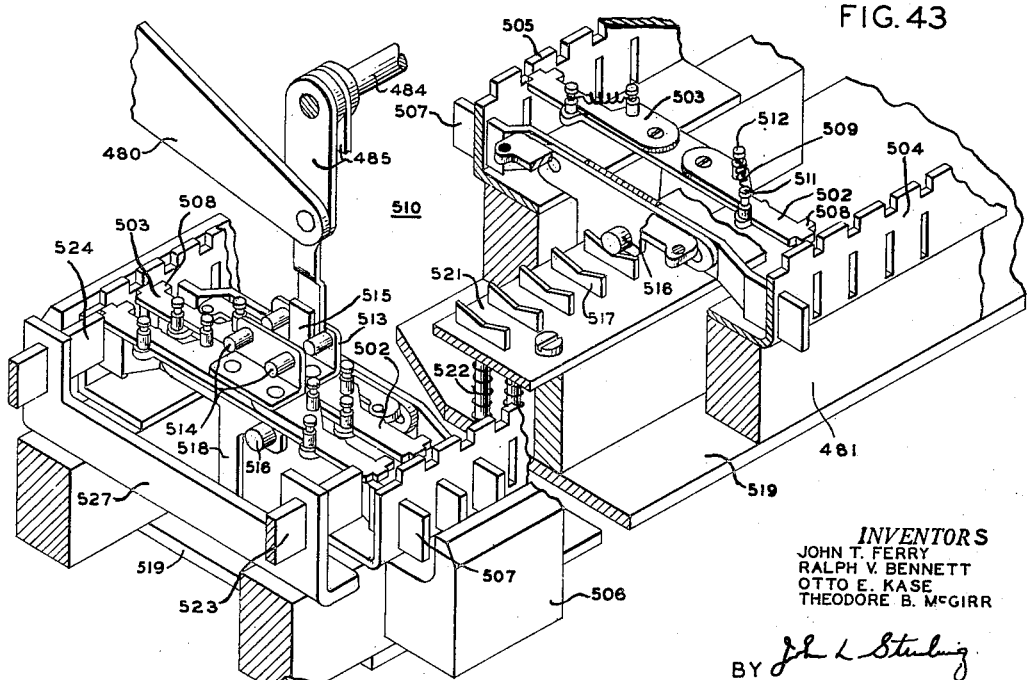
INVENTORS
JOHN T. FERRY
RALPH V. BENNETT
OTTO E. KASE
THEODORE B. McGIRR
BY John L. Sterling
ATTORNEY June 15, 1954
J. T. FERRY ET AL
2,681,145
MACHINE FOR SEQUENTIAL FILE MERGING
Filed July 19, 1947
54 Sheets-Sheet 31
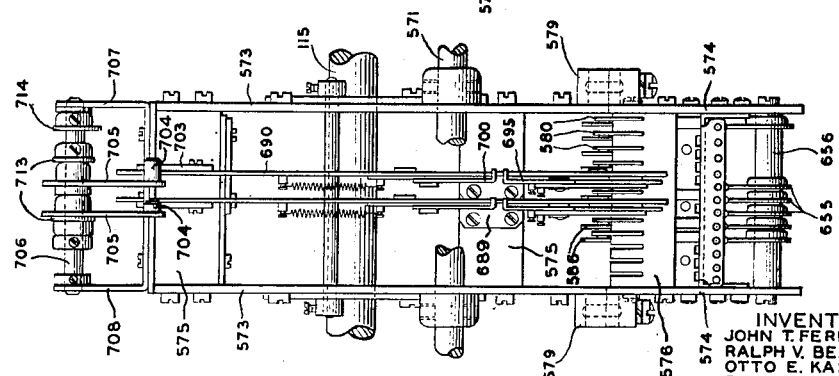
INVENTORS
JOHN T. FERRY
RALPH V. BENNETT
OTTO E. KASE
THEODORE B. McGIRR
BY
ATTORNEY June 15, 1954  J. T. FERRY ET AL  2,681,145
MACHINE FOR SEQUENTIAL FILE MERGING
Filed July 19, 1947  54 Sheets-Sheet 32
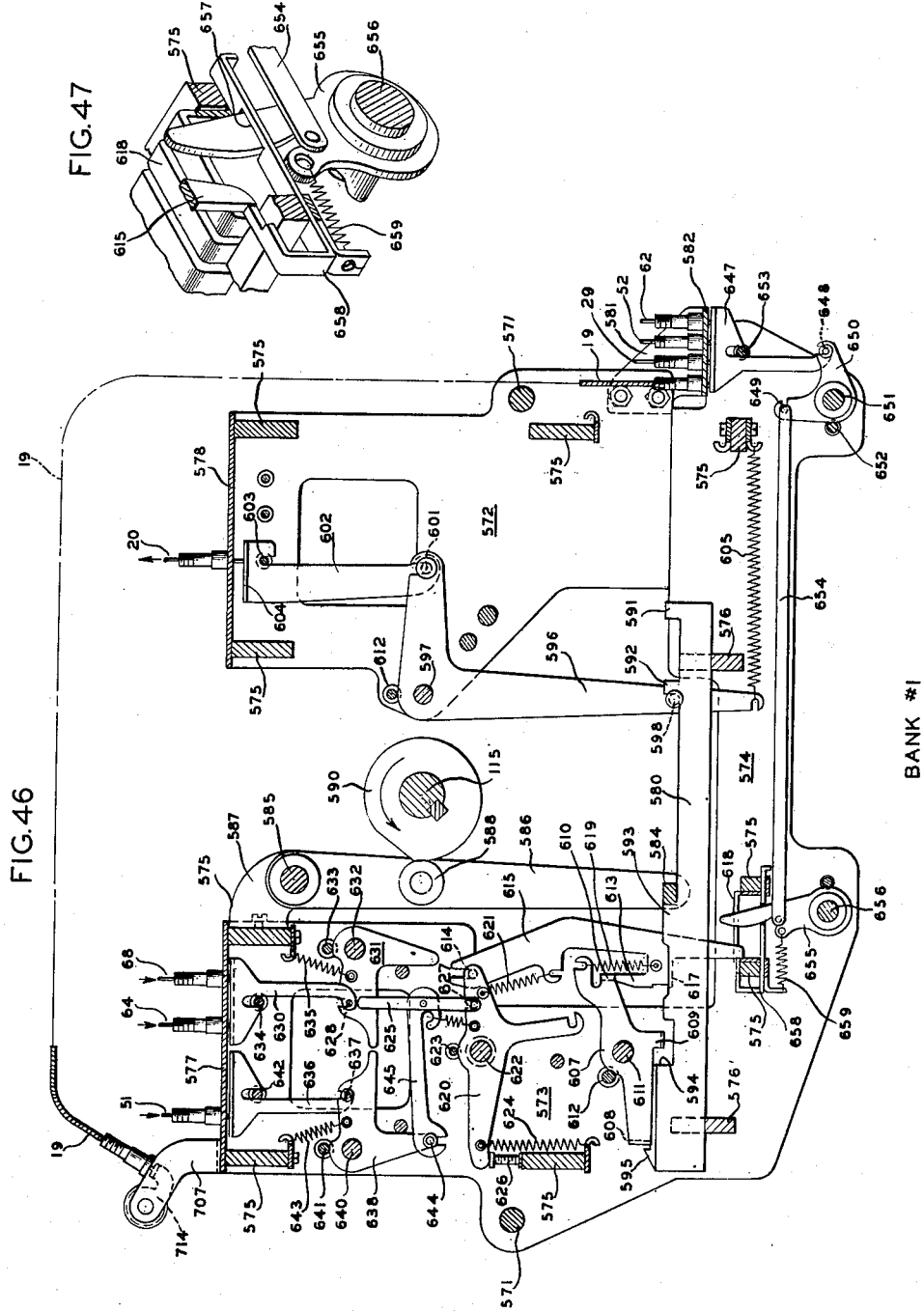
INVENTORS
JOHN T. FERRY
RALPH V. BENNETT
OTTO E. KASE
THEODORE B. McGIRR
BY  *J. L. Sterling*
ATTORNEY June 15, 1954     J. T. FERRY ET AL     2,681,145
MACHINE FOR SEQUENTIAL FILE MERGING
Filed July 19, 1947                                           54 Sheets-Sheet 33
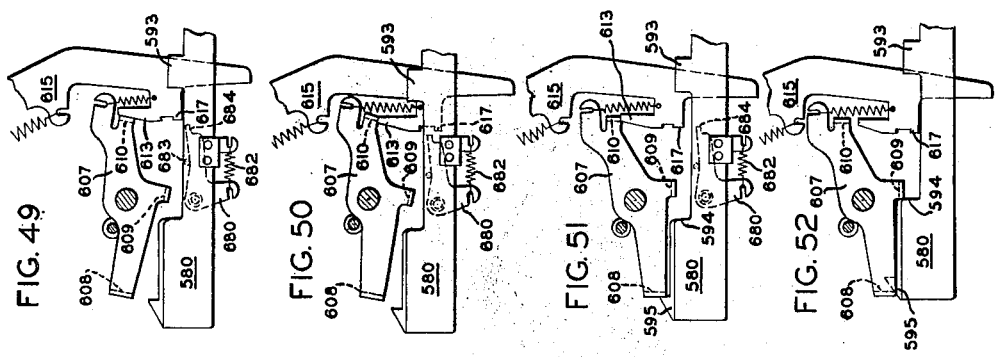
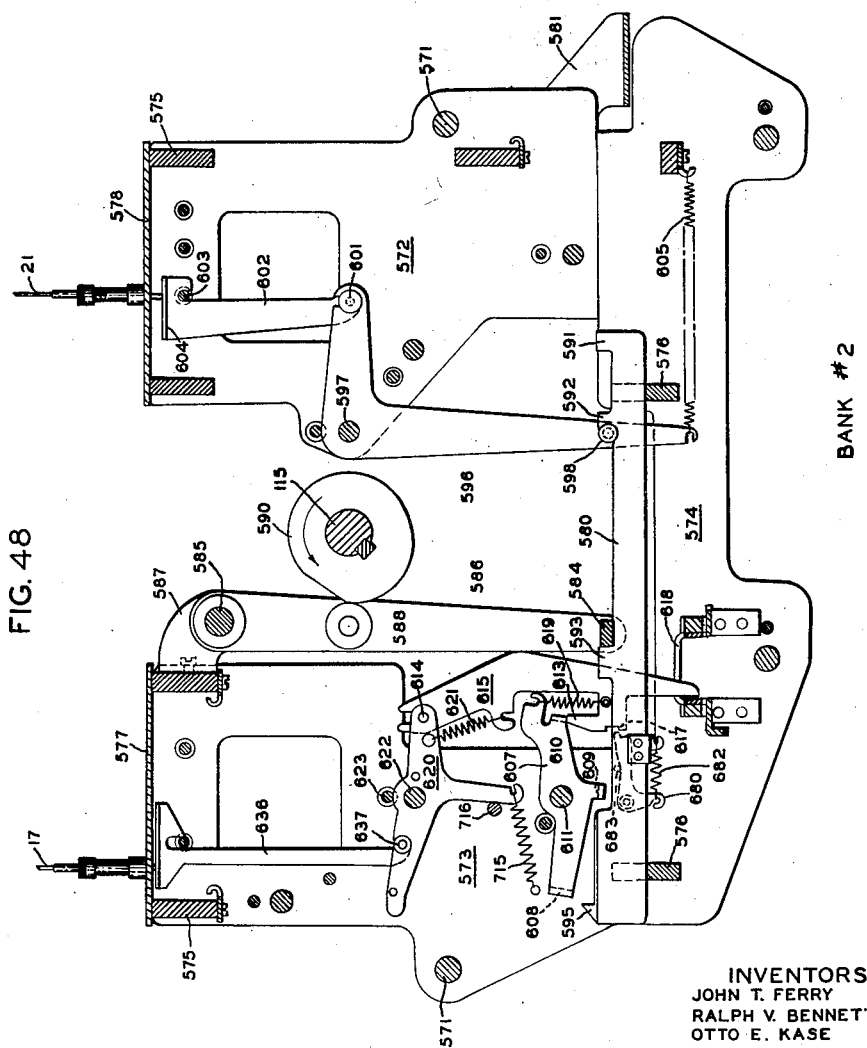
INVENTORS
JOHN T. FERRY
RALPH V. BENNETT
OTTO E. KASE
THEODORE B. McGIRR
BY *J. L. Sterling*
ATTORNEY June 15, 1954   J. T. FERRY ET AL   2,681,145
MACHINE FOR SEQUENTIAL FILE MERGING
Filed July 19, 1947   54 Sheets-Sheet 34

INVENTORS
JOHN T. FERRY
RALPH V. BENNETT
OTTO E. KASE
THEODORE B. McGIRR
BY
ATTORNEY

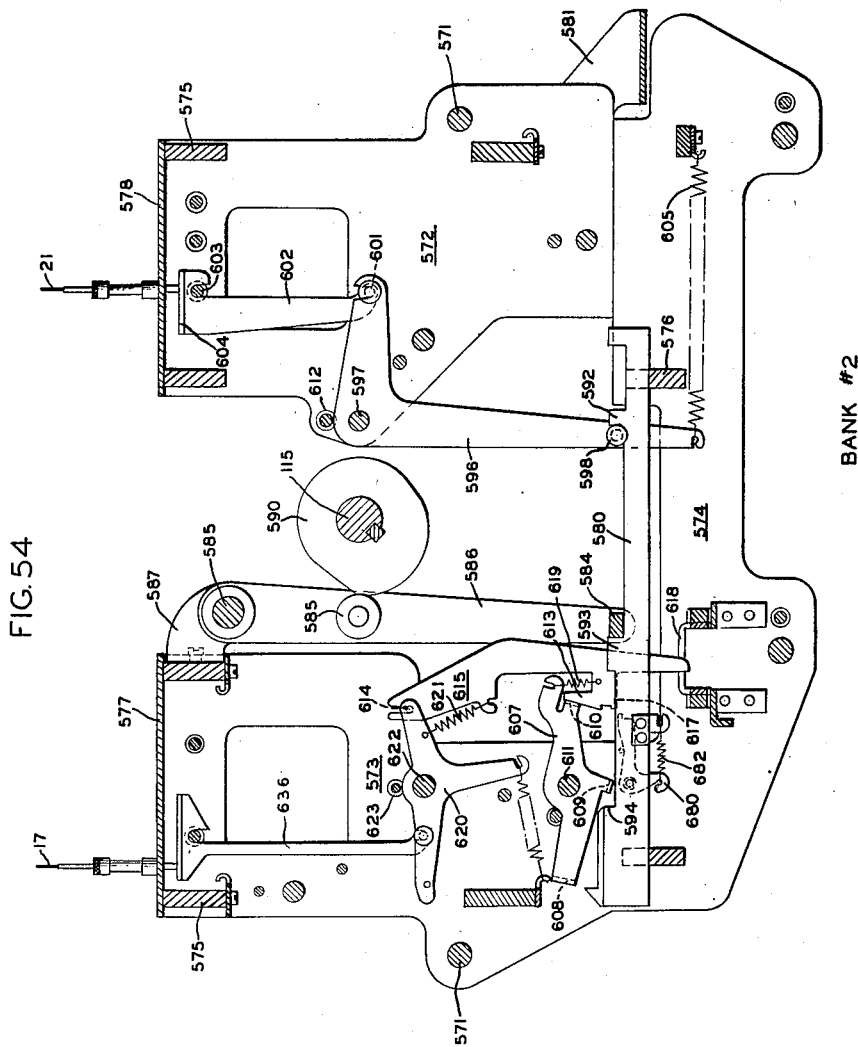

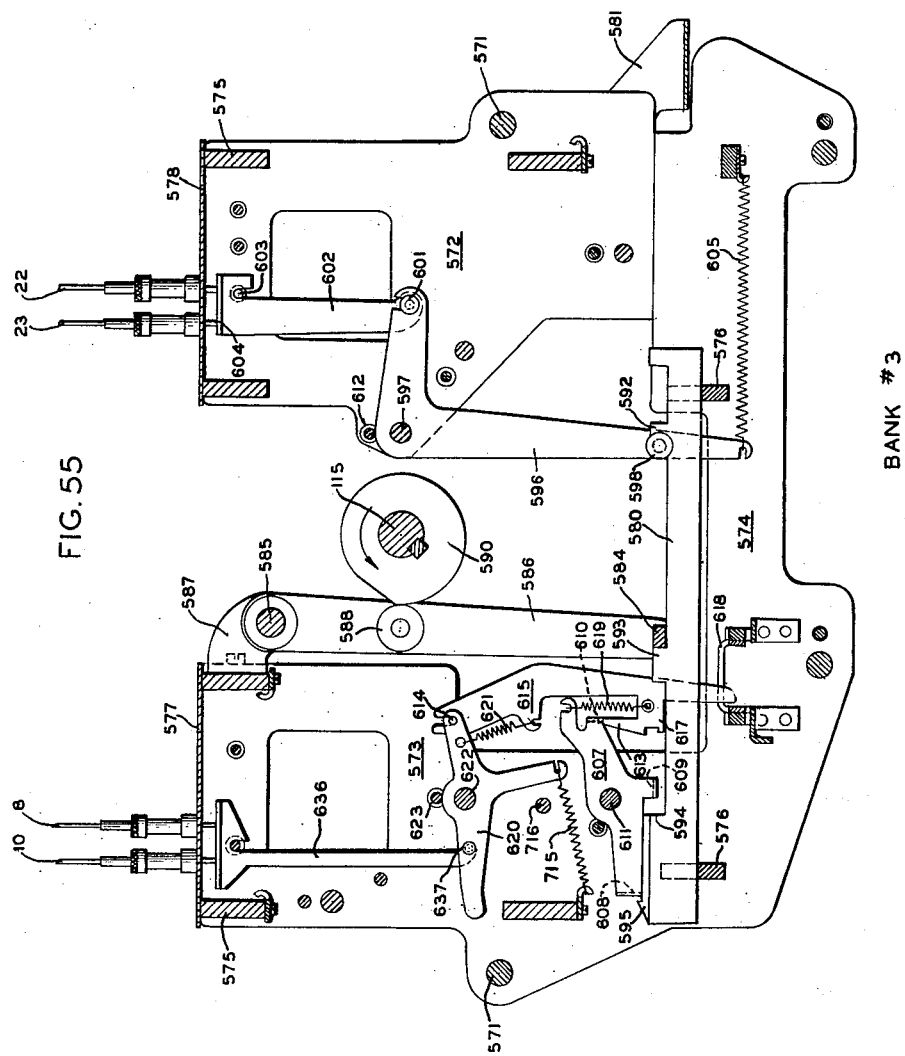

June 15, 1954  J. T. FERRY ET AL  2,681,145
MACHINE FOR SEQUENTIAL FILE MERGING
Filed July 19, 1947  54 Sheets-Sheet 37
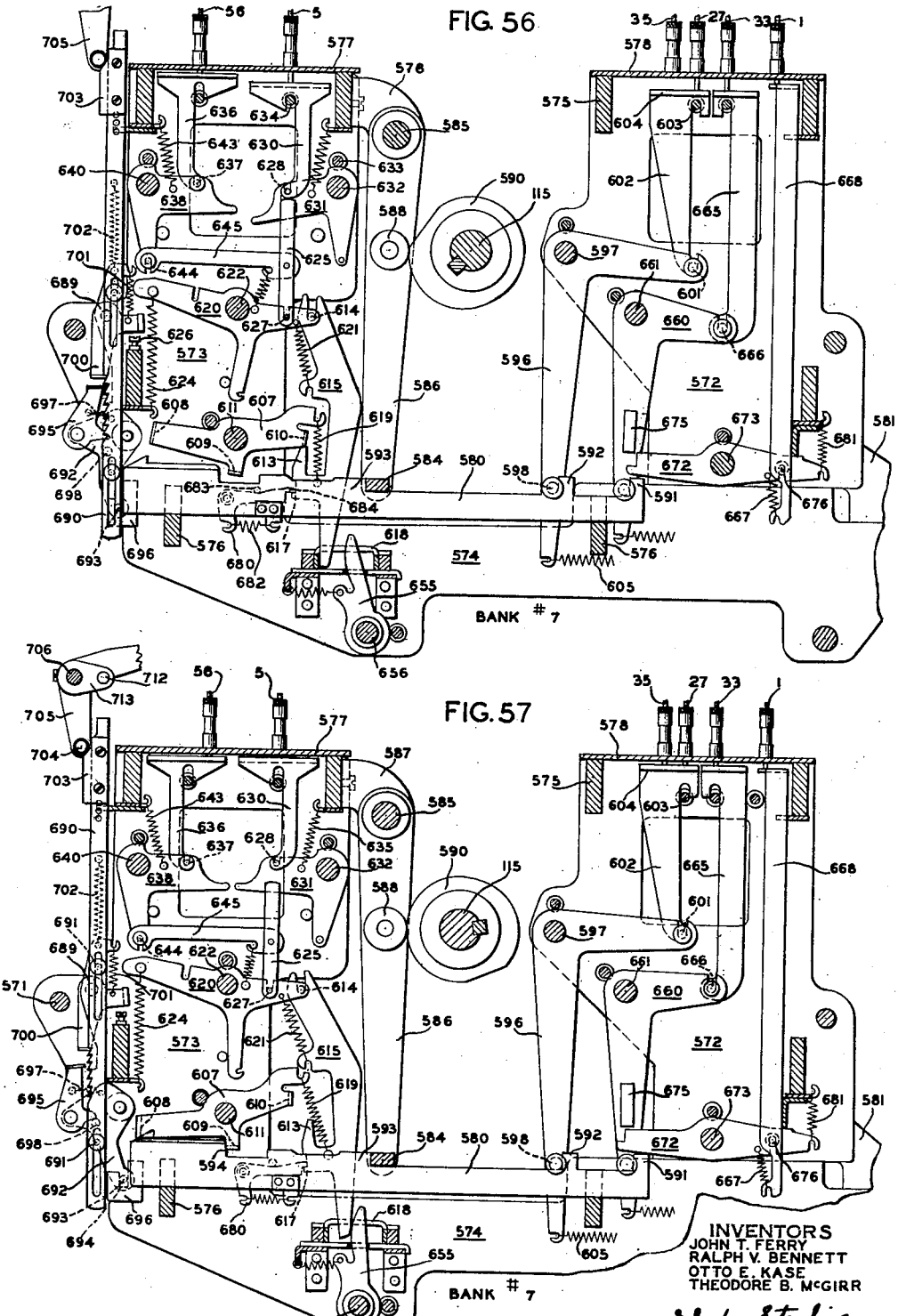

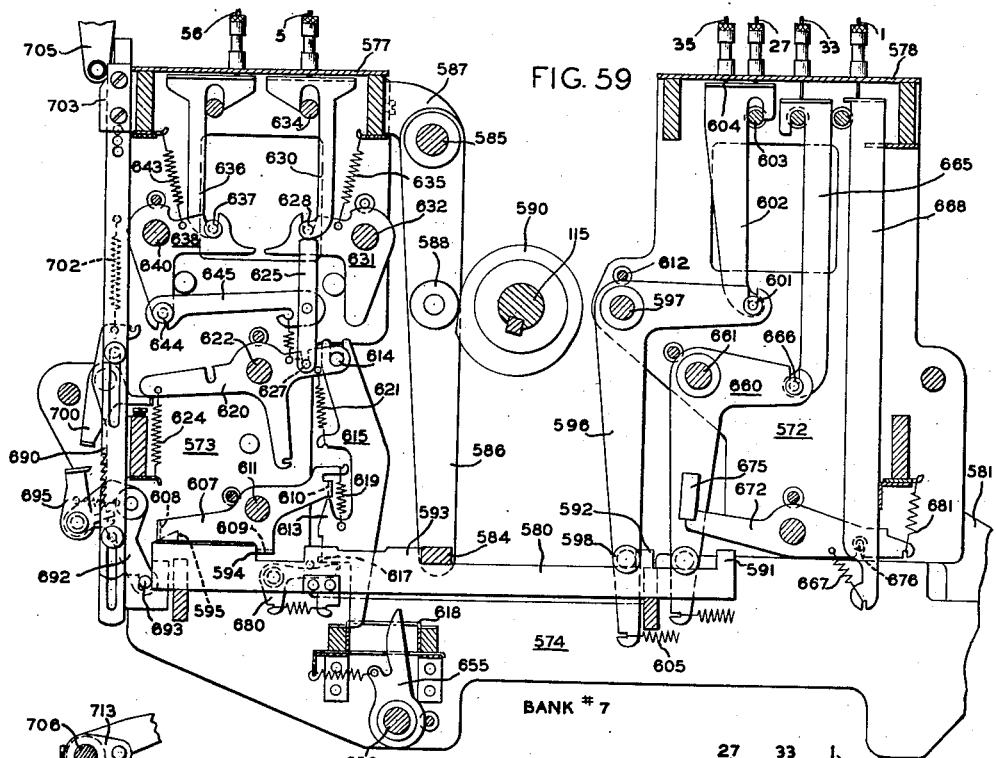

June 15, 1954  J. T. FERRY ET AL  2,681,145
MACHINE FOR SEQUENTIAL FILE MERGING
Filed July 19, 1947  54 Sheets-Sheet 39
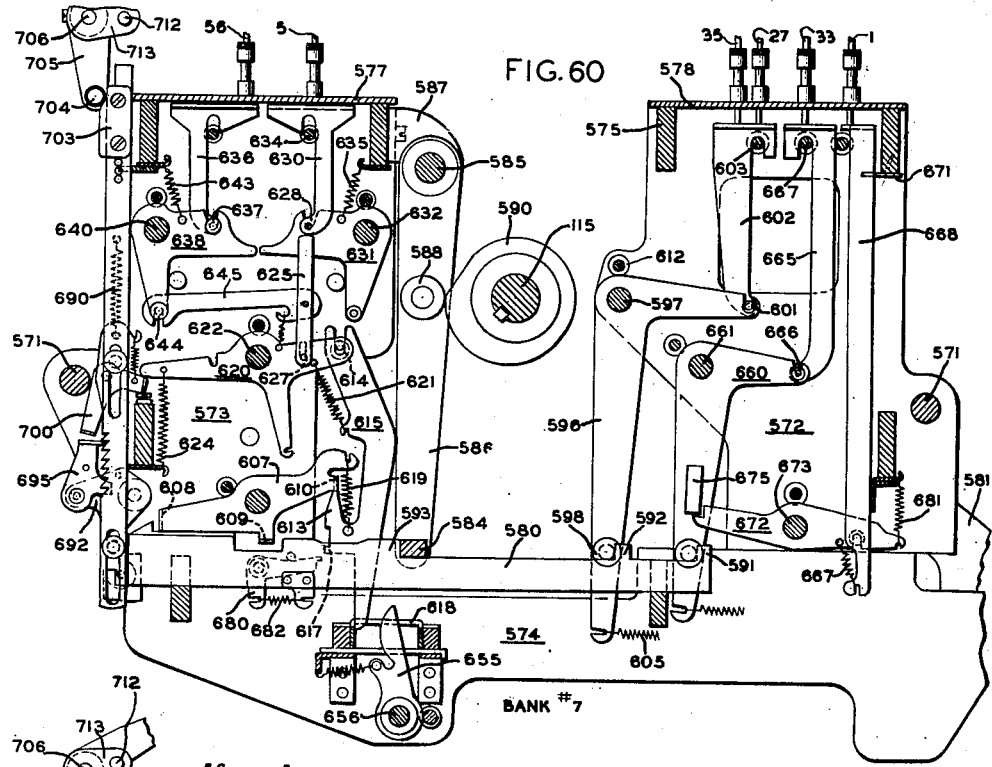
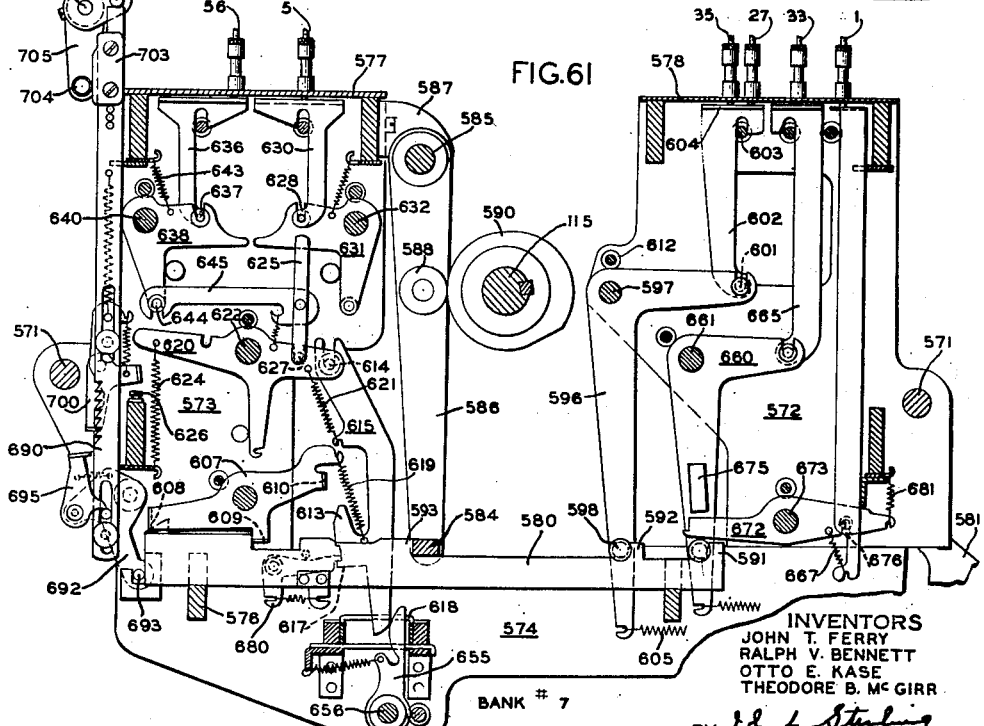
INVENTORS
JOHN T. FERRY
RALPH V. BENNETT
OTTO E. KASE
THEODORE B. McGIRR
BY John L. Sterling
ATTORNEY June 15, 1954  J. T. FERRY ET AL  2,681,145
MACHINE FOR SEQUENTIAL FILE MERGING
Filed July 19, 1947  54 Sheets-Sheet 40

INVENTORS
JOHN T. FERRY
RALPH V. BENNETT
OTTO E. KASE
THEODORE B. McGIRR

BY John L. Sterling
ATTORNEY

June 15, 1954   J. T. FERRY ET AL   2,681,145
MACHINE FOR SEQUENTIAL FILE MERGING
Filed July 19, 1947   54 Sheets-Sheet 41
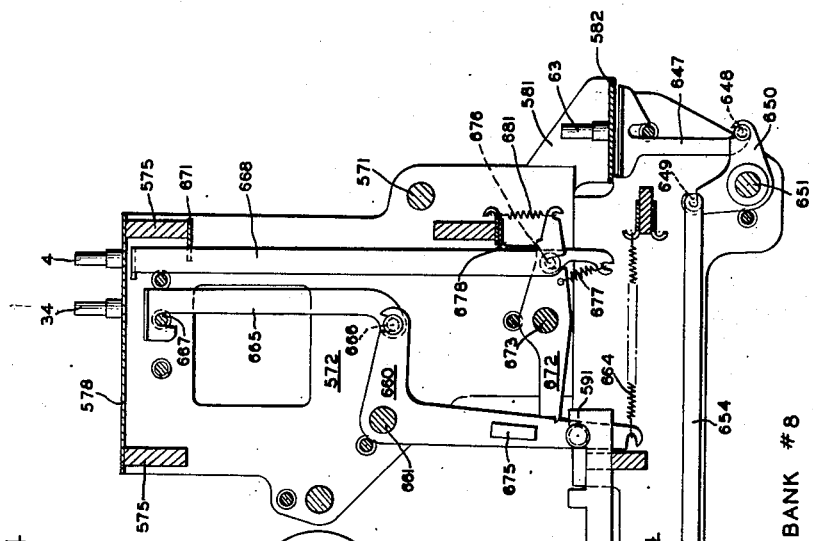
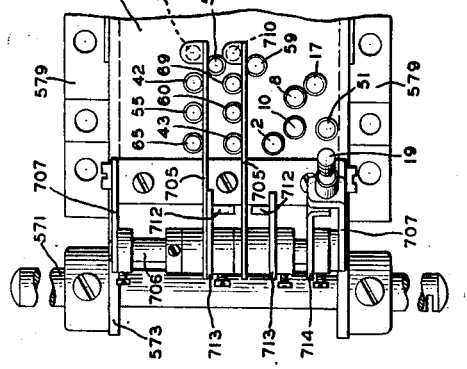
INVENTORS
JOHN T. FERRY
RALPH V. BENNETT
OTTO E. KASE
THEODORE B. McGIRR
BY John L. Sterling
ATTORNEY

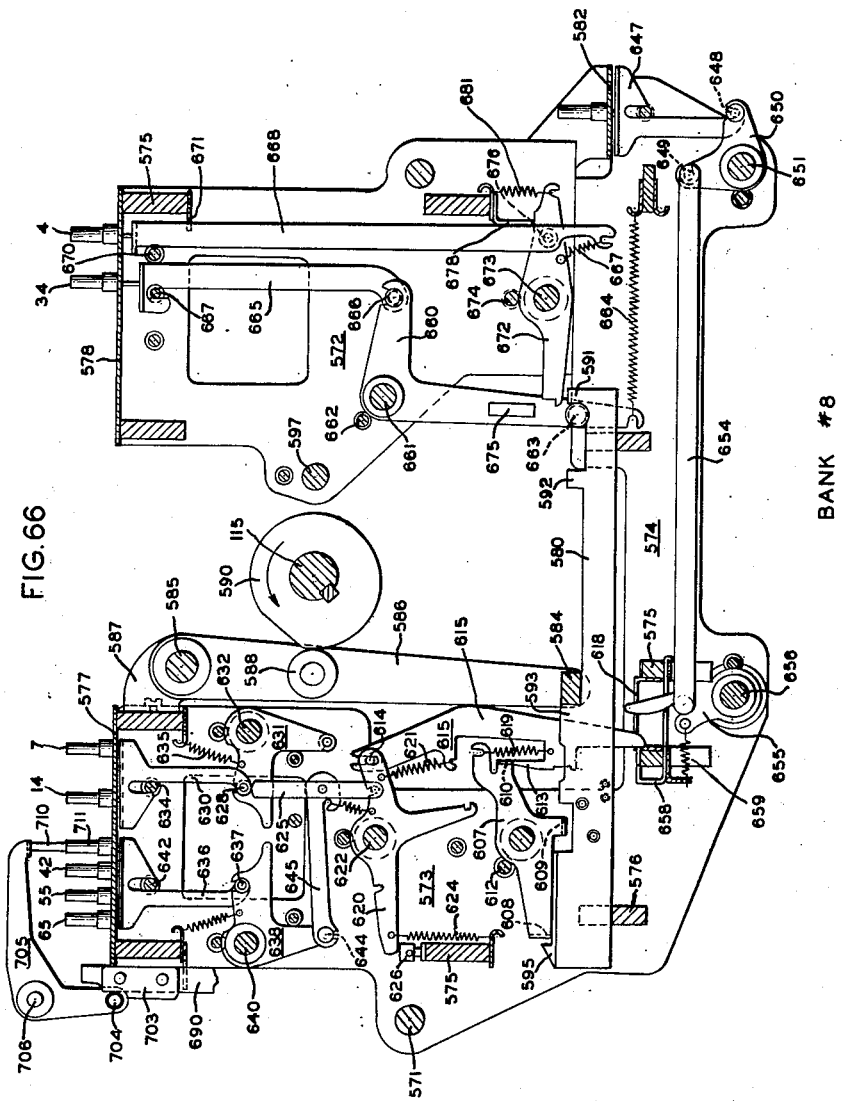

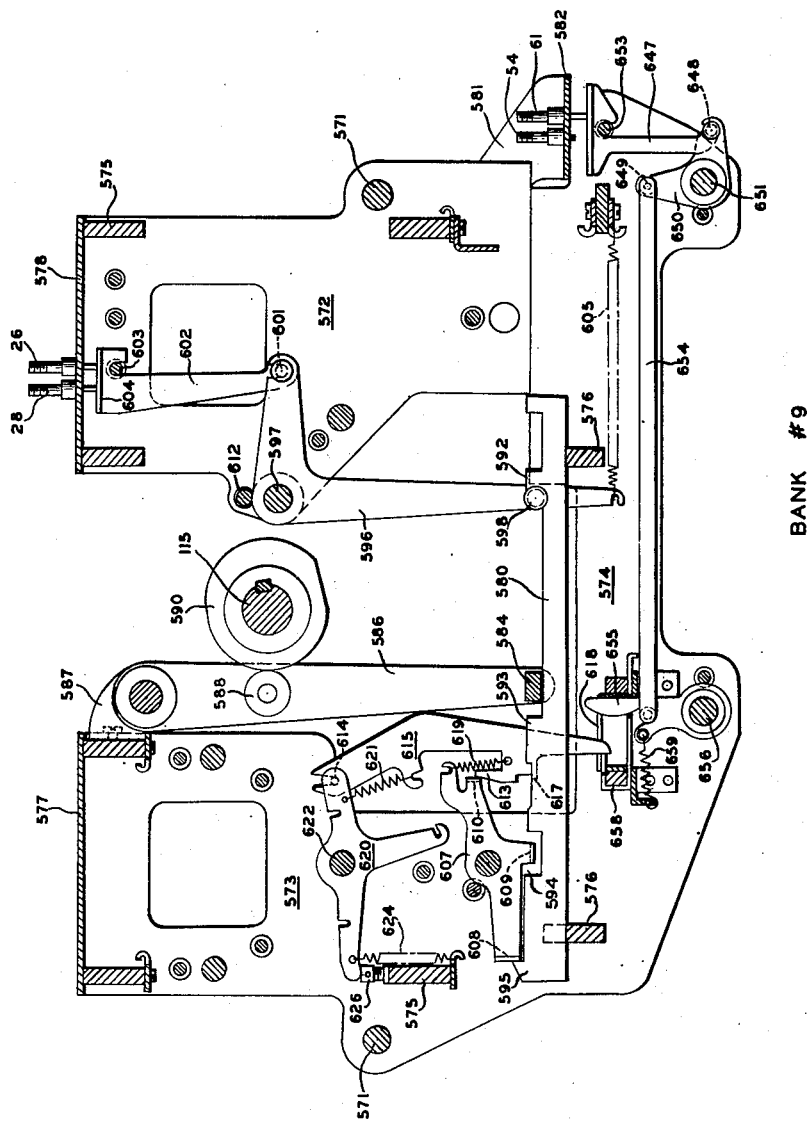

June 15, 1954  J. T. FERRY ET AL  2,681,145
MACHINE FOR SEQUENTIAL FILE MERGING
Filed July 19, 1947  54 Sheets-Sheet 44
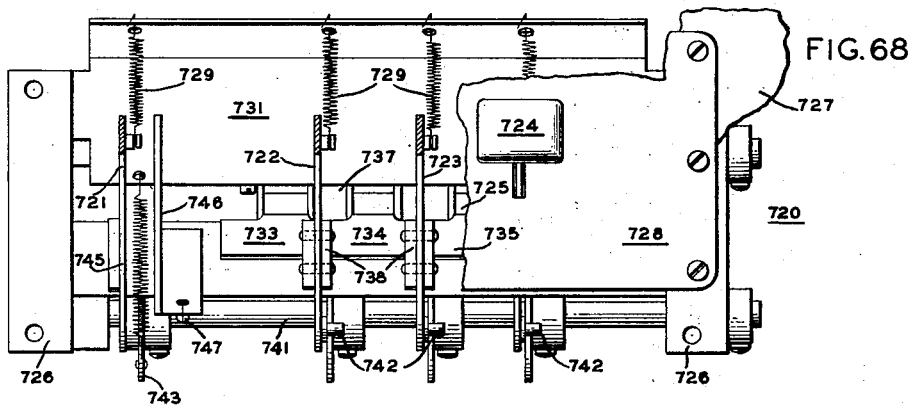
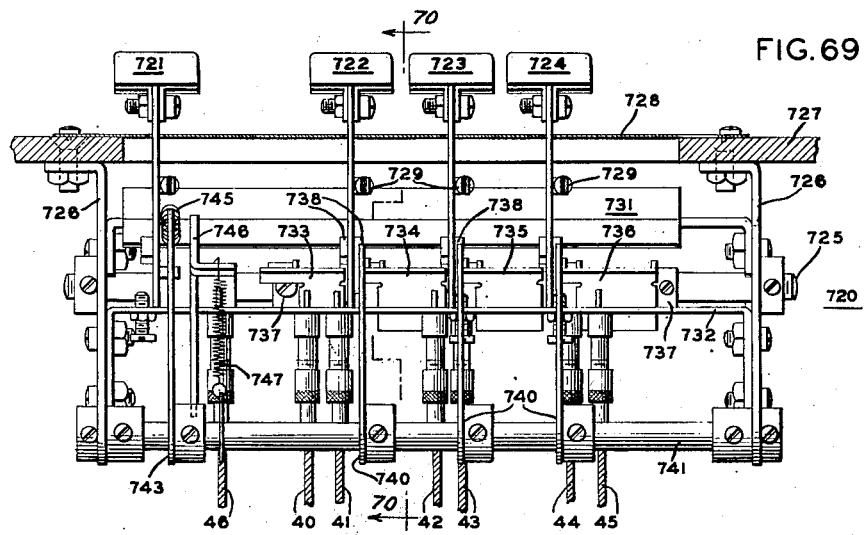
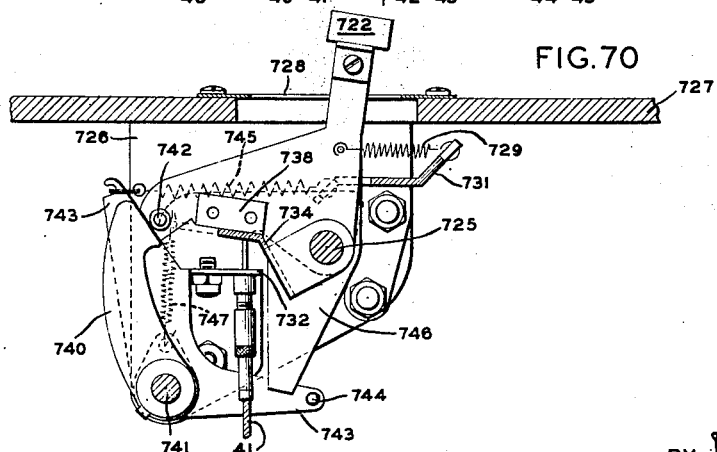
INVENTORS
JOHN T. FERRY
RALPH V. BENNETT
OTTO E. KASE
THEODORE B. McGIRR
BY *J. L. Sterling*
ATTORNEY

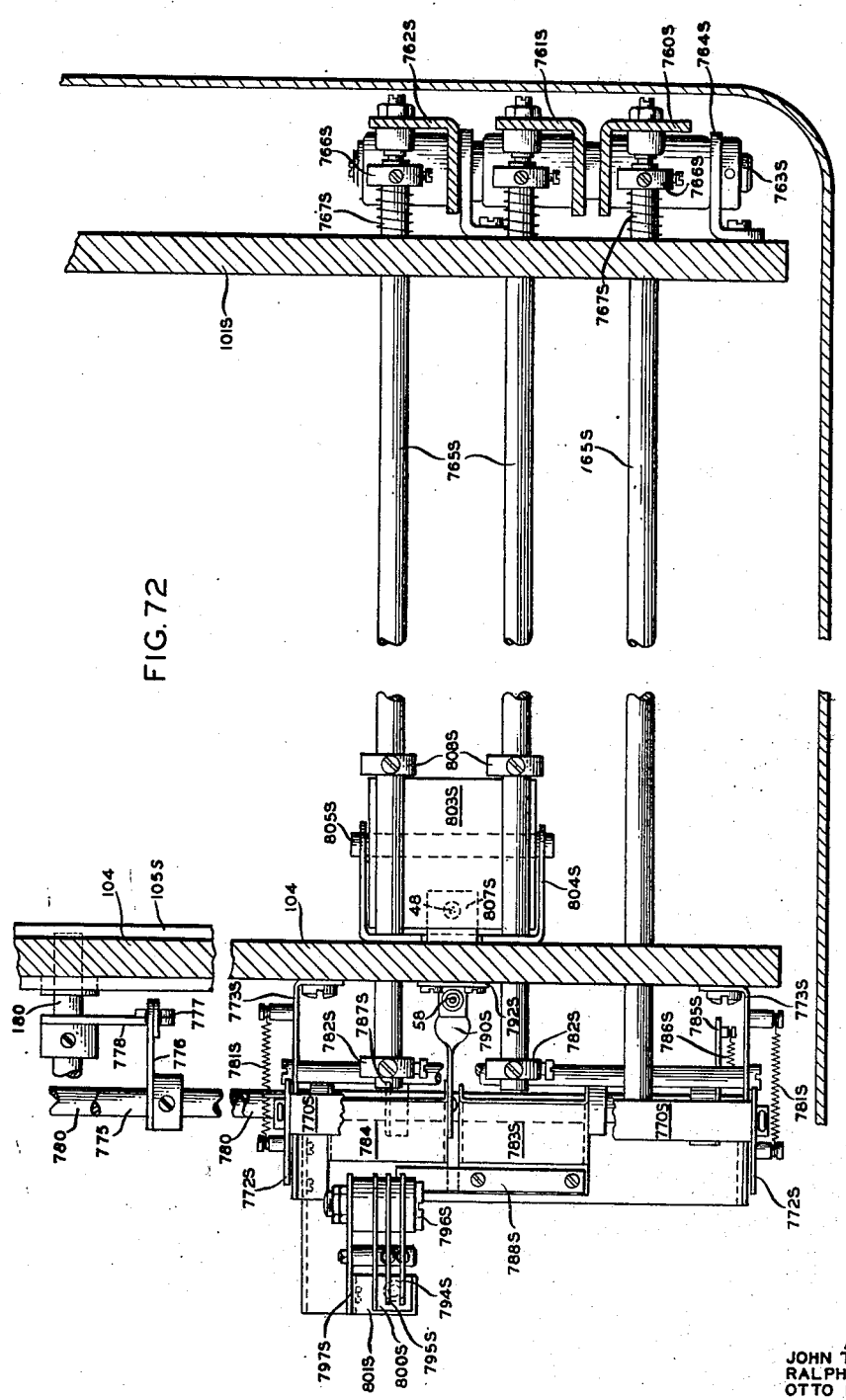

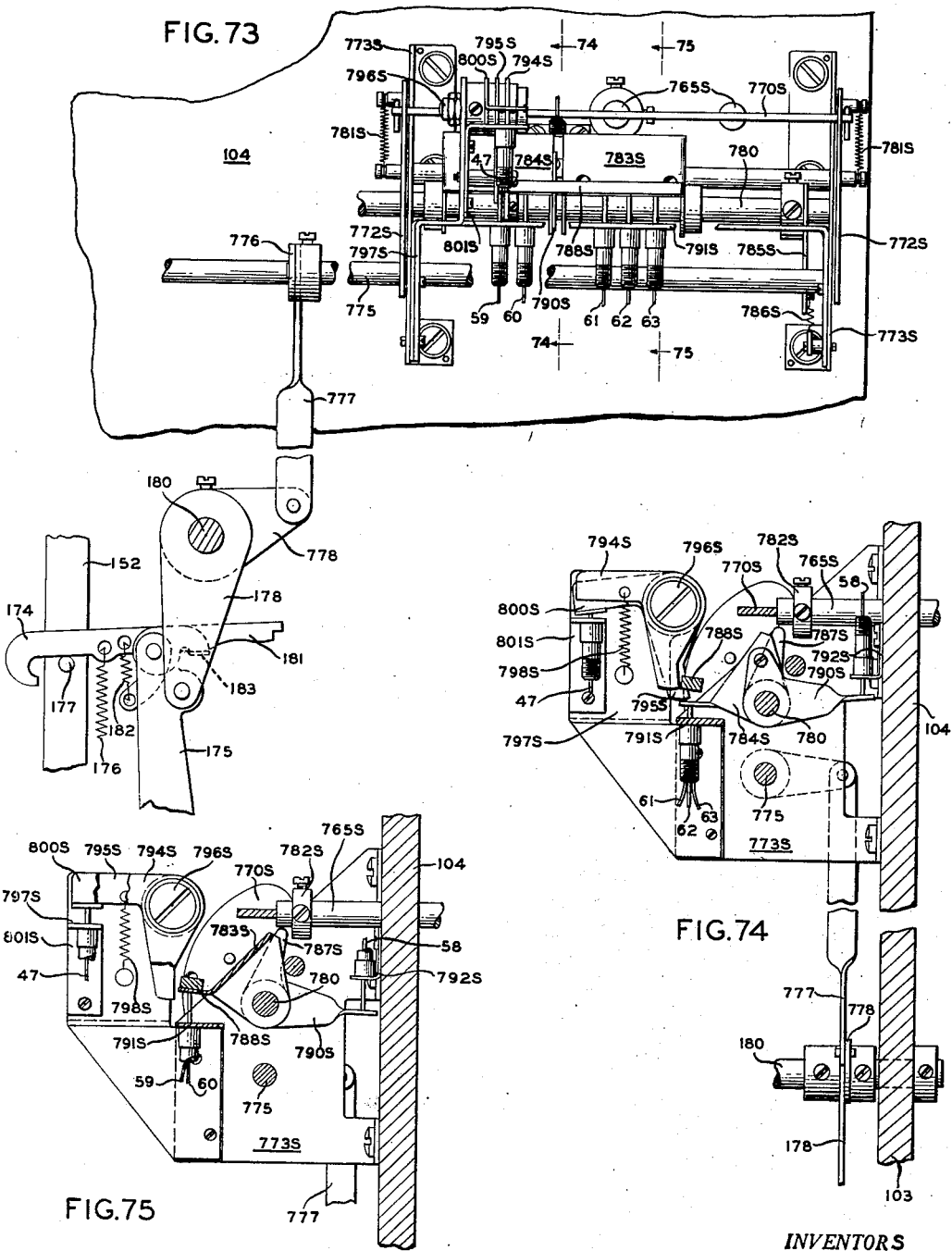

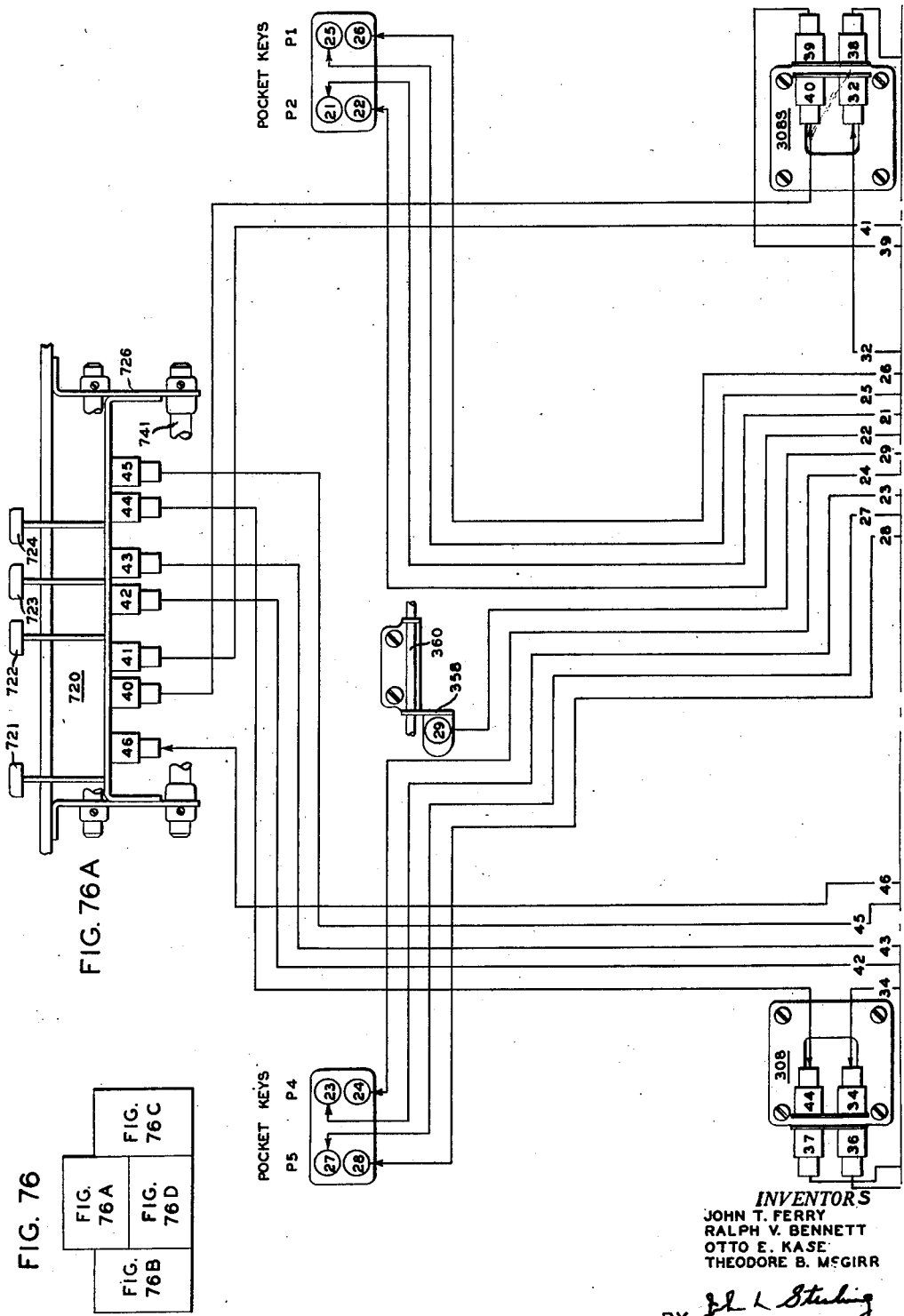

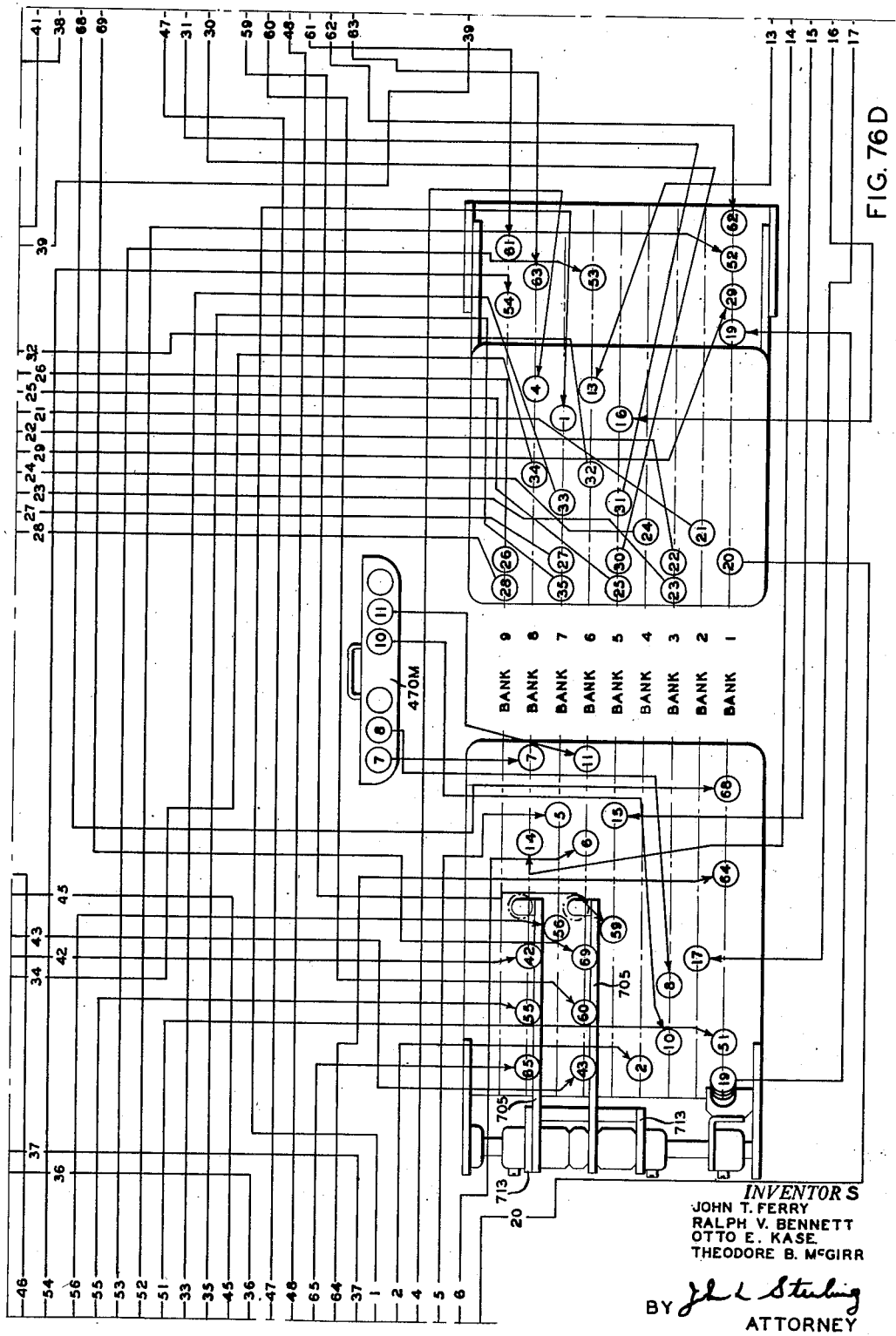

INVENTORS
JOHN T. FERRY
RALPH V. BENNETT
OTTO E. KASE
THEODORE B. McGIRR

BY *John L. Sterling*
ATTORNEY

June 15, 1954          J. T. FERRY ET AL          2,681,145
MACHINE FOR SEQUENTIAL FILE MERGING
Filed July 19, 1947                              54 Sheets-Sheet 52

| SELECTOR UNITS<br>C-CORRECT  BL-BLOCKED<br>E-EQUAL    PH-PRIMARY HIGH<br>W-WRONG   SH-SECONDARY HIGH | | | | | | FILE MERGE SETTING | | | | |
|---|---|---|---|---|---|---|---|---|---|---|
| CONDITIONS | | | SIGNALS TRANSMITTED | | | POCKETS 1,2,4,5 AUTOMATICALLY OPENED | | FEED BLOCKING | | |
| | | | | | | SIGNAL CONTROL UNIT | | PRI SIDE | | SEC SIDE |
| PRI | MERG | SEC | PRI SIDE | MERG | SEC SIDE | BANKS RELEASED | OUTPUTS DELIVERED | CARD | FEED | |
| | | | | | | | | | POCKETS SIGNALLED | |
| 1 | C | PH | C | 1,2 | 7,8 | 16, 17 | 8 | 34 | BL | | |
| 2 | C | PH | E | 1,2 | 7,8 | NONE | 2, 8 | 21, 34 | BL | | 2* |
| 3 | C | PH | W | 1,2 | 7,8 | 13, 14, 15 | 2, 5, 8 | 21, 25, 30, 31, 34 | BL | | 2*<br>1* |
| 4 | C | E | C | 1,2 | NONE | 16, 17 | 3 | 23, 22 | | 4 | 2 |
| 5 | C | E | E | 1,2 | NONE | NONE | 2, 3 | 21, 23, 22 | | 4 | 2* |
| 6 | C | E | W | 1,2 | NONE | 13, 14, 15 | 2, 3, 5, 8 | 21, 23, 22, 25, 30, 31, 34 | BL | 4 | 2*<br>1* |
| 7 | C | SH | C | 1,2 | 10, 11 | 16, 17 | 6 | 32 | | | BL |
| 8 | C | SH | E | 1,2 | 10, 11 | NONE | 2, 6 | 21, 32 | | | 2* | BL |
| 9 | C | SH | W | 1,2 | 10, 11 | 13, 14, 15 | 2, 5, 6, 8 | 21, 25, 30, 31, 34 | BL | | 2*<br>1* |
| 10 | E | PH | C | NONE | 7, 8 | 16, 17 | 4, 8 | 24, 34 | BL | 4* | |
| 11 | E | PH | E | NONE | 7, 8 | NONE | 2, 4, 8 | 21, 24, 34 | BL | 4* | 2* |
| 12 | E | PH | W | NONE | 7, 8 | 13, 14, 15 | 2, 4, 5, 8 | 21, 24, 25, 30, 31, 34 | BL | 4* | 2*<br>1* |
| 13 | E | E | C | NONE | NONE | 16, 17 | 3, 4 | 23, 22, 24 | | 4* | 2 |
| 14 | E | E | E | NONE | NONE | NONE | 2, 3, 4 | 21, 23, 22, 24 | | 4* | 2* |
| 15 | E | E | W | NONE | NONE | 13, 14, 15 | 2, 3, 4, 5, 8 | 21, 23, 22, 24, 25, 30, 31, 34 | BL | 4* | 2*<br>1* |
| 16 | E | SH | C | NONE | 10, 11 | 16, 17 | 4, 6 | 24, 32 | | 4* | | BL |
| 17 | E | SH | E | NONE | 10, 11 | NONE | 2, 4, 6 | 21, 24, 32 | | 4* | 2* | BL |
| 18 | E | SH | W | NONE | 10, 11 | 13, 14, 15 | 2, 4, 5, 6, 8 | 21, 24, 25, 30, 31, 34 | BL | 4* | 2*<br>1* |
| 19 | W | PH | C | 4,5,6 | 7,8 | 16, 17 | 4, 6, 7, 8 | 24, 32, 35, 27, 33 | | 4*<br>5* | | BL |
| 20 | W | PH | E | 4,5,6 | 7,8 | NONE | 2, 4, 6, 7, 8 | 21, 24, 32, 35, 27, 33 | | 4*<br>5* | 2* | BL |
| 21 | W | PH | W | 4,5,6 | 7,8 | 13, 14, 15 | 2, 4, 5, 6, 7, 8 | 21, 24, 25, 30, 31, 35, 27, 33 | | 4*<br>5* | 2*<br>1* |
| 22 | W | E | C | 4,5,6 | NONE | 16, 17 | 3, 4, 6, 7 | 23, 22, 24, 32, 35, 27, 33 | | 4*<br>5* | 2 | BL |
| 23 | W | E | E | 4,5,6 | NONE | NONE | 2, 3, 4, 6, 7 | 21, 23, 22, 24, 32, 35, 27, 33 | | 4*<br>5* | 2* | BL |
| 24 | W | E | W | 4,5,6 | NONE | 13, 14, 15 | 2, 3, 4, 5, 6, 7, 8 | 21, 23, 22, 24, 25, 30, 31, 35, 27, 33 | | 4*<br>5* | 2*<br>1* |
| 25 | W | SH | C | 4,5,6 | 10, 11 | 16, 17 | 4, 6, 7 | 24, 32, 35, 27, 33 | | 4*<br>5* | | BL |
| 26 | W | SH | E | 4,5,6 | 10, 11 | NONE | 2, 4, 6, 7 | 21, 24, 32, 35, 27, 33 | | 4*<br>5* | 2* | BL |
| 27 | W | SH | W | 4,5,6 | 10, 11 | 13, 14, 15 | 2, 4, 5, 6, 7, 8 | 21, 24, 25, 30, 31, 35, 27, 33 | | 4*<br>5* | 2*<br>1* |

* INDICATES A TWO CYCLE OPERATION.
FEED IS BLOCKED WHERE INDICATED BL. EXCEPT ON 1ST. CYCLE FOLLOWING WRONG
SEQUENCE CONDITION ON SAME SIDE.
CARDS FEED TO THE MORE ANTERIOR POCKET INDICATED OR IF NONE INDICATED TO
POCKET 3 EXCEPT WHEN INTERCEPTED BY A 2 ND CYCLE OPERATION OF A MORE
ANTERIOR POCKET GATE.

FIG. 78

INVENTORS
JOHN T. FERRY
RALPH V. BENNETT
OTTO E. KASE
THEODORE B. McGIRR

BY *J. L. Sterling*
ATTORNEY

June 15, 1954

J. T. FERRY ET AL 2,681,145

MACHINE FOR SEQUENTIAL FILE MERGING

Filed July 19, 1947

| | BOTH SIDES SEQUENCE CHECK POCKETS 1,5 AUTOMATICALLY OPEN. POCKETS 2,4 MANUALLY OPEN SIGNALS 42, 43 EFFECTIVE | | | | PRIMARY SEQUENCE CHECK POCKETS 4,5, AUTOMATICALLY OPEN-SIGNALS 40,41,42, EFFECTIVE | | |
|---|---|---|---|---|---|---|---|
| | SIGNAL CONTROL UNIT | | CARD FEED POCKETS SIGNALLED | | SIGNAL CONTROL UNIT | | POCKETS SIGNALLED |
| | BANKS RELEASED | OUTPUTS DELIVERED | PRI SIDE | SEC SIDE | BANKS RELEASED | OUTPUTS DELIVERED | PRI SIDE |
| 1 | NONE | NONE | NONE | NONE | NONE | NONE | NONE |
| 2 | 2 | 21 | NONE | 2 * | 2 | 21 | NONE |
| 3 | 2,5 | 21, 25, 30, 31 | NONE | 2 * / 1 * | 2,5 | 21, 25, 30, 31 | NONE |
| 4 | 3 | 23, 22 | 4 | 2 | 3 | 23, 22 | 4 |
| 5 | 2,3 | 21, 23, 22 | 4 | 2 * | 2,3 | 21, 23, 22 | 4 |
| 6 | 2,3,5 | 21, 23, 22, 25, 30, 31 | 4 | 2 * / 1 * | 2,3,5 | 21, 23, 22, 25, 30, 31 | 4 |
| 7 | NONE | NONE | NONE | NONE | 6 | 32 | NONE |
| 8 | 2 | 21 | NONE | 2 * | 2, 6 | 21, 32 | NONE |
| 9 | 2,5 | 21, 25, 30, 31 | NONE | 2 * / 1 * | 2,5,6 | 21, 25, 30, 31 | NONE |
| 10 | 4 | 24 | 4 * | NONE | 4 | 24 | 4 * |
| 11 | 2,4 | 21, 24 | 4 * | 2 * | 2,4 | 21, 24 | 4 * |
| 12 | 2,4,5 | 21, 24, 25, 30, 31 | 4 * | 2 * / 1 * | 2,4,5 | 21, 24, 25, 30, 31 | 4 * |
| 13 | 3,4 | 23, 22, 24 | 4 * | 2 | 3,4 | 23, 22, 24 | 4 * |
| 14 | 2,3,4 | 21, 23, 22, 24 | 4 * | 2 * | 2,3,4 | 21, 23, 22, 24 | 4 * |
| 15 | 2,3, 4,5 | 21, 23, 22, 24, 25, 30, 31 | 4 * | 2 * / 1 * | 2,3, 4,5 | 21, 23, 22, 24, 25, 30, 31 | 4 * |
| 16 | 4 | 24 | 4 * | NONE | 4,6 | 24, 32 | 4 * |
| 17 | 2,4 | 21, 24 | 4 * | 2 * | 2,4,6 | 21, 24, 32 | 4 * |
| 18 | 2,4,5 | 21, 24, 25, 30, 31 | 4 * | 2 * / 1 * | 2,4, 5, 6 | 21, 24, 25, 30, 31 | 4 * |
| 19 | 4,7 | 24, 35, 27, 33 | 4 * / 5 * | NONE | 4, 6, 7 | 24, 32, 35, 27, 33 | 4 * / 5 * |
| 20 | 2,4,7 | 21, 24, 35, 27, 33 | 4 * / 5 * | 2 * | 2,4, 6, 7 | 21, 24, 32, 35, 27, 33 | 4 * / 5 * |
| 21 | 2,4, 5,7 | 21, 24, 25, 30, 31, 35, 27, 33 | 4 * / 5 * | 2 * / 1 * | 2,4, 5, 6, 7 | 21, 24, 25, 30, 31, 35, 27, 33 | 4 * / 5 * |
| 22 | 3,4,7 | 23, 22, 24, 35, 27, 33 | 4 * / 5 * | 2 | 3,4, 6, 7 | 23, 22, 24, 32, 35, 27, 33 | 4 * / 5 * |
| 23 | 2,3, 4,7 | 21, 23, 22, 24, 35, 27, 33 | 4 * / 5 * | 2 * | 2, 3, 4, 6, 7 | 21, 23, 22, 24, 32, 35, 27, 33 | 4 * / 5 * |
| 24 | 2,3, 4, 5, 7 | 21, 23, 22, 24, 25, 30, 31, 35, 27, 33 | 4 * / 5 * | 2 * / 1 * | 2,3, 4, 5, 6, 7 | 21, 23, 22, 24, 25, 30, 31, 35, 27, 33 | 4 * / 5 * |
| 25 | 4,7 | 24, 35, 27, 33 | 4 * / 5 * | NONE | 4, 6, 7 | 24, 32, 35, 27, 33 | 4 * / 5 * |
| 26 | 2,4,7 | 21, 24, 35, 27, 33 | 4 * / 5 * | 2 * | 2,4, 6, 7 | 21, 24, 32, 35, 27, 33 | 4 * / 5 * |
| 27 | 2, 4, 5, 7 | 21, 24, 25, 30, 31, 35, 27, 33 | 4 * / 5 * | 2 * / 1 * | 2, 4, 5, 6, 7 | 21, 24, 25, 30, 31, 35, 27, 33 | 4 * / 5 * |
| | CARDS FEED FROM BOTH SIDES TO THE MORE ANTERIOR POCKETS INDICATED OR IF NONE IN- DICATED TO POCKETS #2 AND #4 RESPECTIVELY EXCEPT WHEN INTERCEPTED BY A 2 ND CYCLE OPERATION OF A MORE ANTERIOR POCKET GATE. | | | | CARDS FEED FROM ONE SIDE TO THE MORE ANTERIOR POCKET INDICATED OR IF NONE IN- DICATED TO POCKET #3 EXCEPT WHEN INTER- CEPTED BY A 2 ND CYCLE OPERATION OF A MORE ANTERIOR POCKET GATE. | | |

FIG. 78A

INVENTORS
JOHN T. FERRY
RALPH V. BENNETT
OTTO E. KASE
THEODORE B. McGIRR

BY John L. Sterling

ATTORNEY

FIG. 79

CLEAR OPERATION CHART

| BOWDEN WIRE | TYPE OF SIGNAL | FUNCTION OF SIGNAL |
|---|---|---|
| 52 | LOWER INPUT TO BANK #1 | STOPS MACHINE AFTER 1 CYCLE. |
| 53 | LOWER INPUT TO BANK #6 | BLOCKS SECONDARY CARD FEED EXCEPT WHEN SECONDARY SEQUENCE DETECTOR INDICATES WRONG SEQUENCE. |
| 54 | LOWER INPUT TO BANK #9 | OPERATES GATES TO POCKETS 1 & 5 |
| 55 | INPUT CANCELLATION TO BANK #8 | PREVENTS BLOCKING OF PRIMARY FEED BY HIGH PRIMARY OR WRONG SECONDARY CONDITION. |
| 56 | INPUT CANCELLATION TO BANK #7 | RENDERS WRONG PRIMARY CONDITION INEFFECTIVE FOR LIGHTING LIGHT OR STOPPING MACHINE. |
| 57 | DIRECT SIGNAL TO PRIMARY CARD FEED BLOCK 284 | UNBLOCKS PRIMARY CARD FEED AFTER OPERATION OF PRIMARY SAFETY BAIL. |
| 51 | INPUT CANCELLATION TO BANK #1 | RENDERS PRIMARY & SECONDARY CARD FEED SAFETY BAILS INEFFECTIVE FOR STOPPING THE MACHINE. |
| 58 | DIRECT SIGNAL TO SECONDARY CARD FEED BLOCK 284S | UNBLOCKS SECONDARY CARD FEED AFTER OPERATION OF SECONDARY SAFETY BAIL. |
| 59 | INPUT CANCELLATION TO BANK #5 | RENDERS WRONG SECONDARY CONDITION INEFFECTIVE FOR LIGHTING LIGHT OR STOPPING MACHINE. |
| 60 | INPUT CANCELLATION TO BANK #6 | PREVENTS BLOCKING OF SECONDARY FEED BY HIGH SECONDARY OR WRONG PRIMARY CONDITION. |
| 61 | LOWER INPUT TO BANK #9 | OPERATES GATES TO POCKETS 1 & 5 |
| 62 | LOWER INPUT TO BANK #1 | STOPS MACHINE AFTER 1 CYCLE. |
| 63 | LOWER INPUT TO BANK #8 | BLOCKS PRIMARY CARD FEED EXCEPT WHEN PRIMARY SEQUENCE DETECTOR INDICATES WRONG SEQUENCE. |

PRI. CLEAR BUTTON-761: {52–57}
BOTH SIDES CLEAR BUTTONS 762-762S: {51, 58}
SEC. CLEAR BUTTON-761S: {59–63}

INVENTORS
JOHN T. FERRY
RALPH V. BENNETT
OTTO E. KASE
THEODORE B. McGIRR

BY John L. Sterling
ATTORNEY

UNITED STATES PATENT OFFICE 2,681,145

MACHINE FOR SEQUENTIAL FILE MERGING

John T. Ferry and Ralph V. Bennett, Brooklyn, Otto E. Kase, Valley Stream, and Theodore B. McGirr, Lynbrook, N. Y., assignors to Remington Rand Inc., New York, N. Y., a corporation of Delaware Application July 19, 1947, Serial No. 762,168

46 Claims. (Cl. 209—110)

This invention relates to punched card operating machines, and more particularly to a machine capable of merging two individual groups of punched record cards into one group sequentially, in accordance with the data contained in said cards.

Machines of this character, such as disclosed in U. S. Patents 2,359,670 to R. E. Page, issued October 3, 1944, 2,379,828 to D. W. Rubidge, issued July 3, 1945, and 2,411,645 to I. B. Whetstone, issued November 26, 1946, briefly and generally stated operate to selectively feed for merging two individual groups of record cards in accordance with the numeric sequence condition between a card in one group and a card in another group, the machines disclosed by Page and Rubidge operating to selectively feed and control individual card receiving pockets in accordance also with the sequence condition between successive cards in one of said individual groups of cards.

An object of the present invention is to enable the merging of two individual groups of record cards under control of the combined sequence conditions between a card in one group and a card in another group, and also between successive cards in each group.

Another object of the invention is to provide a machine capable of checking the sequence condition within each of two individual groups of records concomitantly with the detection of the sequence condition between a record in one group and a record in another group.

Another object of the invention is to enable a wrong sequence condition within either group of cards to dominate other sequence conditions in controlling the operation of the machine.

Another object of the invention is to provide a counting mechanism operable for stopping the machine after a predetermined number of wrong sequence cycles.

A further object of the invention is to provide a sequence detector responsive to record bearing numerical data or alphabetic data embracing all the letters of the alphabet.

A further object of the invention is to provide operating control keys manually operable for clearing various abnormal conditions in the machine.

Another object of the invention is to provide set up control keys manually pre-settable for enabling a simultaneous sequence checking operation of two individual groups of records.

The mechanical embodiment of the invention as shown in the drawings comprises a pair of sensing mechanisms located on opposite sides of a series of card receiving pockets, a pair of translator units each connecting one pair of sensing units with an individual sequence detector unit, and also connecting one of each pair of sensing mechanisms with a third sequence detector unit. A signal control unit is adapted to receive signals from said sequence detector units and to transmit machine controlling signals in accordance with the nature and combination of signals received into the unit.

Two groups of stacked cards placed in the machine are each fed seriatim to an initial sensing stage from which they proceed to a sequence sensing stage. The data sensed simultaneously in a card in both stages is carried by a translator to an individual sequence detector unit comprising two decoding units adapted to set up alphabetic or numerical data for sequence detection. The data sensed in each sequence sensing stage is also carried by the translators to the decoding units of a third sequence detector adapted to detect the sequence condition between data in the respective sequence sensing stages.

The sequence detector units operate to select signals for transmission to the signal control unit which, among other functions, controls the opening and closing of pocket gates, card feed, data retraction in the sequence sensing stages, and the stopping of the machine. The signal control unit also contains a cycle counting mechanism effective for stopping the machine after receipt of a predetermined number of wrong sequence signals.

There are manual controls for pre-setting the pockets for selective operation under various machine conditions. Manually pre-settable controls are provided also for enabling one side of the machine to operate independently of the other side in sequence checking opeartions or in conjunction with the other side in merging operations. Operating control buttons are provided whereby the machine may be started and stopped or whereby either or both of the card feeding mechanisms may be selectively enabled for clearing purposes. Associated with each side of the machine is a signal light effective for indicating to the operator various types of abnormal machine conditions.

In a merging operation the cards of each group after having been checked for sequence are fed from the sequence sensing stage to either of three pockets, there being five pockets in all provided in the machine. The center pocket is adapted to receive cards from both groups which are in correct sequence. If the sequence is incorrect on either side, the out of sequence card will feed to the pocket nearest the sensing chambers on the same respective side of the machine. Cards containing equal data feed to the pocket adjoining the center pocket on the respective side of the machine.

The machine is also capable of checking sequence without file merging. In this operation two groups of cards may be checked simultaneously, the pocket gate controls being pre-set so as to associate two pockets with each side of the machine, the correct sequence cards and equal cards on each side feeding to the pockets nearest the center pocket, and the out of sequence cards feeding to the pockets nearest the respective sensing chambers. Should it be desired to separate correct sequence cards from equal cards, the pocket gate controls may be pre-set so as to associate the center pocket with one or the other sides of the machine so as to receive correct sequence cards from that side of the machine.

It is to be understood that all mentioned degrees of timing in the specification are approximate.

A more clear conception of the operation, construction, and further objects of the invention may be had from the following specification when read in conjunction with the accompanying drawings, in which Figs. 1 and 1A combined form a front elevation of a machine embodying the invention;

Figs. 2 and 2A combined form a rear elevation of the machine with an auxiliary frame removed to disclose portions of the mechanism;

Figs. 3 and 3A combined form a plan view of the machine;

Fig. 4 is an end view taken from the right hand side of the machine showing the card magazine, translator, and sequence detector unit;

Figs. 5 and 5A combined form a cross section taken along lines 5—5 of Fig. 4;

Fig. 7 is a detail view of the clutch control for starting and stopping the machine;

Figure 12:
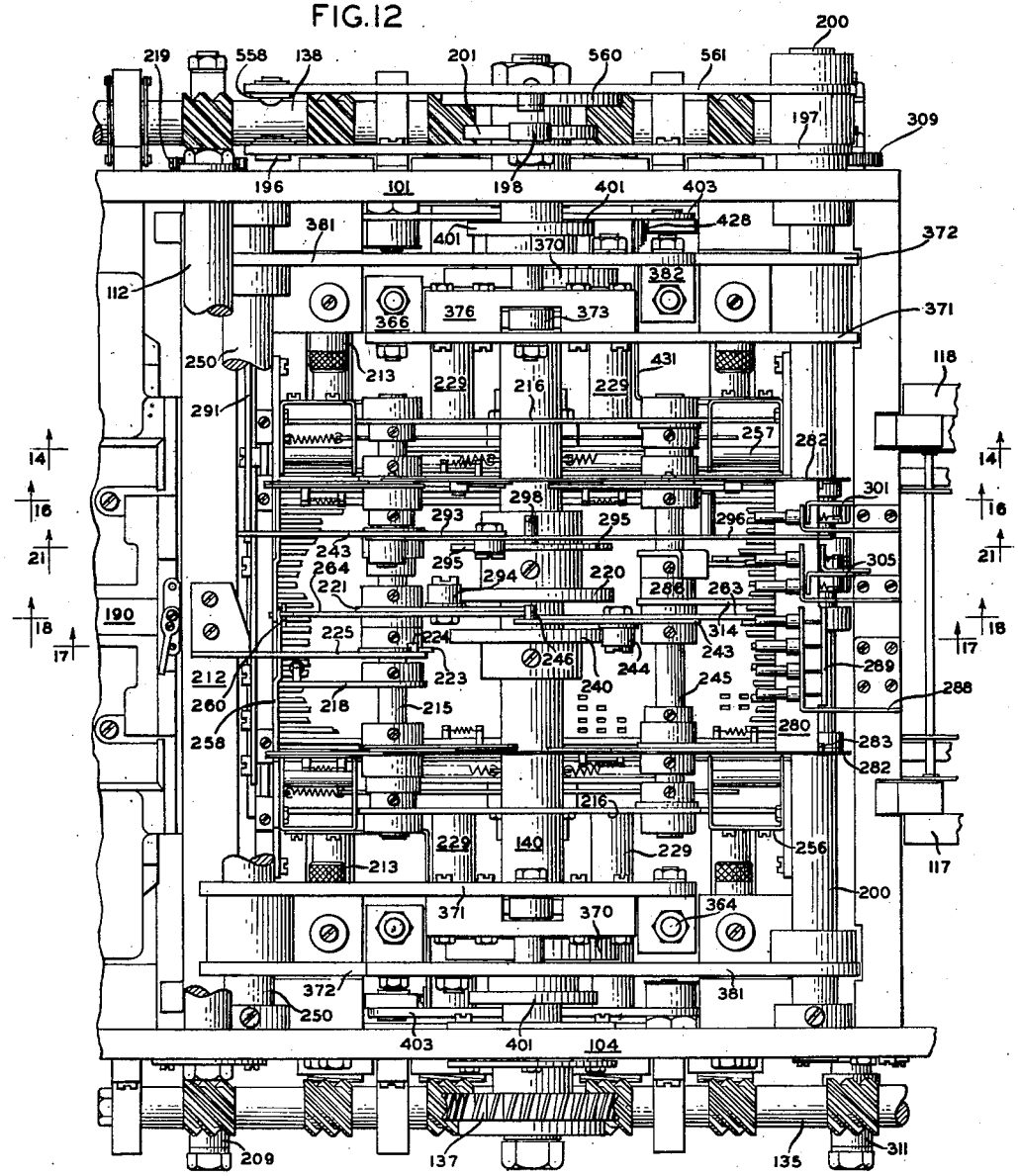
Figure 16:
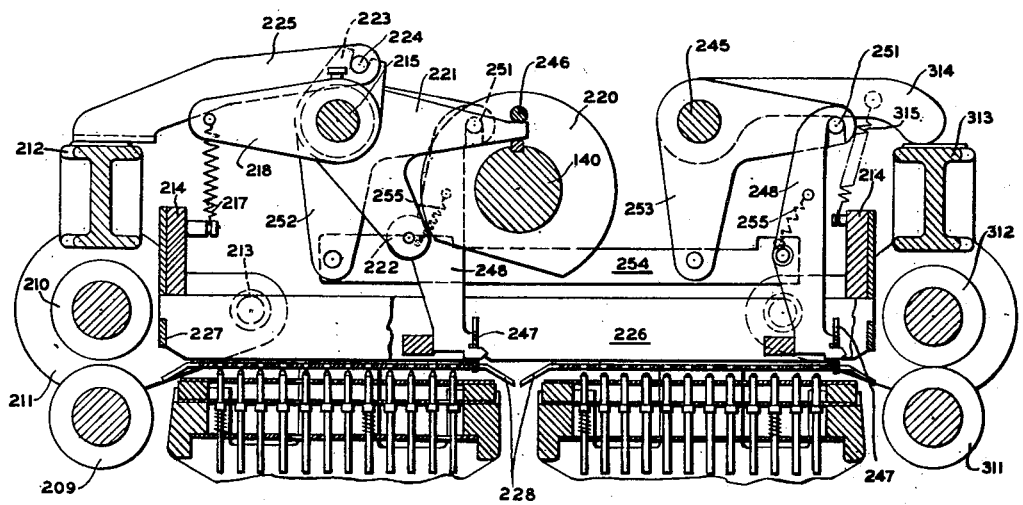
Figure 17:
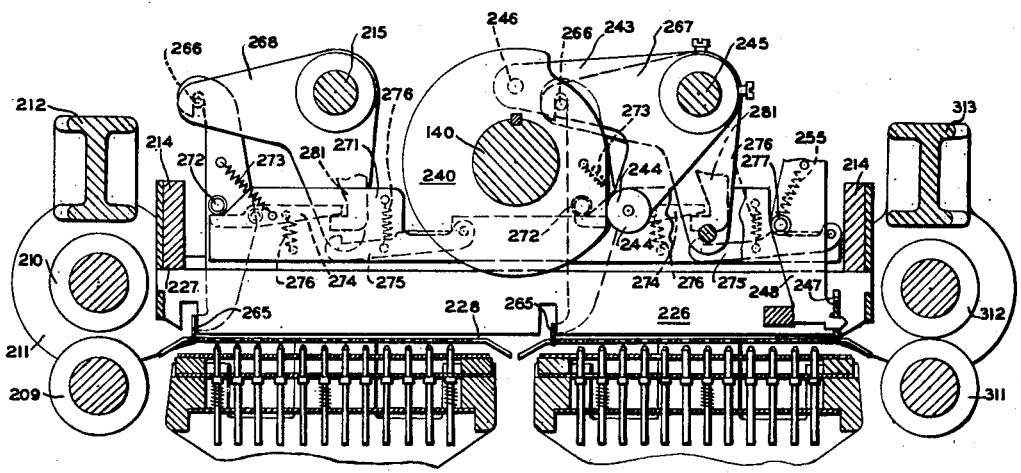
Figure 25:
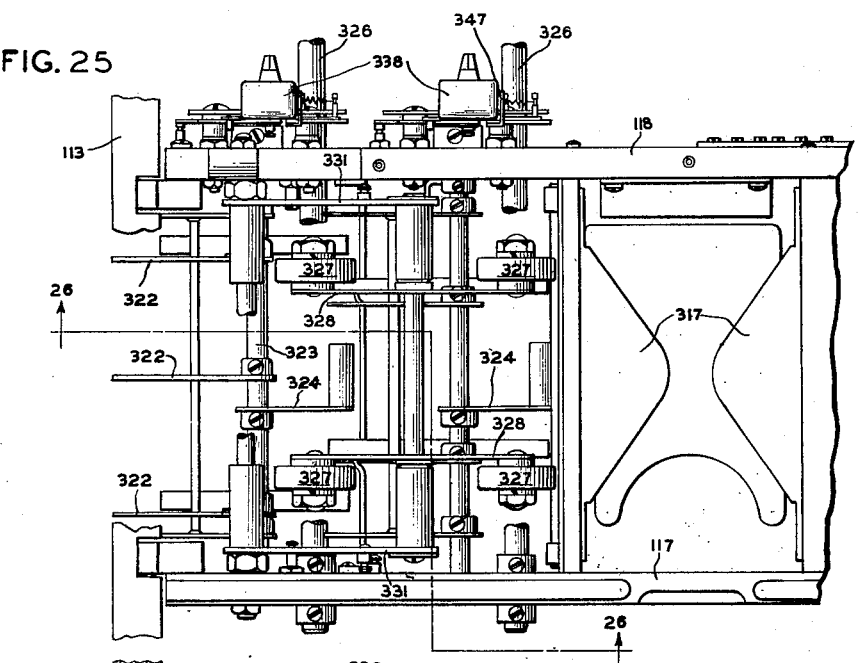
Figure 26:
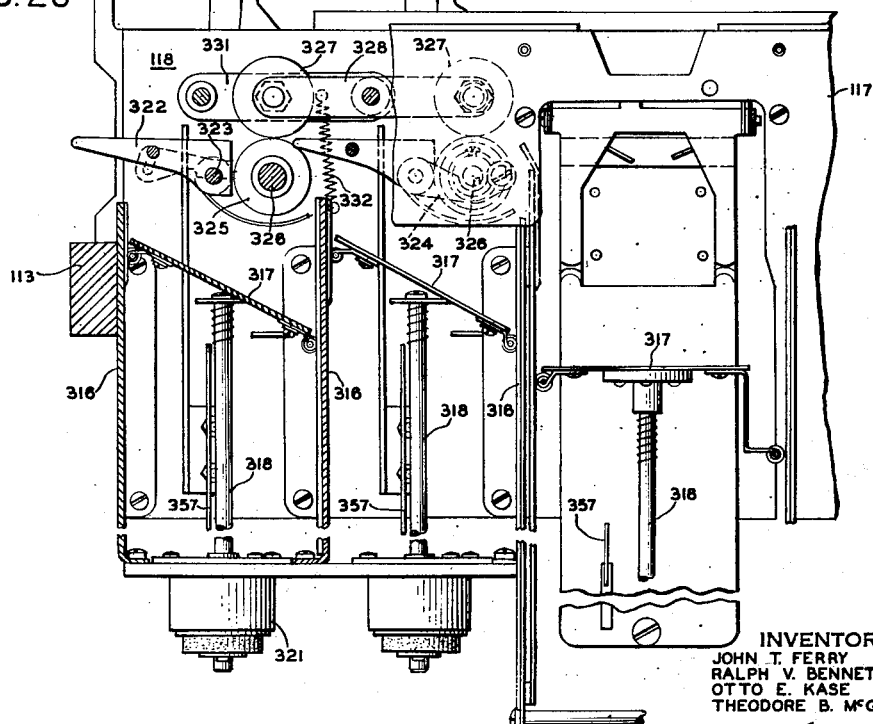
Figure 33:
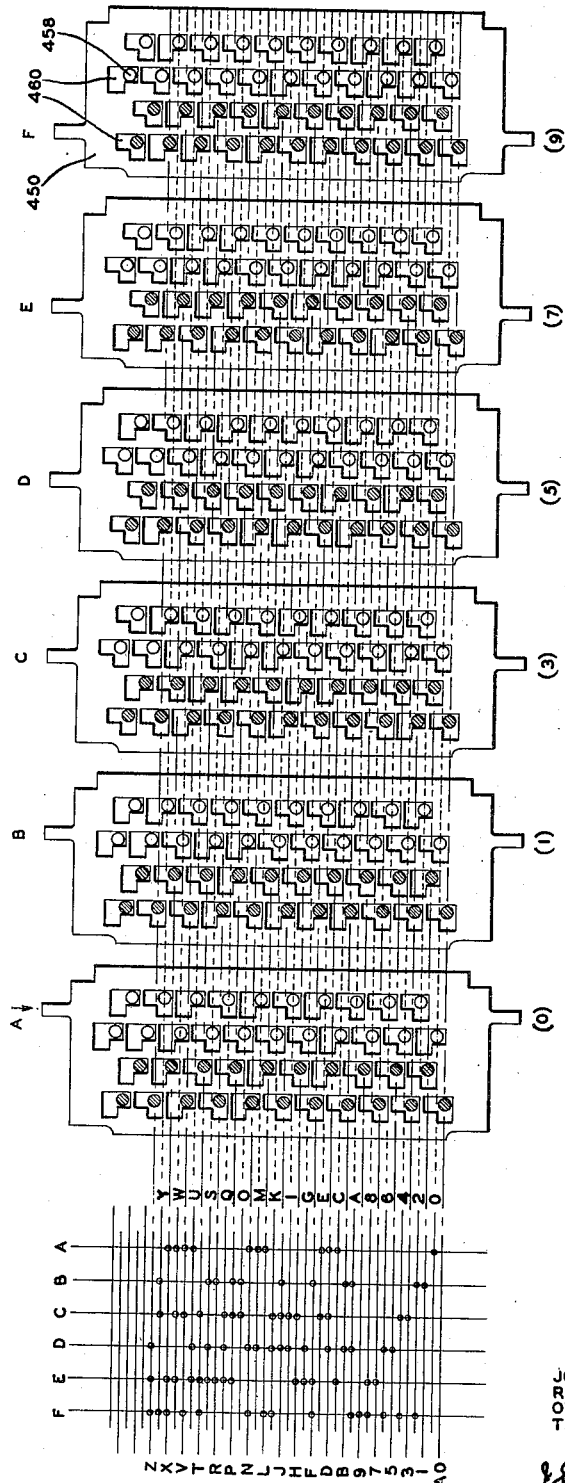
Figure 34:
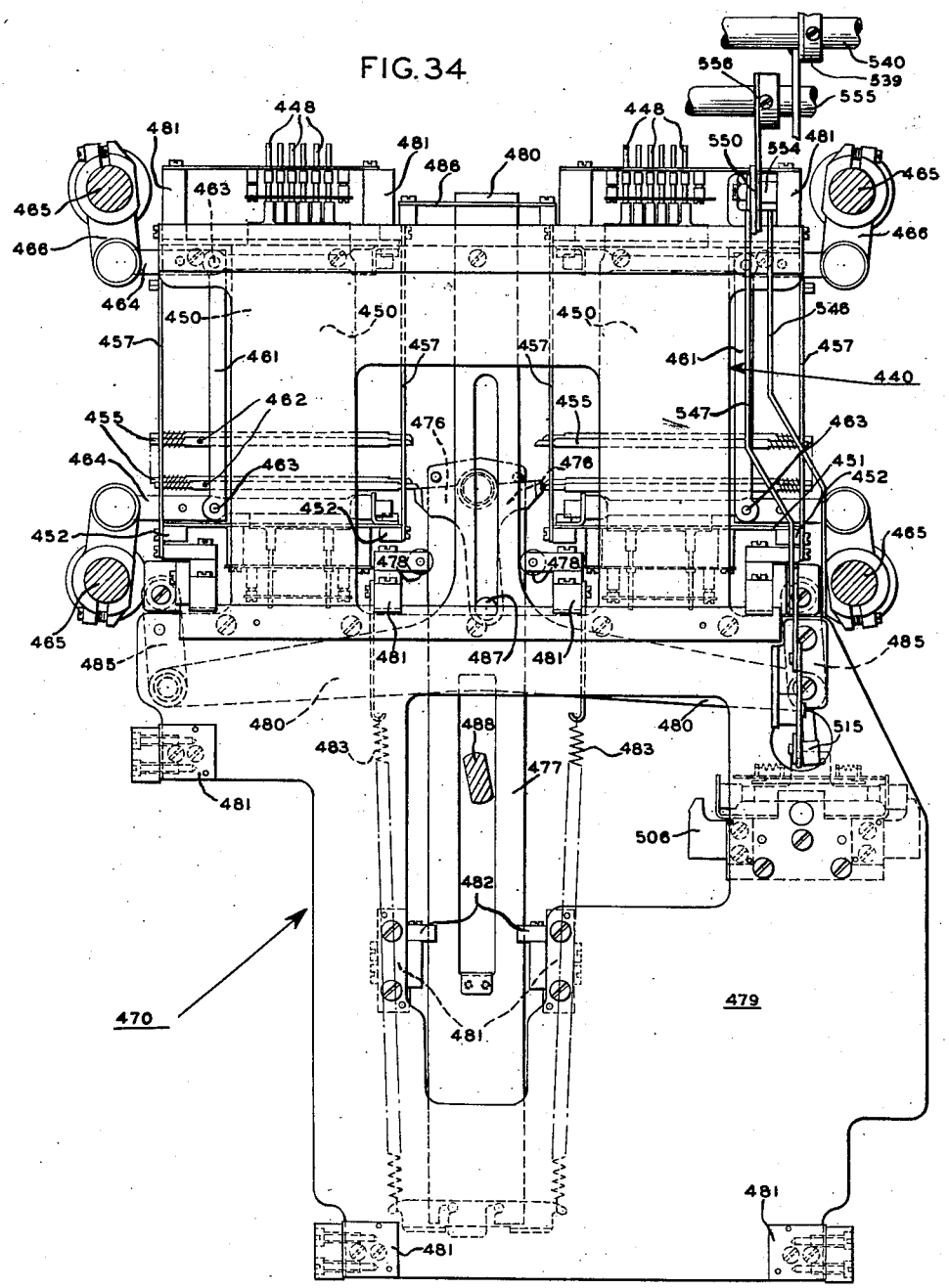
Figure 35:
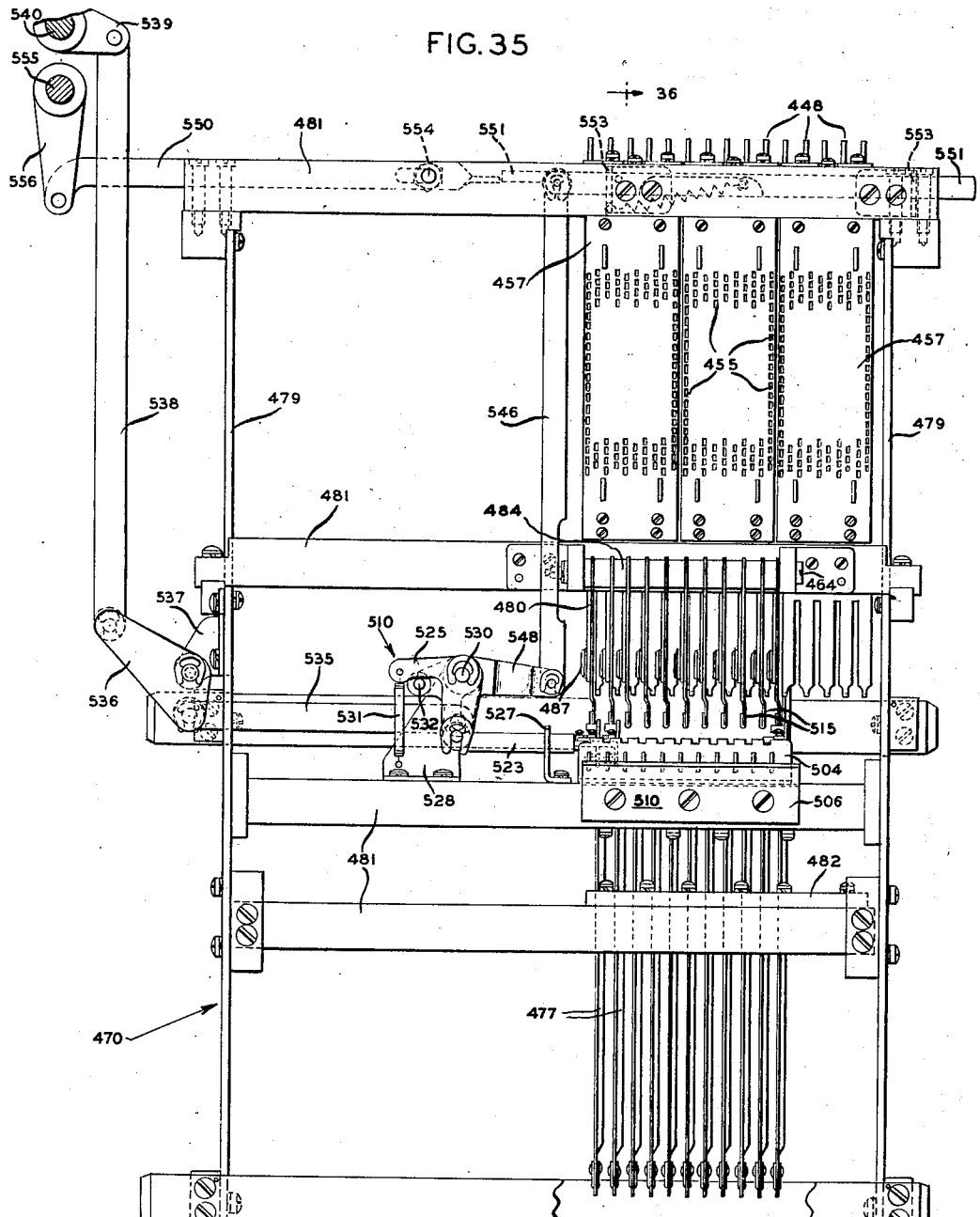
Figure 36:
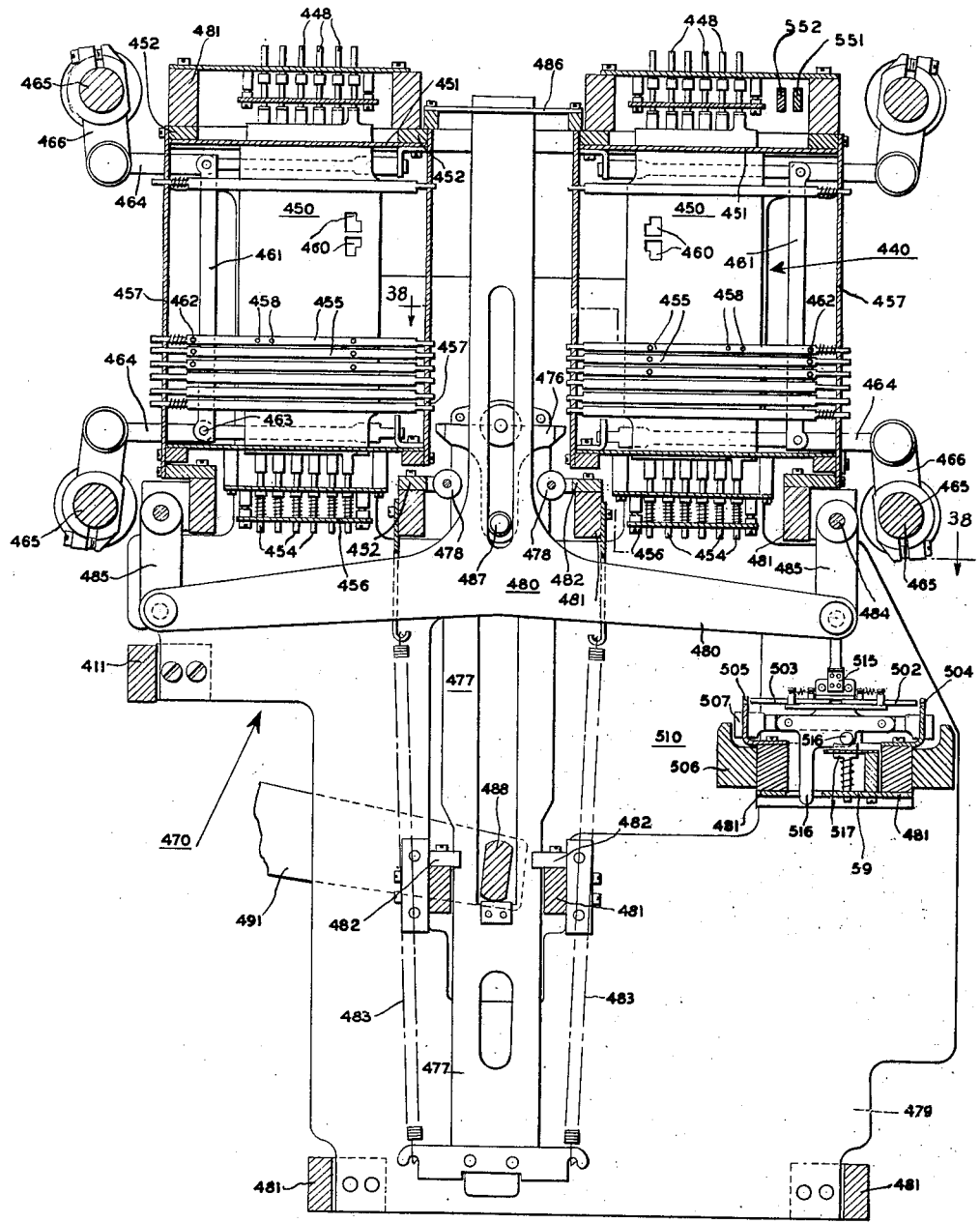
Figure 37:
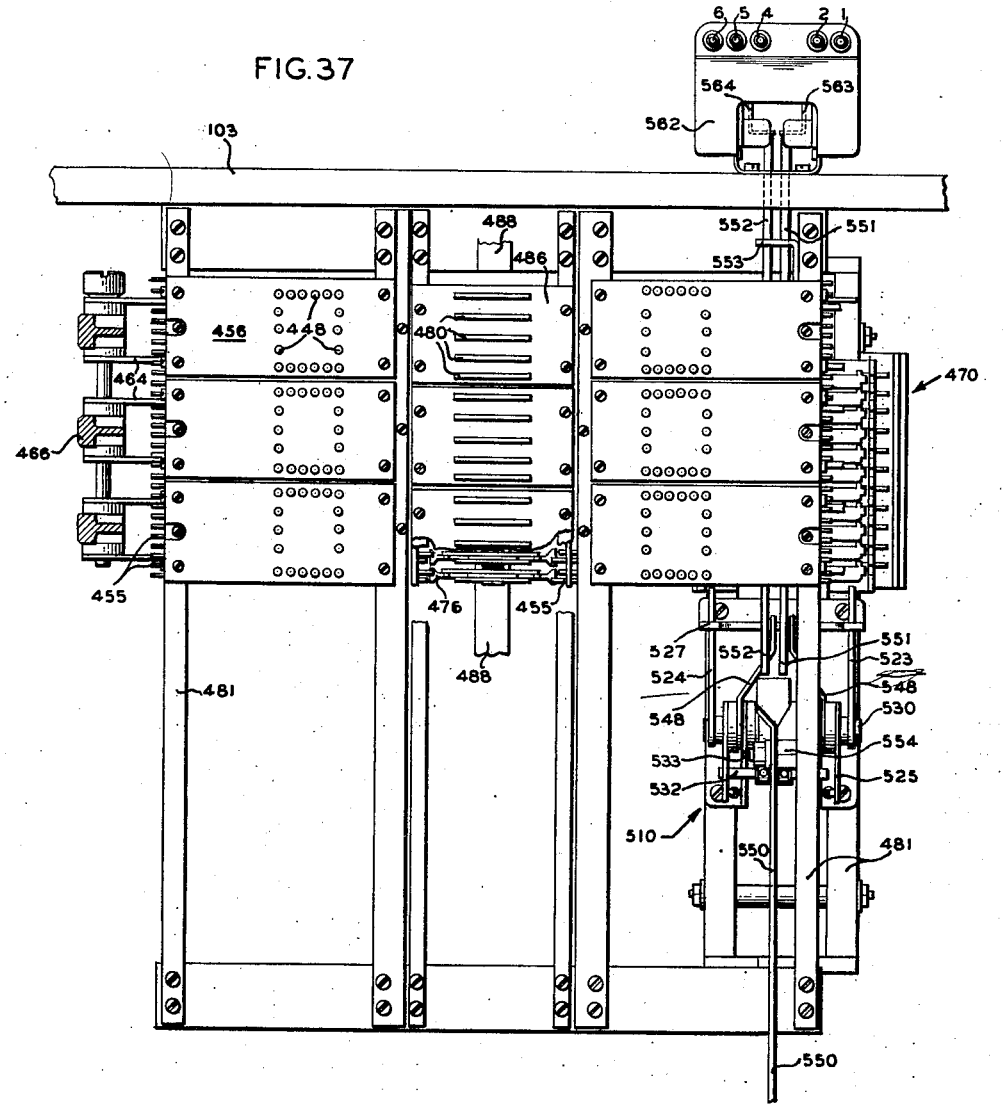
Figure 38:
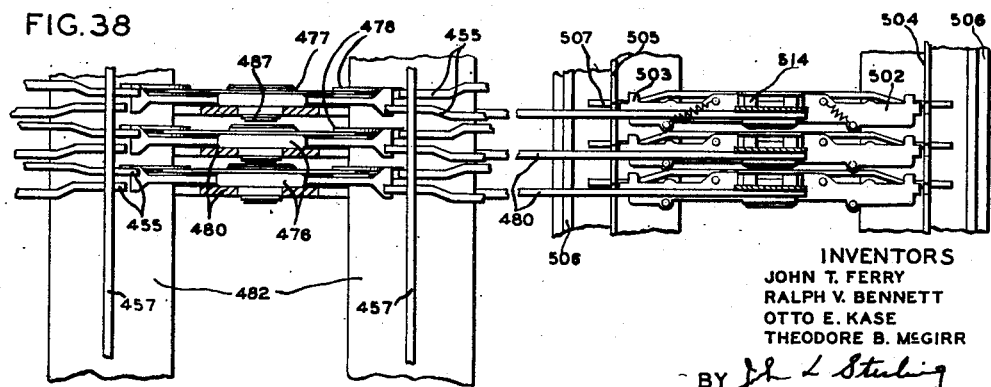
Figure 53:
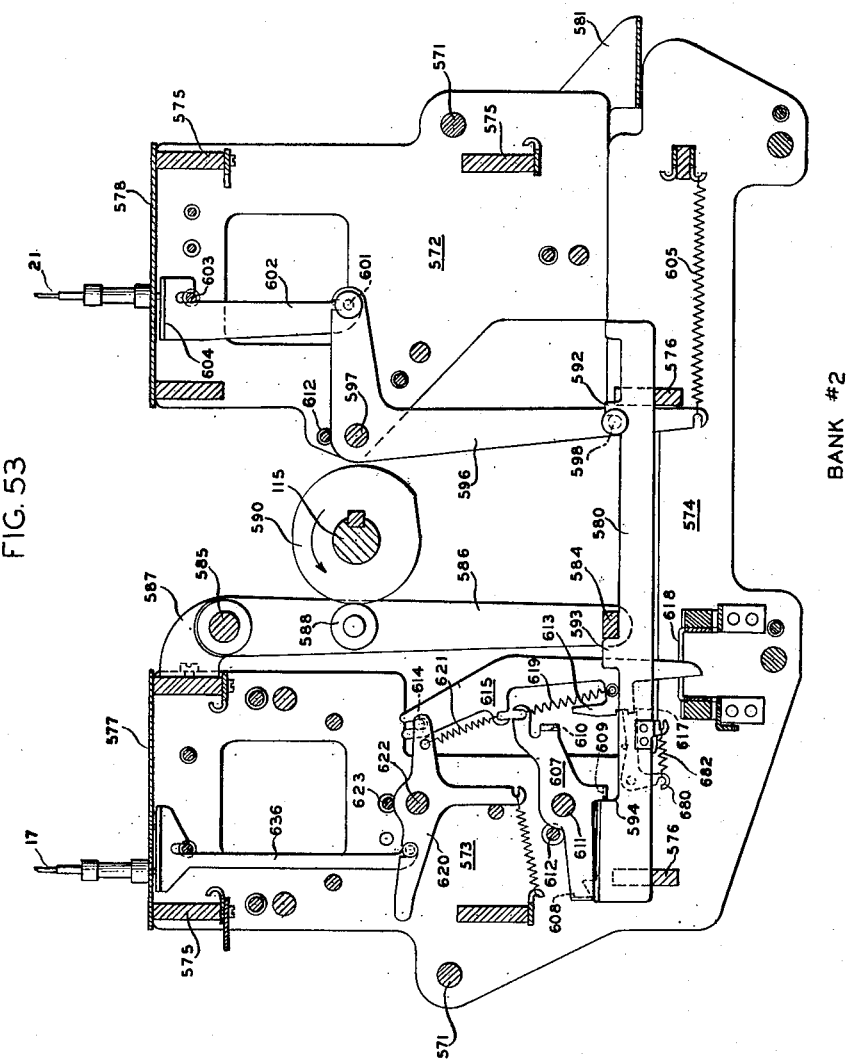
Figure 76B:
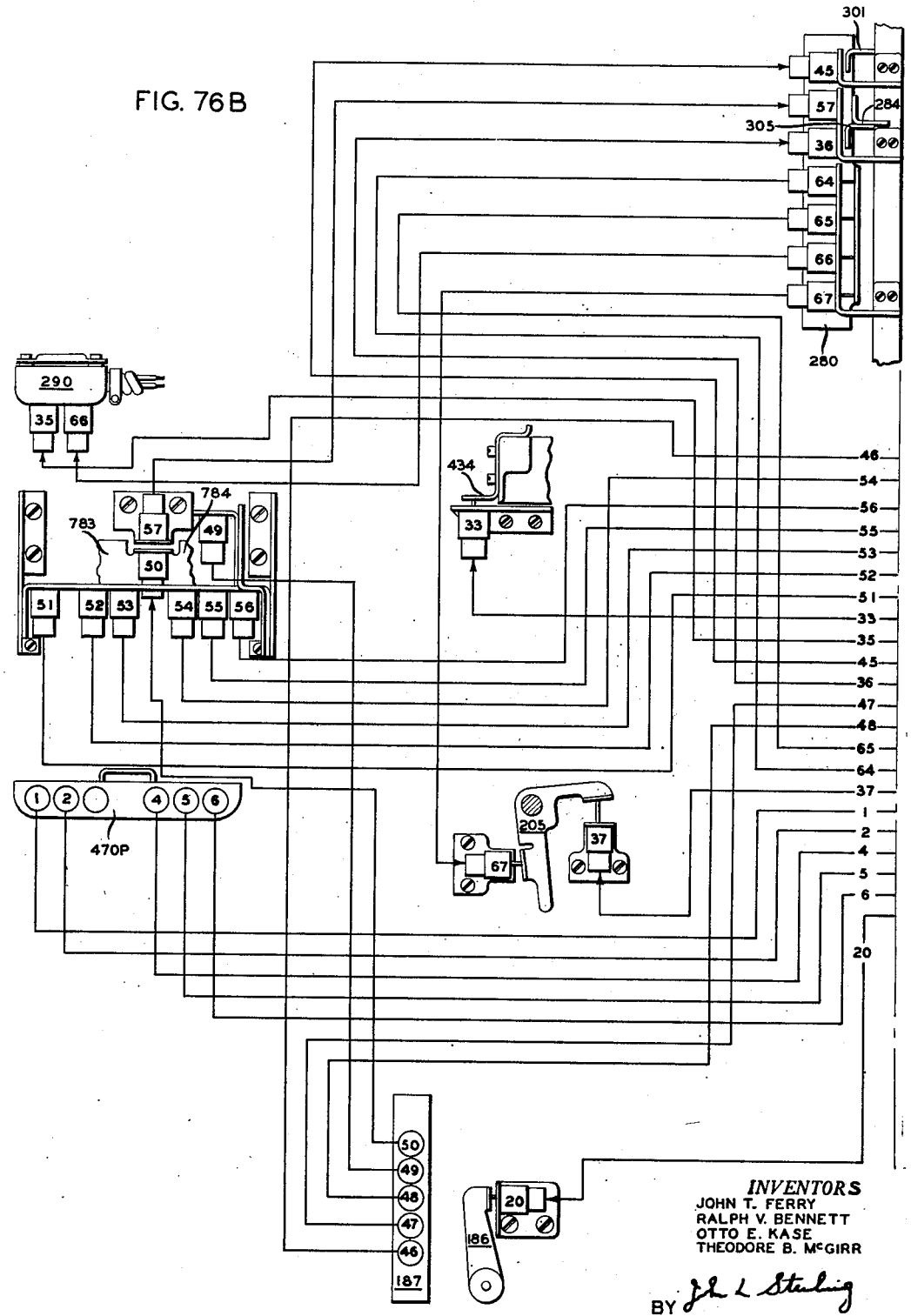
Figure 76C:
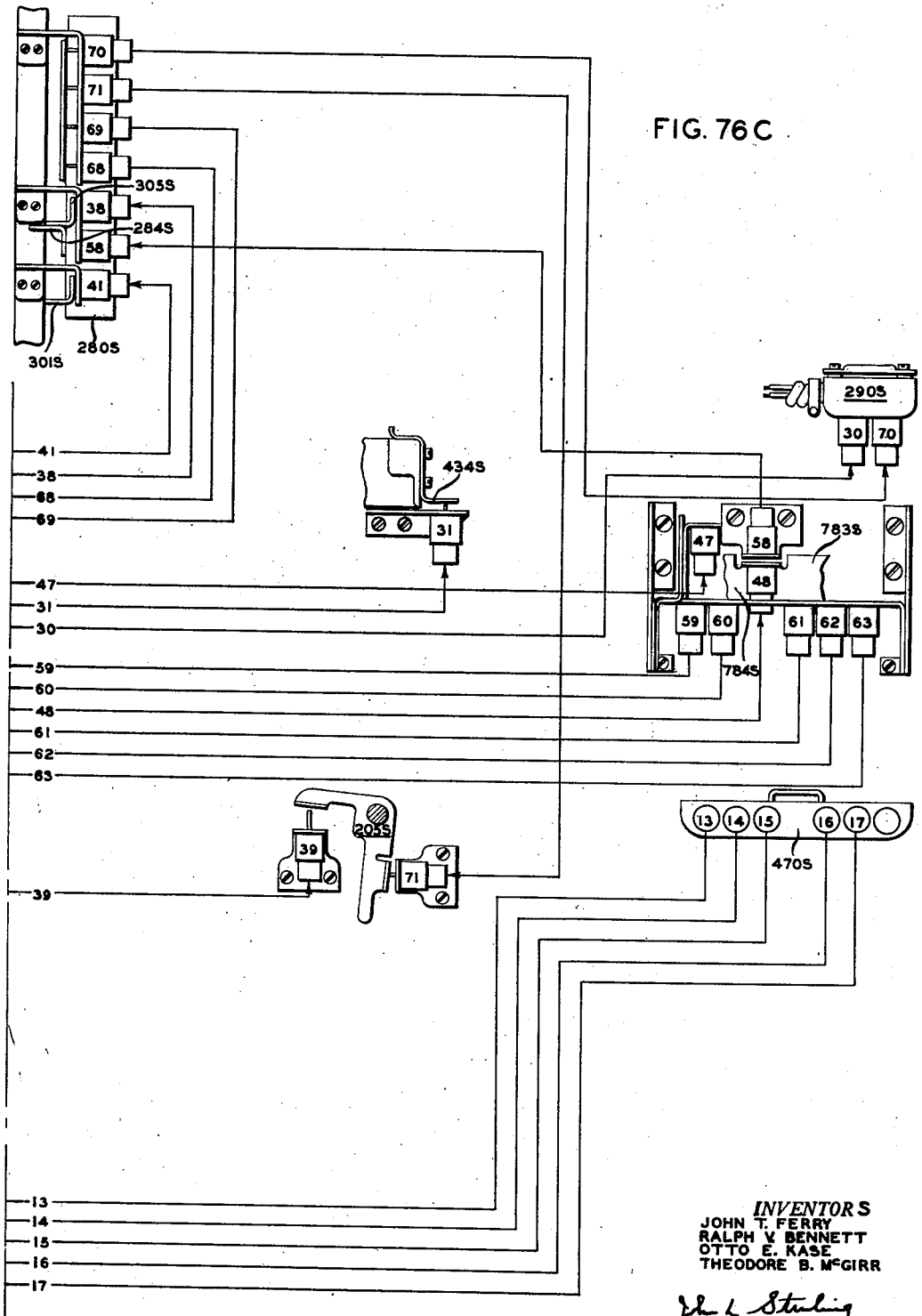
Figure 77:
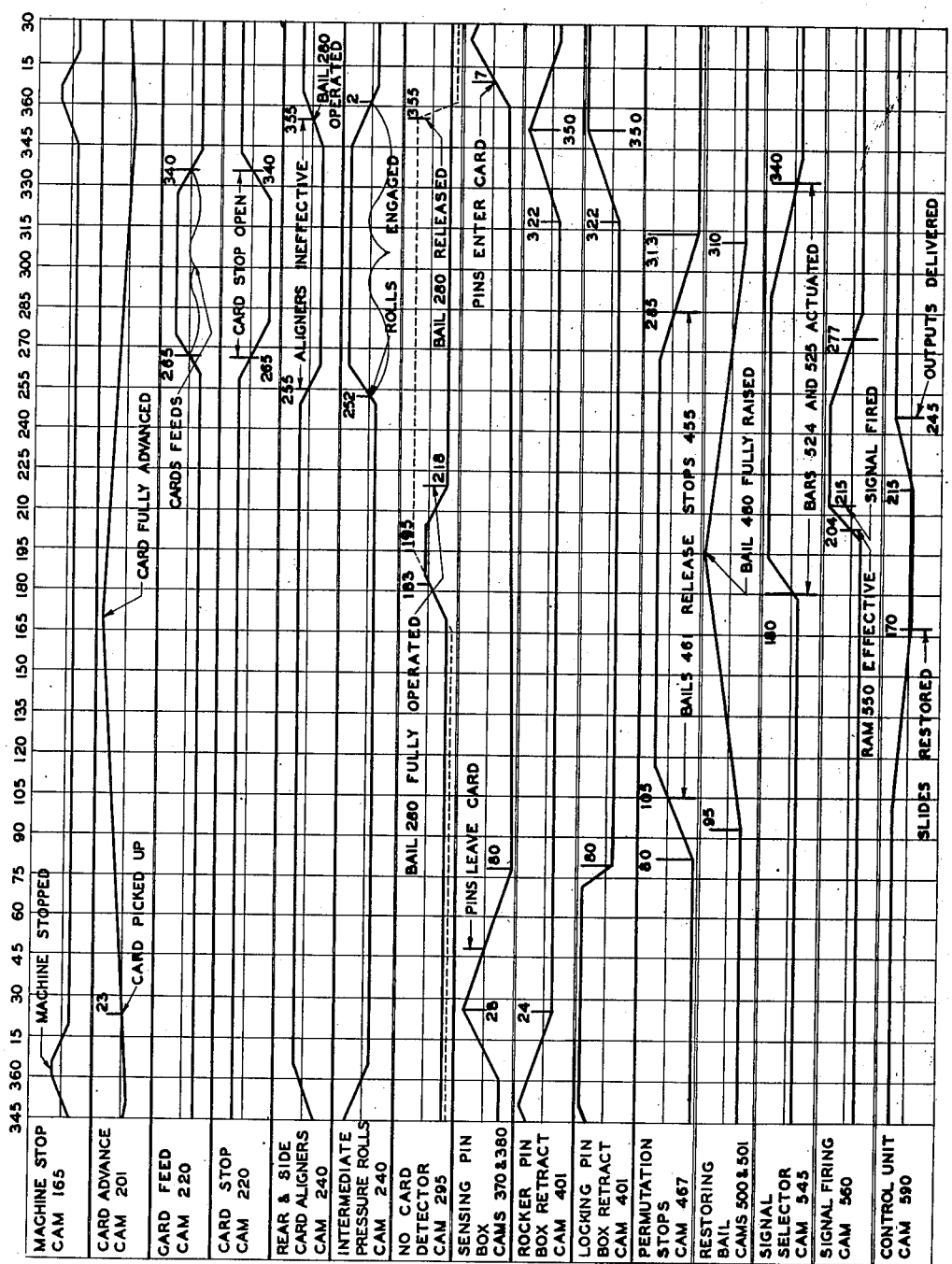

Figs. 8, 9, 10, and 11 are details of the toggle mechanism of Fig. 7;

Fig. 12 is an enlarged plan view of the card handling mechanism on the right hand side of the machine;

Fig. 13 is an isometric showing of the card handling mechanism;

Fig. 14 is a cross section taken along line 14—14 of Fig. 12, showing the controls for the pressure rolls;

Fig. 15 is a cross section taken along line 15—15 of Fig. 14;

Fig. 16 is a cross section taken along line 16—16 of Fig. 12, showing the card stop controls;

Fig. 17 is a cross section taken along line 17—17 of Fig. 12, showing the rear card aligners with certain mechanism omitted for clarity;

Fig. 18 is a cross section taken along line 18—18 of Fig. 12, showing the side card aligners with the associated cam broken away;

Fig. 19 is a cross section taken along line 19—19 of Fig. 18;

Fig. 20 is a fragmentary plan view of the side card aligners;

Fig. 21 is a cross section taken along line 21—21 of Fig. 12, showing the safety bail mechanism;

Fig. 22 is a side elevation of Fig. 21;

Fig. 23 is a section taken along line 23—23 of Fig. 22;

Fig. 24 is a section taken along line 24—24 of Fig. 22;

Fig. 25 is an enlarged plan view of the card pockets on one side of the machine, with their associated card handling mechanism;

Fig. 26 is an elevation of Fig. 25 partly in section as indicated by line 26—26 of Fig. 25;

Fig. 27 is a detail rear view of the card pocket gate control keys and full pocket control mechanism with the rear frame of the machine removed;

Fig. 28 is a cross section taken along line 28—28 of Fig. 27, showing the rear frame in place;

Fig. 29 is an enlarged detail of a pocket gate control key viewed opposite from that shown in Fig. 27;

Fig. 30 is a cross section taken along line 30—30 of Fig. 27;

Fig. 31 is an isometric showing of the drive for the sensing pin boxes;

Fig. 32 is an elevational view of the sensing pin boxes on the right hand side of the machine with the front main frame removed;

Fig. 33 is a schematic showing of one set of the permutation slides in a column of the decoding unit;

Fig. 34 is a front elevation of a sequence detector unit;

Fig. 35 is a side elevation of a sequence detector unit;

Fig. 36 is a cross section taken along line 36—36 of Fig. 35;

Fig. 37 is a plan view of a sequence detector unit;

Fig. 38 is an enlarged cross section taken along line 38—38 of Fig. 36;

Fig. 39 is a plan view of a signal selector unit;

Fig. 40 is a side elevation of Fig. 39;

Fig. 41 is a cross section taken along line 41—41 of Fig. 40;

Fig. 42 is a fragmentary plan view of the signal selector unit in operated position;

Fig. 43 is an isometric showing of the signal selector unit;

Fig. 44 is a side elevation of the signal control unit;

Fig. 45 is a left hand end view of Fig. 44;

Fig. 46 is a schematic showing of bank #1 of the signal control unit;

Fig. 47 is an isometric showing of a portion of the lower input mechanism;

Fig. 48 is a schematic view of banks #2 or #4, showing the wiring associated with bank #2;

Figs. 49, 50, 51, and 52 are operational views of the two cyclic mechanism;

Figs. 53 and 54 are schematic operational views of banks #2 or #4, showing wiring associated with bank #2;

Fig. 55 is a schematic showing of bank #3;

Figs. 56, 57, 58, 59, 60, 61, 62, and 63 are schematic views of banks #5 and #7 in various operated positions, showing wiring associated with bank #7;

Fig. 64 is a schematic view of banks #6 or #8 as controlled by the cycle counting mechanism, showing the wiring associated with bank #8;

Fig. 65 is a plan view of the cycle counting mechanism;

Fig. 66 is a schematic view of bank #6 or #8, showing the wiring associated with bank #8;

Fig. 67 is a schematic view of bank #9;

Fig. 68 is a plan view partly in section of the machine set up control keys;

Fig. 69 is a side elevation of Fig. 68;

Fig. 70 is a cross section taken along line 70—70 of Fig. 69;

Fig. 71 is a detail end elevation of the Start, Stop and Clear controls;

Fig. 72 is a cross section taken along line 72—72 of Fig. 71;

Fig. 73 is a detailed rear elevation of the operating control mechanism;

Fig. 74 is a cross section taken along line 74—74 of Fig. 73, showing a part of the mechanism in actuated position;

Fig. 75 is a cross section taken along line 75—75 of Fig. 73;

Fig. 76 is a diagram showing arrangement of Figs. 76A, 76B, 76C, and 76D;

Figs. 76A, 76B, 76C, and 76D when combined form a wiring diagram for the Bowden wire connections of the machine;

Fig. 77 is a timing diagram of the machine with zero lines for indicating the periods of effective and ineffective movement of the respective mechanisms;

Figs. 78 and 78A when combined form an operational chart of the functions resulting from different sequence combinations in the machine; and Fig. 79 is a chart showing the functions performed by the operation of the machine Clear buttons.

FRAME WORK

*(Figs. 1 to 5A, inclusive)*

Figure 1:
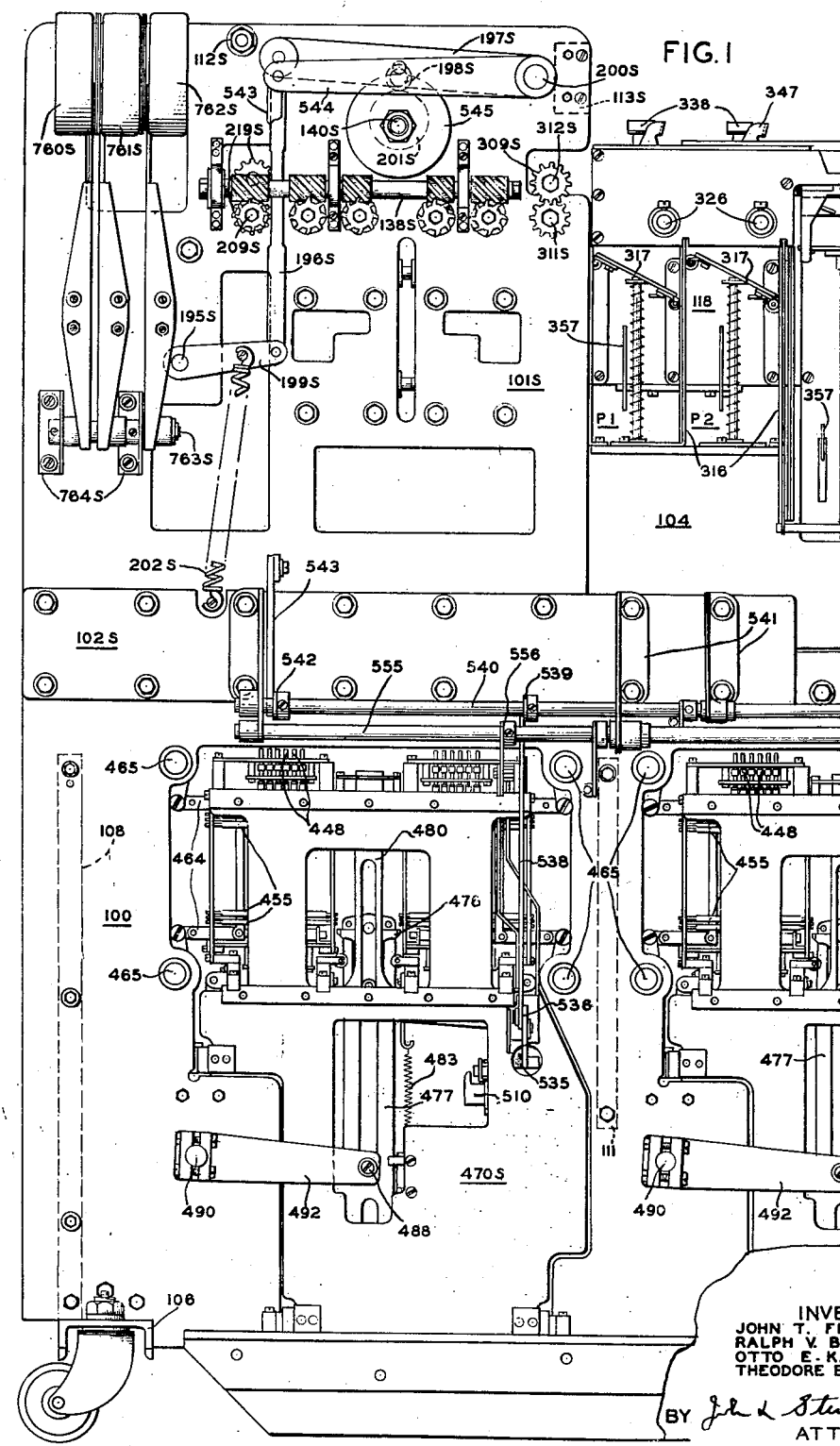
Figure 1A:
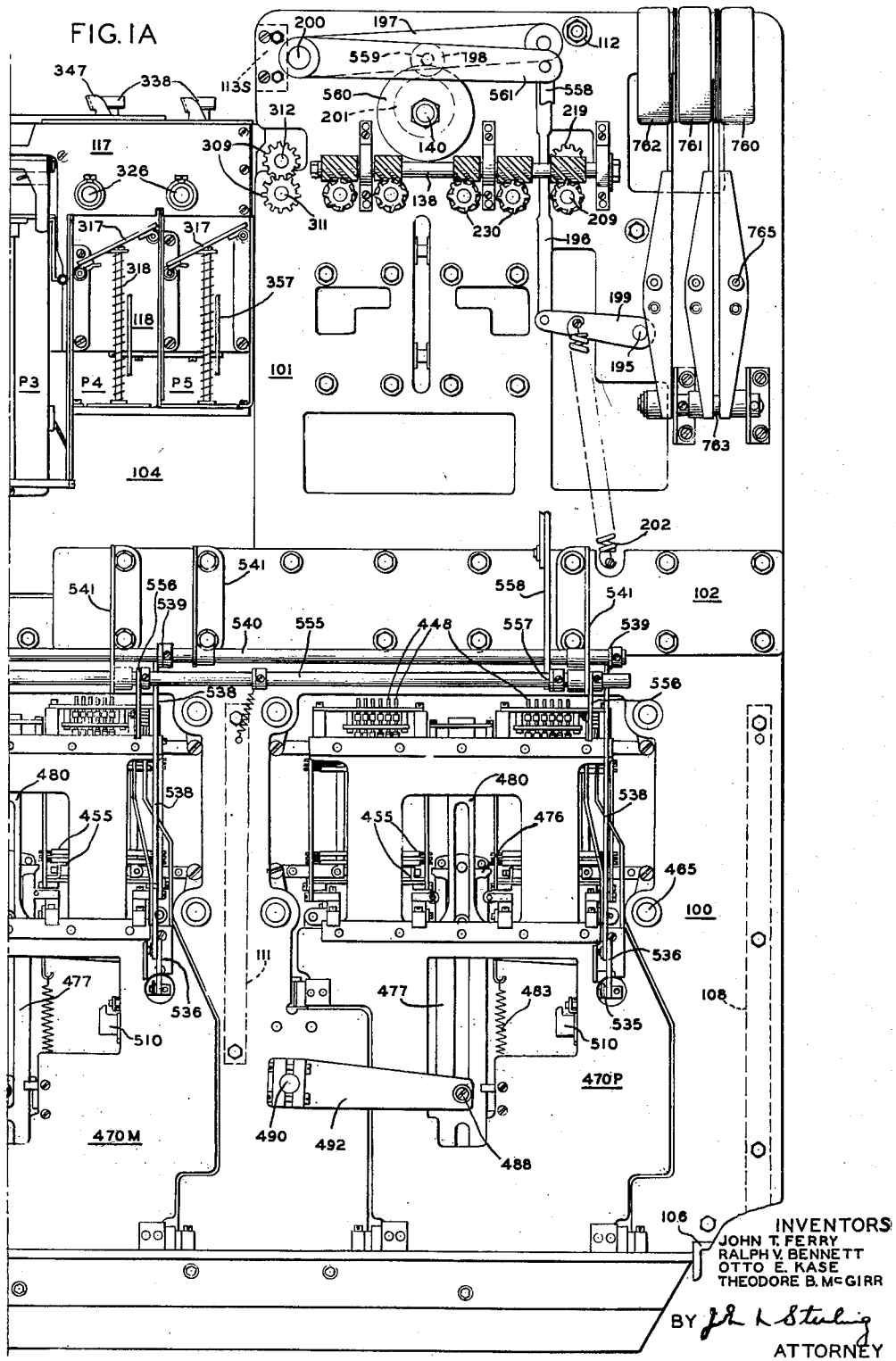
Figure 4:
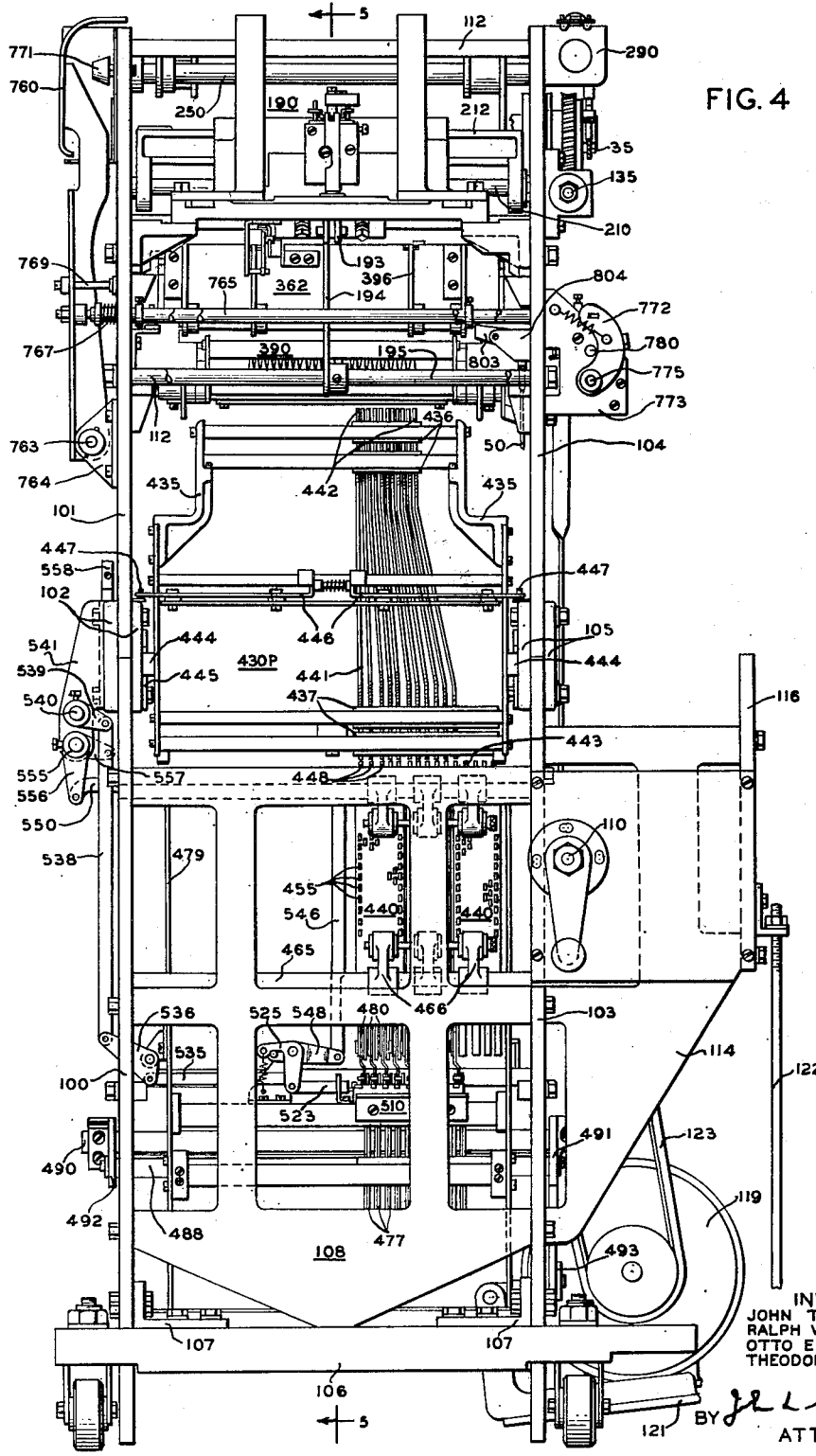

The frame work of the machine consists of front and rear vertical frames. The front frame (Figs. 1 and 1A) comprises a rectangular plate 100 and two square plates 101 and 101S. The plates 101 and 101S are secured as shown in Figs. 1, 1A, and 4 to the plate 100 by strips such as 102 and 102S, one on each side of the plates. The rear frame (Figs. 2 and 2A) comprises two rectangular plates 103 and 104 formed as shown and secured together by strips 105, and 105S in the same manner as the front frames. The plates 100 and 103 are mounted vertically on two channel shaped members 106 and are secured thereto by angle brackets 107 (Fig. 4). Secured between the lower frame plates 100 and 103 is a pair of end members 108 formed as shown (Fig. 4). Also secured between the center portions of plates 100 and 103 are two plates 111 which act to stiffen the frame. The upper front plates 101 and 101S are secured to upper rear plate 104 by means of cross rods 112, 112S and rectangular bars 113, 113S. Secured to the outer face of lower rear frame member 103 are brackets 114 to which is secured in turn an auxiliary rear frame plate 116. Secured between and to the bars 113 is a pair of cross members 117 and 118 between which are mounted the receiving or sorting pockets and their associated mechanism.

DRIVE MECHANISM

The machine is driven from a motor 119 (Figs. 2 and 4) mounted on a hinged bracket 121 which is held in adjustable position by a rod 122 secured at the upper end to the rear auxiliary plate 116. The motor is connected by belt 123 to a pulley 124. Secured to the main drive shaft 110 is a clutch 125 cooperating with the pulley 124. The main drive shaft is mounted in roller bearings carried in a series of brackets secured to the rear lower frame plate 103. Secured to the shaft 110 is a worm gear 126 which meshes with a worm wheel 127 mounted on a cam shaft 115 journaled in the rear frame 103 and auxiliary frame 116. Also secured on the main drive shaft 110 is a worm gear 128 (Fig. 2A) which meshes with a worm wheel 129 secured on a cam shaft 120 which is also journaled in the rear frame plate 103 and plate 116. The shaft 110 also has secured thereon a miter gear 131 meshing with a miter gear 132, secured to a vertical drive shaft 130. Secured to the upper end of drive shaft 130 is a miter gear 133 meshing with miter gears 134 and 134S which gears are secured to and drive upper drive shafts 135 and 135S, respectively. These two shafts carry worm drives for the card feed mechanisms which will be described hereinafter and it will be noted that they are driven in opposite directions by the shaft 130, thus feeding cards from opposite ends of the machine toward the centre or sorter pocket section. Secured to shaft 135 is a worm gear 136 which meshes with worm wheel 137 mounted on a cam shaft 140 which extends across the machine being journaled in upper front frame plates 101 and rear plate 104. A similar worm gear 136S and wheel 137S drives cam shaft 140S which is journaled in the same manner as shaft 140.

Auxiliary drive shafts 138, 138S, (Figs. 1 and 1A) are similarly mounted on the upper front frame plates 101, 101S, respectively, and are driven in a manner hereinafter described.

MACHINE START-STOP MECHANISM

*(Figs. 2, 3A, 7–11, inclusive)*

Figure 2:
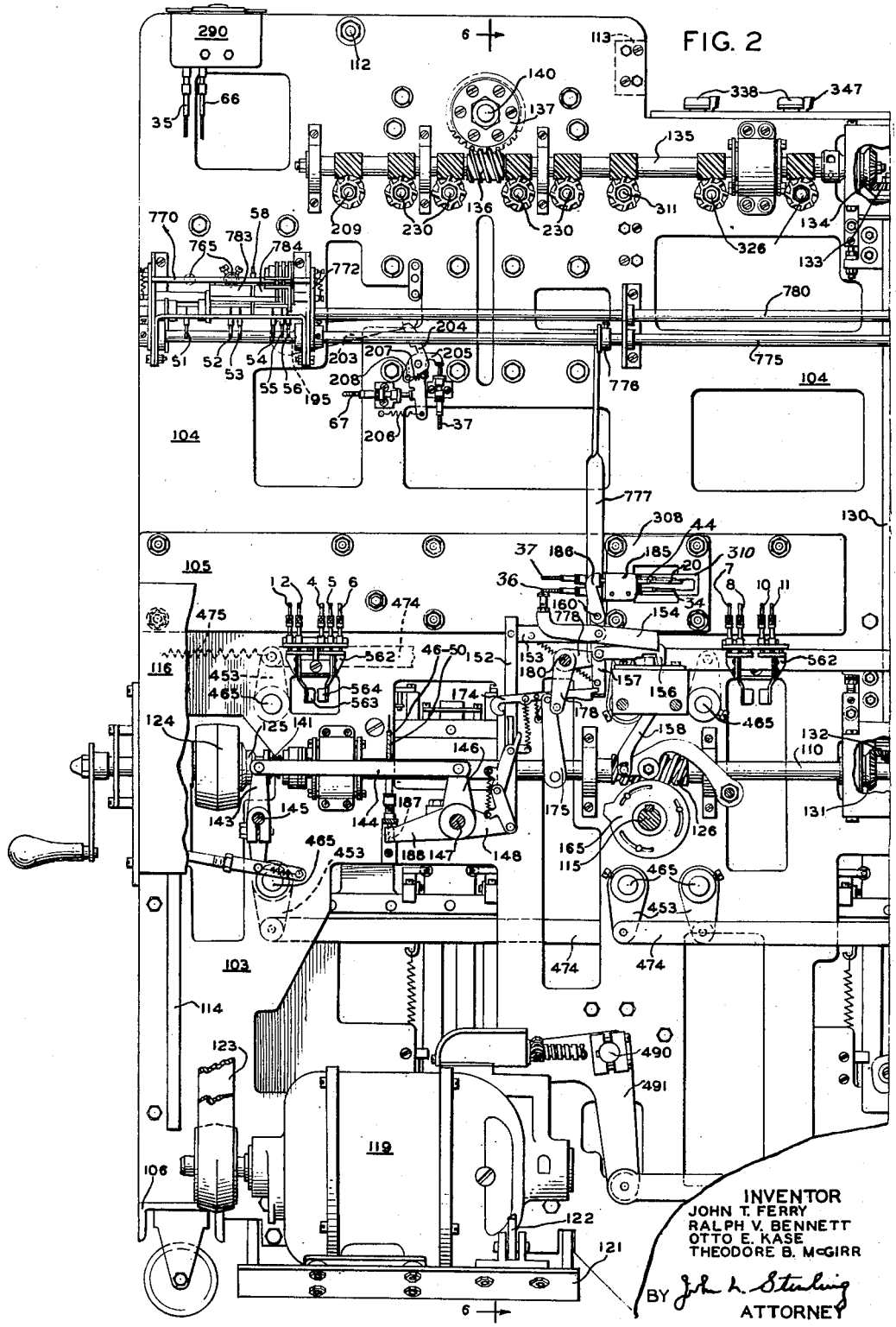

The clutch 125 as seen in Fig. 2, is actuated against tension of a clutch spring 141 by means of a pair of arms 142 fastened to a clutch shaft 145 journaled in the rear frame plates 103 and auxiliary frame plate 116, respectively. Also fast on the shaft 145 is a rock arm 143 pivotally connected by a link 144 to a rock arm 146 fast on a similarly journaled shaft 147, the two shafts 145, 147 being thus adapted to rock in unison. The means for rocking said shafts so as to disengage the clutch and thereby stop the operation of the machine are substantially similar to the machine start-stop mechanism, as fully shown and described in Patent No. 2,151,177, issued to S. Alvine, March 21, 1939. A rock arm 148, fast on shaft 147 (see Fig. 7), supports a stud 151. An upright link 152 formed with a slotted opening embracing said stud is pivotally connected to a lever 153 journaled on a stud shaft 150 secured to the frame plate 116. Also journaled on shaft 150 is a bell-crank 154, one arm of which is formed with an ear overlying the lever 153, the other arm carrying a blocking element 155 overlying an interponent slide 156. The interponent is pivoted to a rock arm 157 fast on a rock shaft 160 and is formed with a cut away step portion enabling idle reciprocation of a thrust bar 158. The rock arm 157 is tensioned clockwise by a spring 159 biasing the arm with lever 153. The bar is suitably guided for vertical reciprocation by a slotted plate 161, and is pivoted to a follower arm 162. The follower arm is pivoted to the machine frame 116 and carries a roller 163 engaging a machine stop cam 165 mounted on the cam shaft 115. When the machine is operating, the bar 158 reciprocates idly once each cycle. A machine stop is effected by rocking the arm 157, shifting interponent 156 so that the lower step portion overlies the bar 158, in which position the next following rise of the bar will result in rocking counterclockwise the interponent slide 156, bell-crank 154, and lever 153 to thrust downward the link 152. The downward thrust of link 152 operates through a pair of toggle arms 166, 167, (see also Figs. 9 and 10), interconnecting the link 152 and the stud 151 so as to rock the arm 148 clockwise, together with shafts 147, 145, thereby disengaging the clutch 125. The clutch is held disengaged against the tension of its spring 141 by a second pair of toggle arms 168, 169, (Figs. 8, 10) interconnecting the stud 151 and a stud shaft 170 secured to the auxiliary frame plate 116, which second pair of toggle arms straighten as the stud is rocked by the normally straightened first mentioned toggle arms 166, 167.

Restarting of the machine is effected by breaking both toggles, thereby enabling the clutch 125 to spring into an engagement. A toggle breaking arm 171 (Fig. 11) is pivoted on the stud shaft 170 and carries a pin 172 engaging a slot 173 in the toggle arm 166 and abutting a shoulder of the toggle arm 169. The toggle breaking arm 171 is engageable by a hooked shape lever 174 pivoted on a rock arm 175 and tensioned by a spring 176 against a limit pin 177 formed on the link 152. In Fig. 7, the parts are shown in position when the machine is operating, i. e., with the clutch engaged. It will be seen that downward thrust of link 152 to stop the machine, as before described, enables the hook portion of lever 174 to drop into a position horizontally aligned with the toggle breaking arm 171, at which time both pairs of toggles will be straightened. In such position a clockwise rocking of arm 175 will act through the hook lever 174, toggle breaking arm 171, and pin 172 to break both toggles, enabling the stud 151 to rise within the slot of link 152 and the clutch to engage. The arm 175 is rocked by a cooperating rock arm 178 fast on a rock shaft 180 journaled in the frame plates 103, 116. The shaft 180 is actuated through linkage associated with manually operated controls of the machine and is actuated at times in a manner which will be hereinafter more fully described in that part of this specification relating to machine controls.

The clockwise rocking of the arm 175 also effects a machine stop when the machine is operating. As seen in Fig. 7, a bell-crank 181 pivoted on the arm 175 is tensioned clockwise by a spring 182 against a bent under ear 183 formed on the hook lever 174 so as to follow the rocking movement of said hook lever. The free arm of said bell-crank is formed with a shoulder engageable with a bent over ear 184 formed on the above described rock arm 157. Accordingly, when the machine is operating with the parts in position as shown, clockwise rocking of the arm 175 acts through the bell-crank 181 to rock arm 157 counter-clockwise, shifting interponent 156 into effective machine stopping position. However, when the machine stops, the lowering of link 152 enables the hook lever 174 to rock counter-clockwise, raising the free end of bell-crank 181 above engageable relation with the arm 157 so that clockwise rocking of arm 175, with the parts in machine stop position, is ineffective to rock the arm 157, but acts only to break the two pairs of toggles as above described. It will be noted that the arm 175 when rocked clockwise to effect a machine stop must first be returned counter-clockwise to normal position before it can effect a machine start, and likewise when rocked clockwise to effect a machine start it must be returned counter-clockwise to normal position before it can effect a machine stop. Accordingly, retension of the arm 175 in its clockwise rocked position is ineffective for controlling the associated start-stop mechanism.

Automatic stopping of the machine under various operating conditions is effected by a signal through a BW20 mounted in a bracket 185 secured to the rear frame 116. Engageable by said BW20 is an arm 186 fast on the rock shaft 160. Receipt of a signal through this Bowden wire rocks the arm 186 and shaft 160, thereby shifting interponent slide 156 into effective machine stopping position. The actuation of BW20 is effective only for stopping the machine and is responsive to the operation of signal control mechanism of the machine, as hereinafter more fully described.

At this point it will be noted that reference to Bowden wires in the specification will be the letters BW. Also, all Bowden wires while not showing have a spring in one end or the other of their casing.

Associated with the start-stop mechanism, as shown in Fig. 7, is a bail 187 hereinafter referred to as the clutch shaft safety bail, said bail connecting rock arms 188 (one shown in Fig. 7), which arms are fast on the shaft 147. Engaging with said bail are a plurality of BW's 46 through 50 mounted in a bracket 191 extending between the frame plate 103 and auxiliary frame plate 116. As will be seen, the clockwise rocking of shafts 145—147 for disengaging clutch 125 acts to raise the bail 187 and actuate said BW's 46 through 50. The signals effected by the actuation of said Bowden wires are adapted to operate a certain lockout mechanism associated with the machine controls as will be hereinafter more fully described. It will be seen that the bail operates to effect signals through said Bowden wires as the machine stops and to hold the signals effective as long as the clutch is disengaged and enabling said signals to be withdrawn when the machine is restarted and as long as the clutch remains engaged. As can be seen with reference to the timing diagram, Fig. 77, the machine stop cam 165 is effective for disengaging clutch 145 and actuating BW's 46, 47, 48, 49, 50 at 360° of a cycle. Clutch engagement to start the machine drive, not being controlled by cam 165, occurs at about 0° of a cycle and is effected by the breaking of the toggle mechanism as above described.

CARD HANDLING

As heretofore mentioned, each side of the machine operates to advance and feed cards from its respective side towards the center of the machine so as to deposit the card in a pocket common to both sides except when card feed is blocked or intercepted prior to reaching said common pocket as a result of sequence conditions set up in the machine. The card handling mechanism for each side of the machine is substantially identical to the other. For that reason it is believed a detailed description of such mechanism associated with one side will be sufficient, it being understood that each part so described is duplicated on the other side of the machine. The manner in which both sides of the machine jointly contribute in machine operation will be thereafter described. For purposes of description, the right hand side of the machine, as viewed from the front, and which side of the machine is shown in Figs. 1A, 5A, will be hereinafter referred to as the primary side, the left hand side of the machine, as viewed from the front (Figs. 1 and 5) being referred to as the secondary side. The primary side operates to advance and feed primary cards, the secondary side handling secondary cards, it being understood the terms "primary" and "secondary" are used herein for convenience only and are not intended to denote operational distinction between the respective sides of the machine.

Figure 3A:
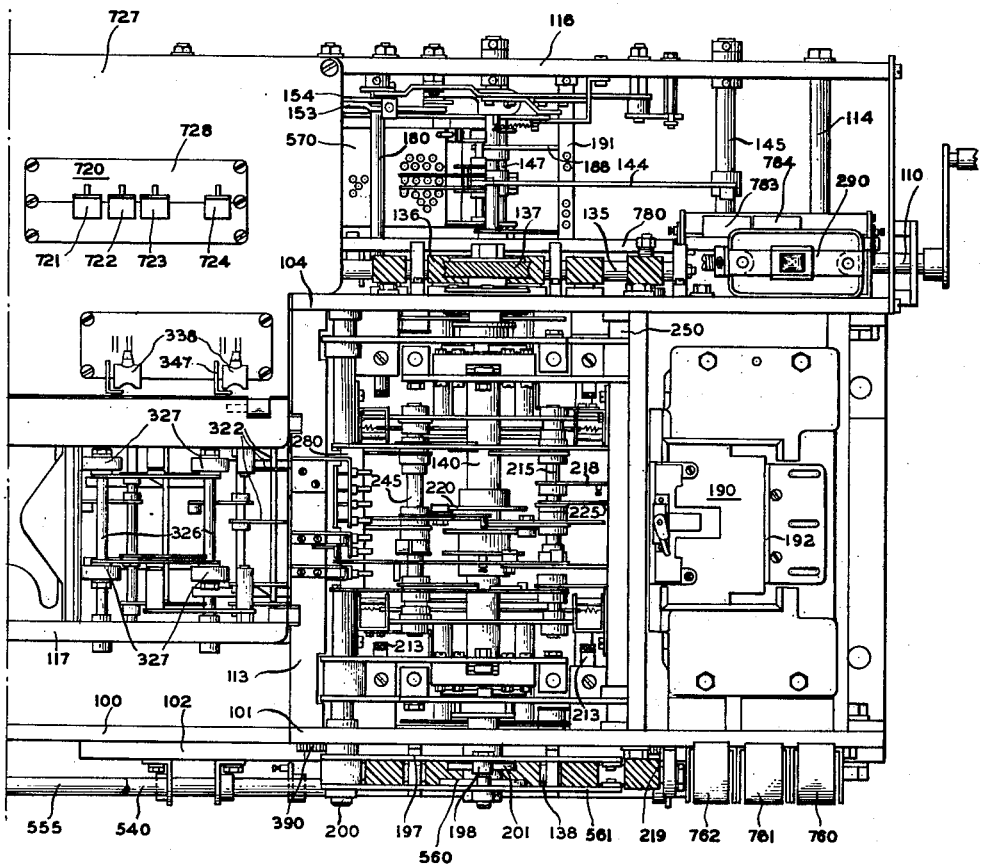

As seen in Figs. 3A, 4 and 5A, the primary side of the machine is provided with a card magazine 190 from which magazine stacked primary cards are advanced seriatim by a picker blade 192. The magazine and picker blade are of well known structure fully described in patent to W. W. Lasker, 2,044,119, issued June 16, 1936. The picker blade (see Figs. 4 and 5A) is reciprocated once each cycle by a link 193 connecting the blade with a rock arm 194 fast on a rock shaft 195 journaled in the front frame 101 and the rear frame 104 on the machine. Fast on the shaft 195 is a rock arm 199 (see Fig. 1A) pivotally connected to a link 196 which in turn is pivoted to follower arm 197, loosely mounted on the end of a fixed shaft 200. Said shaft 200 is mounted in the frame plates 104, 101, and extends through the frame plate 101. A roller 198 carried by the follower arm cooperatively engages a cam 201, hereinafter referred to as the card picker cam, mounted on the main primary head cam shaft 140. A spring 202 connecting the arm 199 with the frame plate 101 acts to retain the roller in engagement with the cam, thereby yieldably advancing the card picker blade 192 as the roller rides into the low periphery of the cam. The high periphery of the cam bearing on the roller acts to positively restore the picker to normal or returned position.

In order that the operation of the picker blade may be disabled under certain operating conditions of the machine, blocking mechanism is provided which includes a rock arm 203 (see Fig. 2) secured to the rear end of shaft 195 and formed with a notch engageable by a blocking lever 204. The blocking lever is pivoted jointly with a bell-crank 205 to the machine frame 104. The bell-crank is tensioned in a clockwise direction by a spring 206, the blocking lever being formed with a limit stud 208 tensioned by a spring 207 counter-clockwise so as to bear yieldably against and follow the rocking movement of the bell-crank. Both arms of said bell-crank are formed with bent over ears, each ear engageable by a BW37, 67, respectively, said Bowden wires being suitably mounted in brackets secured to the frame 104. As can be seen in Fig. 2, the signal resulting from the actuation of either of said Bowden wires will act to rock bell-crank counter-clockwise, enabling the blocking lever 204 at the proper time in the cycle to engage the notch of the rock arm 203, thereby holding the picker blade disabled in its returned position. Withdrawal of the signal through either of said Bowden wires enables the bell-crank 205 to rock clockwise under tension of spring 206 to its normal unblocking position. As will be seen in Fig. 77, the card picker cam 201 operates so as to advance a card beginning at about 23° of the cycle, advancing it fully at approximately 170°. The signal through BW67 results from the operation of safety mechanism associated with the primary card feed. The signal through BW37 arises from the operation of signal control mechanism actuated by certain sequence conditions of the machine. The operation of both said mechanisms and the time at which the respective signals are delivered will be hereinafter described.

The cards are advanced by the picker blade to a position wherein the leading edge of the card is disposed between a pair of feed rolls 209, 210 (see also Figs. 14, 15, and 16), the lower roll 209 being journaled in frame plates 101, 104, and driven by the primary rear drive shaft 135. The upper feed roll 210 is journaled in a pair of arms 211 fastened together with a release bar 212. The arms 211 are journaled on studs 213 mounted in blocks secured to the front frame 101 and rear frame 104. The roll 209 serves to drive the front auxiliary worm shaft 138 and also drives the upper feed roll 210 through cooperating gears 219, one on each of the rolls 209, 210.

The action of the picker blade operates to advance the lowermost card in the magazine so as to partially eject the card to a position where the trailing edge is in the magazine and the leading edge disposed between the feed rolls 209, 210. The term "card advance," as hereinafter used, is intended to designate the movement of the card by picker blade. The term "card feed," as hereinafter used, is intended to refer to the subsequent movement of the card to the card sensing stages and to its ultimate destination in the machine. The card feed rolls 209, 210 are normally separated and are rendered operative at predetermined periods of a cycle by mechanism associated with the main primary head shaft 140. As seen in Figs. 13 and 16, the primary head framework includes a pair of cross bars 214 extending between the front frame 102 and the rear frame 103, and between which bars are secured a pair of shaft supporting plates 216 (see also Fig. 15). A rock shaft 215, hereinafter referred to as the card stop shaft, is journaled at its ends in said plates 216, and is tensioned counter-clockwise (Fig. 16) by a spring 217 stretched between a stud on the cross bar 214 and a rock arm 218 fast on the shaft. Also fast on the shaft 215 is a follower 221 bifurcated to form a blocking arm and a follower arm, said follower arm carrying a roller 222 engaging a cam 220, hereinafter referred to as a card stop cam, mounted on the main head shaft 140. Also fast on said shaft 215 is a rock arm 223 formed with an open slot engaging a stud 224 on an arm 225 secured to the feed roll release bar 212. It will be seen that as the cam 220 rotates once per cycle, the high periphery thereof bearing on the roller 222 will rock shaft 215 clockwise so as to rock the upper feed roll 210 above and away from roll 209, the dwell of the cam 220 enabling a counter-clockwise rocking of the shaft 215 and engagement of feed rolls 210, 209 under tension of the spring 217. As seen in Fig. 77, the feed rolls are held in feeding contact by cam 220 from about 265° to 340°. It will be seen that the rolls will be spaced apart at approximately 170° of the cycle, which is the time at which a card is fully advanced by the picker blade, as heretofore described.

The primary feed rolls 209, 210 operate to withdraw the card fully from the card magazine and to propel the leading edge thereof into the first of two primary sensing chambers, hereinafter referred to as the "primary initial sensing chamber." The second of said sensing chambers will be hereinafter referred to as the "primary sequence sensing chamber." The upper limit of both of said sensing chambers is formed by a row of spaced bars 226 arranged in side by side relation, and supported at their ends by combs 227 (Fig. 13), one secured to each of the cross bars 214. The lower member of each sensing chamber comprises a plate 228 formed with holes in accordance with the index positions of a record card, which is suitably secured to the shaft supporting plates 216 and formed with bent over lip portions for guiding passage of a card. Projecting through slots in each of the plates 228 are a series of intermediate feed rolls 231 (Fig. 14), two for each side of each plate, each roll being mounted on a short shaft 230. The four front shafts 230 (Fig. 15) are suitably journaled in sleeves 229 secured to the front frame 101, and driven by the front drive shaft 138, the rearmost shafts 230 (see Fig. 2) being similarly journaled in the rear frame 104 and driven by the drive shaft 135. Engageable with each of said intermediate rolls 231 is a pressure roll 232, two on each side of each sensing chamber.

Each pressure roll 232 is mounted on the arm of an individual bell-crank 233, pivoted to the supporting plate 216, the two bell-cranks associated with each side of each sensing chamber being interconnected by a spring 234 which acts to yieldably retain each pressure roll 232 in bearing engagement with its related driving roll 231. Each bell-crank 233 is pivotally connected by a link 235 to a pressure release bar 236, one on each side of each of said sensing chambers, said bar being mounted for parallel movement on two arms 237 pivotally mounted on the supporting plates 216. The bar 236 is provided with a stud 241 engaged by a rock arm 242 fast on a rock shaft 245. The shaft 245, journaled similarly to shaft 215 in the supporting plates 216, and hereinafter referred to as the "card aligner shaft," carries a follower 243 bifurcated to form a blocking arm and a follower arm. Said follower arm carries a roller 244 engaging a cam 240 on the main primary head shaft 140, said cam being hereinafter referred to as the "card aligner cam." As seen in Figs. 13 and 14, the high periphery of cam 240 bearing on the roller 244 rocks shaft 245 counter-clockwise, shifting the pressure release bar 236 to the right, rocking each bell-crank 233 about its pivot point against the tension of spring 234 so as to disengage each pressure roller 232 from its associated driving roll 231. The low dwell of the cam enables clockwise rocking of shaft 245 and engagement of each pair of intermediate rolls 231, 232 under tension of their associated springs 234. As seen in Fig. 77, timing diagram, the cam 240 is effective for enabling engagement of the intermediate rolls from about 252° to 2° of the following cycle, thereby coinciding with and slightly overlapping the timing of the feed rolls which, as above described, were rendered effective from approximately 265° to 340° of the cycle. Accordingly, it will be seen that shaft 215 is rocked to enable card feed at that point of the cycle coinciding with the rocking of a shaft 245 so that the card fed by the feed rolls 209, 210 will be picked up to be fed fully into the initial sensing chamber by the first of the pairs of intermediate feed rolls 231, 232. The shaft 215, however, is adapted to rock only concurrently with the shaft 245 and is prevented from rocking independently of the shaft 245 by means of the interaction of the followers 243 and 221. As seen in Figs. 13 and 14, the blocking arm of follower 243 carries a stud 246 overlying the blocking arm of the follower 221, thereby preventing the follower 221 from rocking counter-clockwise into effective card feed position unless the follower 243 is concurrently rocked clockwise into effective card feeding position. As will be hereinafter described, feed blocking mechanism effective under certain sequence conditions of the machine is associated with the shaft 245 to render the shaft inoperative for engaging the intermediate rolls 231, 232. Under such conditions, blocking arms and followers 243, 221 act to render the shaft 215 concurrently inoperative for engaging the feed rolls 209, 210.

As seen in Figs. 13 and 16, cards are fed through each sensing chamber until limited by a card stop 247 of the usual construction, each stop being carried by a pair of arms 248, one of each pair being shown. Each of said stops are adapted to slide vertically in slots cut out of the guide bars 226. Each card stop arm 248 is suspended from a stud 251 on bell-cranks 252, 253, the bell-cranks 252, associated with the initial sensing chamber, being fast on shaft 215, and bell-cranks 253, associated with the sequence sensing chamber, being loosely mounted on the shaft 245. Each bell-crank 252 is pivotally connected by a link 254 to a bell-crank 253 so as to rock bell-cranks 252, 253 concurrently. It will be seen that clockwise rocking of shaft 215 enables each card stop to be lowered or closed under tension of springs 255 stretched between each arm 248 and associated link 254. The counter-clockwise rocking of shaft 215 by operation of the card stop cam 220, above described, acts to positively raise each stop above card engaging position. The stops being actuated through shaft 215, it will be seen that their timing coincides with raising and lowering of the feed rolls 209, 210 whereby, as seen in Fig. 77, the stops 247 open at 265° and at the same time that the feed rolls engage, thereby permitting the ejection of a card from each sensing chamber. Said stops are closed at 340°, coinciding with the disengagement of feed rolls 209, 210 and slightly in advance of the disengagement of intermediate rolls 231, 232, so as to block the movement of the next succeeding card in each sensing chamber.

Aligning mechanism is provided for accurately positioning a card against each of the card stops, said aligning mechanism being actuated by the shaft 245. As seen in Figs. 13, 18, 19 and 20, the short or side edges of a card are adapted to be engaged by an aligning flap 256, one on each side of each sensing chamber, each being pivotally mounted on a stud 257 secured in the frame cross bars 214 and each flap projecting through cut away portions of the sensing chamber plates 228. Secured to each flap 256 is an inwardly extending arm 258 each formed with an open slot engaging a pin 261 in a short slotted slide 260. Said slide 260 is mounted for vertical movement on studs 262 secured on the cross bars 214. Engageable with the top of the slide 260 associated with the sequence sensing chamber is the free end of a rock lever 263 loosely mounted on a shaft 245. A similarly shaped rock lever 264 loosely mounted on shaft 215 engages with the slide 260 associated with the initial sensing stage. The inwardly projecting ends of levers 263, 264 are each provided with an open slot engaging the blocking stud 246, heretofore described, on the follower 243. It will be seen that as the follower 243 rocks clockwise under control of cam 240, the free end of each lever 263, 264 will be lowered, depressing slides 260 and rocking each aligning flap about its pivot point 257 into ineffective position. As the cam 240 rocks the follower 243 counter-clockwise, the free end of said levers 263, 264 rise, enabling springs 259, interconnecting said levers and slides, to raise the slides 260 and permit the flaps 256 to rock inwardly against the edges of a card to effective aligning position. In the event there should be no card in a sensing chamber, it will be noted that lost motion between levers 263, 264 and the associated slide 260 will enable the flaps to rock fully against the limit of the slots formed in the lower sensing chamber plate 228. The side aligning flaps 256 being actuated from the shaft 245, it will be seen with reference to Fig. 77, that the timing of the side aligning flaps coincides substantially with that of the intermediate feed rolls 231, 232, i. e., the flaps being ineffective from about 255° to 355° during which time the feed rolls are effective. The flaps are, however, effective for the remainder of a cycle at which time the intermediate rolls are ineffective.

Each sensing chamber is also provided with a pair of rear card aligners 265 (see Figs. 13, 17 and 21) for engaging the rear or trailing edge of a card and holding it against a card stop 247, said aligners being adapted to reciprocate in slots formed in guide bars 226 and plate 228 of each sensing chamber. The rear aligners are suspended on studs 266 in bell-cranks 267, 268, the bell-crank 267, associated with the sequence sensing chamber, being fast on the rock shaft 245, the bell-crank 268, associated with the initial sensing chamber, being loosely mounted on the rock shaft 215. Pivotally connecting bell-cranks 267, 268 is a slide 271 formed with inclined cam surfaces, each engaging a roller 272 on each of the aligners 265. Each aligner is held in engagement with its pivot stud 266 by a spring 273 connected to the slide 271. It will be seen that the clockwise rocking of shaft 245 under control of the card aligner cam 240, as above described, will act to shift the slide 271 to the left (as seen in Fig. 17), camming each roller 272 to the left and upward. At the same time, the clockwise rocking of bell-cranks 267, 268 will raise the pivot point 266 of each aligner so that the combined action of the bell-cranks and slide give each aligner an upward sweeping action against tension of the springs 273. The counter-clockwise rocking of shaft 245 enables the aligners to sweep downwardly against the trailing edge of a card fed into the sensing chamber so as to yieldably align each card against its associated card stop. The rear aligners operate concurrently with the side aligning flaps 256, above described. It will be seen with reference to Fig. 77, the timing chart, that the aligners sweep upward to ineffective position at 255° of a cycle, i. e., when the intermediate feed rolls engage, and sweep downwardly to effective aligning position at 355° of a cycle, i. e., at which time the intermediate feed rolls become disengaged, and the card stops are in the lower effective position.

As is well known to this art, the normal feeding and aligning of a card is occasionally hindered as a result of a defect in the card, a foreign substance in the path of card travel, or some other cause, which condition, unless otherwise provided for, would result in jamming a plurality of successive cards in the chamber. In order to avoid card jams, the present machine is provided with a safety mechanism for causing a machine stop operation upon failure of a card to align properly in any sensing chamber. There is pivoted to each of the slide bars 271, pawls 274, 275, each pawl 274 yieldably tensioned by a spring 276 to bear upon and follow the movement of the rear card aligner stud 272, each pawl 275 similarly tensioned by a spring 276 to bear upon and follow the movement of a stud 277 on each card stop arm 248. Pawls 274 are formed with a flat end, while pawls 275 have a hook nose. The free end of each pawl 274 and the hook on pawls 275 are adapted under certain conditions to engage a shoulder formed on the depending arm of a rock lever 281 associated with each side of each sensing chamber, the two levers associated with the initial sensing chamber being freely mounted on the shaft 215, and the two levers 281 associated with the sequence sensing chamber being freely mounted on the shaft 245. It will be seen that as the slide 271 is shifted laterally to the left (Fig. 17) to raise the rear card aligners 265, as above described, and at the time card stop arms 248 are raised through the actuation of shaft 215, each pawl 274, 275 will be free to rock into horizontal alignment with the shoulder of each rock lever 281, the pawls 274, 275 rocking clockwise. In normal operation as aligners and card stops are lowered to effective position, pawls 274 and 275 will be rocked out of alignment with each shoulder so that as the slide 271 slides to the right, each pawl 274, 275 will be clear of the associated rock lever 281. However, in the event a card is displaced with respect to any sensing chamber, it will be seen that either the aligner 265 or the card stop 247 will be blocked by such card and prevented from returning to effective position. Under such condition the pawl associated therewith will be effective for engaging and rocking the associated lever 281 as the slide 271 shifts laterally to the right and which, as above described, occurs at about 355° of a cycle. Fig. 21 illustrates the position of pawls 274, 275 when a card is in proper alignment with card stop arms 248 and aligners 265 in effective positions.

The upwardly extending arm of each rock lever 281 is pivotally connected to associated link 282 (Fig. 13), one on either side of the sensing chambers, each link carrying a stud 283 engaging a bail 280 loosely mounted on shaft 200. It will be seen that the blocking of any card stop 247 or rear card aligner 265 by a displaced card will result in actuating the associated lever 281 and link 282, rocking the bail 280 counter-clockwise about the shaft 200, said rocking occurring at about 355° in a cycle. The bail 280, hereinafter referred to as the "primary card feed safety bail," is effective for blocking primary card feed and also actuating certain Bowden wires so as to transmit signals to other control members of the machine, as will be hereinafter described. As seen in Figs. 13 and 24, a bell-crank 284 having a vertical arm with a bent over ear and a horizontal arm having a blocking nose is freely mounted on the shaft 200 and yieldably tensioned by a spring 285 to follow the rocking movement of the bail 280. The blocking nose of said bell-crank is adapted when the bail is rocked counter-clockwise to engage the bent over ear of an arm of a bell-crank 286 fast on the card aligner shaft 245. A spring 287 stretched between said bell-crank 286 and the frame cross bar 214 acts to supplement clockwise tension, as above described, on the shaft 245. It will be seen that with the safety bail 280 in normal unactuated position, the blocking nose of bell-crank 284 will be disposed above and clear of the ear of bell-crank 286, enabling the shaft 245 to rock clockwise under the control of cam 240 to enable the normal operation of the intermediate feed rolls, card aligners, card stops and feed rolls. However, rocking of the safety bail by link 282 which occurs at about 355° of a cycle will release the bell-crank 284 which will rock counter-clockwise to effective blocking position, thereby preventing at about 255° of the following cycle a clockwise rocking of shaft 245, thus preventing normal operation of the feed rolls, intermediate feed rolls, card aligners and card stops, i. e., blocking primary card feed. Engaging with the vertical arm of said bell-crank 284 is the end of a BW57 suitably supported in a bracket 288 secured to one of the frame cross bars 113. Said Bowden wire, as will be hereinafter more fully described, is actuated upon the initiation of a clear operation of the machine and is effective for rocking the bell-crank 284 clockwise to unblocking position irrespective of the position of the safety bail 280.

In addition to releasing the bell-crank 284, the rocking of the primary card feed safety bail 280 operates to actuate and initiate signals through a group of BW's 64, 65, 66, 67, each suitably supported in a bracket 288 so as to be engaged by turned up ears 289 formed on the bail 280. As can be seen with reference to Fig. 76B, the BW67 extends from the safety bail to the bell-crank 205 (see also Fig. 2) which, as heretofore described, operates to block primary card picker blade 192. The signal through BW67, occurring at about 355°, operates to rock said bell-crank 205 counter-clockwise, thereby preventing card advance at the beginning of the following cycle. The BW66 extends from the bail 280 to switching mechanism associated with a primary signal light 290 which signal light is mounted on the rear frame plate 104. The light and switching mechanism may be of well known structure contained in an independent circuit, the switch being responsive to the actuation of either of two BW's 66 or 35, for making and holding a circuit through the light as long as the respective Bowden wire is actuated, and breaking the circuit through the light when the Bowden wire is withdrawn. The BW35 for controlling said switch is responsive to the operation of signal controlling mechanism of the machine and is actuated upon certain out of sequence conditions in the machine, as will be hereinafter fully described. The BW's 65, 64 actuated by the primary card feed safety bail are effective for transmitting signals to the same signal control mechanism of the machine for achieving functions which will be fully described in that part of the specification dealing with said mechanism. For the present, however, it will be sufficient to state here that the signal through BW65 operates to prevent primary feed blocking which would otherwise result from certain out of sequence conditions of the machine, the signal through BW64 operating to stop the machine upon completion of the following cycle. Accordingly, it will be seen that when the primary card feed safety bail 280 is pulled at about 355° of a cycle by the link 282, the signal through BW67 will block card advance which would otherwise occur in the first half of the following cycle, bell-crank 284 is released to block card feed which would otherwise occur in the second half of the following cycle, a signal is transmitted through BW66 to light the primary signal light 290, a signal is transmitted through BW65 to prevent blocking of primary feed by sequence conditions in the machine, and a signal is transmitted through BW64 to cause a machine stop which machine stop occurs at the end of the following cycle with the signal light still on.

The bail 280 may also be rocked upon a run out of cards or a failure of card advance by mechanism adapted to detect the presence of a card in the advance stage, i. e., between feed rolls 209, 210, the absence of a card in the advance stage indicating either a failure of card advance or an empty feed magazine. As seen in Figs. 21 and 22, a bell-crank 291 carrying a card detecting finger 292 is pivoted on a bracket 299 which is secured to the frame cross bar 214, said bell-crank having an open slot engaging one arm of a three arm cam follower 293 loosely mounted on the shaft 215. As also seen in Fig. 13, another arm of said follower carries a roller 294 cooperating with a cam 295, hereinafter referred to as the "card detector cam" mounted on the main primary head shaft 146. The third or upright arm of said follower is pivotally connected to a pull link 296 the free end of which link is formed with a hook shaped shoulder normally bearing on the top surface of the card feed safety bail 280. A spring 297 stretched between the link and a collar on shaft 245 acts to yieldably retain the hooking shoulder in bearing relation with the bail 280 and at the same time exerting a clockwise tension on the follower 293. The dwell in the no-card cam 295 enables a clockwise rocking of follower 293 under tension of spring 297 so as to rock the card detector finger 292 against the side edge of the card when in advanced position. If a card is detected in the advanced position, further clockwise rocking of follower 293 will be blocked by the card, thereby preventing the roller 294 from reaching the lowest limit of the cam dwell. If there is no card in the advanced position the roller 294 will be free to reach the low limit of the cam dwell and in that position of the follower 293, the link 296 will be shifted laterally a sufficient distance to enable the hook to engage behind the safety bail 280. In such event, when the roller 294 rides into the high periphery of the cam to rock the follower counter-clockwise, the pull link 296 engaging the safety bail 280 will pull the bail counter-clockwise into effective position. As can be seen in Fig. 77, the low dwell of the cam enables card detection at about 183° of a cycle, the card having been fully advanced by about 165°. If no card is detected, the pull link 296 is free to engage behind the bail 280 at about 195°, the bail being pulled from approximately 195° to 218° so as to be fully actuated at 218°.

The link 296 is disengaged from behind the bail 280 by a stud 298 formed on the cam 295 which stud is adapted to engage and cam against a nose formed on the link whenever the link is in its lower bail engaging position. The stud 298 is so located on the cam as to engage the link and rock it about its pivot point with follower 293 at about 355° of a cycle so as to enable the bail 280 to return to normal ineffective position. As hereinafter described, the timing of the rocking of bail 280 by link 296 is sufficiently early to enable the signal through BW64 to stop the machine upon completion of the same cycle in which the bail is pulled. Accordingly, the signals through BW64, 65, 66, 67 will be withdrawn as the machine stops, the signal through BW64 having caused the machine stop, the signal through BW65 having prevented primary feed blocking as a result of certain out of sequence conditions in the machine, the signal through BW66 having flashed the signal light 290 on and off, the signal through BW67 having been ineffective to block primary card advance since it was held actuated from about 218° to 355°, i. e., during that portion of the cycle in which the picker blade was returned from advance to normal position.

Disabling mechanism is provided for rendering the pull link 296 ineffective for rocking the primary card feed safety bail on a no-card detection so as to enable one side of the machine to operate independently of the other, i. e., when the other card magazine is empty. Said disabling mechanism comprises a bell-crank 301 (Fig. 21) having an upright arm formed with a bent over ear, and a horizontal arm forming a blocking nose, said bell-crank being mounted on the shaft 200 and yieldably tensioned counterclockwise by a string 303 against the end of a BW45 suitably supported in one of the brackets 288. The blocking nose of said bell-crank is disposed normally to lie below and clear of a pin 304 secured in the pull link 296. It will be seen that clockwise rocking of said bell-crank resulting from a signal through BW45 will raise the blocking nose into engagement with the pin 304, thereby blocking and preventing the link from shifting laterally and engaging behind the safety bail 280. The signal through BW45 is associated with set up controls of the machine hereinafter fully described, and is actuated upon setting the machine for a secondary sequence check operation, being held actuated as long as the operation continues.

Primary card feed and card advance may also be blocked independently of the operation of the primary card feed safety bail 280 as a result of various sequence conditions in the machine or as the result of setting the machine for a secondary sequence check operation. Feed blocking under either of these conditions is not effected through the operation of the primary card feed safety bail 280 and, accordingly, does not result in the stopping of the machine. As seen best in Fig. 23, a bell-crank 305, similar in shape to the above described bell-crank 301, is freely mounted on the shaft 200 and tensioned by a spring 306 counterclockwise against a BW36 suitably mounted in one of the brackets 288. The blocking nose of bell-crank 305 is disposed normally below and clear of the bent over blocking ear of bell-crank 286. It will be seen that clockwise rocking of bell-crank 305, resulting from a signal through BW36, raises the blocking nose into the path of said ear on bell-crank 286, thereby preventing clockwise rocking of the card aligner shaft 245. As heretofore described, blocking of shaft 245 results in holding feed rolls and intermediate feed rolls disengaged, and the card stops and card aligners lowered in effective position. As best shown in Figs. 2 and 76A, the other end of BW36 is supported adjacent to a BW37 in one ear of a bracket 308 which bracket is secured to the rear frame connecting strips 105. Mounted in another ear of said bracket are BW's 34, 44 each engaging a common slide interponent 310, and which slide interponent is adapted to engage each of the BW's 36, 37. The other end of BW37 (see also Figs. 2 and 76B) is suitably supported to engage the blocking bell-crank 205 associated with the primary picker blade and is effective for rocking said bell-crank so as to block primary card advance as heretofore described. It will be seen that signals through BW's 36 and 37 result from either of two independent sources, i. e., through BW44 or BW34. BW44 is associated with set up controls of the machine and is actuated, as hereinafter more fully described, when the machine is set up for a secondary sequence check operation and held actuated as long as said operation continues. BW34 is associated with signal control mechanism of the machine, being responsive to certain sequence conditions in the machine. The signal through BW34 in those cycles when effected is transmitted prior to the period of card feed in the same cycle, and is withdrawn subsequent to the period of card advance in the following cycle, thereby being effective for blocking primary card feed which would otherwise result at about 255° of the cycle, and also blocking card advance which would otherwise occur beginning at approximately 5° of the following cycle.

From the foregoing it will be seen that primary cards are advanced successively by the picker blade to the feed rolls 209, 210 within the first half of a cycle and are fed by operation of the card stop shaft 215 and card aligner shaft 245 within the last half of a cycle. Primary card advance and feed will be blocked as a result of a signal through either BW44 or BW34. Primary card advance and feed may also be blocked as the result of the actuation of the primary card feed safety bail 280 when actuated at about 355° of a cycle as a result of card misalignment in either sensing chamber, the actuation of said bail also resulting in a machine stop. Card feed but not card advance may also be blocked by operation of the card feed safety bail by the no-card detector at about 218° of a cycle, said actuation of bail 280 being ineffective to block card advance which occurs beginning at approximately 5° of the following cycle.

It should be understood that all of the primary card advance and feed mechanism heretofore described is duplicated on the secondary side of the machine which operates to feed and advance secondary cards in the identical same manner. Except for the Bowden wires associated with the secondary side of the machine, each element in the structure of the secondary side will be hereinafter referred to in the specification and drawings by the same reference numeral as its primary counterpart and designated with the suffix "S" to thereby designate it as part of the secondary structure. Accordingly, it is believed that detailed description of the secondary head mechanism will not herein be required. Briefly stated, however, it will be seen (Figs. 1, 3, and 5) that secondary cards are advanced from a secondary magazine 190S by a secondary picker blade 192S to secondary feed rolls 209S, 210S which thereafter feed the secondary cards seriatim to the intermediate feed rolls 231S, 232S of the initial and sequence sensing chambers on the secondary side of the machine. Associated with the main head shaft 140S on the secondary side are the secondary card stop shaft 215S and the card aligner shaft 245S which are effective for actuating the secondary feed rolls, card stops, intermediate feed rolls, and card aligners in the same manner as heretofore described with reference to the primary side of the machine.

The secondary card feed safety bail 280S is rocked by the secondary no-card detecting link at about 218° or as the result of card misalignment at about 355°. The rocking of the secondary card feed safety bail 280S effects signals (see Fig. 76C) through BW's 68, 69, 70 and 71. The BW68 corresponding to BW64 on the primary side is effective for causing the machine to stop. The signal through BW69 corresponding to primary BW65 prevents blocking of secondary card feed as the result of various sequence conditions in the machine. The BW70 corresponding to primary BW66 is effective for lighting the secondary signal light 290S, which light is also responsive to a signal through BW30, corresponding to primary BW35. The BW71 is effective for rocking bell-crank 265S so as to block secondary card advance. The feed blocking bell-crank 284S associated with the secondary card feed safety bail is responsive to a signal through BW58 corresponding to primary BW57 for rendering the bell-crank ineffective in secondary clear operations. The BW41 corresponding to primary BW45 is effective for disabling the secondary no-card detector link 296S and is actuated upon the setting of the machine for a primary sequence check operation. BW38 corresponding to primary BW33 is responsive to signals through either BW40 or 32 corresponding to primary BW's 44, 34, so as to actuate the secondary feed blocking bell-crank 305S upon either a primary sequence check setting of the machine or upon various sequence conditions arising in other settings of the machine. A BW39 is provided corresponding with primary BW37 and is effective for rocking bell-crank 295S so as to block secondary card advance concurrently with the actuation of BW38 through BW's 40 or 32, as above described.

The timing of the secondary side is identical with that of the primary side so that when secondary card feed safety bail 289S is fully rocked as a result of a no-card detection at 213°, the machine will come to a stop at completion of the same cycle but with the safety bail restored. However, when the bail is rocked as the result of card displacement at about 355° of a cycle, the machine will come to a stop at the completion of the following cycle with the bail held in rocked position.

Cards are fed, except when blocked by the mechanism heretofore described, from the sequence sensing chamber at about 265° to a pair of eject rolls 311, 312 (Fig. 16). The roll 311 is suitably journaled in the frame plates 101 and 102 and is driven in a manner similar to feed roll 209, previously described, by the head shaft 135. The roll 312 is journaled in a pressure bar 313 pivoted in the same manner as feed roll 210 to frame plates 101 and 104, and driven in a similar manner by gears 309, and is yieldably retained in engagement with the lower roll 311 by an arm 314 freely mounted on rock shaft 245 and tensioned clockwise to bear on the pressure bar 313 by a spring 315 stretched between the arm 314 and cross bar 214. The eject rolls 311, 312 are in constant engagement, as distinguished from the feed rolls 209, 210, and act to fully eject a card from the sequence sensing chamber to receiving pocket mechanism now to be described.

The card receiving pockets (as seen in Figs. 1, 1A, 5, 5A, 25, 26) are disposed between the primary head section and secondary head section of the machine. Five pockets are provided, two associated with the primary side, two associated with the secondary side, and one, i. e., the middle pocket, being associated with both primary and secondary sides and adapted to receive either primary or secondary cards. The pockets are of the usual construction found in sorters and the like, being formed by partition plates 316 (Fig. 26) secured to the frame members 117, 118. Each pocket is provided with a card tray 317 guided on the partition plates and mounted on a yieldable plunger 318 cooperating with a bumper 321 in a well known manner so that as the weight of cards increases, the tray will be yieldably lowered a distance to compensate for the increasing height of the card stack.

For purposes of description, the several pockets will be referred to by numbers P1 through P5, reading from left to right, as viewed in Figs. 5 and 5A. The first pocket, i. e., P1, is a secondary "reject" pocket; pocket P2 being a secondary "equals" pocket; pocket P3 being a file merge pocket; pocket P4 being a primary "equals" pocket; pocket P5 being a primary "reject" pocket. Associated with each of the pockets P1, P2, P4, P5 is a pocket gate, each gate comprising a pair of card deflector plates 322 of substantially triangular shape and secured to a rock shaft 323 which shaft is journaled in the frame members 117, 118, and counter-balanced by a weighted arm 324 secured to each shaft. Each gate is adapted to assume either an open or closed position with respect to its associated pocket. When open, the gate shaft 323 will be rocked so that the under side of the deflector plates 322 will intercept a card and deflect it into the associated pocket. When closed, the gate shaft will be rocked to a position wherein the top side of the deflector plates will support the passing card, enabling it to pass beyond the associated pocket.

Cards are conveyed to and beyond their respective pockets by means of pocket conveyor rolls 325 mounted on shafts 326, two rolls being on each shaft so as to engage both sides of a card, the shafts 326 being suitably journaled in the frame plates 117, 118 and rear frame 104, and driven by worm drives on the shafts 135, 135S, respectively. Engaging with each roll 325 is an idler roll 327, one mounted at each end of an arm 328 carried by a lever 331 pivoted to the frame members 117, 118, respectively. A spring 332 stretched between each arm 331 and the related frame 117, 118 acts to equally tension each idler roll 327 against its associated driving roll 325. The arrangement is such that there are four pairs of rolls 325, 327 associated with the primary side and adapted to convey all primary cards to middle pocket P3 unless intercepted by one of the primary gate deflectors 322. Likewise, four pairs of secondary conveyor rolls 325, 327 are provided which are adapted to convey all secondary cards to the file merge pocket P3 unless intercepted by one of the secondary gate deflectors 322.

Each gate is provided with gate control mechanism settable to control the operation of the gate in one of four different ways. As best seen in Figs. 29 and 30, the end of each gate shaft 323, extending through the frame 118, carries a block 333 to which is secured a rocker 334. Said rocker is formed with two shoulders and two dwells, one shoulder and dwell each disposed on opposite sides of its axis. The rocker is guided by a slot therein cooperating with a limit pin 335 secured in the frame 118. Cooperating with said rocker is a slide 336 (Fig. 29) mounted on studs 337 formed on a gate control key 338 in the form of a manually shiftable plate. Said slide is yieldably tensioned by a spring 341 to bear on the upper surface on said rocker 334. The plate 338 is mounted for sliding movements on three studs 342 secured in the frame 118 and is manually shiftable laterally to one of four positions. Also cooperating with the said rocker is the upper end of a thrust rod 344 carried by a pin and slot connection on a pin 345 in the plate 338. The lower end of said rod is pivotally connected to a bar 346 slidably mounted on studs in the frame 118. The bar 346 is formed with a bent over ear adapted for engagement by either one of two Bowden wires suitably supported in a bracket mounted on the frame 118. It will be seen that with the shiftable plate 338 set as shown in Fig. 29, the actuation of a Bowden wire will result in raising the bar 346 and thrust rod 344 which will engage the left hand shoulder formed on the rocker 334 and thereby operate the associated card gate. The direction in which the card gate shaft 323 is rocked by the rod 344 depends upon with which shoulder of rocker 334 the rod is set to engage. In Fig. 29, the plate 338 is set in position for automatic closing of the gate upon signal. It will be seen that the slide 336 acts to hold the rocker 334 and its associated gate in a counter-clockwise rocked position, i. e., open position, while the rod 344 is disposed to bear on the left hand shoulder of the rocker so as to rock the shaft and gate clockwise to a closed position against tension of the yieldable slide 336. A manual shifting of the plate 338 to the right from the position shown would effect a "manually open setting of the control" in which position the gate would be held open by the slide 336 and the rod 344 would be disposed clear of the shoulder of rocker 334 and, therefore, ineffective to rock the gate clockwise to closed position. Shifting of the plate to the left from the position shown would effect an automatic open setting of the gate control wherein the slide 336 will hold the gate in its clockwise rocked position, i. e., closed position, and the rod 344 would be disposed to bear against the right hand shoulder of rocker 334 so as to rock the shaft and gate counter-clockwise to open position upon receipt of a signal. Shifting of the plate 338 to its extreme leftmost or fourth position will effect a manually closed position of the gate control with the rocker held rocked clockwise by slide 336, the rod 344 being disposed to clear a shoulder of rocker 334 and thereby ineffective to rock the gate open upon receipt of signal. Accordingly, it will be seen that in the first of the four settable positions of the plate 338, i. e., the rightmost position, the card gate is held open and uneffected by signal and in the second position, as shown, the card gate is held open and is closed upon receipt of signal, and in the third position the card gate is held closed and open upon receipt of signal, and in the fourth position it is held closed and uneffected by the receipt of signal.

Accurate setting of the plate 338 into one of the four above described positions is effected with detent mechanism comprising a manually rockable bell-crank 347 pivoted to the plate 338 and carrying a detent pin 348 cooperating with detent dwells formed in a bar 351 supported by the studs 342. The bell-crank is tensioned counter-clockwise by a spring 353 and carries a pin 354 engaging a rocker 355 which rocker is pivoted on the plate 338 and has a shoulder bearing on a pin 356 in the slide 336. The arrangement is such that manual rocking of the bell-crank 347 releases the detent pin 348 and at the same time raises the slide 336 enabling the plate 338 to be freely shifted to any one of the four positions.

From the foregoing it will be seen that each primary card ejected by rolls 311, 312 will be conveyed into one of the pockets P5, P4, or P3, depending upon the setting of gate controls for pockets P5 and P4, and upon receipt of signals associated therewith. Likewise, all secondary cards rejected by secondary eject rolls 311S, 312S will be conveyed to pocket P1, P2, or P3 depending upon setting of gate controls for pockets P1 and P2 and upon receipt of signals associated with said pockets. It might be here noted that in file merge operations of the machine the gate controls for all pockets are reset for automatic opening so that cards fed from either primary or secondary sides of the machine will be conveyed to the file merge pocket P3 unless intercepted by the automatic opening of a more anterior gate. The signals for operating said gates are responsive to the operation of the signal control mechanism of the machine resulting from various sequence conditions, as can be seen in Figs. 27, 76A and 76B. The signals for operating pocket P1 gate are transmitted through BW's 25, 26; the signal through BW25 being initiated by a secondary "wrong sequence" condition and the signal through BW26 resulting from a "clear" operation. The signals for operating the P2 pocket gate are transmitted through BW's 21, 22, both of said signals resulting from "equal" conditions in the machine. Likewise, signals for operating P4 pocket are transmitted through BW's 23, 24, resulting from "equal" conditions in the machine. The signals for operating the P5 pocket are transmitted through BW's 27, 28, the signal through BW27 resulting from a primary "wrong sequence" condition and the signal through BW28 resulting from a "clear" operation.

Associated with each pocket is full pocket control mechanism adapted to effect an automatic machine stop when any of the pockets become full. The mechanism, as seen in Figs. 26, 27 and 28, comprises a rock arm 357 having its end disposed within each pocket, each arm being engageable by an associated card tray 317 so as to be rocked as the tray yields under weight of cards to its lowest limit of movement. The rock arms 357 associated with pockets P1, P2, P4 and P5 are mounted on a rock shaft 350 and the rock arm 357 associated with the P3 pocket is mounted on a shaft 360, both of said shafts being journaled in brackets secured to the inside of the rear frame member 104 between said frame and auxiliary frame 118 and adapted to rock in unison through interconnecting link 361. Fast on the rock shaft 360 is a short rock arm 358 formed with a bent over ear for engaging the end of a BW29 suitably mounted in a bracket secured to the frame 104. It will be seen that the lowering of any card support tray 317 to full pocket position will act to rock the shaft 360 against the tension of a spring 349 so as to actuate and transmit a signal through BW29 to the signal control mechanism, which signal, as hereinafter described, is effective for causing an automatic machine stop. A bell-crank 359 fast on shaft 360 is adjustably settable to limit the rocking movement of arms 357.

The pocket controlling signals through BW's 21–28, inclusive, are output signals from the signal control mechanism and, as hereinafter more fully described, are transmitted within the last half of the cycle, being withdrawn within the first half of the following cycle. As heretofore described, the card stops normally rise to ineffective position at about 265° of a cycle so that it will be seen that the time between about 265° and 100° of the following cycle enables the card to be fully ejected by eject rolls 311, 312, and conveyed by rolls 325, 327 to any one of the three pockets associated with each side of the machine. Such timing is sufficient to enable the card to be completely fed into any one of said three pockets before the signal is withdrawn in the following cycle before the next succeeding card is conveyed to a pocket in accordance with the next succeeding group of signals effective in said following cycle.

CARD SENSING

*(Figs. 5A, 12, 31, and 32)*

The machine is provided with sensing mechanism of a well known type for determining the perforation pattern of a record card, and controlling the machine in accordance therewith. Said sensing means is similar to the means fully shown and described in British Patent 401,012 to Arthur Thomas, dated November 9, 1933. As fully shown in said patent, and as seen in Figs. 5, 5A, and 32, a reciprocating sensing pin box 362 cooperates with each sensing chamber, said boxes being suitably guided for vertical movement between the frames 101, 104 of the present machine, each box supporting by three perforated plates 363 a plurality of individually yieldable sensing pins 365. One pin is provided to correspond to each index position of a record card and is adapted to reciprocate with the pin box through a perforation in the lower sensing chamber plate 228. Both sensing pin boxes on each side are reciprocated concurrently by a cam assembly mounted on the primary head shaft 140. As seen in Figs. 31 and 32, each sensing pin box is formed with a pair of threaded shanks 364 one on each side of each box, one shank carrying an adjustable sleeve 366 and the other shank carrying a sleeve 382 on the threaded portion. The frame 367 of the sensing pin box 362 is mounted for reciprocation on pins 368 carried on the frame 386 of the rocker pin box 387.

Both pin boxes 362 are driven concurrently by an individual set of cams for the front and rear of the machine as shown in Fig. 31. Since both drives are similar only one need be described. A lever 371 is pivotally connected to sleeve 366 of the initial sensing pin box. The lever 371 is formed integral with a sleeve loosely mounted on a shaft 260. Secured integral with the above sleeve is an arm 372. A roller 373 is mounted in the mid portion of arm 371 which cooperates with a cam 370. A roller 374 mounted in the free end of arm 372 cooperates with a cam 380. The cam 370 is complementary to cam 380 and both are secured to head shaft 140. Secured to arm 371 is a block 376 which is provided with a horizontal slot 377 for cooperation with a pin 378 carried in an arm 381. The arm 381 is loosely mounted on shaft 250 and is pivotally secured at its free end to sleeve 382.

In operation the cams 370 and 380 raise and lower the arm 371 which rocks about shaft 260 reciprocating one side of the initial sensing pin box. The reciprocation of arm 371 is transmitted to arm 381 by pin 378 which raises and lowers one side of the sequence sensing pin box. Similar cams 370 and 380 reciprocate the other side of both pin boxes concurrently through similar mechanism.

As can be seen with reference to Fig. 77, the cams 370, 380 are effective for raising sensing pin boxes from about 0° to fully raised position at approximately 28° and for lowering said pin boxes to fully lowered position at about 80° of a cycle to thereby sense a card which is fully fed and aligned in each sensing chamber at about 355° of the previous cycle, in the manner heretofore described.

Cooperating with each sensing pin 365 is a rocker pin 383 formed with an offset head portion and each supported by intermediate yieldably mounted transmission pins 384, said pins 383, 384 being suitably guided by perforated plates 385, mounted in a frame work 386 comprising a set pin box 387 fixed to the frames 101 and 104. As more fully described in said British Patent 401,012, the shank of each rocker pin 383 is yieldably tensioned by spring pressed transmission pin 384 to bear against an associated sensing pin so that when a sensing pin in being raised is not blocked by a card, i. e., finds a hole in a card, it will rise above the end of its associated rocker pin which in turn will rock about its head into alignment with the raised sensing pin, so that as the sensing pins are lowered, the associated rocker pin will be interposed between pins 365 and 384 in accordance with the perforation pattern detected in a card. The rocker set pin box 387 is provided with a retract plate 388 having oversized slots encompassing the shank of each rocker pin 383 and being adapted to shift all rocker pins to their tilted or ineffective position, i. e., to retract all operated rocker pins in preparation for the next successive sensing operation.

Cooperating with each rocker pin box 387 is a locking pin box 390 comprising a plurality of locking pins 389, each formed with an extrusion 391 and yieldably supported between perforated plates 392 mounted on frame bars 393, said pin box being suitably mounted between the frames 101, 104. Associated with separate rows of said locking pins is a locking slide 394 having windows formed with a latching nose, each slide being yieldably mounted so as to engage with the extrusions 391 and thus lock any actuated pin in effective actuated position.

Retract mechanism is provided for each rocker pin box and each locking pin box, and includes a rock shaft 395 suitably mounted on each rocker pin box 387 and a rock shaft 400 suitably mounted on each locking pin box 390. Each shaft 395 carries a retract arm 396 engaging the associated retract plate 388. Each shaft 400 carries a pair of arms 397 which support a retract bail 398 engaging all associated locking slides 394. The shafts 395, 400 are actuated from retract eccentrics 401 mounted on the head shaft 140, one at each end of said shaft, the front eccentric 401 shown in Fig. 32 being associated with the primary sequence sensing stage retract mechanism, the rear eccentric not shown in Fig. 32 being associated with the primary initial sensing stage retract mechanism. Each eccentric engages a roller 402 carried by a follower arm 403 suitably pivoted to the frame plates 101 and 104, respectively. Pivoted to each arm 403 is an upright link 404 guided for vertical movement by a pin 405 mounted in the frames 101, 104, respectively, said link being yieldably tensioned upward by a spring 406 stretched between the link and a stud on the adjacent frame 101 or 104. Each link 404 carries a stud 407 and a rocker 408. The stud 407 is disposed to engage the squared off shoulder of a rock arm 410 fast on the rocker pin box retract shaft 395. The rocker 408 is pivotally mounted on link 404 and yieldably tensioned counter-clockwise by spring 411. Rocker 408 is formed with two squared noses, one of which engages a stud 413 on a rock arm 414 fast on the locking pin box retract shaft 400. The other nose of said rocker is normally engageable with a stud 415 formed on a bell-crank 416 pivotally mounted on the adjacent frame 101 or 104. As seen in Fig. 32, the rotation of the front eccentric 401 acts to lower the link 404, causing stud 407 to rock the arm 410 and through shaft 395 and arm 396 retract all sequence stage rocker pins 383. At the same time the rocker 408, bearing against stud 415, is rocked counter-clockwise about its pivot point on the link 404 so as to rock the arm 414, thus rocking retract shaft 400 clockwise, which in turn rocks arm 397 and bail 398, thereby retracting all sequence stage locking pins 389. As seen with reference to Fig. 77, the retract eccentrics are effective for rocking retract shafts 395, 400, starting at about 322° to fully rocked retract position at approximately 350°. The rocker pin box retract is fully restored under control of eccentric 401 by about 24° so as to enable any rocker pin to align with an associated sensing pin prior to the descent of the sensing pin box starting at approximately 28° and which is fully lowered at about 80°, as before mentioned. The locking pin box retract shaft 400, however, does not restore under control of eccentric 401, but is held retracted during that portion of the cycle that the sensing pin box descends by a mechanism comprising a rock arm 417 secured to each locking pin retract shaft 400. The arm 417 is formed with a bent over ear engageable with a bell-crank 418 pivoted to the frame 386 of the associated rocker pin box. The depending nose of bell-crank 418 is adjustable and is yieldably connected to arm 417 by a spring 419 which holds the nose against a limit pin 423 on the arm 417. A stud 421 in the horizontal arm of bell-crank 418 is engageable by an angle bar 422 secured to the frame 367 of the associated sensing pin box. It will be seen that the rocking of shaft 400 from about 322° to 350° under control of one of the eccentrics 401 will lower the arm 417 and enable the bell-crank 418 to rock counter-clockwise against a limit pin 423 in the arm 417 to a position as shown, above the ear on arm 417 so as to hold the locking pin box retract slides 394 in retract position. As the sensing pin box reaches its lower limit of movement at 80°, the angle bar 422 engaging stud 421 rocks the bell-crank clockwise to unblock arm 417, enabling all locking slides 394 to snap into effective locking position. This arrangement removes resistance to locking pin movement which otherwise would result by the camming of the locking pins 389 against retract slides 394. It should be understood that each locking pin box retract is similarly provided with retract holding mechanism, as just described, said mechanism for the primary sequence stage locking pin box being disposed on the opposite side of the pin box from the side shown in Fig. 32.

Retract disabling mechanism is provided for rendering the rocker pin box retract ineffective upon the absence of a card in the associated sensing chamber, or for rendering both rocker pin box retract and locking pin box retract ineffective in response to signal from the signal control unit, as will be presently described. Said disabling mechanism includes (as seen in Fig. 32), a latch arm 424 pivoted jointly with bell-crank 416 to the machine frame, said arm 424 and bell-crank having pins 425 engaged by and between a pair of scissor arms 426 yieldably tensioned together by a spring 427. An upright link 428 pivoted to the latch arm 424 is joined by a pin and slot connection with an arm 431 secured to the associated side card aligner flap 256 (see also Fig. 13) heretofore described. The aligner flap lowers into effective aligning position starting at 345° to bear against the side edges of a card in the sensing chamber at 355°. If there is no card present in the associated sensing chamber the aligner flap rocks to its full limit of movement at 5° of the cycle. The rocking of the aligner flap to its fully rocked position is effective through link 428 for rocking the latch arm 424 counter-clockwise into latching engagement with the arm 410 which at 5° of the cycle is held rocked in effective position under control of the retract eccentric 401. The arrangement is such that if the card aligner flap 256 engages a card, its movement is insufficient to rock the latch arm 424 into latching position, but if the aligner flap finds no card in the sensing chamber, continued movement of the flap is effective for rocking the latch 424 into effective latching position, thereby holding all rocker pins 383 in tilted or retracted position during the subsequent downward stroke of the sensing pin box 362. The rocking of latch arm 424 through link 428 acts to spread the scissor arms 426 since the spring 427 is considerably weaker than spring 409 which biases lever 416 clockwise. Consequently, the absence of a card in a sensing chamber results in disabling of rocker pins in the associated rocker pin box so as to prevent the actuation of all said rocker pins, which would otherwise result in the sensing of an empty card chamber. It does not, however, disable the normal retraction of the locking pins 389.

The retract for the locking pin box 390 of the sequence stages are disabled in response to a signal from the signal control unit, the signal for the primary sequence stage locking pin box being transmitted through a BW33 suitably mounted on bracket 433, secured to the frame 101 of the machine. Said Bowden wire is disposed to engage an ear formed on a slide 434 suitably mounted for sliding movement on the frame 101 which slide is disposed to engage a horizontal arm of bell-crank 416. It will be seen that actuation of said Bowden wire will rock the bell-crank 416 counter-clockwise against tension of spring 409 in moving stud 415 from engageable relation with rocker 408. Consequently, upon a signal through BW33, the fulcrum for rocker 408 will be removed and a downward movement of link 404 will be ineffective to rock the retract arm 414 and shift the slides 394 into retract position. The rocking of bell-crank 416 by BW33 also acts to render latch arm 424 effective for latching arm 410 through operation of the scissors 426 since, as above mentioned, the spring 427 is weaker than spring 409 thus permitting the arm 424 to engage the nose on arm 410. The signal through BW33 is actuated by the signal control unit as the result of a primary out of sequence condition, being transmitted within the last half of a cycle and withdrawn within the first half of the following cycle. Consequently, in those cycles when effective, the signal will rock bell-crank 416 and spread scissors 426 so that when the retract link 404 lowers from 350° to 24°, the rocker 408 will be ineffective for retracting all locking pins 389. The latch arm 424 will be effective for springing into latching position with arm 410 and holding all associated rocker pins in retracted or disabled position. Accordingly, it will be seen that whenever a signal is transmitted through BW33, the rocker pin box becomes ineffective for transmitting the sensing of a subsequent card to the locking pin box, the locking pin box retaining the card pattern sensed in the preceding card for a subsequent cycle. It should be understood that all rocker pin boxes and locking pin boxes in all sensing and sequence stages are provided with similar retract mechanism and all rocker set pin boxes in all stages are provided with similar retract disabling mechanism. However, the retract disabling mechanism actuated by signal from the signal control unit is associated only with the pin boxes in the two sequence stages, the signal for disabling the secondary sequence stage retract being transmitted (as seen in Fig. 76C) through BW31.

As can be best seen in Figs. 4, 5 and 5A, the machine is provided with two translator units 430P and 430S, one for each side of the machine, each being responsive to the movement of associated locking pins 389 for actuating associated sequence detection mechanism in accordance therewith. Each translator comprises an open substantially L-shaped frame 435 for supporting a plurality of pin guide plates 436, 437, and a plurality of tapped Bowden wire supporting plates 438 in which are mounted the ends of a plurality of BW's 441. Mounted between each of the plates 436 are the upper translator pins 442 and mounted between plates 437 are the lower translator pins 443. As seen in Figs. 5 and 5A one field or group of upper translator pins 442 is associated with each locking pin box 390, there being three fields of lower pins 443 in each translator 430. The arrangement is such that one group of upper pins, i. e., the group associated with the primary initial sensing stage locking pin box, is interconnected by BW's 441 with one field of lower pins 443. Another field of upper pins 442, i. e., the field associated with the primary sequence sensing stage locking pin box, is interconnected with two fields of lower pins 443 by means of the well known Y wire arrangement, whereby each of said upper pins is interconnected with a pin in each of two lower fields of pins 443. The translator frame (as best seen in Fig. 4) is provided with the usual flanges 444 cooperating with guide rails 445 secured to the frame strips 102, 105 respectively, enabling the units to be slidably removed through the ends of the machine. The well known manually releasable latching slides 446 are provided to cooperate with lugs 447 so as to lock the respective translator units securely in operative position.

SEQUENCE DETECTING MECHANISM

The above described translator units carry data from the card to three sequence detector units 470P, 470M, 470S, each of which contains two decoding units 440.

As can be seen in Figs. 4, 5 and 5A, each field of lower translator pins 443 is disposed to actuate through an associated field of transmission pins 448 and individual decoding units 440, said decoding unit comprising sets of permutation slides 450 being mounted and arranged in a manner similar to that fully disclosed and described in Patent 2,323,816, issued to W. W. Lasker et al., July 6, 1943. Said slides (Fig. 36) are guided for vertical movement in slotted plates 451 supported by an open frame 452. Each decoding unit is adapted for actuation by the associated field of lower translator pins 443 through intermediate transmission pins 448 and against the tension of yieldably mounted tension pins 454, said pins 448 and 454 being suitably mounted in spaced perforated plates 456 secured to the frame 452. As fully described in said patent to Lasker, said permutation slides are arranged in sets of six slides each, each set corresponding to a card column, each slide relating to an index position in such card column. Cooperating with each set of permutation slides 450 are stop bars 455 arranged in vertical rows, each individually yieldable to slide in slotted plates 457 secured to the frame 452. In the present machine, as distinguished from that of said patent, the stop bars 455, associated with each set of permutation slides 450, are arranged in two rows, one on either side of each set of slides, and are formed with extrusions 458 cooperating with windows 460 in said plates so that actuation of any one or combination of permutation slides, in accordance with a sensed card pattern, will act to release one of the stops in the two rows of stops associated with each set of slides 450.

The form of said permutation slides in the present machine is somewhat modified from that disclosed in the above mentioned Patent 2,323,816 in order to enable actuation of the plates from the top and to enable the stop bars 455 released under the control of perforation pattern for each of the several digits and letters to be arranged with respect to each set of slides 450 in a sequential order from bottom to top. As best seen in Fig. 33, which is a schematic diagram of the operation of one set of permutation slides and associated stops, each slide is formed with four columns of windows 460, the windows being either of two shapes and adapted to either normally block or normally unblock an associated stop bar 455. The windows which are normally blocking, when lowered assume an unblocking position with respect to the extrusions 458 of the associated stop bars, the windows which normally unblock assuming a blocking relation to the associated stop bars when lowered. Each set of six slides operates to release one stop from the two rows of stops associated with each set. As can be seen also in Fig. 35, the two rows of stops 455 cooperating with each set of slides 450 are arranged vertically in staggered relationship and are released to one effective position. The windows in said permutation slides are arranged so that actuation, of any set of slides, in accordance with the well known Powers 90 column code, the same code as disclosed in said patent, will act to release a stop bearing the same sequence relation from bottom to top with all other stops, as does the number or letter represented by said code. In Fig. 33, the six permutation slides 450 associated with a related card column are indicated by letters A through F, the A slide being the slide actuated by a perforation in the zero card index position, the B slide related to the 1 index position, the C slide related to the 3 index position, the D related to the 5 index position, the E slide related to the 7 index position, the F slide related to the 9 index position. As seen in said Fig. 33, the windows 460 of each slide are arranged in four vertical columns each staggered with respect to the other, the lowermost window in each slide being the lowest window in the first or left hand column of windows, the next higher window being the lowest window in the third column of windows, the third lowest window being the lowest window in the second column of windows, and the fourth lowest window being the lowest in the fourth column of windows, etc. Successive windows in each of the first two columns of windows cooperate with extrusion 458 on alternate stop bars 455 of one row of bars, and successive windows in the third and fourth column of windows cooperating with extrusions on alternate stop bars in the other row of bars associated with each set of said permutation slides.

The lowermost window in each of said slides, i. e., the lowest window of the first column, controls the lowest stop bar, i. e., automatic zero stop bar, said window in each of said slides being of identical shape and adapted to block the automatic stop bar upon actuation of any one of the slides 450. The non-actuation of any one of the slides which would result either from sensing of a blank card column or from an empty card chamber will result in releasing the "automatic zero" stop bar 455. The next higher stop bar 455 is the zero stop being controlled by the lowest window in each of the third column of windows, the zero stop being normally blocked by the window in the A slide. Actuation of the A slide will enable release of the zero stop bar 455. The next higher stop bar is the "one" stop being controlled by the lowest window in each of the second columns of windows, and is normally blocked by the B slide. The next higher stop bar is the "two" stop bar being controlled by the lowest window in the fourth column of windows, and is normally blocked by the B and F slides, actuation of both B and F slides 450 enabling release of the "two" stop bar 455.

The twelfth stop bar 455 from the bottom is the "A" stop and is controlled by the third window from the bottom in the fourth column of windows, being normally blocked by the B, D and F slides, actuation of said B, D and F slides enabling release of the A stop. The thirteenth stop from the bottom is the "B" stop bar being controlled by the fourth window from the bottom in the first column and normally blocked by the B and D slides 450, actuation of said slides enabling the release of the B stop and the blocking of all other stops. Accordingly, it will be seen with reference to Fig. 33, that each set of slides 450 is responsive to actuation in accordance with the usual Powers 90 column code for selectively enabling the release of one stop bar, which bar will be disposed with respect to its associated set of slides in the same sequential order as the corresponding numeral or letter. The Z stop bar is the sixth highest stop being controlled by the second window from the top of the first column of windows, being released upon actuation of slides D, E and F. The five highest stop bars 455 shown are provided for special purposes, if desired, so as to be actuated by control patterns in a card not embracing all the patterns heretofore used for numerals or letters. It is, of course, understood that in the diagram shown at the left of Fig. 33, the dots shown at the intersection of lines representing stop bars and permutation slides correspond to the perforations in the 90 column code and indicate which of the six slides are effective for releasing the associated stop 455.

As best seen in Figs. 5 and 5A, six of said sets of decoding units 440 are provided, three being associated with the primary side of the machine and three with the secondary side of the machine, each being actuated by an individual field of lower translator pins 443. Said units are arranged in pairs of inwardly facing units, each pair comprising elements of individual sequence detector unit 470. The arrangement is such that the two right hand pair of decoding units 440 comprise elements of the primary sequence detector unit 470P one of said pair of decoding units being actuated and controlled from the primary initial sensing stage, the other of said pair of decoding units being controlled and actuated by the primary sequence sensing stage. There are two decoding units 440 in the merging sequence detector unit 470M, one of said decoding units being actuated and controlled by the primary sequence sensing stage, the other of said units being actuated and controlled by the secondary sequence sensing stage. The two leftmost units 440 comprise elements of the secondary sequence detector unit 470S, one group of decoding units 440 being actuated and controlled by the secondary sequence sensing stage, the other of said pair of decoding units being controlled by the secondary initial sensing stage.

As can be seen also in Figs. 34 and 36, the stop bars 455 of said units are released in cooperation with bails 461, one bail being provided for each row of stops, and cooperating with extrusions 462 on each of said stops. The restoring bails are supported at each end thereof by rods 463, said rods being carried by and between pairs of bars 464 which bars extend through and are suitably guided by slots formed in the supporting plate 457. Each bar 464 (as best seen in Figs. 5, 5A and 36) is pivoted to an arm 466 fast on an associated rock shaft 465. As can be seen, there are two rows of shafts 465, an upper and a lower row, of six each, one shaft in each row being associated with one of the decoding units 440. Said shafts are journaled between the front and rear frame 100 and 103, respectively, in the machine, and are rocked in unison by two cams 467 of identical shape, one of said cams being mounted on the cam shaft 115, the other of said cams being mounted on the cam shaft 120. Cooperating with each cam is a follower 468 pivoted to the frame 103 and carrying a roller 471 engaging the associated cam 467. Each follower is pivotally connected by links 472 to arms 473, one of said arms being fast on upper shaft 465, one arm being fast on a lower shaft 465. Consequently, it will be seen that the cam 467 mounted on the shaft 120 acts to positively rock one of the upper shafts 465 counterclockwise and one of the lower shafts clockwise, while the cam mounted on shaft 115 positively rocks one of the upper shafts 465 clockwise and the lower shaft counter-clockwise. As can best be seen in Figs. 2 and 2A, each of the shafts 465 is provided on one end with a rock arm 453 connected to one of four links 474, two of said links being associated with the upper row of shafts 465 and disposed on opposite sides of frame 103 and two links 474, likewise disposed, associated with the lower row of shafts 465. Each of the two upper links pivotally interconnects arms 453 on alternately disposed shafts in the upper row of shafts and each of the two lower links 474 interconnects arms on alternately disposed shafts in the lower row of shafts 465. The arrangement is such that all alternate shafts in both upper and lower row of shafts, beginning with the left hand shaft (as seen in Figs. 5 and 5A) are rocked under control of the cam 467 mounted on shaft 115 and all other shafts being rocked under control of the cam 467 mounted on shaft 120. Springs 475 (Fig. 2A) connecting each link 474 to the frame 103, act to yieldably return the shafts 465 to normally restored position. As seen with reference to Fig. 77 cams 467 are effective for releasing restoring bails 461 of each decoding unit 440 at 80° to released position at 105°, and restoring said restoring bails by 285°. Permutation slides 450 are fully actuated by the downward movement of the associated sensing pin box by 80° of the cycle.

It should be understood that although the sets of decoding units 440 of each sequence detector unit 470 are reversed with respect to a cooperating decoding unit 440, the wiring of the translator 430 is such as to match corresponding columns of the initial and sequence sensing chambers with directly opposing sets of permutation slides in the associated sequence detector unit 470. In other words, the set of permutation slides 450 in the primary sequence selector unit 470P, actuable in accordance with a perforation pattern in a given column of a card within the initial sensing chamber, will be disposed directly opposite the set of permutation slides 450 actuable in accordance with the perforation pattern in the same column of a card within the primary sequence stage sensing chamber. Likewise, the wiring of the translators is such as to match corresponding columns of cards in the two sequence sensing stages, i. e., primary sequence sensing stage and secondary sequence sensing stage, with directly opposing sets of permutation slides associated with the merging sequence detector unit 470M. The secondary side translator 430S likewise matches corresponding columns of cards in the secondary initial sensing stage and secondary sequence sensing stage with directly opposing sets of permutation slides within the secondary sequence detector unit 470S. In this connection, it might be here noted that to accomplish the above result the wiring of one of said translator units 430 is reversed from the other one and they are not interchangeable since the proper merging of cards fed from two opposing sides of the machine requires that secondary cards be stacked and fed in reversed position, i. e., with the normal bottom edge of the card becoming the leading edge. For this reason, reversal of the wiring in the secondary translator 430S enables the decoding units 440 associated with the secondary side of the machine to be actuated and controlled in the same manner and by the same code as are the decoding units on the primary side of the machine heretofore described.

As can be seen in Figs. 34 and 36, each sequence detector unit 470 has an individual frame comprising end plates 479 and cross bars 481. Included in each unit is a series of rockers 476, one being disposed between and cooperating with each opposing pair of sets of permutation slides 450. Each rocker is pivotally secured to an individual restoring slide 477, and is formed with fan shaped arms (see Figs. 37 and 38), adapted to engage with the stops 455 in either row of stops controlled by each of the associated paired sets of permutation slides 450. The restoring slides 477 are suitably guided for vertical movement by rollers 478 mounted on unit cross bars 481 and by comb plates 482 also secured to said frame bars 481, said slides being yieldably tensioned to rise by springs 483 stretched between each slide and cross bars 481.

Cooperating with each rocker 476 is an individual follower 480 having an inverted T shape and pivotally suspended from frame cross bars 481 by a pair of parallel links 485. The vertical upright arm of said follower is suitably guided for lateral movement in either direction by a comb 486 secured to cross bars 481 and is formed with a longitudinally extending cam slot cooperating with a stud 487 formed on the associated rocker 476.

The arrangement is such that a slide 477 is released and rises under tension of spring 483 which will raise and carry rocker 476 into blocking engagement with the lowest stop 455 released by the associated paired sets of permutation slides 450 causing the rocker to swing about its pivot point with the slide in one direction or the other, depending upon which set of slides released the lowest stop. If the stops released by both of the paired sets of permutation slides are of the same horizontal plane, i. e., representing equal values, the rocker 476 will engage both of said stops simultaneously and will not be rocked. When the stops released by each of said paired sets of permutation slides are not in the same horizontal plane, the rocker 476 will rock about its pivot point and act through stud 487 to cam follower 480 in one direction or another, depending upon which of the two stops is the lower. Fig. 36, is a view of a sequence detector unit in fully retracted position while Fig. 34, is a view showing the detection of a sequence condition, i. e., both sides of the sequence detector unit operating to release stops representing different valuations. It will be seen that if stops of different value are released (Fig. 34), the rocker 476 will cause a camming of follower 480 in a direction towards the high side of the unit. Accordingly, if a follower 480 in the primary sequence detecting unit is shifted or cammed to the right, as viewed in Figs. 5 and 5A, it will indicate a higher value in a related card in the primary initial sensing stage than the value in the corresponding column of a card in the primary sequence sensing stage, and if cammed to the left it will indicate a higher value in the sequence sensing stage card. If there is no movement of follower 480 such would indicate equal values in the related columns of both primary cards. Likewise, if a follower associated with the secondary sequence detector unit is cammed to the right, it will indicate a higher sequence sensing stage value than initial sensing stage value, no movement indicating equal values. If a follower 480 associated with the merging sequence detector unit is shifted or cammed to the right it will indicate a higher primary sequence sensing stage value than secondary sequence sensing stage value, and if shifted to the left a higher secondary sequence sensing stage value, no movement indicating equal values between the primary and secondary sequence sensing stages.

It is, of course, realized that in determining the sequence between the values of multi denominations, the sequence between the highest denominations of said values is controlling. Consequently, the camming of follower 480 associated with the highest denominations in each of said sequence detector units indicates the sequence condition of the unit as a whole. If such follower 480 associated with the highest denominations is not cammed, i. e., indicating equal values in the highest denominations, then the condition of the unit as a whole will be indicated by the camming of the follower associated with the highest denominations in which there is a sequence relationship. Accordingly, with reference to the primary sequence detector unit, if said follower is cammed to the right (as seen in Fig. 5A), the high initial stage condition, i. e., a primary correct sequence condition, is thereby indicated with respect to primary cards. If shifted to the left, a wrong, i. e., out of sequence condition, is indicated with respect to primary cards. If such follower is not cammed in either direction an equal condition is thereby indicated. With respect to the secondary sequence detector unit 470S, if such follower associated with the highest denomination having a sequence relation is cammed to the right (as viewed in Fig. 5), a high secondary sequence stage condition, i. e., wrong sequence condition, is thereby indicated with respect to secondary cards. If cammed to the left, a high secondary initial stage or correct sequence condition is thereby indicated.

If not cammed in either direction, an equal condition is thereby indicated with respect to secondary cards. Similarly, if such follower associated with the merging sequence detector unit 470M is cammed to the right, a high primary condition is thereby indicated and if cammed to the left, a high secondary condition is thereby indicated, and if not cammed in either direction an equal condition is thereby indicated with respect to the cards in each of the sequence sensing stages.

The restoring slides 477 are reciprocated in cooperation with restoring bails 488 one of which (as seen in Figs. 5 and 5A) is associated with each of the sequence detector units, and extends transversely through slotted openings in all of the slides 477 of the associated unit. As can be best seen in Figs. 2 and 2A, the rearmost end of said bails are secured to one arm of an individual bell-crank 491, the frontmost end of said bails (see Figs. 1 and 1A) being secured to rock arms 492. Said rock arms and bell-cranks are fast on the opposite ends of rock shafts 490 which shafts are journaled in the front and rear lower frames 100 and 103, respectively. The three bell-cranks 491 are pivotally interconnected by a link 493 so as to rock their associated shafts 490 in unison. Secured to the right hand shaft 490 (as seen in Fig. 2A) is a rock arm 494 pivotally connected by link 496 with a lever 497 fast on a rock shaft 495 journaled in the rear frame 103 and auxiliary frame 116. Also fast on shaft 495 is a follower arm 498, said lever and said follower arm each carrying a roller 499 cooperating with a pair of complementary cams 500, 501 mounted on the cam shaft 120. The high periphery of cam 500 acts through lever 497 to restore and hold restored all the restoring bails 488, the high periphery of cams 501 acting through follower 498 acts to rock said bails into released position. As can be seen with reference to Fig. 77, cams 500, 501 are effective for releasing the restoring bails starting at 95° to fully released position at 195° restoring said bails from 195° to 310°. As heretofore described, the stops 455 released under control of decoding units 440 reach released position by 105°, thereby allowing sufficient time for any stop to engage its associated rocker 476.

Associated with each sequence detector unit 470 is a signal selector unit 510 which unit acts in response to the movement of any one or combination of followers 480 for enabling a selection of signals depending upon the sequence condition of the sequence detector unit as a whole, i. e., the actual sequence between the two multi denominational values represented in each sequence detector unit.

As above described, each follower 480 is cammed in one direction or another depending upon the sequence relation between corresponding denominations of the two values represented in each unit. The signal selector unit operates to select signals depending upon the sequence relation of said values and the highest denominations in which there is a sequence relation, so as to enable the sequence relation between said highest denominations of said values to have precedence over the sequence relation between the lower denominations of said values. As can be seen in Figs. 36, 39 and 40, each signal selector unit includes a pair of tumbler pawls 502, 503 arranged in rows, one pair of said pawls being associated with each follower 480 and adapted to follow the camming movement of its associated follower upon sequence detection, as above described. The tumbler pawl assembly (see also Figs. 41, 43) includes a pair of notched comb plates 504, 505 secured to the frame cross bars 481. Each pair of tumbler pawls 502, 503 is pivoted to the bent over shelf portion of a slide bar 507 mounted to slide within the slots of combs 504, 505 and limited by shouldered blocks 506. The free end of each pawl is formed with a blocking shoulder disposed to engage notches in an associated comb plates 504, 505, respectively, and is also formed with a cam shoulder 508 adapted to bear against the side of an adjacently mounted pawl. Springs 509 stretched between limit studs 511 secured to each slide bar 507 and studs 512 formed on each pawl act to yieldably retain each pawl in normal unrocked position against said limit studs. Also secured to the shelf portion of said slide bar 507 is a bracket 513 carrying a pair of spaced studs 514 which studs are disposed to embrace the tail portion 515 of one of the links 485 which support the associated follower 480. Consequently, it will be seen that as each follower is cammed upon a detection of sequence, a pair of pawls 502, 503, associated with said follower, will be shifted accordingly, i. e., with either pawl 502 engaging the notch in plate 504, or pawl 503 engaging the notch in plate 505. Accordingly, when the sequence relation between corresponding card columns is correct, i. e., for example, a high primary initial sensing stage value in the primary sequence detector unit 470P, the pawl 502 will engage plate 504, and when said sequence relation is wrong, i. e., out of sequence, the pawl 503 will engage with plate 505. If there is no sequence relation, i. e., an equal condition, neither pawl will engage the associated plate.

Each pair of pawls 502, 503 (as best seen in Figs. 41, 43), is centered between the two comb plates 504, 505 by individual detent mechanism comprising a stud 516 cooperating with a yieldably mounted pin 517 having a V-shaped cam head. The stud 516 is formed on a guide arm 518 secured to each slide bar 507 and which cooperates with a comb 519 secured to the underside of the cross bars 481. The aligning pin 517 is slidably mounted by said comb 519 and an auxiliary comb 521, and is yieldably tensioned by spring 522 to bear on stud 516, and yieldably retain each slide bar 507 and the associated pair of pawls 502, 503 in centered position.

As can be seen in Figs. 39, 40, 42 feeler bars 523, 524 are associated with each of the rows of tumbler pawls 502, 503, respectively, said feeler bars being pivoted to bell-cranks 525, 526 (see Figs. 39, 40) and suitably supported for sliding movement by a comb 527 secured to the unit cross bars 481. Each bell-crank 525, 526 is loosely mounted on a shaft 530 supported by a pair of brackets 528 also secured to the unit cross bars 481, said bell-cranks being yieldably tensioned in a counter-clockwise direction by spring 531 so as to follow the movement of a bail 532. Said bail is supported by a pair of bell-cranks 533 loosely mounted on shaft 530 and joined by a pin 534. The bail 532 is rocked each machine cycle through a link 535 interconnecting said pin 534 with a bell-crank 536 pivotally mounted in a bracket 537. The bell-crank 536 is connected by a link 538 to an arm 539 fast on a rock shaft 540. The shaft 540 (see Figs. 1 and 1A) extends across the front of the machine and is journaled in brackets 541 secured to the front frame strips 102 and 102S. The shaft is rocked through a rock arm 542 pivotally connected by a link 543 with a follower 544 journaled on shaft 200S and cooperating with a cam 545 mounted on the secondary cam shaft 140S. It will be seen that rotation of cam 545 acts through shaft 540 to rock bail 532, thereby enabling both feeler bars 523, 524 to bear against the edge of the end tumbler pawls 502, 503 in both rows of said pawls. It is, of course, understood that the end pair of pawls 502, 503 are associated with the highest denomination of the two values entered in the associated sequence detector unit 470, each successive pair of pawls 502, 503 being associated with the next lower denominations of said values. Accordingly, if said end pair of pawls relating to the highest denomination is shifted away from center, one of the other feeler bars 523, 524 will be blocked by its associated pawl 502, 503, the other of said feeler bars becoming unblocked by its associated pawl regardless of the direction of shifting of any of the lower denominational pairs of pawls. It is understood that the engagement of a pawl with its associated plate 504, 505 indicates a high value condition on the related side of the sequence detector unit, i. e., for example, with reference to the primary sequence detector unit, a pawl 502 shifted to engage with plate 504 indicates that the related denomination of the initial sensing stage value is higher than that of the sequence sensing stage value, and a pawl 503 engaging with plate 505 indicating a higher sensing stage value than initial stage value.

If the values in the highest denomination or denominations are equal, then it will be seen that the condition of the highest denomination in which there is a sequence relation will be controlling, with the pawl relating to the high side acting to block the tumbling of all higher denomination pawls in the same row of pawls, the pawl relating to the low side of such denomination acting to unblock and enable the tumbling of all pawls of higher denominational value in the same row of pawls.

Fig. 42 is a fragmentary view of the signal selector unit associated with the primary sequence detector unit showing the tumbler pawls shifted to a position indicating a normal sequence condition. As seen in said figure, the tumbler pawls 502, 503 associated with the two highest denominations have not been shifted in either direction indicating equal values in said two highest denominations. The pair of pawls 502, 503 associated with the third highest denomination has been shifted to a position where pawl 502 engages a notch in plate 504 to indicate a high initial sensing stage value, and in which position the pawl 502 acts to block the tumbling action of all pawls 502 in higher denominations, while the pawl 503 associated with the third highest denomination acts to unblock, i. e., permit tumbling of all pawls 503 of higher denominations. Consequently, it will be seen that the movement of feeler bar 523 will be blocked by the row of pawls 502 while the feeler bar 524 will be unblocked by the row of pawls 503. This result will follow regardless of the shifting of pawls associated with the lower denominations. The pair of pawls 502, 503 associated with the fifth highest denomination has been shifted to a position where the pawl 503 engages plate 505, indicating a wrong sequence in said fifth highest denomination. However, the pawl 503 associated with said fifth highest denomination is in-effective to block the movement of feeler bar 524 since an intermediate pawl 503, i. e., that of the third highest denomination, has been shifted to unblocking position. Accordingly, it will be seen that the blocking or unblocking of feeler bars 523, 524 is determined by the position of the pair of pawls 502, 503 of the highest denomination in which there is a sequence relation regardless of the sequence relation in the lower denominations. If there is no sequence relation in any denomination (as shown in Fig. 39) all pawls in both rows of pawls will tumble and will be ineffective for blocking the movement of either feeler bar 523 or 524.

The selective blocking or unblocking of the feeler bars 523, 524 serves to enable transmission of one or another group of signals to the signal control unit of the machine, the unblocking of both feeler bars simultaneously, i. e., upon an equal condition, resulting in the non transmission of either of said groups of signals. As can be seen in Figs. 34, 35 and 37, upright links 546, 547 cooperate with each feeler bar 523, 524, respectively, each of said links being pivoted to a rock arm 548 loosely mounted on a shaft 530 and secured integrally with bell-cranks 525, 526, respectively. Pivotally secured to the upper extremities of each of the links 546, 547 are signal selector rods 551, 552, respectively, said rods being suitably guided for lateral movement by combs 553 secured to the upper cross bar 481 of the associated sequence detector unit 470. Engageable with one end of said selector rod is a signal firing ram 550 slidably supported by a stud 554 formed on the unit frame cross bar 481 and pivotally connected with a rock arm 556 fast on a rock shaft 555. The shaft 555 (see also Figs. 1 and 1A) extends across the front of the machine and is journaled similarly to shaft 540. The shaft 555 is rocked through a rock arm 557 pivotally connected by a link 558 with a follower 561 journaled on shaft 200, said follower having a roller 559 thereon cooperating with a cam 560 mounted on the primary head shaft 140.

It will be seen that rotation of cam 560 acts through shaft 555 and shifts the firing ram 550 laterally into engagement with one or the other selector rods 551 or 552 depending upon whichever of said selector rods is in effective firing position. The free end of each of said selector rods 551, 552 (Fig. 37) is disposed to engage one arm of cooperating bell-cranks 563, 564, respectively, suitably mounted in brackets 562 secured to the rear machine frame 103 (see also Figs. 2, 2A and 6). The other arm of said bell-cranks is disposed to engage individual groups of Bowden wires suitably supported in bracket 562. With reference to the primary signal selector unit, the rod 551 being associated with the feeler bar 523 is disposed to engage bell-crank 563 so as to actuate BW's 1 and 2. The selector rod 552 being associated with the feeler bar 524 is disposed to engage bell-crank 564 so as to actuate BW's 4, 5 and 6. The arrangement is such that when feeler bar 523 is blocked by its associated row of tumbler pawls 502, i. e., indicating a normal sequence condition in the signal selector unit, the associated selector rod 551 will be held in firing position with respect to the firing ram 550, while the selector rod 552, responsive to the movement of feeler bar 524, will be raised clear of the signal firing bar 550 and ineffective for actuating its associated group of BW's 4, 5 and 6. Conversely, should the primary signal selector unit indicate a wrong sequence condition, the selector rod 552 associated with feeler bar 524 will be retained in normal firing position and selector rod 551 associated with feeler bar 523 will be raised clear of signal firing ram 550, and ineffetcve to actuate its associated group of BW's 1 and 2. In the event the primary selector unit indicates an equal condition, both selector rods 551, 552 will be raised clear of the signal firing ram 550 and thereby be ineffective for actuating either group of signals through BW's 1, 2 or 4, 5 and 6.

As can be seen with reference to Fig. 77, the cam 545 is effective for actuating feeler bars 523, 524 into actuated position at 180° of the cycle and for restoring said bars at 340° of the cycle, while cam 569 is effective for shifting the signal firing ram 550 from 204° to 215° and holding said signals effective until 252° and enabling withdrawal of said signals from 252° to 277° of the cycle.

It is, of course, understood that a signal selector unit is associated with each sequence detector unit, the signal selector unit associated with the merging sequence detetcor unit being effective for enabling the actuation of one or the other groups of BW's 7, 8, or BW's 10 and 11 (see Fig. 2), which Bowden wires are similarly mounted in a bracket 562 secured to the rear machine frame 103. The merging signal selector unit operates to select signals through BW's 7 and 8 upon a primary high condition, and signals through BW's 10 and 11 on a secondary high condition, neither of said groups of signals 7, 8 or 10, 11 being selected, i. e., effective, on an equal condition in the merging sequence detecting unit. Likewise, the signal selector unit associated with the secondary sequence detector operates to select signals 13, 14, 15 upon a wrong sequence condition in the secondary sequence detector, and to select signals 16, 17 upon a correct sequence condition, neither of said groups of signals being effetcive upon an equal condition in the secondary sequence detector. As can be seen in Figs. 76A, 76B, 76C, 76D, all Bowden wires associated with the three sequence detector units, i. e., BW's 1, 2, 4, 5, 6, 7, 8, 10, 11, 13, 14, 15, 16, 17, extend to the signal control unit of the machine which operates to deliver output signals for controlling the machine in accordance with the various combinations of input signals received into the unit in the manner herein below described.

SIGNAL CONTROL UNIT

The function of the hereinbefore mentioned signal control unit 570 is, briefly and generally stated, to receive all signals from the sequence detector units 470 along with signals from manually actuated controls and other parts of the machine and to emit and distribute magnified signals to controlling members of the machine in accordance with the nature and combination of the signals received. The unit is adapted to respond to the receipt of signals which, for purposes of description, may be classified in three categories, i. e., input signals, input cancellation signals and output cancellation signals. The receipt of input signals normally results in the emission from the unit of one or more related output signals. The receipt of an input cancellation signal has the effect of cancelling any related input signal which may be received into the unit simultaneously therewith, and resulting in cancellation of all related output signals. The receipt of an output cancellation signal results in cancelling one or more of the output signals which would otherwise result upon simultaneous receipt of a related input signal. Since some of the machine controlling members normally require signals in each machine cycle, the signal control unit also is adapted to deliver output signals each machine cycle without receipt of a related input signal, and in this connection, it should be understood that the normal emission of these output signals may be cancelled by the receipt of the related cancellation of an input signal, even though the emission of such output signals does not require the receipt of a corresponding input signal.

Figure 6:
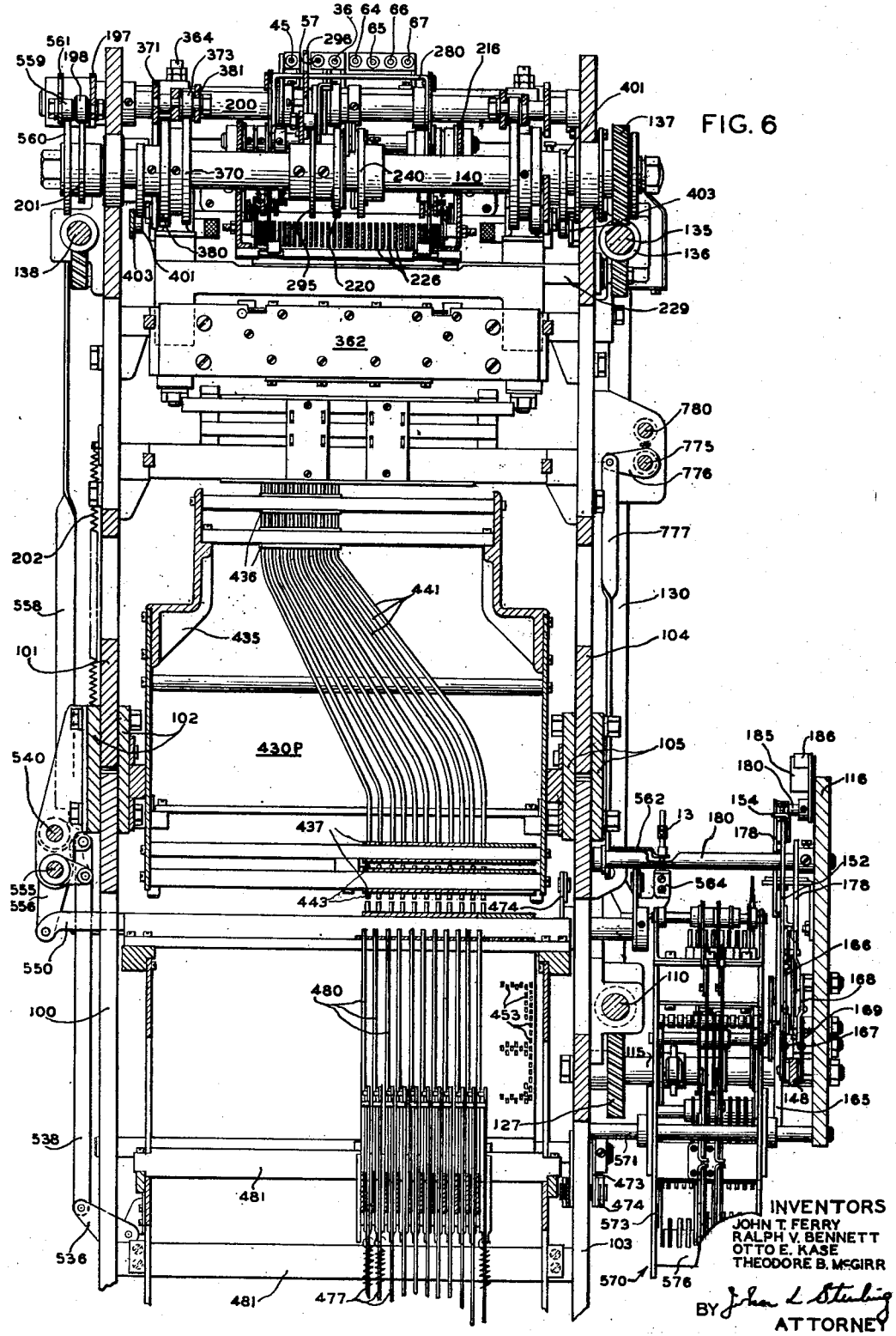
Fig. 6 is a cross section taken along line 6—6 of Fig. 2.

The signal control unit, as seen in Figs. 6, 44 and 45, is supported by a pair of rods 571, each mounted on and extending between the rear frame plate 103 and the auxiliary frame plate 116 of the machine. The operating mechanism of the unit is supported by and between two side frames, each comprising three plates 572, 573 and 574, suitably joined together by plates 579 so as to form a U-shaped supporting structure. The plates of the unit are joined together into a box-like structure by a plurality of cross bars 575, 576, the bars 576 being slotted to form combs which serve to support and guide the movement of a horizontally disposed row of slides 580. Secured to the upper extremities of the side frames 572 and 573 are top plates 577 and 578 tapped to receive the nipples of Bowden wires through which signals are received in and delivered from the unit. Also secured to a pair of brackets 581 is a plate 582 tapped to receive additional Bowden wires which will be termed hereinafter as the lower input wires. A bail 584 is provided for restoring the slides 580 and is carried by two arms 586 journaled on a shaft 585 supported by brackets 587 secured to the side frames 573. Fixed to the cam shaft 115 are two restoring cams 590 of identical shape, each engaging a roller 588, mounted on each of the arms 586. The shaft 115 makes one revolution each machine cycle causing the cams to rock the restoring bail clockwise so as to restore to normal position in each cycle any slide 580 which may be released in the ways hereinafter described.

According to the requirements of the present embodiment of the invention, nine slides 580 are utilized. It should be understood that any desired number of slides may be provided, depending upon the functions needed for a particular machine. Each slide is provided with its individual release mechanism, so disposed in vertical alignment as to constitute separate banks, each of the nine slides together with its related mechanism constitutting one of the banks of the unit. Since some of the banks are of substantially identical construction and all of the banks have many similar features in common, it is believed a detailed description of each bank would be superfluous and unnecessary. Accordingly, a detailed description will first be made of the structure and operation of one bank whereupon the features of dissimilarity between it and all of the remaining banks will thereafter be set forth.

Fig. 46 is a schematic view disclosing the mechanism constituting bank #1 of the unit, that being the first bank as viewed from the rear of the machine or to the right in Fig. 45, and being the bank utilized to deliver an output signal for stopping the machine. The slide 580 is formed with portions cut away so as to form shoulders 591, 592, 593, and 594, and also has secured thereto a latch plate 595 formed as shown with an inclined cam surface and latching shoulder for latching the slide in ineffective position. A bell-crank 596, loosely mounted on a cross shaft 597, extending between the side frames 572, has mounted on one arm thereof a roller 598 engaging the shoulder 592, the other arm of said bell-crank being formed with a slot for encompassing a stud 601 in the lower end of an output key 602. The key 602 is formed with a slot by which it is loosely supported on a comb shaft 603 extending between the side frames 572 and is formed with a bent over ear 604 which provides a flat abutting surface for engaging the ends of Bowden wires extending through the plate 573. A spring 605 stretched between the lower end of the bell-crank 596 and one of the frame cross bars 575 exerts a counter-clockwise pull on the bell-crank which pull is resisted by the slide 580, the restoring bail 584 and the cams 590. The cams are so positioned on the shaft 115 and so shaped as to release the restoring bail beginning at about 218° (Fig. 77) of the machine cycle and to restore the bail to ineffective position at 100° of the following cycle whereupon it will be seen that spring 605 will act through output key 602 to deliver an output signal by exerting and maintaining a push on the Bowden wires during that portion of each machine cycle in which slide 580 is permitted to reciprocate with and follow the movement of the restoring bail 584.

Since the operation of the machine does not require the delivery of an output signal from this bank each machine cycle, mechansm actuated by predetermined input signals is provided so as to control the movement of the slide with respect to the particular cycle in which the output signal is required. Accordingly, a latch 607 formed with a bent over toe 608, heel 609 and ear 610 is loosely mounted on a cross shaft 611 extending between the side frames 573 and being suitably spaced by a comb shaft 612. It will be noted that all of the bell-cranks and levers in the signal control unit are without collars. They are, therefore, positioned on their respective shafts by comb shafts such as 612. The toe 608 of latch 607 is adapted to engage with the shoulder on the latch plate 595, the heel 609 with the shoulder 594 of slide 580, and the ear 610 with the top of an inclined surface step 613, formed as shown on a floating link 615. The floating link is formed with a slot for encompassing a stud 614 in one arm of a bell-crank 620, a latching nose 617 for purposes hereinafter described, and a tail portion projecting into a comb plate 618 by which the movement of the link is suitably guided. The comb plate is secured to two of the cross bars 575 aforementioned. A spring 619 stretched between the link 615 and the latch 607 exerts a clockwise pull on the latch to the point where it is limited by the step 613 and tends to rotate the latch in conjunction with the vertical movement of the link 615. A spring 621 stretched between the floating link 615 and bell-crank 620 exerts a pull on the link, causing it to follow the movement of the bell-crank 620. The bell-crank 620 is loosely mounted on a cross shaft 622 extending between the side frames of the unit and suitably spaced by a comb shaft 623. A spring 624 secured to the opposing arm of the bell-crank exerts a counter-clockwise pull to a position as limited by a set screw 626, in one of the cross bars 575, which determines the normal latching position of the latch 607, and which position provides a slight amount of lost motion between link 615 and bell-crank 620. From the foregoing it will be seen that a clockwise rocking of bell-crank 620 before that period in the cycle when the restoring bail 584 starts to reciprocate from normal, i. e., 218°, will result in rocking latch 607 clockwise raising toe 608 so as to permit the slide 580 to follow the movement of the bail and result in actuating Bowden wires to deliver an output signal.

The bell-crank 620 is rocked on receipt of an input signal by means of a swing link 625, the lower end of which has a stud 627 resting in a slot formed in the bell-crank 620. The upper free end of said link is normally disposed directly beneath the lower end of an input key 630 which is formed with a bent over flat upper surface for engagement with either one of two input BW's 64 or 68 mounted in the top plate 577. A stud 628 in key 630 rests in a slot formed in a bell-crank 631, loosely mounted on a cross shaft 632 and suitably spaced by a comb shaft 633. The bell-crank 631 has a spring 635 associated therewith, urging it in a clockwise direction, thus holding key 630 elevated, said key being guided for vertical movement on a comb shaft 634. Thus, it will be seen that actuation of any one of the input wires 64 or 68 will act to depress the input key 630 and the swing link 625 to rock the bell-crank 620 clockwise, thus releasing the latch 607, at the same time rocking bell-crank 631 against the tension of a spring 635. Upon discontinuance of the input signal prior to the restoration of the slide 580, the latching mechanism is returned to normal position, as shown, by the combined action of springs 621, 624, 635.

The mechanism for effecting the cancelling of an input signal upon receipt of an input cancellation signal comprises a cancellation key 636 and bell-crank 638, similar in shape and operation to key 630 and bell-crank 631, and are similarly mounted by means of a stud 637, cross shafts 640, 641 and 642, and tensioned by a spring 643. The lower depending arm of bell-crank 638 carries a stud 644 supporting a link 645 pivoted to the swing link 625. It will be seen that receipt of an input cancellation signal will depress key 636 and rock bell-crank 638 clockwise to swing the link 625 counter-clockwise out of line with input key 630, whereby the simultaneous receipt of an input signal will be ineffective to rock the bell-crank 620 to release the latch 607.

The unit also provides additional mechanism for receipt of input signals having slightly different characteristics from the above described input receiving mechanism and which will be hereinafter referred to by reasons of its location with respect to the unit as lower input mechanism. To this end, Bowden wires are secured in plate 582, as described above, and engage an input key 647, similar in shape to keys 630, 636. The key 647 is provided with a stud 648 engaging a slot in one arm of a bell-crank 650, mounted on a stud shaft 651 and spaced by a comb 652. The key 647 is guided for vertical movement by a cross rod 653. A link 654 has a stud 649 engaging a slot in the bell-crank 650 and is connected at its other end to a cam finger 655, rotatably mounted on a cross shaft 656. The cam finger (see also Fig. 45) projects upwardly through the aforementioned comb plate 618 and engages in a slot 657 formed in a slide 658 having a U-shaped end, a portion of which is reduced to project between two adjacent tines of the comb 618 and abut the tail portion of the floating link 615. The construction is such that receipt of a lower input signal acts to rock the cam finger clockwise against the tension of a spring 659, shifting the slide 658 to the right so as to rock the floating link 615 counter-clockwise about a pivot point at 614. The rocking of the floating link acts to displace the step 613 from beneath the ear 610, causing the latch 607 to rock clockwise to unlatching position through the tension of spring 619. Upon the release of slide 580, the shoulder 594 engages the heel 609 of the latch lever to rock the lever counter-clockwise to latching position, as shown, so that upon subsequent discontinuance of the lower input signal, the floating link 615 will be free to rock clockwise under tension of springs 619, 621 into latching position, wherein the step 613 will be returned to a position directly beneath the ear 610. Upon the restoring movement of the slide 580, the latch 607 is again rocked clockwise through the camming action of the incline on latch plate 595 with the toe 608. However, at this period of the cycle, the floating link is in its restored normal position and the clockwise rocking of the latch 607 carries the floating link with it against the tension of spring 621 which spring carries the latch counter-clockwise to return it to normal latching position upon the completed restoration of the slide 580 by the restoring bail 584. It should be noted that the main distinction in operation between the upper input receiving mechanism first described and the lower input receiving mechanism is that the resulting function of the upper input first described may be cancelled by simultaneous receipt of an input cancellation signal through key 636, while the lower input function cannot be so cancelled.

As seen in Fig. 67, the mechanism constituting bank #9 comprises much of the same mechanism as contained in the above described bank #1 with a few exceptions. Bank #9 is the ninth or rearmost bank as viewed from the rear of the machine, it being one of the banks utilized to deliver output signals for control of the wrong sequence pockets P1 and P5, respectively, and it being operative only during the clearing operations of the machine. As seen in Fig. 67, shown with signal in at 360° bank #9 delivers two output signals through BW's 28, 26 upon receipt of either one of two lower input signals through BW's 54, 61, and is not provided with means for receiving other types of input signals, including input cancellation signals.

As will be hereinafter described, the lower input signals for bank #9 through BW's 54 and 61 are responsive to manually actuated controls of the machine and are effective for a complete cycle from 0° to 360°. Consequently, said signals being transmitted at 0°, at which period of the cycle the restoring bail is in released position and the slide 580 is normally held latched by the latch 607, the rocking of the floating link 615 upon receipt of signal will not result in the immediate clockwise rocking of the latch 607, since the spring 619 is of insufficient strength to overcome the friction caused by spring 605 between the latch plate 595 and the toe 608. However, the counter-clockwise rocking of the floating link 615, upon receipt of a signal, enables said link to immediately rise under tension of springs 619, 621 to a position limited by the stud 614, which is the position shown in Fig. 67, so that as the bail 584 restores from 100° to 170° and removes the binding friction on the latch 607, the latch will be free to rock clockwise to unlatching position (see Fig. 49) prior to the next release movement of the bail 584, occurring at 218° of the cycle. Accordingly, slide 580 will be released at 218° to deliver an output signal which is held effective at 360° when the machine stops and when the lower input signal is withdrawn. It will be seen that as the slide 580 releases, the shoulder 594, bearing on the heel 609 of the lever 607, acts to rock the lever counter-clockwise to the position shown in Fig. 52. In the absence of a second successive lower input signal received at 0° of the second cycle, the floating link 615 will be free to rock clockwise under tension of springs 619, 621 to the position shown in Fig. 52, so as to render the latch 607 effective for latching the slide 580 against release during said second cycle. Of course, in the event a lower input signal is received in the second or more successive cycles, the floating link 615 will be rendered ineffective for holding the latch 607 in latching position, thereby enabling the slide 580 to release and deliver output signals in said second or more successive cycles and until the first cycle in which no lower input signal is received.

Banks #6 and #8 are of identical construction, both being utilized to deliver a single output signal for blocking card feed and advance, bank #6 controlling these functions on the secondary side and bank #8 controlling the same on the primary side. As seen in Fig. 64, which shows the wiring for bank #8 only, banks #6 and #8 each are adapted to operate upon receipt of either of two upper input signals either of which upper input signals may be cancelled by the receipt of any one of four input cancellation signals. Said banks are also adapted to operate upon receipt of a lower input signal which, as above described, will not be cancelled by the receipt of an input cancellation signal. To distinguish from bank #1, the output side of said banks #6 and #8 includes a bell-crank 660 loosely mounted on a cross shaft 661 suitably spaced by comb 662, both of said shafts 661 and 662 extending between the side frames 573. The bell-crank 660 carries a roller 663 adapted to abut and follow under tension of a spring 664 the shoulder 591 of the slide 580. Said bell-crank supports an output key 665 by means of a stud 666 thereon, said key being supported and guided by a comb shaft 667 and formed with the usual flat wire engaging surface for delivering an output signal.

The output signal normally delivered by the key 665 may be cancelled upon receipt of an output cancellation signal in the following manner: A cancellation key 668 formed with a bent over surface for engagement by an output cancellation wire is provided and is guided for vertical movement between a comb shaft 670 and a comb plate 671 secured to one of the cross bars 575. A blocking lever 672 mounted on a cross shaft 673 and suitably spaced by a comb shaft 674 has a blocking shoulder for engaging a block 675 formed on the bell-crank 660. The lever 672 and key 668 are pivotally joined by a pin and slot connection 676 and spring 677. The lever 672 is held in normal unblocking position against a stop bar 678, by a spring 681. It will be seen that the receipt of an output cancellation signal, prior to that point in any cycle at which the slide 580 starts to reciprocate with the bail 584, will rock the blocking lever 672 clockwise so as to prevent a counter-clockwise rocking of bell-crank 660, and thereby cancel the output signal which would otherwise normally be delivered. It should be noted here that the receipt of an input cancellation signal as heretofore described acts to conceal the effect of upper input signals only, whereas the receipt of an output cancellation signal acts to prevent output signals originating either from receipt of an upper input signal or receipt of a lower input signal.

Banks #5 and #7 are of identical construction, each being actuated by "wrong" input signals from one or the other sides of the machine. Bank #5 is responsive to an input signal resulting from a wrong sequence between secondary cards and operates to deliver output signals to the secondary signal light causing it to flash, secondary out of sequence pocket control opening the pocket, and the secondary sequence stage retract control retracting any set up in that stage. Bank #7 is adapted to respond to and deliver similar signals for the primary side of the machine. The main distinction between the operation of banks #5 and #7 and the banks heretofore described is that provision is made to enable said banks #5 and #7 to operate through a repeat cycle, i. e., to deliver its respective output signal for two successive cycles upon receipt of an input signal during only the first of said two successive cycles. The necessity for providing a two cycle operation arises from the inability to determine upon a comparison of two successive cards which of two ways the out of sequence condition may arise. For example, an out of group sequence card may be in sequence with the preceding card and out of sequence with a succeeding card, or it may be out of sequence with the preceding card and in sequence with the succeeding card, a two card comparision being able to detect only the latter condition. For this reason, banks #5 and #7 operate to open reject pockets for two cycles so as to receive the two cards which give rise to the out of sequence signal, thus assuring that the card actually out of group sequence is rejected, enabling subsequent inspection by the machine operator to determine which of the two rejected cards is the out of group sequence card. If the out of group sequence card is out of sequence with a preceding card, it will be the second card of the two cards rejected. If it is out of sequence with a succeeding card, it will be the first of the two cards rejected. For example, in the sequence D1, D2, D3, D5, D4, D6, the D5 is out of group sequence, but being in sequence with the preceding D3 card, the out of sequence relation is not detected by the machine until the D5 card is in the sequence sensing stage and compared with the card following, i. e., D4 card. Accordingly, both the D5 and D4 cards will be rejected with the two cycle or repeat operation of bank #5 or #7. On the other hand, in the sequence D1, D2, D3, D4, D6, D5, D7, D8, the D5 is again out of group sequence, but in this instance out of sequence with its preceding D6 card. Accordingly, the out of sequence condition is detected when the D5 card is in the initial sensing stage, both the D6 and D5 cards being rejected in the two cycle operation of bank #5 or #7.

To enable the two cycle or repeat operation of banks #5 and #7, a latching pawl 680 (as seen in Fig. 56) is provided which is pivoted on the slide 580 and tensioned by a spring 682 against a limit stud 683 formed on the slide. A latching nose 684 of the pawl, upon release of the slide, is disposed in a position to bear against the floating link 615 immediately above the latching nose 617 formed thereon when the link is in its depressed or lowered position, as heretofore described, resulting from the receipt of an input signal (as shown in Fig. 56). The continued release movement of the slide 580 carries with it the link 615 holding the link depressed in the position as shown in Fig. 57. In this position it will be noted that whereas the nose 613 of the floating link 615 is no longer below the ear 610 of the latch lever 607, the lever does not rock clockwise as ear 609 thereon has been engaged by shoulder 594 on the slide, thus preventing it from rocking. As the slide 586 is restored to normal position (Fig. 58) which restoring movement occurs at from 100° to 170° of the following cycle, it will be seen that the latch 607 will be free to rotate fully clockwise under tension of spring 619 to a position limited by comb 612. When the latch 607 is fully rocked in a clockwise direction, the ear 610 will be disposed in a position to block the return movement of the link 615. As the slide continues to fully restored position at about 170°, the link 615 being blocked by the latch 607 becomes disengaged from the holding pawl 680, enabling the bell-crank 620 to rock counter-clockwise to normal position under tension of spring 624 and thereby raising the floating link 615 above engageable relation with the pawl 680. The link 615, in rising, slides over the abutting surface of the ear 610 and is ineffective to rock the latch 607 which is held by spring 619 in fully rocked unlatching position until the next release movement of the slide 580 occurring at 218° of the second cycle, i. e., the cycle following the cycle in which the input signal was received. As the slide 580 is being released in said second cycle, the shoulder 594 thereon acts to rock the latch 607 counter-clockwise (Fig. 59) to normal latching position but behind the nose on latch plate 525, enabling the floating link 615, which is now in raised position and free of the latch pawl 680, to rock clockwise about the stud 614 to a position wherein the step 613 will be disposed directly beneath the ear 610. This is a normal latching relation between the lever 607 and link 615, and is maintained despite subsequent rocking of the latch lever 607 by the cam plate 595 during the continued movement of slide 580 to restored position (Fig. 60), whereby the slide will be latched against subsequent reciprocation at 218° of the third cycle and until 218° of the next subsequent cycle in which an input signal is received in the bank. Accordingly, it will be seen that the slides 580 of the banks #5 and #7 reciprocate for two cycles when once released by the pawl 607 and that the receipt of a cancellation input signal subsequent to the first reciprocation and prior to the second reciprocation will be ineffective to prevent the second reciprocation. Likewise, it will be seen that receipt of an uncancelled input signal in two successive cycles will cause the slide to reciprocate through three successive cycles and three successive inputs, causing four reciprocations, etc., the slide reciprocating to deliver an output signal for one additional cycle beyond the cycle in which the last of a series of input signals is received.

Banks #5 and #7 are also provided, as distinguished from the banks heretofore described, with a cycle counting mechanism operable for stopping the machine upon a predetermined number of successive out of sequence cycles. The necessity for this counting mechanism arises from the fact that an out of sequence condition is an abnormal condition usually resulting from a misfiling of one or more cards, and which condition could otherwise prevent the normal merging of a plurality of succeeding cards not out of sequence, as will be hereinafter more fully explained.

As seen in Figs. 45 and 56, the cycle counting mechanism of banks #5 and #7 is mounted on an angle plates 689 secured to one of the frame cross bars 575 and provided, as shown, with two studs 691 acting in slots in a rack 690 for guiding and limiting vertical movement thereof. A bell-crank 692 pivoted to the plate 689 has one arm formed with a stud 693 cooperating with a cam slot 694 formed in a bracket 696 secured to the end of the slide 580. Pivotally mounted on the other arm of bell-crank 692 is an advance pawl 695 tensioned clockwise by a spring 697 against a limit stud 698 on the bell-crank 692. Each complete reciprocation of the slide 580 acts to rock the bell-crank 692 first counter-clockwise and then clockwise, whereby the advance pawl 695 is first lowered upon release movement of the slide (Fig. 59) and then advanced a distance equivalent to one tooth space, upon the return movement of the slide (Fig. 58), the pawl being cammed counter-clockwise about its pivot point and held disengaged from the rack by the stud 698 when the slide 580 is completely released. A holding pawl 700 pivoted to the plate 689 is formed with a bent over tail portion underlying and engageable by an arm of the bell-crank 620. A spring 701 stretched between the holding pawl and the plate 689 and of less strength than the spring 624 acts to rock the pawl counter-clockwise into engagement with a tooth of the rack 690 whenever the bell-crank 620 is rocked in a clockwise direction. It will be seen that normally in the absence of an input signal the bell-crank 620 will act to hold the holding pawl disengaged from the rack 690. Figs. 56 to 60, inclusive, illustrate the operation upon receipt of a wrong sequence signal for one cycle only, while Figs. 61 to 63, inclusive, illustrate the operation of the bank after a succession of wrong sequence signals during a plurality of cycles.

In Fig. 56, shown at 218° of the first cycle, i. e., the cycle in which an input signal enters the bank at about 215° of the cycle, bell-crank 620 is rocked clockwise so as to unlatch slide 580 and enable the holding pawl 700 to engage the first or top tooth of the rack 690. At the end of the first cycle, the parts are in the position shown in Fig. 57 and the input signal will have been withdrawn but the bell-crank 620 remains in actuated position as floating link 615 is held down by the pawl 680, enabling the holding pawl 700 to engage and hold the rack in normal starting position while the advance pawl 695 is disengaged from the rack. In the restoring movement of the slide 580 carried on from 100° to 170° of the second cycle, the advance pawl 695 is rocked clockwise into engagement with the third tooth of the rack 690 so as to advance the rack one step above normal to the position shown in Fig. 58. As seen in Fig. 58, the holding pawl is rocked clockwise out of engagement with the rack by the counter-clockwise rocking of bell-crank 620 which occurs when the floating link 615 disengages from the two cycle pawl 680. The parts remain in the position shown in Fig. 58 until 218° of the second cycle at which time the release movement of slide 580 acts to rock the advance pawl 695 counter-clockwise out of engagement with the rack permitting the rack to drop to its lowest limit of movement under tension of spring 702, connecting the rack with the plate 689, and which is the position of the parts as shown in Fig. 59. As the slide 580 is restored, during the third cycle, the advance pawl 695 is rocked clockwise to engage the second tooth of the rack 690 advancing it one step to normal starting position which is the position of the parts as shown in Fig. 60, and which position is thereafter maintained until the next cycle in which a wrong sequence signal is received in the bank. Accordingly, it will be seen that the counting mechanism upon receipt of an input signal in a single cycle operates to advance the rack one step above normal at 170° of the second cycle and releases the rack for restoration to normal position during the release movement of the slide in the second cycle at about 240° of the second cycle. However, assuming that an input signal is received in the second cycle, the bell-crank 620 will be rocked clockwise and held in said position by the latching pawl 680 and floating link 615 so as to enable the holding pawl to engage and hold the rack during that portion of the cycle when the advance pawl is disengaged from the rack. Accordingly, the advance movement of the advance pawl 695 occurring at from 100° to 170° of the third cycle will act to engage with the fourth tooth of the rack, advancing the rack another step to its second step beyond normal starting position. Assuming further that a wrong sequence signal is received in the third cycle, the identical operation just described as occurring in the second cycle is repeated, i. e., the holding pawl being rendered effective for preventing restoration of the rack so that by 170° of the fourth cycle, the rack is advanced three steps above normal starting position. As long as wrong sequence signals are continually received in successive cycles, the rack will continue to be advanced one step further from normal starting position so that, assuming that input signals are received in six successive cycles, the position of the mechanism at the end of the sixth cycle will be as shown in Fig. 61, wherein it will be seen that the rack has advanced five steps above normal starting position, which movement of the rack occurred at 170° of the sixth cycle.

The movement of the rack 690 is utilized to transmit signals for controlling other banks of the unit, and to this end there is adjustably secured to the upper portion of each rack a cam plate 703 engaging a follower roller 704 carried by the vertical arm of a bell-crank 705 (see also Fig. 45). The bell-crank 705 is loosely mounted on a rock shaft 706, journaled in two brackets 707, 708 secured to the top plate 577 of the unit. The horizontal arm of the bell-crank 705 is formed with a bent over lip engaging the top of a spring raised pin 710 projecting through a perforation in the top plate 577 carried in a nipple 711 secured to the plate 577. The pin, as seen in Figs. 64, 66, engages the cancel key 636 of the next higher numbered bank adjacent to the #5 and #7 banks, respectively, i. e., the #6 and #8 banks. The actuation of said key acts to cancel, as heretofore described, the effect of any upper input signal simultaneously received in the same bank. It will be seen in Figs. 58 and 64 that the counting rack 690 of the #7 bank, upon rising one step from normal starting position at 170° of the cycle following the cycle in which a "wrong" sequence signal is received, will rock bell-crank 705 clockwise depressing pin 710 and key 636 of the adjacent #8 bank, thereby effecting a cancellation of input signals in the #8 bank, which cancellation signal is held in the #8 bank during any further steps to which the counting rack may be advanced, and until the rack is restored to normal starting position. Since, as before described, bank #8 operates to block primary card feed, the signal transmitted by the rack 690 acts to prevent operation of bank #8 during the second cycle, thereby assuring feed and rejection of the second of the two cards, the sensing of which gave rise to the "wrong" sequence signal in bank #7, regardless of what input from other sources may be received in bank #8 in said second cycle. Similarly, it should be understood that the counting rack for the #5 bank operates to effect an input cancellation in the #7 bank, the cooperative relation between banks #5 and #6 being identical with that between banks #7 and #8.

The advance movement of the rack 690 after a predetermined number of successive "wrong" sequence cycles also acts to transmit a signal for stopping the machine and to this end an arm 713, having a pin 712 therein, is disposed in the path of each of the counting racks 690, the arms 713 being fast on the rock shaft 706. Also fast on the shaft 706 is a rock arm 714 (see also Figs. 46 and 65) having a bent over lip adapted to bear on the end of a BW19, the nipple of which is mounted on the bracket 707, the other end of which wire is secured to the lower input plate 582 and associated with bank #1. The position of the pin 712 is such as to be raised by the rack 690 as the rack moves into the fifth step above normal position which movement occurs at 170° of the sixth cycle of a continuous succession of "wrong" sequence input signals to the bank. The rocking of the arm 713 rotates arm 714 through the shaft 706 thus transmitting a lower input signal into bank #1 to stop the machine at the end of the said cycle, at which time the parts are in the position shown in Fig. 61. As seen, the position of the parts when the machine stops are such as to retain in the machine the normal output signals delivered by bank #7 in addition to the machine stop signal actuated by the rack 690.

Figure 62:
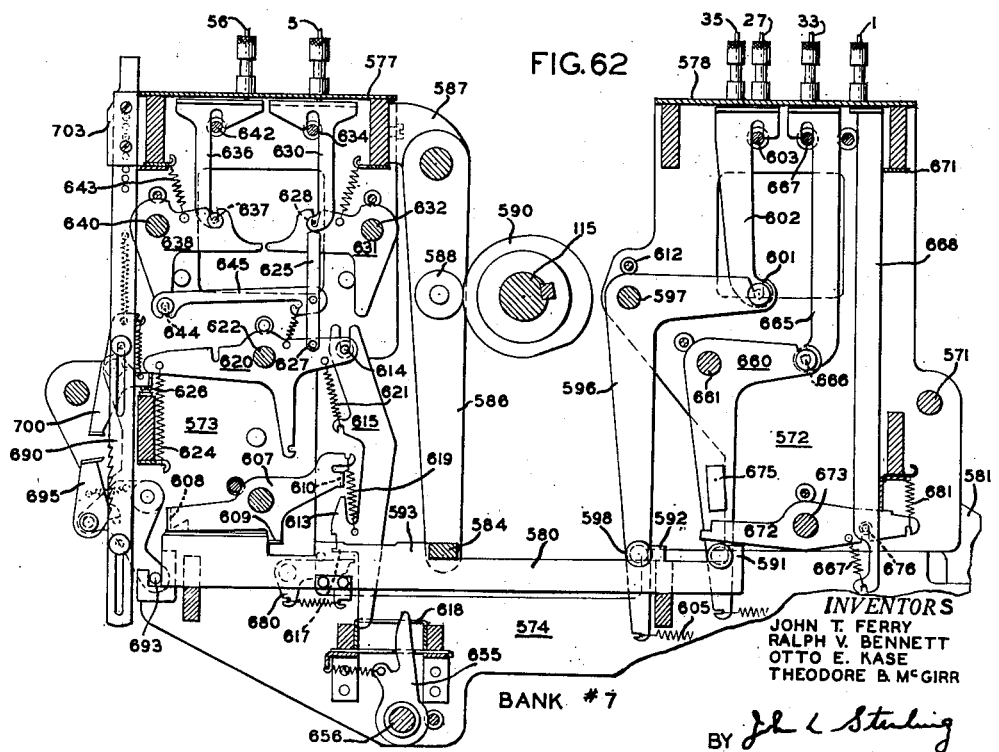

As elsewhere described herein, restarting of the machine after the machine has stopped as a result of a successsion of "wrong" sequence cycles is effected by the operation of a "clear" control button associated with that side of the machine on which the out of sequence occurred. The manual depression of said button operates to start the machine and to actuate certain other Bowden wires which transmit signals to the signal control unit and other controlling members of the machine. As bank #7 is associated with the primary side of the machine, the primary "clear" button is depressed upon a stop signal from that side. One of the signals effected by operation of the primary "clear" button is a lower input to bank #1, the machine stop bank, so as to stop the machine again after completing only one clearing cycle. The clear primary button also actuates wires transmitting input cancellation signals to banks #7 and #8. Accordingly, it will be seen that when the machine is restarted after the sixth cycle and the slide 580 approaches fully restored position, the floating link 615 will bear against the ear 610 of the clockwise rotated latch 607, as shown in Fig. 49. The input cancellation signal effected by the clear button acts to rock swing link 625 to the position shown in Fig. 63 and unblock the bell-crank 620, enabling it to rock counterclockwise to normal position and retain said position despite subsequent receipt of an input signal, thereby raising the floating link 615 above engageable relation with the pawl 680, at the same time rocking the holding pawl 700 clockwise to disengage it from the counting rack 690. The rack 690 at this point of the cycle is being held in fully raised position by the advance pawl 695. As the slide 580 is again released at about 218° of the seventh cycle, the rack not being held by the holding pawl 700 follows the lowering movement of the advance pawl 695 until about 238° of that cycle at which time the advance pawl is rocked counter-clockwise out of engagement with the rack, enabling the rack to drop against its limit studs 698. In addition, the forward movement of the slide 580 in the seventh cycle rocks the latch lever 607 counter-clockwise, enabling the floating link 615 to swing counter-clockwise into normal latching position relative to the latch lever 607 in which position the parts are seen in Fig. 62 when the machine stops at the end of the seventh cycle.

Figure 63:
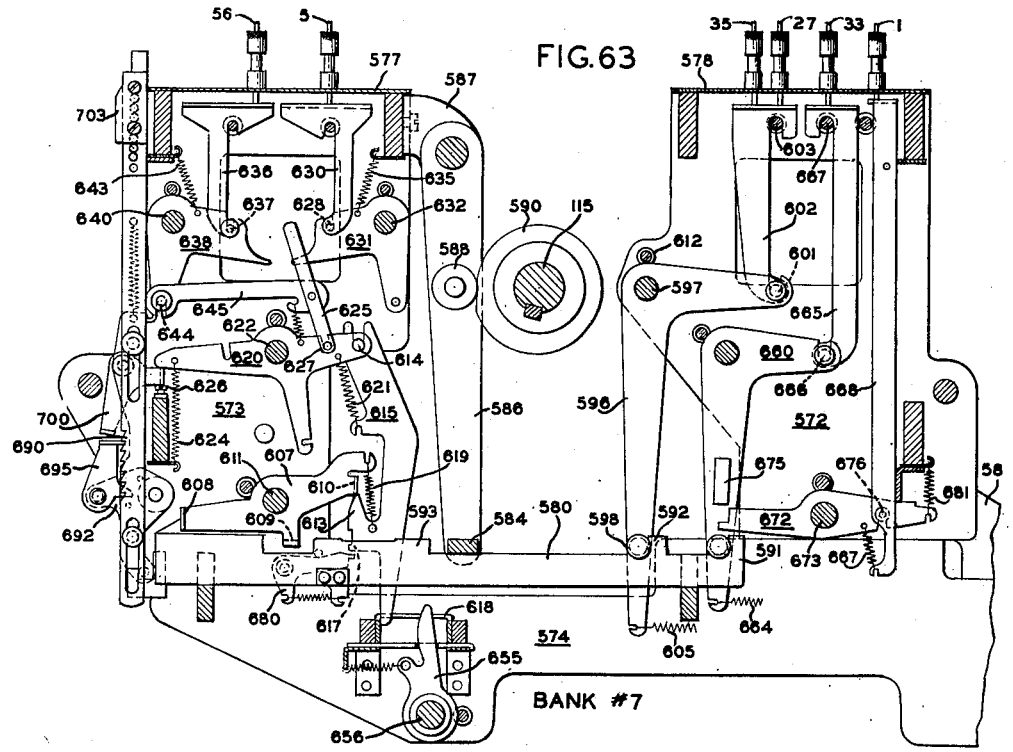

The machine is again restarted at the beginning of the eighth cycle by operation of the secondary "clear" button which, as before described, transmits a lower input signal to the machine stop bank #1 and also an input cancellation signal to bank #7. As the slide 580 is restored from 100° to 170° of the eighth cycle, the advance pawl 695 is rocked clockwise into engagement with the second tooth of the rack 690 raising the rack to normal starting position. The presence of the input cancellation signal which holds the swing link 625 in a counter-clockwise position renders the "wrong" sequence input signal ineffective for rocking the bell-crank 620 and thereby enables the floating link 615 and latch 607 to retain their normal latching position. Accordingly, as the restoring bail 584 advances to release position at about 245° of the eighth cycle, which is the position of the parts as shown in Fig. 63, the slide 580 is held latched by latch 607 and no output signals are delivered from bank #7. Thus, when the machine stops at the end of the eighth cycle as the result of the lower input entry in bank #1, the mechanism of bank #7 is fully restored to normal with the counting rack 690 at normal starting position and the slide 580 latched in restored position.

The operation of bank #5 is identical with that of bank #7 as above described, the source and distribution of the signals associated with bank #5 operating to perform the same identical function with respect to the secondary side of the machine. Accordingly, bank #5 is responsive to an input signal indicating a "wrong" sequence of secondary cards, the counting rack 690 associating with bank #5 operating through bell-crank 705 to transmit an input cancellation signal into bank #6 during the second cycle of operation and also operatin through pin 712 on rock arm 713 to transmit a lower input signal to bank #1 in the sixth cycle of continuous operation, and input cancellation signal for bank #5 being responsive to the operation of the "clear" button associated with the secondary side of the machine.

The remaining banks not heretofore described, i. e., the second, third and fourth banks as viewed from the rear of the machine, are operable for delivering signals to the "equals" card pockets P2 and P4 and are each mainly distinguished from the banks heretofore described in that they have no means for responding to upper or lower input signals, but rather are adapted to operate and deliver output signals each machine cycle. However, they are responsive to input cancellation signals which render the banks ineffective for delivering output signals.

Bank #3 is a one cycle bank operable for delivering an output signal to each of the "equal" pockets whenever an equal condition is signalled by the merging detector unit, 470M while banks #2 and #4 which are of identical construction and serve identical functions for their respective sides of the machine, are two cycle banks operable for delivering an output signal to a corresponding "equals" pocket for two successive cycles upon an equal condition in the corresponding detector unit.

As seen in Fig. 55, banks #3 is adapted to deliver two output signals per cycle except when its operation is cancelled by either of two input cancellation signals. To distinguish from the banks heretofore described, a spring 715 is connected to the depending arm of the bell-crank 620 replacing spring 624 and exerting a clockwise pull on the bell-crank rocking it toward a limit shaft 716 extending between and mounted on the side frame plates 573. The effect of said spring is the same as though an input signal was continually present in the bank and depresses the floating link 615 to retain the latch 607 rocked clockwise in unlatched position with respect to the slide 580. Thus it will be seen that the spring 715 acts to hold the latch 607 in unlatching position, enabling the slide 580 to reciprocate with the restoring bail 584 each machine cycle. The slide 580 is latched upon receipt of an input cancellation signal which acts to depress a cancellation key 636. The cancellation key provided in bank #3 differs from that of the above described banks in being elongated so as to connect with the bell-crank 620, the stud 637 of said key engaging a slot formed in said bell-crank. Depression of the key 636 upon receipt of an input cancellation signal acts to rock the bell-crank 620 counter-clockwise against the tension of spring 715, raising the floating link 615 and rotating the latch 607 counter-clockwise to effective latching position. Accordingly, it will be seen that bank #3 is effective to deliver an output signal in every cycle except those cycles in which an input cancellation signal is received. It might be here noted that since the cancellation signals entered in bank #3 are signals indicating either a high secondary or high primary condition in the merging detector unit 470M, in normal merging operations in the machine, one or the other of said cancellation signals will normally be transmitted to bank #3. Accordingly, the abnormal condition of neither side high, i. e., an equal condition in the merging detector unit, which condition is indicated by lack of any signal from said unit, is a condition which renders bank #3 effective for delivering an output signal to each of the two "equals" pockets of the machine.

Banks #2 and #4, as aforementioned, are identical with each other in construction and operation, and differ from bank #3 only to the extent that once rendered effective they are provided with a two cycle pawl 680 for effecting two successive cycles of the slide 580 regardless of a change in signal condition in the bank during the second or repeat cycle. Fig. 53 is a view of bank #2 at zero degrees of the cycle and Figs. 48 and 54 are views of said bank at 218° of the cycle. Each of the said banks #2 and #4 operates to transmit a single output signal to its corresponding "equals" pocket as controlled by receipt of an input cancellation signal from its corresponding sequence detector unit, i. e., bank #2 being responsive to a signal from the secondary detector unit for operating the secondary "equals" pocket and bank #4 being responsive to a signal from the primary detector unit for operating the primary "equals" pocket. As seen in Fig. 48, the lack of an input cancellation signal enables the spring 715 to retain the bell-crank 620 rocked in a clockwise position thereby holding the floating link 615 depressed and the latch lever 607 rocked clockwise to an unlatching position. The receipt of an input cancellation signal prior to 218° of a cycle depresses the push link 636, rocking bell-crank 620 counter-clockwise raising the floating link 615 and rocking the latch 607 counter-clockwise into latching position as shown in Fig. 51. However, as distinguished from bank #3, the slide 580 is provided with a two cycle pawl 680 engageable with the floating link 615 and operative for enabling a second successive reciprocation of the slide 580 in the same manner as heretofore described in reference to the operation of bank #7. As seen in Fig. 48 the bank is shown in operative position at 218° in the first cycle without an input cancellation signal following the cycle in which a signal was received, the floating link 615 is retained in lowered position so as to be engaged by the pawl 680 as the slide 580 is released, and the parts will be in the position, as shown in Fig. 53, at 360° of the same cycle. As the slide is restored to normal position about 100° to 170° of the second cycle, the latch 607 is free to rock fully clockwise under tension of the spring 619 against the bar 612, in which position the ear 610 will cam against the inclined surface of the step 613 and thereby be held in unlatching position for said second cycle. Assuming for the moment that no input cancellation signal is received in said second or repeat cycle, it will be seen that the pawl 680 will engage the push link 615 so that upon restoration of the slide occurring at about 170° of the third cycle the parts will be restored to the identical position as in the repeat cycle. In each additional successive cycle in which no input cancellation signal is received, the identical operation will occur. However, assuming that an input cancellation signal is received in a cycle following the cycle in which no signal was received, the parts will assume the position shown in Fig. 54 which is shown at 218° of such cycle. The receipt of an input cancellation signal which occurs from about 205° to 215° of the cycle depresses the cancel key 636 to rotate bell-crank 620 counter-clockwise enabling floating link 615 to slide along the ear 610 and rise above engageable position with respect to the pawl 680. Accordingly, as the slide 580 is released, rocking the latch 607 counter-clockwise, the floating link 615 now being above engageable position with the pawl 680 is free to swing clockwise under tension of spring 621 to a position whereby the step 613 underlies the ear 610 as shown in Fig. 52 in which position receipt of input cancellation signals in subsequent cycles will be effective to latch the slide. From the foregoing, it will be seen that banks #2 and #4 operate to deliver an output signal for each machine cycle in which there is no input cancellation signal and in addition deliver an output signal in the first cycle following that in which an input signal is received. Since in file merging operations the presence of cards of equal data value is an abnormal condition, it will be seen that the two cycle or repeat operation of banks #2 and #4 segregates the two cards, the detecting of which created the "equal" condition so as to facilitate inspection of the two segregated cards, whereby the cause for such abnormality may be determined.

In summarizing the operation of the signal control unit, it is seen that each bank of the unit operates to deliver one or more output signals at 245° of a machine cycle under control of an input signal entered prior to 218° of the same machine cycle. With reference to Figs. 76A, 76D, inclusive, which comprise a schematic wiring diagram of the machine, and Fig. 46 it will be noted that the output delivered by bank #1 actuates the BW20 and rock arm 186 so as to stop the machine at the completion of the same cycle. The output signal of bank #1 is rendered effective by any one of four lower input signals through BW's 19, 29, 52, or 62, or either of two upper input signals through BW's 64 or 68, either of which upper input signals may be cancelled by an input cancellation signal through BW51. The lower input signal through BW19 occurs on the sixth cycle following five successive out of sequence cycles on either side of the machine, and is under control of the racks 690. The lower input signal through BW29 results from the rocking of arm 358 by a full pocket condition. The lower input signal through BW52 results from the operation of a primary "clear" button and the lower input signal through BW62 arises from operation of a secondary "clear" button, as will be described hereinafter. The upper input signal through BW64 results from rocking of primary card safety bail 280 and indicates failure of the primary card advance or feed and the upper input through BW68 results from the rocking of safety bail 280S and indicates failure of the secondary card advance or feed either of which upper inputs is cancelled by receipt of an input cancellation signal through BW51 which results from operating a "clear both sides" button as will be described.

As seen in Fig. 48, bank #2 operates for two successive cycles to deliver an output signal through BW21 to the secondary "equals" pocket P2 upon the absence of an input cancellation signal through BW17, which cancellation signal indicates a "correct" sequence condition in the secondary detector unit 470S.

As seen in Fig. 55, bank #3 operates for one cycle to deliver output signals through BW's 22 and 23, to each of the "equals" pockets P2 and P4 upon the absence of input cancellation signals through BW's 10 and 8. An input cancellation signal through BW10 results from a "high" secondary condition in the merging detector unit 470M and the signal through BW8 results from a "high" primary condition in the merging detector unit.

Bank #4, being similar in construction to bank #2, as hereinbefore described operates on two successive cycles to deliver an output signal through BW24 "equals" pocket P4 upon the absence of an input cancellation signal through BW2. This cancellation signal indicates a "correct" sequence condition in the primary detecting unit 470P.

Bank #5, similar to bank #7, operates through two successive cycles to deliver three output signals through BW's 25, 30 and 31. BW25 delivers a signal to the secondary reject pocket P1, the signal through BW30 lights the secondary signal light 290S, and the signal through BW31 operates slide 434S disabling the secondary sequence sensing stage retract mechanism. The output signal through BW31 may be cancelled upon receipt of an output cancellation signal through BW16 which signal indicates a "correct" sequence in the secondary detector unit 470S. Bank #5 is rendered operative upon receipt of an upper input signal through BW15 resulting from a "wrong" sequence condition in the secondary detector unit, which signal through BW15 may be cancelled by an input cancellation signal through BW59 which results from the operation of a "clear" secondary button or a "clear both sides" button. Although bank #5 operates to deliver output signals for two cycles, it will be seen that the secondary sequence sensing stage retract mechanism will not be held disabled on the repeat cycle if on such cycle the secondary detector unit indicates a correct sequence condition, since on such a second cycle an output cancellation signal through BW16 will be entered to cancel the output signal otherwise transmitted through BW31. Bank #5 also operates to transmit an input cancellation signal into bank #6 by bell-crank 705, during this second or repeat cycle of operation and also to transmit a lower input signal through BW19 into bank #1 during the sixth cycle following five consecutive out of sequence cycles.

Bank #6 operates similar to bank #8 for one cycle to transmit an output signal through BW32 which signal actuates BW's 38 and 39, blocking secondary card feed and card advance and may be cancelled by receipt of an output cancellation signal through BW13 indicating a "wrong" sequence condition in the secondary detector unit. Bank #6 is rendered operative upon receipt of a lower input signal through BW53 resulting from the operation of the primary "clear" button or it may be rendered operable by either of two upper input signals through BW's 6 and 11. The signal through BW6 indicates a "wrong" sequence condition in the primary detector unit 470P and the signal through BW11 indicates a "high" secondary condition in the merging detector unit 470M. The upper input signals through BW6 and BW11 will be cancelled by receipt of any one of four input cancellation signals through BW's 43, 60, 69 or the bell-crank 705 responsive to the counting rack 690 associated with the #5 bank. The signal through BW43 results from setting the sequence control button 723 or 724 for a sequence check operation on both sides of the machine, or for a secondary sequence check, respectively. The signal through BW60 results from the operation of the secondary "clear" button or a "clear both sides" button. The signal through BW69 is delivered by the rocking of the secondary card feed safety bail 187 indicating a failure of the secondary card feed.

Bank #7 (Fig. 56) operates for two successive cycles to deliver three output through BW's 35, 27, and 33. The signal through BW27 being delivered to the primary reject pocket P5, the signal through BW35 lighting the primary signal light 290 and the signal through BW33 operating the slide 434 for disabling the primary sequence sensing stage retract mechanism. The output through BW33 may be cancelled by an output cancellation signal received through BW1 indicating a correct sequence condition in the primary detector unit 470P. Bank #7 is rendered operative by an upper input signal through BW5 resulting from a "wrong" sequence condition in the primary detector unit. The signal through BW5 may be cancelled by an input cancellation signal through BW56 which results from operating the "clear" primary button or a "clear both sides" button. Although bank #7 operates to deliver output signals for two successive cycles, it will be seen that the primary sequence sensing stage retract will not be held disabled on the second of said cycles if in said second or repeat cycle the primary detector unit indicates a correct condition, since on such repeat cycle the output cancellation signal through BW1 will result in cancelling the output signal which otherwise would be delivered through BW33. Bank #7 also operates bell-crank 705 to transmit an input cancellation signal into bank #8 during its second cycle of operation and also transmits a lower input signal through BW19 into bank #1 by means of arm 713 during the sixth cycle following five consecutive out of sequence cycles of operation.

Bank #8 (Fig. 64) operates for one cycle to transmit an output signal through BW34 thence over BW's 36 and 37 to block primary card feed and card advance. The output through BW34 may be cancelled by receipt of an output cancellation signal through BW4 indicating a "wrong" sequence condition in the primary detector unit 470P. Bank #8 is rendered operative by receipt of a lower input signal through BW63 resulting from the operation of the secondary "clear" button or by either of two upper input signals through BW's 14 and 7. The upper input through BW14 indicates a "wrong" sequence condition in the secondary detector unit 470S and the signal through BW7 indicates a "high" primary condition in the merging detector unit 470M. The upper input signals through BW's 14 and 7 may be cancelled by any one of four input cancellation signals received through BW's 65, 55, 42, or the bell-crank 705 which is responsive to the counting rack 690 associated with the #7 bank. The input cancellation signal through BW65 is actuated by the primary card feed and safety bail 280 indicating failure of primary card feed. An input cancellation signal through BW55 results from the operation of the primary "clear" button or a "clear both sides" button. The input cancellation signal through BW42 arises from the setting of keys 722 or 723 for a primary sequence check operation or for a both sides sequence check operation.

Bank #9 (Fig. 67) is operative for one cycle for delivering output signals through BW's 28 and 26. BW28 delivers a signal to the primary reject pocket P5 and the signal over BW26 controls the secondary reject pocket P1. Bank #9 is rendered operative by either of two lower input signals through BW's 54 or 61. The lower input signal through BW54 results from the operation of the primary "clear" button or a "clear both sides" button, and the signal over BW61 results from the operation of the secondary "clear" button.

MACHINE CONTROLS (*Figs. 68 to 75, inclusive*)

A plurality of manually operative controls is provided comprising a group of control keys by which the machine is set up for a particular type of operation and groups of operating control levers, one group associated with each side of the machine, by which a preselected type of machine operation may be initiated. The above first named group of controls, i. e., the set up controls, enables the machine to be manually pre-set for any one of four general types of operation, viz., a "file merging" operation, a "both sides sequence check" operation, a "primary sequence check" operation, or a "secondary sequence check" operation.

It is, of course, understood that a "file merging" operation includes a sequence checking of the cards being merged, the term "file merging," as herein used and referred to, being intended to mean that type of operation where the center or merging pocket P3 is utilized to receive cards intermittently from both the primary and secondary side of the machine, depending on their respective sequential order.

A "sequence check" operation, as the term is herein used and referred to, is one wherein there is no merging of cards from the respective sides of the machine, the cards of each side being deposited in the pockets associated only with one side or the other, and as determined by the presetting of the machine.

The set up control mechanism 720, as seen in Figs. 68, 69 and 70, includes four manually operative keys 721, 722, 723 and 724, each rotatably mounted on a fixed shaft 725, which shaft is supported at its end in two brackets 726 secured to the underside of a cover plate 727. Each key is formed with a stem portion extending vertically through a slotted plate 728 covering a cut away opening in the cover plate, a button being secured to the upper extremity of said stem portion. Each key lever is tensioned in a clockwise direction by individual springs 729 against a limit comb bar 731 extending between the brackets 726. Also extending between the brackets 726 is a bar 732 suitably tapped for supporting the nipples of a plurality of BW's 46, 40, 41, 42, 43, 44, 45. Engaging with the projecting ends of selected groups of said Bowden wires is a plurality of individual bails 733, 734, 735 and 736, each bail being loosely mounted on the shaft 725 and suitably spaced thereon by collars 737. The arrangement is such that bail 733 overlies BW's 40, 41; bail 734 overlies BW42; bail 735 overlies BW43; and bail 736 overlies BW's 44, 45. The bails are engaged and actuated by blocks 738 secured to the key levers 722, 723 and 724, whereby manual operation of any one of said levers acts to rock the related bails counter-clockwise, as seen in Fig. 70, to depress the Bowden wires associated with said actuated bail. Accordingly, it will be seen that manual operation of lever 722 rocks bails 733, 734 to depress BW's 40, 41, 42; operation of lever 723 rocks bails 734, 735 to depress BW's 42, 43; and operation of lever 724 rocks bails 735, 736 to depress BW's 43, 44, 45.

The operation of key lever 722 sets the machine for a "primary sequence check" operation and, as seen in the schematic wiring diagram (Figs. 76A, 76B, 76C and 76D), the signal effected through BW40 acts to rock bell-cranks 205S and 305S, thus blocking the secondary card feed and card advance; the signal through BW41 acting to disable the secondary automatic "no card" machine stop; and the signal through BW42, being an input cancellation signal for signal control unit bank #8, acts to prevent blocking of primary card feed through operation of bank #8. The operation of lever 723 sets the machine for a "both sides sequence check" operation, the signal through BW42, as aforesaid, being an input cancellation signal to bank #8 so as to prevent blocking of primary card feed, and the signal through BW43, being an input cancellation signal for bank #6, acts to prevent blocking of the secondary card feed. The operation of key lever 724 sets the machine for a "secondary sequence check" operation; the signal through BW43, as aforesaid, being an input cancellation signal for bank #6, acts to prevent blocking of secondary card feed; the signal through BW44 acting to block primary card feed and card advance; and the signal through BW45 acting to disable the primary automatic no card machine stop through bell-crank 301.

The machine setting effected by the operation of either of key levers 722, 723 or 724 is held and retained in the machine by means of latch arms 740 which, as seen in Figs. 69 and 70, are fast on a rock shaft 741 journaled in the brackets 726. Each latch arm is formed with a camming and latching nose engageable with a stud 742 formed on each of the related key levers 722, 723 and 724. Also fast on shaft 741 is a bell-crank 743, the vertical arm of which is formed with a cam surface, the horizontal arm of which is provided with a blocking stud 744. The cam surface of the bell-crank engages with the stud 742 formed on the key lever 721 which is the reset key, the bell-crank being yieldably tensioned in a clockwise direction by a spring 745. Accordingly, it will be seen that the operation of any key operates to rock the shaft 741 counter-clockwise against the tension of spring 745 and except for the reset key 721, as the stud 742 rocks past the nose of the latch arm 740, the arm will return clockwise to normal position to latch the actuated key in effective position. The operation of any key, therefore, acts to release any other key which may have been previously latched, the operated key being latched by the arm 740. There being no latching nose on the bell-crank 743, the reset key 721 is not latched but operates only to release one of the other keys. The machine is set for a "file merging" operation when all of the key levers are in normal unlatched position, the function of the reset key 721 being to restore the keys to "file merging" setting.

The set up control keys above described may be operated only when the machine is idle so as to prevent erroneous machine operations which might otherwise result from accidental or inadvertent operation of a key during a running of the machine. The lockout mechanism for the keys includes a bell-crank 746 rotatably mounted on the shaft 725, the horizontal arm of said bell-crank being formed with a bent over ear engageable by BW46 mounted in the bar 732. The vertical depending arm of said bell-crank is formed with a squared off shoulder engageable with the blocking stud 744 in the bell-crank 743. The blocking bell-crank 746 is yieldably tensioned in a counter-clockwise direction by spring 747. Thus, it will be seen that in the absence of an incoming signal through BW46, the bell-crank will be in a counter-clockwise rocked position, the vertical arm being disposed over stud 744 so as to block the counter-clockwise rocking of the bell-crank 743 and the shaft 741 and thereby prevent the manual operation of any of the key levers 721, 722, 723 and 724. The receipt of a signal through BW46 rocks the bell-crank 746 clockwise, unblocking the counter-clockwise rocking of bell-crank 743 and thereby enabling the operation of any of the key levers 721, 722, 723 and 724. The BW46 is associated with and actuated by the clutch shaft safety bail 187 (see Figs. 7, 76A, 76B, and 76D), hereinbefore described, so that it will be seen the signal through BW46 is received when the machine stops and held as long as the machine remains idle, being withdrawn when the machine starts and held withdrawn as long as the machine is operating.

The operating controls by which the selected type of machine operation is initiated and effected include a group of three button levers associated with each side of the machine. One of each group of levers is effective for starting and stopping the machine, the other two levers in each group being effective for initiating clearing operations of the machine. The arrangement is such that either side of the machine may be cleared independently of the other or both sides may be cleared simultaneously. One of said clearing buttons is operative for initiating a clearing operation for each respective side of the machine. The other of said clearing buttons is operative for initiating a "both sides clear" operation of the machine. Since both groups of operating control levers are of substantially identical function with respect to its related side of the machine, a detailed description will be made first of the controls associated with the secondary side of the machine, whereafter their manner of joint operation will then be set forth. As seen in Figs. 1, 1A, 71 and 72, the operating control levers 760, 761, 762, 760S, 761S, 762S are each formed at their upper extremities in the shape of a manually operative button, the levers 760, 761 and 762 being the primary control levers, 760S, 761S and 762S being the secondary operating control levers. As seen in Figs. 71 and 72, the levers are rotatably mounted on a shaft 763S supported between brackets 764S secured to the front frame plate 101S. The outside button of the group, i. e., button 760S, is a machine "start-stop" button, the middle button of the group, i. e., button 761S, being a "secondary clear" button for the secondary side of the machine, the inside button of the group, i. e., 762S, being a clear button for initiating a "clear both sides" operation of the machine.

Each button lever is associated with a plunger 765S extending through openings in the front frame 101S and the rear frame 104, respectively, each plunger carrying a collar 766S and a spring 767S acting to yieldably retain the lever against a limit collar 768S mounted on a guide stud 769S secured to the front frame 101S. The manual clockwise rocking of the lever about shaft 763S against tension of spring 767S is limited by bumpers 771S also secured to the front frame plate 101S. The free rearmost end of each plunger 765S (see also Fig. 73) is disposed in horizontal alignment with a bail 770S carried by and between a pair of rock arms 772S which are fixed on a rock shaft 775 extending across the rear of the machine (Figs. 2 and 2A) and journaled in a series of brackets 773 and 773S secured to the rear frame 104 of the machine. The brackets 773 and 773S are arranged in pairs, one pair for each side of the machine. Fast on the shaft 775 is a rock arm 776 pivotally connected by a link 777 to a rock arm 778 fastened on a shaft 180. As hereinbefore described, the shaft 180 is journaled in the frame plates 103 and 116 of the machine and carries a rock arm 178, actuable upon rocking of the shaft for causing either a starting or stopping of the machine. Accordingly, it will be seen that the manual operation of any operating button lever acts through the associated plungers 765S to rock the bail 770S, shaft 775 and shaft 180, such shafts and bail being yieldably retained in normal ineffective position by springs 781S stretched between studs formed on the rock arms 772S and brackets 773S, respectively.

As best seen in Figs. 73, 74 and 75, the rearmost end of plungers 765 associated with the middle and inner button levers 761S, 762S, i. e., the "secondary clear" lever and the secondary side "both sides clear" lever, carry collars 782S disposed in horizontal alignment with the upright wall portion of individual bails 783S, 784S, respectively. Said bails are formed as shown with a flat protruding lip portion and a bent over end portion by which each bail is loosely mounted on a rock shaft 780 (Figs. 2 and 2A). Said rock shaft extends across the rear of the machine being journaled similarly to rock shaft 775 and the brackets 773 and 773S, and yieldably tensioned in a clockwise direction by a spring 786S stretched between an arm 785S fastened on the shaft and one of the brackets 773S. Also fastened on the shaft 780 is an upright rock arm 787S disposed in alignment with the collar 782S associated with the innermost lever, i. e., "clear both sides" lever 762S, said rock arm also abutting the upright wall portion of the bail 784S. A carry bar 788S secured to the lip portion of bail 783S overlies the lip portion of bail 784S so that, whereas the counter-clockwise rocking of bail 783S carries with it bail 784S, bail 784S is free to rock counter-clockwise independently of bail 783S. A bell-crank 790S loosely mounted on the shaft 780 has one arm thereof twisted to form a flat wire engaging lip, the other arm thereof being secured to the bail 784S so as to rock concurrently with the rocking of said bail.

The counter-clockwise rocking of said bails is adapted to transmit signals through selected groups of BW's 58 to 63, inclusive, it being understood that a duplicate pair of said bails is provided for the primary group of operating levers, i. e., 760, 761 and 762, the shafts 775 and 780 being universal to both primary and secondary operating controls. The BW's 59 to 63, inclusive, actuated by said bails, are mounted in a tapped supporting bar 791S extending between the brackets 773S. BW's 59 and 60 are mounted for engagement by bail 784S and BW's 61, 62, 63 are engageable by the bail 783S. The BW58 is mounted in a bracket 792S secured to the rear frame 104 and is actuated by the counter-clockwise rocking of the bell-crank 790S. On the primary side of the machine (see Figs. 2 and 76B), BW's 52 and 53 are similarly mounted so as to be engaged by corresponding bail 783, BW's 54, 55 and 56 for engagement by corresponding bail 784, and BW57 being mounted so as to be engaged by the bell-crank 790 associated with the primary side of the machine. In addition, the supporting bar 791 associated with the primary side of the machine supports a BW51 (see Fig. 3A) engageable by the bent over lip of an arm 793 fastened on the shaft 780, which Bowden wire is actuated whenever the shaft 780 is rocked.

From the foregoing it will be seen that manual actuation of the separate operating controls results as follows, starting with the secondary controls: Actuation of the outermost lever 760S, i. e., the secondary start-stop lever, acts through its associated plunger 765S to rock bail 770S and shaft 775, thereby actuating the machine start and stop mechanism as above described; manual actuation of the middle lever 761S, i. e., clear secondary lever, acts to rock the bail 770S and, in addition, rock bails 783S about the shaft 780 which at the same time carries along bail 784S so as to transmit signals through BW's 58, 59, 60, 61, 62, 63, the shaft 780 remaining stationary under tension of spring 786S. The manual operation of the innermost lever 762S, i. e., "clear both sides" lever, acts to rock bail 770S and, in addition, rocks arm 787S causing both the bail 784S and the shaft 780 to rock. Rocking of bail 784 causes signals through BW's 58, 59 and 60, and there being a similar rock arm 787 associated with bail 784 on the primary side of the machine, the rocking of shaft 780 causes said arm on the primary side to rock so as to effect signals through BW's 54, 55, 56 and 57 and, in addition, the signal through BW 51.

The same identical group of signals are effected by manual operation of the innermost button 762, i. e., "clear both sides" button on the primary side, the plunger 765 associated with said lever acting to rock the bail 770 on the primary side together with rock arm 787 on the primary side, causing shaft 780 to rock and operating both bails 784, 784S, transmitting signals to BW's 54, 55, 56, 57, 58, 59, 60 and 51. The manual actuation of the middle button 761 on the primary side, i. e., "clear primary" button, acts to rock the bail 770 and also the corresponding bail 783 which carries with it the adjoining bail 784 so as to transmit signals through BW's 52, 53, 54, 55, 56, 57. The manual actuation of the outermost button 760 on the primary side, i. e., primary "start-stop" button, operates to rock the bail 770 which, as heretofore described, operates the machine start-stop mechanism.

The timing of the signals effected by the manual operation of the clear buttons is synchronized with machine timing by means of holding mechanism which operates to retain said signals in the machine as long as the machine continues to operate and release said signals when the machine operation stops. Said signal holding mechanism (see Figs. 71 to 75, inclusive) comprises bell-cranks 794S, 795S rotatably mounted on a post 796S secured to an auxiliary bracket 797S mounted on the innermost of the pair of brackets 773S. Also rotatably mounted on said post is a rock arm 800S having a bent under ear which underlies the horizontal arms of both the bell-cranks 794S, 795S which bell-cranks are individually tensioned counter-clockwise as viewed in Fig. 75 by springs 798C. Engaging with the bent under ear of said rock arm is the end of a BW47 supported by an angle bracket 801S secured to the bracket 797S, the signal transmitted by the actuation of said BW47 acting to rock the arm 800S and bell-cranks 794S, 795S clockwise against the tension of the springs 798S. Withdrawal of the signal through BW47 releases the bell-cranks into blocking engagement with either or both the carry bars 788S or the bail 784S, respectively. The bell-crank 794S engages the carry bar 788S which is secured to the bail 783S, as above described, and the bell-crank 795S engages the lip of the bail 784S. The BW47 is actuated by the clutch shaft safety bail 187 heretofore described, so as to transmit a signal when the machine comes to a stop, withdrawing said signal when the machine is started. Accordingly, it will be seen that when the machine is started by actuation of the clear secondary button 761S, the bail 783S will be actuated, carrying with it bail 784S and the simultaneous withdrawal of signal through BW47 enables bell-cranks 794S and 795S to rock counter-clockwise, whereby the vertical arms of said bell-cranks will act to hold both bails 783S, 784S in actuated or effective position. Since one of the signals transmitted by actuation of the clear secondary button, i. e., signal through BW62, is a lower input signal for the signal control unit bank #1, which as heretofore described, operates to stop the machine, the machine will stop upon the completion of one cycle at which time the signal through BW47 will rock the bell-cranks 794S, 795S clockwise to unblock bails 783S, 784S which thereupon return to normal ineffective position. Likewise, when the machine is started by the manual actuation of the "clear both sides" button 762S, it will be seen (Fig. 74) that since bail 784S is rocked independently of bail 783S, it will be held rocked by bell-crank 795S, the bell-crank 794S being ineffective in this operation and only bearing against the side of the carry bar 788S. As distinguished from a "clear secondary" operation, a "clear both sides" operation does not transmit a lower input signal to signal control unit bank #1, but in the other hand, does transmit through BW51 a cancellation of input signal into signal control unit bank #1. Accordingly, a "clear both sides" operation is a continuous operation and overcomes, as long as the button is held actuated, all automatic stop conditions except the full pocket automatic stop condition operating through BW29. The release of the "clear both sides" button enables the shaft 780 to restore to normal, thereby withdrawing the cancellation of input signal through BW51 from the signal control unit bank #1, the remaining signals, i. e., through BW's 54, 55, 56, 57, 58, 59, 60, being held effective by the bell-cranks 795 and 795S. Accordingly, it will be seen that if at the time the "clear both sides" button is released there is no automatic machine stop condition causing upper input signals in bank #1, the machine will continue to clear until such a condition arises or until the machine is stopped by the operation of one of the "start-stop" buttons 760 or 760S. On the other hand, if at the time the "clear both sides" button is released there is an automatic stop condition causing an upper input signal in bank #1, such as a failure of card feed condition, such condition will be effective to stop the machine through the operation of signal control unit bank #1 immediately upon the release of the "clear both sides" button and the simultaneous withdrawal of the input cancellation of signal from control unit bank #1. In such an event, the machine would automatically stop either at the completion of the same cycle in which the "clear both sides" button was released or upon completion of the following cycle, depending upon whether the "clear" button release occurred prior or subsequent to 218° of the machine cycle, i. e., that period of the machine cycle in which the slides 580 of the signal control unit 570 start their releasing movement.

In order to prevent inadvertent or accidental actuation of a "clear" button while the machine is running, mechanism is provided for blocking a "clear" button against manual actuation whenever the machine is running, unblocking said button only when the machine is idle. The blocking mechanism (see Figs. 71 and 72) comprises a flap lever 803S pivotally mounted by a stud shaft 805S in a bracket 804S secured to the inside of rear frame 104. The lever is yieldably tensioned by spring 806S counter-clockwise against the end of a BW48 supported by an auxiliary bracket 807S. BW48 is actuated by the clutch shaft safety bail 187, heretofore described, transmitting the signal through the BW48 whenever the machine comes to a stop and withdrawing the signal whenever the machine is started. Fig. 71 shows the machine stop position with the BW48 actuated. It will be seen that withdrawal of the signal through BW48 enables the flap lever to rock counter-clockwise so as to raise the free end thereof into blocking engagement with collars 808 fast on each of the plungers 765S associated with the secondary "clear" buttons 761S and 762S. Accordingly, when the machine is running, manual actuation of a "clear" button is blocked, and as the machine stops, the flap lever 803 is rocked clockwise to the position shown, out of the path of the collars 808S to unblock the clear buttons. It is, of course, understood that a button once depressed may be held depressed during the operation of the machine if the need arises.

Fig. 79 is a chart indicating the Bowden wires and related signals associated with each of the respective "clear" buttons, it being understood that actuation of each button also operates to rock either the bail 770 or 770S, thereby causing engagement of the machine clutch so as to start the machine clearing operation. As appears on said chart and with reference to Figs. 76A, 76B, 76C and 76D, a "primary clear" operation effects through BW52 a lower input signal into signal control unit bank #1 to stop the machine and result in a one cycle operation regardless of whether the primary "clear" button 761 is or is not held actuated. Upon release of the button, a subsequent actuation of the button will cause a second one cycle "clear" operation. A primary "clear" operation also effects a lower input signal through BW53 into bank #6 for blocking secondary card feed except when the secondary sequence detector indicates a wrong sequence condition; a lower input signal through BW54 into bank #9 which operates gates for pockets P1 and P5; a signal through BW55 which is an input cancellation signal for bank #8 and prevents blocking of the primary feed by a high primary condition in the merging sequence detector unit or wrong sequence condition in the secondary sequence detector unit; a signal through BW56 which is an input cancellation signal into bank #7 and renders bank #7 inoperative for lighting primary signal light or for stopping the machine; a signal through BW57 which is a direct signal to bell-crank 284 for unblocking primary card feed after operation of the primary card feed safety bail 280. The necessity for a signal through BW57 becomes apparent upon realizing that one of the functions of a "clear" operation is to eject cards from one or both of the primary sensing chambers after certain conditions, as heretofore described, have caused a machine stop through rocking of the card feed safety bail. The rocking of the bail, as heretofore described, enables the blocking arm of the bell-crank 284 to rock into effective feed blocking position. The signal through BW57 acts to rock and restore the bell-crank 284 to normal unblocking position so that during said clearing operation of the machine, primary card feed will be unblocked regardless of the position of the safety bail 280 and thereby enabling the ejection of primary cards from the respective primary sensing chambers.

As seen in Fig. 79, actuation of the secondary clear button 761S performs the same identical functions for the secondary side of the machine and effects a signal through BW58 which is a direct signal to bell-crank 284S for unblocking secondary card feed after operation of the secondary card feed safety bail 280S; a signal through BW59 which is an input cancellation signal into bank #5, and renders a secondary wrong sequence condition ineffective for lighting secondary signal light 290S or stopping the machine; a signal through BW60 which is an input cancellation signal for bank #6 and prevents blocking of secondary card feed by a high secondary condition in the merging sequence detector unit 470M or a wrong sequence condition in the primary sequence detector unit 470P; a signal through BW61 which is a lower input signal for bank #9 and operates the gates to pockets P1 and P5; a signal through BW62 which is a lower input signal for bank #1 which operates to stop the machine after completion of one cycle; and a signal through BW63 which is a lower input signal for bank #8 which operates to block primary card feed except when the primary sequence detector unit indicates a wrong sequence condition.

The actuation of either of the "both sides clear" buttons 762 or 762S, both being effective for causing the same group of signals, results in transmitting some of the same signals as were effected by the actuation of the primary clear button, i. e., BW's 54, 55, 56, 57, and some of the same signals as are effected by actuation of the secondary clear button, i. e., BW's 58, 59, and 60, in addition to an input cancellation signal through BW51 to the signal control unit bank #1. A signal over BW51 cancels any signals received in bank #1 over BW's 64, 68 from the card safety bails 280, 280S, respectively, rendering said bails ineffective for stopping the machine. Accordingly, a "both sides clear" operation does not transmit lower input signals for releasing banks #1, #6 or #8, thereby enabling both sides of the machine to feed and clear simultaneously for a continuous succession of cycles, and for a number of cycles depending on whether the "clear both sides" button 762 or 762S is held actuated and also on whether automatic machine stopping conditions are present in the machine, as heretofore described.

OPERATING DESCRIPTION

As heretofore described, each of the primary and secondary sequence detector units operates to detect one of three sequence conditions, i. e., in sequence or correct, out of sequence or wrong, no sequence or equals, which terms "correct," "wrong," and "equals" will be used hereinafter in the specification to designate these conditions.

The merging detector unit operates to detect one of three sequence conditions, i. e., high card on the primary side, high card on the secondary side, or equal cards on both sides, which will be designated hereinafter as primary high, secondary high, and equals, respectively. It will thus be seen that there are twenty-seven possible combinations of sequence conditions between the three units, each of said combinations being listed in the first three columns of an individual line of a chart (see Figs. 78 and 78A). Each line of said chart indicates the signals and signal control banks which are released as the result of each of said combinations of sequence condition in each of three different types of machine operation, i. e., "File Merger," "Both Sides Sequence Check" or "Primary Sequence and Check" operation. The columns headed "Signals Transmitted" list the Bowden wires through which signals selected by each of the sequence detector units are transmitted to the signal control unit. Under "File Merge Setting" the column having the sub-heading "Banks Released" indicates those banks of the signal control unit which are operable for delivering output signals, and the column sub-headed "Outputs Delivered" lists the Bowden wires through which signals are delivered from the respective banks of the signal control unit. The two columns having the sub-heading "Feed Blocking" and "Pockets Signaled" indicate which of the pockets receive a signal and on which side of the machine card feed and advance is blocked for each sequence combination. When the machine is set for a "file merge" operation all pocket controls are set closed and are opened only on signal. It is understood that each side feeds except where indicated by "BL," i. e., blocked and that in the absence of any pocket signal the respective side of the machine will feed to the P3 i. e., merge pocket except when intercepted by a second cycle operation of a pocket gate anterior to said merge pocket. Where more than one pocket is signaled for a given sequence combination, cards are fed to the more anterior pocket indicated, the pockets designated with an asterisk being those receiving signals which are effective for two successive cycles. It should be here noted that the sequence condition of each of the primary and secondary sequence detector units, as indicated, will not always correspond with the actual sequence between cards in the related sensing chambers since, as heretofore described, wrong sequence conditions operate to disable the retract of sequence sensing stage data.

Similarly, in the four columns headed "Both Sides Sequence Check" are the signal control unit banks which are released, the Bowden wires through which output signals are delivered from the unit, and the pockets receiving signals when the machine is set for a "both sides sequence check" operation. With this setting of the machine, it will be noted that input cancellation signals through BW's 42 and 43 become effective for preventing blocking of card feed and advance on sides of the machine as a result of sequence conditions. Accordingly, with gate controls for pockets P2 and P4 in "manual open" setting both sides will feed simultaneously each cycle to said pockets P2 and P4, respectively, or to the more anterior pockets indicated in the two columns sub-headed "Pockets Signaled."

Similarly, the three columns included under the "primary sequence check" heading list the signal control banks which are effective, the Bowden wires through which outputs are delivered, and the pockets to which signals are transmitted for each of the sequence conditions arising in a "primary sequence checking" operation. Setting the machine for this type of operation makes signals effective through BW's 40, 41, 42. The signal through BW40, as heretofore described, is effective for preventing card advance and card feed from the secondary side of the machine. The signal through BW41 disables the secondary no-card detector, and the signal through BW42, being an input cancellation signal to the signal control unit bank #8 prevents the blocking of primary feed which might otherwise result from various sequence conditions in the machine. Accordingly, in a "primary sequence check" operation, cards feed each cycle to either one of three pockets, it being understood gate controls for pockets P4 and P5 are set to open automatically upon signal so that in the absence of a signal primary cards will feed to the merge pocket, i. e., pocket P3, except when intercepted as a result of a two cycle signal to a more anterior pocket gate. A "file merge" operation will first be described in conjunction with a group of primary and a group of secondary cards arranged in a sequential order, as shown in the operating diagram hereinbelow set forth. It will be understood that the sequential order of said cards, as shown, is arbitrarily arranged so as to illustrate a large variety of combinations of sequence conditions. Said diagram is intended to be read in conjunction with Figs. 78 and 78A heretofore described, and also with the schematic wiring diagram, Figs. 76A, 76B, 76C, 76D.

middle five columns represent the card pockets and list the data in the cards fed to the respective pockets. The next two columns list the data contained in the two cards being sensed on the secondary side of the machine. The numbers of the final column correspond to the number of the sequence condition combination set forth in the first column of Figs. 78 and 78A, which arise in the respective sequence detector unit in each of the respective cycles of operation. It will be understood that the location of cards, with respect to each sensing chamber, as shown in said diagram, is that at the beginning of a machine

|  | Primary Sensing | | Pockets | | | | | Secondary Sensing | | |
|---|---|---|---|---|---|---|---|---|---|---|
|  | Initial | Sequence | 5 | 4 | 3 | 2 | 1 | Sequence | Initial |  |
| 1 | 3 | 1 |  |  |  |  |  | *2 | 4 | 7 |
| 2 | 5 | 3* |  |  | 1 |  |  | 2 | 4 | 1 |
| 3 | 5 | 3 |  |  | 2 |  |  | *4 | 5 | 7 |
| 4 | 6 | 5* |  |  | 3 |  |  | 4 | 5 | 1 |
| 5 | 6 | 5 |  | 5 | 4 | 5 |  | 5 | 7 | 4 |
| 6 | 8 | 6 |  |  |  |  |  | *7 | 9 | 7 |
| 7 | 8 | 8* |  |  | 6 |  |  | 7 | 9 | 10 |
| 8 | 8 | 8 |  |  | 7 |  |  | *9 | 10 | 16 |
| 9 | 11 | 8 |  | 8 |  |  |  | *9 | 10 | 7 |
| 10 | 12 | 11* |  | 8 |  |  |  | 9 | 10 | 1 |
| 11 | 12 | 11* |  |  | 9 |  |  | 10 | 10 | 2 |
| 12 | 12 | 11* |  |  |  | 10 |  | 10 | 11 | 1 |
| 13 | 12 | 11 |  |  |  | 10 |  | 11 | 11 | 5 |
| 14 | 13 | 12* |  | 11 |  | 11 |  | 11 | 14 | 1 |
| 15 | 13 | 12 |  |  |  | 11 |  | 14 | 14 | 8 |
| 16 | 13 | 13 |  |  | 12 |  |  | *14 | 14 | 17 |
| 17 | 14 | 13 |  | 13 |  |  |  | *14 | 14 | 8 |
| 18 | 14 | 14 |  | 13 |  |  |  | 14 | 14 | 14 |
| 19 | 17 | 14 |  | 14 |  | 14 |  | 14 | 18 | 4 |
| 20 | 16 | 17 |  | 14 |  | 14 |  | *18 | 19 | 25 |
| 21 | 20 | 16 | 17 |  |  |  |  | *18 | 19 | 7 |
| 22 | 21 | 20* | 16 |  |  |  |  | 18 | 19 | 1 |
| 23 | 21 | 20* |  |  | 18 |  |  | 19 | 23 | 1 |
| 24 | 21 | 20 |  |  | 19 |  |  | 23 | 22 | 9 |
| 25 | 21 | 20 |  |  |  |  | 23 | 22 | 24 | 7 |
| 26 | 26 | 21 |  |  | 20 |  | 22 | *24 | 26 | 7 |
| 27 | 27 | 26* |  |  | 21 |  |  | 24 | 26 | 1 |
| 28 | 27 | 26* |  |  | 24 |  |  | 26 | 25 | 6 |
| 29 | 27 | 26 |  |  |  |  | 26 | 25 | 28 | 4 |
| 30 | 32 | 27 |  | 26 |  |  | 25 | *28 | 31 | 7 |
| 31 | 32 | 32* |  |  | 27 |  |  | 28 | 31 | 10 |
| 32 | 32 | 32* |  |  | 28 |  |  | 31 | 30 | 12 |
| 33 | 32 | 32* |  |  |  |  | 31 | 30 | 35 | 10 |
| 34 | 32 | 32* |  |  |  |  | 30 | 35 | 33 | 18 |
| 35 | 32 | 32* |  |  |  |  | 35 | 33 | 34 | 18 |
| 36 | 32 | 32 |  |  |  |  | 33 | 34 | 36 | 16 |
| 37 | 37 | 32 |  | 32 |  |  | 34 | *36 | 39 | 7 |
| 38 | 39 | 37* |  | 32 |  |  |  | 36 | 39 | 1 |
| 39 | 39 | 37 |  |  | 36 |  |  | *39 | 39 | 8 |
| 40 | 38 | 39 |  |  | 37 |  |  | *39 | 39 | 23 |
| 41 | 40 | 38 | 39 |  |  |  |  | 39 | 39 | 5 |
| 42 | 41 | 40* | 38 |  |  | 39 |  | 39 | 41 | 1 |
| 43 | 41 | 40 |  |  |  | 39 |  | *41 | 44 | 7 |
| 44 | 45 | 41 |  |  | 40 |  |  | 41 | 44 | 4 |
| 45 | 43 | 45 |  | 41 |  | 41 |  | 44 | 42 | 21 |
| 46 | 46 | 43 | 45 |  |  |  | 44 | 42 | 46 | 1 |
| 47 | 49 | 46 | 43 |  |  |  | 42 | 46 | 49 | 4 |
| 48 | 48 | 49 |  | 46 |  | 46 |  | 49 | 47 | 24 |
| 49 | 51 | 48 | 49 |  |  |  | 49 | 47 | 50 | 4 |
| 50 | 62 | 51* | 48 |  |  |  | 47 | 50 | 54 | 1 |
| 51 | 62 | 51 |  |  | 50 |  |  | *54 | 55 | 7 |
| 52 | 52 | 62 |  |  | 51 |  |  | *54 | 55 | 19 |
| 53 | 53 | 52 | 62 |  |  |  |  | *54 | 55 | 19 |
| 54 | 56 | 53 | 52 |  |  |  |  | *54 | 55 | 19 |
| 55 | 57 | 56 | 53 |  |  |  |  | *54 | 55 | 19 |
| 56 | 58 | 57 | 56 |  |  |  |  | *54 | 55 | 19 |
| 57 | 59 | 58 | 57 | Auto Machine Stop | | | | *54 | 55 | 19 |
| 58 | 60 | 59 | 58 | Primary Clear Cycle | | | | *54 | 55 | 19 |
| 59 | 61 | 60 | 59 | do | | | | *54 | 55 | 19 |
| 60 | 63 | 61* | 60 | Start Button Operated | | | | 54 | 55 | 1 |
| 61 |  |  |  |  | 54 |  |  |  |  |  |

The first column of said diagram lists the cycle number, the second and third columns list the data contained in the two primary cards being sensed, it being understood that the second column lists the data in the card in the initial sensing chamber, the third column listing the data in the card in the sequence sensing chamber. Cards containing said data will hereinafter be referred to as D1, D2, etc., D1 being a card having the numeral "one" punched therein, D2 having the numeral "two" punched therein. The cycle, a card fed during that cycle to a sensing chamber or pocket being shown at its destination in the next succeeding cycle, i. e., the next line of the diagram. The asterisk indicates that side of the machine in which card feed and advance is blocked. The underlined numerals indicate cards the data of which is ineffective for controlling its associated sequence detector unit due to retaining of the data sensed from the preceding card in that chamber by reason of a "wrong" sequence condition in the previous cycle.

It is, of course, understood that on insertion of a new group of cards into an empty machine, two cycles of operation are required before all sensing chambers are filled, the first cycle indicated in said diagram being the first cycle in which the machine is in condition for merging. As seen in said diagram 1A the first cycle primary cards D1 and D3 will register a correct sequence on the primary side secondary cards D2 and D4 will register correct sequence on the secondary side with secondary side high this being the seventh sequence combination listed in Fig. 78A. Accordingly, signals are transmitted through BW's 1, 2, 10, 11, 16 and 17 to the signal control unit which releases and renders bank #6 the only bank of the unit effective for delivering an output signal. The signal delivered by bank #6 transmitted through BW32 actuates through BW's 38 and 39 the secondary picker blade blocking bell-crank 205S and secondary feed blocking bell-crank 305S for blocking secondary card advance and secondary card feed. Since, under this sequence combination no pocket signals are transmitted, the leading primary card in the first cycle, i. e., card D1 will feed to pocket P3 with card D3 feeding to the primary sensing sequence stage and card D5 feeding to the primary initial sensing stage.

In the second cycle of operation, the primary sequence condition resulting from cards D3, D5 is correct, the secondary sequence condition resulting from cards D2, D4 is still correct, but with the primary side high, which is the sequence combination #1 in the chart, Fig. 78. Under such sequence combination, as seen in said chart, signals through BW's 1, 2, 7, 8, 16 and 17 are transmitted from the respective sequence detector units to the signal control unit, rendering bank #8 the only effective bank for delivering an output signal. The output signal delivered by bank #8 is transmitted through BW34 and is effective through BW's 36 and 37 for actuating primary feed blocking bell-crank 305 and primary picker blade blocking bell-crank 205 for blocking primary card advance and feed. Accordingly, since no pocket signals are transmitted in this cycle, the leading secondary card D2 will feed into pocket P3, the secondary card D4 feeding to the secondary sequence sensing stage and secondary card D5 feeding into the secondary initial sensing stage. The two above described sequence combinations are normal in a "file merge" operation and are repeated in the third and fourth cycles, each side being in correct sequence and one or the other sides being high. The third and fourth cycles are included so as to better illustrate an uninterrupted merging operation in which cycles cards D3, D4, feed to the center merging pocket P3.

At the start of the fifth cycle, the primary sequence condition from cards D5, D6 will be correct and the secondary sequence condition from cards D5, D7 correct with an equal condition in the merging sequence detector unit from primary card D5 and secondary card D5 which is the fourth combination in Fig. 78. Accordingly, signals through BW's 1 and 2, 16 and 17 will be transmitted by the respective sequence detector units to the signal control unit, rendering only bank #3 effective for delivering output signals. The output signals from bank #3 are transmitted through BW's 23, 22 to the gate controls for each of the pockets P2 and P4. Accordingly, during said fifth cycle the card D5 in the primary side will feed to pocket P4, the card D5 in the secondary side will feed to pocket P2.

In the sixth cycle, the primary condition D6, D8 is correct, the secondary sequence condition D7, D9 is correct, the secondary side being high, which is the seventh combination in Fig. 78.

It will be noted that the chart shows a number of these combinations, i. e., first or seventh, which are normal merging combinations. This has been done to separate cycles of abnormal combinations for reasons of clarity as there are a number of abnormal combinations which cause an overlapping of control in succeeding cycles. Accordingly, on the sixth cycle, which is the seventh condition in Fig. 78, the primary card D6 will feed into the merge pocket.

On the seventh cycle the primary sequence condition D8, D8 will be equal, secondary sequence condition D7, D9 correct, the primary side high, which is the tenth combination in Fig. 78, therefore, signals through BW's 7, 8, 16 and 17 will be transmitted to the signal control unit rendering banks #4 and #6 effective for delivering output signals through BW's 24, 34. The signal through BW24 operates the gate control of pocket P4 and bank #4 being a two cycle bank, said signal is transmitted for two successive cycles. The signal through BW34 operates as aforesaid to block primary card advance and feed. Accordingly, only the secondary side will feed, the card D7 feeding into the merge pocket P3.

In the eighth cycle primary sequence condition D8, D8 remains equal no primary card having been fed, secondary sequence condition D9, D10 is correct with the secondary side high, which is the sixteenth combination in Fig. 78. Accordingly, signals through BW's 10, 11, 16 and 17 will be transmitted to the signal control unit rendering banks #4 and #6 effective for delivering output signals through BW's 24 and 32. Bank #4, being a two or repeat cycle bank, and having been rendered effective in the preceding cycle, i. e., seventh cycle, the signal through BW24 coincides with the repeat cycle operation of bank #4 occurring in this eighth cycle again opening the gate of pocket P4. However, it is effective for initiating a new two cycle succession of signals through BW24. The signal from bank #6 is transmitted through BW32 which, as aforesaid, is effective for blocking secondary card feed and advance. Accordingly, in the eighth cycle, the primary side will feed leading card D8 to pocket P4, the card feed and advance on the secondary side being blocked.

In the ninth cycle, the primary condition D8, D11 will be correct, secondary condition D9, D10 correct, with the secondary side high, which is seventh combination. As aforedescribed, in this combination bank #6 only is effective for delivering a signal through BW32 blocking secondary card feed and advance. Accordingly, in the ninth cycle the primary side will feed card D8 to pocket P4 and not pocket P3, since in this cycle it is intercepted by the gate of pocket P4 which receive the repeat signal from the two cycle operation of bank #4, as above described.

In the tenth cycle, the primary condition D11, D12 is correct, secondary condition D9, D10 is correct, with primary side high, which is the first sequence combination. Accordingly, as above described, primary feed will be blocked, secondary side will feed into pocket P3.

In the eleventh cycle, primary sequence condition D11, D12 is correct, secondary sequence condition D10, D10 is equal, with the primary side high, which is the second combination. Accordingly, signals will be transmitted through BW's 1 and 2, 7 and 8 to render signal control unit banks #2 and #8 effective for delivering output signals through BW's 21, 34. Bank #2 being a two cycle bank the signal through BW21 operates the gate control for pocket P2 for two cycles, the signal through BW34 operating to block primary card feed and advance. Accordingly, in the eleventh cycle, the primary feed will be blocked, and the secondary side will feed to the pocket P2.

In the twelfth cycle, the primary sequence condition D11, D12 is correct, the secondary sequence condition D10, D11 is correct, and primary side high, which is the first combination. Accordingly, the primary feed is blocked, secondary feed is intercepted by the repeat cycle operation, initiated in the eleventh cycle, as above described, of bank #2 so as to open pocket gate of pocket P2, and thereby receiving the second of the two equal secondary cards, i. e., cards D10, D10 which gave rise to the equal secondary sequence condition in the eleventh cycle.

In the thirteenth cycle, the two primary cards sensed, i. e., card D11 followed by card D12, indicate correct sequence, two secondary cards, i. e., card D11 followed by card D11, indicating an equal sequence condition, the two leading cards also being equal, giving rise to the fifth combination in Fig. 78. Accordingly, with signals through BW's 1 and 2, only banks #2 and #3 of the signal control unit effective for delivering output signals through BW's 21, 23, 22, the signal transmitted by bank #2 through BW21 being a two cycle signal. Both sides will feed in the thirteenth cycle, the primary side feeding to pocket P4, the secondary side feeding to pocket P2.

In the fourteenth cycle, primary sequence condition D12, D13 is correct, secondary sequence condition D11, D14 is correct, with the primary side high, which is the first sequence combination. Consequently, primary feed will be blocked, secondary side will feed card D11 to pocket P2 which receives the second of the two signals through BW21 initiated in the thirteenth cycle.

In the fifteenth cycle, primary sequence condition D12, D13 is correct, secondary sequence D14, D14 is equal, with the secondary side high, being the eighth sequence combination. Accordingly, sequence detector signals through BW's 1, 2, 10 and 11 render signal control unit banks #2 and #6 effective for delivering output signals through BW's 21, 32. Secondary feed is blocked by the signal through BW32 and the primary side of the machine feeds card D12 to pocket P3.

In the sixteenth cycle, both primary and secondary sides will have an equal sequence condition D13, D13 and D14, D14 with the secondary side high, being the seventeenth combination. Accordingly, signals through BW's 10, 11 enable banks #2, #4 and #6 to be effective for delivering output signals through BW's 21, 24, 32. Secondary feed will be blocked by the signal through BW's 32, primary side will feed card D13 to pocket P4 which receives the first of two successive signals through BW24.

In the seventeenth cycle, primary sequence condition D13, D14 will be correct, secondary condition D14, D14 will still be equal, with the secondary side high, being the eighth sequence combination. Accordingly, signals through BW's 1, 2, 10 and 11 enable banks #2 and #6 to be effective for delivering output signals through BW's 21, 32. Secondary card feed will be blocked by a signal through BW32. The primary side will feed card D13 to pocket P2 which receives the repeat signal through BW24 by operation of bank #4 in the previous cycle, i. e., the sixteenth cycle.

In the eighteenth cycle, both primary and secondary sides have an equal sequence condition D14, D14 and D14, D14 with neither side high, being the fourteenth sequence combination. Accordingly, no signals will be transmitted from the sequence detector units to the signal control unit, thereby rendering banks #2, #3, and #4 effective for delivering output signals through BW's 21, 23, 22 and 24, banks #2 and #4 being two cycle banks. Both sides will feed simultaneously primary side feeding leading primary card D14 into pocket P4, secondary side feeding leading secondary card D14 into pocket P2.

In the nineteenth cycle, both primary and secondary sides will have correct sequence D14, D17 and D14, D18 with neither side high, being the fourth sequence combination. Accordingly, signals through BW's 1, 2, 16 and 17 render bank #3 effective for delivering outputs through BW's 23, 22 to pocket P4 and P2, respectively, and which signals coincide with the repeat cycle of signals through BW's 21, 24 initiated in the previous cycle. The primary side will feed primary D14 to pocket P4, the secondary side will feed secondary D14 to pocket P2.

In the twentieth cycle, the two primary cards D17 followed by D16 show a wrong sequence condition, the secondary condition being correct, D18, D19 with the secondary side high, being the twenty-fifth sequence combination. Accordingly, signals through BW's 4, 5, 6, 10, 11, 16 and 17 render banks #4, #6, and #7 effective for delivering outputs through BW's 24, 32, 35, 27, 33. The signal through BW35 is effective for flashing primary signal light 290 for two successive cycles, the signal through BW27 operating pocket P5 gate for two cycles, signal through BW33 operating to disable the primary sequence sensing stage retract. Consequently, in the twentieth cycle secondary feed will be blocked by a signal through BW32 and primary side will feed card D17 to pocket P5. The incidental operation of pocket P4 by a signal through BW24 is ineffective to deflect primary card D17 which is intercepted prior to reaching pocket P4 by the operation of the more anterior gate to pocket P5.

In the twenty-first cycle, D16 will be in the primary sequence sensing chamber. However, since the primary sequence sensing stage retract was disabled as the result of a "wrong" primary sequence condition in the previous cycle, the sensing of card D16 will not be transmitted to the primary sequence detector unit which instead retains the set up of sequence stage data from the previous or twentieth cycle. Accordingly, the primary sequence detector unit will be detecting sequence relation between D17 and card D20 in the initial sensing chamber which is a correct sequence condition. The secondary sequence condition D18, D19 is also correct, with the secondary side high, being the seventh sequence combination. Secondary feed is blocked and the primary side feeds card D16 to pocket P5, which pocket receives the second of two successive signals through BW27. It will be noted that since the primary sequence condition in the twenty-first cycle is correct, the output cancellation signal from the primary sequence detector unit through BW1 acts to cancel the output signal through BW33 which output would otherwise be transmitted to disable the primary sequence sensing stage retract in the twenty-first cycle.

In the twenty-second and twenty-third cycles the first sequence combination is present, secondary side feeding cards D18, D19 into pocket P3 in both cycles.

In the twenty-fourth cycle, the ninth sequence combination is present, rendering banks #2, #5, #6 and #8 effective for delivering output signals through BW's 21, 25, 30, 31 and 34. The signal through BW25 operates pocket P1 for two cycles, signal through BW30 flashes the secondary signal light 290S for two successive cycles, the signal through BW31 operating to disable secondary sequence sensing stage retract 434S. Bank #6 is released but delivers no signal through BW32 by reason of output cancellation signal through BW13. Accordingly, primary feed will be blocked by signal through BW34, secondary side will feed card D23 to pocket P1.

In the twenty-fifth cycle, card D22 will be in the secondary sequence sensing chamber but the sensing thereof will not be transmitted to the secondary sequence detector which retains sequence sensing stage data from the previous cycle so as to detect sequence between card D23 and card D24, which is a correct sequence condition. In this cycle, primary sequence condition D20, D21 is also correct with secondary side high, presenting the seventh sequence combination. Accordingly, the secondary side would feed card D22 to pocket P1 which receives the second of two successive signals through BW25 initiated in the twenty-fourth cycle. Likewise, as explained in the twenty-first cycle, the correct secondary sequence condition in this twenty-fifth cycle gives rise to an output cancellation signal through BW16 which operates to cancel the output signal through BW31 which otherwise would cause disabling of the secondary sequence sensing stage retract in the twenty-fifth cycle. Consequently, in this cycle both sides feed simultaneously, with the primary side feeding card D20 into pocket P3 and the secondary side feeding card D22 into pocket P1. The secondary side feeds, although high, since operation of bank #5 in the twenty-fourth cycle transmits through its associated cycle counting rack and bell-crank 705 an imput cancellation signal into bank #6 thereby preventing the secondary feed blocking signal through BW32 from being effective for blocking secondary feed in the twenty-fifth cycle.

In the twenty-sixth cycle, the seventh sequence combination is present, with the secondary card feed blocked and primary card D21 feeding into pocket P3.

In the twenty-seventh cycle, the first sequence combination is present, with primary card feed blocked and the secondary side feeding card D24 into pocket P3.

In the twenty-eighth cycle, the sixth sequence combination is present, which render blanks #2, #3, #5 and 8 effective for delivering output signals through BW's 21, 23, 22, 25, 30, 31, 34. Consequently, primary card feed is blocked, and the secondary side feeds card D26 into pocket P1. The signal over BW30, as aforedescribed, flashes secondary signal light 290S, and the signal over BW31 disables the secondary sequence sensing stage retract.

In the twenty-ninth cycle, the data in secondary sequence sensing stage being retained from the previous cycle presents the fourth sequence combination in which both sides are in correct sequence D26, D27 and D26, D23 with neither side high. Both sides will feed simultaneously, primary side feeding card D26 to pocket P4, secondary side feeding card D25 to pocket P1 which is actuated by the second of two successive signals from BW25 initiated in the twenty-eighth cycle.

In the thirtieth cycle, the seventh sequence combination is present, secondary card feed being blocked and primary side feeding card D27 into pocket P3.

In the thirty-first cycle, the tenth sequence combination is present, primary card feed being blocked and the secondary side feeding card D28 into pocket P3.

In the thirty-second cycle, the twelfth sequence combination is present, rendering banks #2, #4, #5 and #8 effective for delivering output signals through BW's 21, 24, 25, 30, 31 and 34. Consequently, primary card feed is blocked, with the secondary side feeding card D31 into pocket P1.

In the thirty-third cycle, the tenth sequence combination is again present, with primary card feed blocked, but in this instance, the secondary side will feed D30 into pocket P1 which receives the second of two successive signals through BW25, originated in the thirty-second cycle.

In the thirty-fourth cycle, the eighteenth sequence combination is present, banks #2, #4, #5, #6 and #8 being released with primary card feed blocked and the secondary side feeding card D35 into pocket P1.

In the thirty-fifth cycle the eighteenth sequence combination is again present, since the data in the secondary sequence sensing stage is retained in the secondary and merging sequence detector units, respectively, from the previous cycle. Consequently, primary card feed is still blocked and the secondary side feeds card D33 to pocket P1.

In the thirty-sixth cycle, the sixteenth sequence combination is present with both sides feeding cards simultaneously, the primary side feeding card D32 into pocket P4. The secondary side feeds, although high, in relation to the primary side, since the operation of bank #5 in the thirty-fifth cycle entered an input cancellation signal through bell-crank 705 in bank #6 in the thirty-sixth cycle, rendering bank #6 ineffective for delivering an output signal to BW32 to block secondary card feed. The secondary side feeds card D34 into pocket P1 which receives the second of two successive signals through BW25 initiated in the thirty-fifth cycle.

In the thirty-seventh cycle, the seventh sequence combination is again present, with the secondary card feed blocked and primary side feeding card D32 into pocket P4 which receives the second of two successive signals through BW24 initiated in the thirty-sixth cycle.

In the thirty-eighth cycle, the first sequence combination is present, with primary card feed blocked and the secondary side feeding card D36 into pocket P3.

In the thirty-ninth cycle, the eighth sequence combination is present, with secondary card feed blocked and the primary side feeding card D37 into pocket P3.

In the fortieth cycle, the twenty-third sequence combination is present, rendering banks #2, #3, #4, #6 andy #7 effective. Consequently, secondary card feed is blocked and the primary side feeds card D39 into pocket P5.

In the forty-first cycle, the fifth sequence combination is present, with both sides feeding simultaneously, the secondary side feeding leading card D39 into pocket P2, and the primary side feeding card D38 into pocket P5 which receives the second of two successive signals through BW27 initiated in the preceding, i. e., the fortieth cycle.

In the forty-second cycle, the first sequence combination is present with primary card feed blocked and the secondary side feeding card D39 into pocket P2 which receives the second of two successive signals through BW21 initiated in the preceding cycle.

In the forty-third cycle, the seventh sequence combination is present with primary side feeding D40 into pocket P3.

In the forty-fourth cycle, the fourth sequence combination is present, with both sides feeding simultaneously, the primary side feeding D41 into pocket P4 and the secondary side feeding D41 into pocket P2.

In the forty-fifth cycle, both primary and secondary sides are in "wrong" sequence, with the primary side high, which is the twenty-first sequence combination. Signal control banks #2, #4, #5, #6, #7, and #8 are released. Banks #6 and #8, however, which are adapted to deliver output signals through BW's 32, 34, respectively, for blocking secondary and primary sides of the machine, respectively, are ineffective to deliver said outputs as the result of output cancellation signals through BW's 13 and 4. Consequently, both sides feed simultaneously, the primary side feeding D45 into pocket P5, the secondary side feeding D44 into pocket P1, each of said pockets being actuated by the first of two successive signals through operation of banks #5 and #7 which also operate to flash both primary and secondary signal lights in the forty-fifth cycle.

In the forty-sixth cycle, the first sequence combination is present. However, each side will feed since they follow a wrong sequence condition on their respective sides, the primary side feeding D43 into pocket P5 and the secondary side feeding D42 into pocket P1, both of said pockets receiving the second of the two successive signals initiating in the forty-fifth cycle.

In the forty-seventh cycle, the fourth sequence combination is present, rendering bank #3 effective for delivering output signals through BW's 23, 22. Consequently, both sides will feed simultaneously, the primary side feeding D46 into pocket P4, and the secondary side feeding D46 into pocket P2.

In the forty-eighth cycle, both sides are in wrong sequence, with neither side high, which is the twenty-fourth combination. Signal control banks #2, #3, #4, #5, #6, #7 and #8 are released. However, as in the forty-fifth cycle, above described, banks #6 and #8 are rendered ineffective by output cancellation signals through BW's 13 and 4, so that both sides feed simultaneously, the primary side feeding D49 into pocket P5, and the secondary side feeding D49 into pocket P1.

In the forty-ninth cycle, the primary sequence is correct, secondary correct, the merging detector unit being equal which is the fourth combination of sequence conditions. Accordingly, bank #3 is released to open pockets P2 and P4. However, primary card D48 feeds to pocket P5 and secondary card D47 feeds to pocket P1, both of said pockets receiving a repeat signal originating from wrong sequence conditions in the previous cycle.

In the fiftieth cycle, the first sequence combination is again present. Consequently, the primary feed will be blocked, the secondary side feeding D50 into pocket P3.

In the fifty-first cycle, the seventh sequence combination is present, with the secondary card feed being blocked, and primary side feeding D51 into pocket P3.

It is, of course, realized that all of the sequence combinations listed in Fig. 78 are not specifically referred to in describing the operation of the above fifty-one cycles. Since both sides of the machine are identical in structure and operation, the operations resulting from the sequence combinations not specifically referred to above are the same in counterpart of operations resulting from combinations which have been specifically referred to above.

The following fifty-second through sixtieth cycles illustrate the automatic stopping of the machine and a clearing operation after six successive cycles of "wrong" sequence conditions on the primary side.

In the fifty-second cycle, cards D62, D52 show a "wrong" sequence condition, the secondary cards D54, D55 being in correct sequence with the primary side high which is the nineteenth sequence combination. Consequently, the secondary card feed is blocked, and the primary side feeds D52 into pocket P5, with the primary sequence sensing stage retract mechanism disabled.

In the fifty-third cycle, the sensing of card D52 is ineffective to control the primary or merging detector unit, so that the primary detector unit retains the data sensed in the previous cycle, i. e., D62, and continues to register a wrong sequence condition. The secondary cards D54, D55 are in correct sequence and the primary side is high. Consequently, the nineteenth sequence combination is again present wherein the secondary card feed is blocked, and the primary side feeding D52 into pocket P5.

Likewise, in the fifty-fourth, fifty-fifth, fifty-sixth and fifty-seventh cycles, the same sequence combination is present with the secondary card feed being blocked in each of said cycles with the primary side feeding D53, D56, D57 pocket P5, the fifty-seventh cycle being the sixth of a succession of wrong sequence cycles on the primary side of the machine. The machine will automatically stop at the end of the fifty-seventh cycle as the result of an input signal through BW19 into bank #1 and which signal is actuated by the cycle counting rack 690 associated with bank #7. The machine will stop with the primary signal light 290 on as the result of signal through BW35. The sixth flashing of the primary signal light 290 will indicate to the machine operator the cause of the automatic machine stop.

The "wrong" sequence condition in the machine may be corrected by a "clear" operation of one side or the other of the machine depending upon the side on which the wrong sequence condition is present, as indicated by the respective signal lights 290 or 290S. Accordingly, manual operation of the primary "clear" button 761 will engage the machine drive for the fifty-eighth cycle. As seen in Fig. 79, the operation of the primary "clear" button effects signals through BW's 52, 53, 54, 55, 56, 57. Consequently, in the fifty-eighth cycle the nineteenth sequence combination is still present with the secondary card feed blocked and primary side feeding D59 into pocket P5 with the machine coming to a stop at the end of the fifty-eighth cycle as the result of signal through BW52 into bank #1. Also the signal through BW56 during that cycle, being an input cancellation to bank #7, will prevent the release of that bank in the following fifty-ninth cycle.

At the start of the fifty-ninth cycle by operation of the primary "clear" button, the primary sequence sensing stage retract still being disabled, the primary sequence condition remains "wrong," i. e., D62, D61 secondary condition between cards D54 and D55 being correct with primary side high, the nineteenth combination is still present. Accordingly, the secondary feed will be blocked, the primary side will feed D60 into pocket P5 which receives its signal through BW28. The machine will come to a stop at the end of the fifty-ninth cycle with the primary signal light 299 out since bank #7 was not released in this cycle.

Stopping of the machine enables examinations of cards in the reject pocket to determine the extent of the wrong sequence condition. Since in this instance the condition was caused by one card, i. e., card D62, the machine may be restarted at the beginning of the sixtieth cycle by operation of either of the start buttons 760, 760S at which time the machine will be in condition for merging, bank #7 having been rendered ineffective in the previous cycle so as to enable the primary sequence sensing stage to retract in the sixtieth cycle. Consequently, during this cycle the sensing of card D61 will be transmitted to the primary and merging sequence detector units so as to give a correct sequence condition on the primary side, the secondary sequence condition being correct with primary side high, which results in the first sequence combination. Consequently, the primary card feed will be blocked and secondary side will feed D54 to pocket P3 to resume the normal merging operation.

It is, of course, understood that although Fig. 78 and the above set forth operating diagram illustrate machine operation under sequence conditions and combinations between numerical data, the same sequence conditions and combinations may be detected with respect also to alphabetic data for controlling the operation of the machine in the identically same manner.

In a "both sides sequence check" operation, the same combinations of sequence conditions are possible as in a "file merge" operation and as appears in Fig. 78. However, in a "both sides sequence check" operation, banks #6 and #8 are rendered ineffective as the result of input cancellation signals through BW's 43, 42, respectively, being manually present in the machine by key 723. Consequently, in this type of operation both primary and secondary sides feed simultaneously, each machine cycle, there being no means for blocking feed on one or the other side as the result of various sequence conditions. In a "both sides sequence check" operation, the gate control keys 338 for pockets P1 and P5 are set so as to open automatically upon receipt of signal. Gate control keys 338 for pockets P2 and P4 are set manually open and ineffective by receipt of signal, thus eliminating pocket P3. Accordingly, in this type of operation, as seen in Fig. 78A, primary cards will feed to either pocket P4 or pocket P5, pocket P4 receiving "correct" sequence cards and "equals," pocket P5 receiving "wrong" sequence cards. Likewise, the secondary side will feed to either pocket P2 or pocket P1, pocket P2 receiving "correct" sequence cards and "equals," pocket P1 receiving "wrong" sequence cards.

In a "primary sequence check" operation, the manual presetting of the machine through set up control key 722 effects signals through BW's 40, 41, 42, the signals through BW's 40 and 41 being effective for preventing secondary card feed and advance and disabling the secondary no card detector mechanism, the signal through BW42 being an input cancellation rendering bank #8 ineffective for blocking primary card feed throughout the entire operation. In a "primary sequence check" operation, three pockets may be utilized with the gate control key 338 for pockets P4 and P5, both being set to open automatically upon signal. Accordingly, as seen in Fig. 78A, primary cards will feed each cycle to either pocket P5, P4 or P3 "correct" sequence cards feeding to pocket P3, "equals" feeding to pocket P4, and "wrong" sequence cards feeding to pocket P5.

It might be here mentioned that although the fourth, fifth, and sixth sequence combinations indicate correct primary sequence conditions feeding into pocket P4 such sequence combinations cannot possibly arise in this type of operation if the machine is operated correctly, since it is a combination of sequence conditions in which neither side is high and would be impossible if the secondary side were void of cards prior to the start of the "primary sequence checking" operation. It should also be noted that should it be desired in a "both sides sequence check" operation to associate three pockets with the primary side of the machine, the operation and feed of cards on that side will be identical to that described above, i. e. with respect to a "primary sequence check" operation.

It is of course understood that a "secondary sequence check" operation may be effective for utilizing three pockets in the same manner which type of operation is set up by manually presetting key 724 and setting gate control keys 338 for each of the pockets P1 and P2 to open automatically upon receipt of signal.

It is, of course, understood that in sequence checking operations all automatic machine stopping controls associated with the sides being operated are effective, i. e., the control responsive to card misalignments, failure of card feed, full pockets, and a predetermined number of wrong sequence conditions.

It is evident that the decoding mechanism of a sequence detector may be wired through a translator, as shown in U. S. Patent 2,421,078, granted May 27, 1947 to John Mueller, to different portions of a single card sensing mechanism so that a sequence between the data of different fields or zones of a record card can be obtained.

It is also evident that the decoding unit may employ stops and stop operating means of other forms than the stops and permutation plates shown herein, i. e., a keyboard connected by Bowden wires to a travelling carriage similar to that disclosed in the U. S. patents to W. W. Lasker, 1,305,557, issued June 3, 1919, and Reissue 20,720, issued May 10, 1938, may be made to travel columnwise setting up said stops.

While there are above described but a limited number of embodiments of the invention, it is possible to produce still other embodiments without departure from the inventive concept above disclosed, and it is, therefore, desired that only such limitations shall be imposed on the appended claims as are stated therein, or required by the prior art.

What we claim as new, and desire to secure by Letters Patent, is:

1. In a machine of the class described, two individual feeding means for feeding individual groups of records; a sensing unit associated with each of said feeding means each including successively disposed sensing stages; successively disposed pockets individual to each of said feeding means; gates for each of said pockets, each actuable in accordance with sensed data for deflecting a record into its associated pocket; a pocket common to both feeding means and disposed to receive those cards not deflected; a plurality of individual sequence detecting means each adapted to ascertain the relative magnitude of data sensed in a pair of records and operatively associated with said sensing means to detect the sequence condition within each group and between said groups of records said detecting means determining within each group of records equal, wrong or correct sequence conditions in relation to a predetermined sequental order; and a control means responsive to the combination of sequence conditions detected for selectively blocking said individual feeding means and actuating said gates, said control means rendering selective distribution of records from either of said groups to said pockets dependent upon the sequence conditions detected within and between both of said groups of records.

2. In a machine of the class described, a sensing unit including an initial sensing stage and a sequence sensing stage; card aligners associated with each sensing stage, said card aligners beside their assigned function being capable of sensing a no-card condition, each of said sensing stages comprising, a sensing pin box, a rocker pin box and a lock pin box; a retract associated with each rocker pin box and lock pin box, said retracts being normally actuated each machine cycle; independently operable disabling means for each of said retracts; a control unit adapted to receive and transmit impulses; a detector unit connected to said sensing stages for determining the sequence condition between said sensing stages and adapted to transmit an impulse to said control unit upon detection of a wrong sequence condition, said control unit operating to actuate conjointly said rocker pin and lock pin retract disabling means associated with said sequence sensing stage; and means associated with said card aligners upon sensing a no-card condition in one of said stages for independently actuating said rocker pin box retract disabling mechanism of said stage.

3. In a machine of the class described, a plurality of sensing units, each including an initial sensing stage and a sequence sensing stage, each of said sensing stages comprising a sensing pin box, a rocker pin box, and a lock pin box; a retract mechanism associated with each rocker pin box and lock pin box, and being normally actuable each machine cycle; a disabling means for each of said retract mechanisms associated with a sequence sensing stage and operable for preventing the release of data from said stage; a plurality of detector units interconnecting said sensing stages for detecting an equal, correct, or wrong sequence condition between the stages of each of said sensing units; and a control unit operating upon receipt of an impulse indicating a wrong sequence condition, to transmit impulses for operating the retract disabling means for the sequence sensing stage of that sensing unit wherein the wrong sequence condition occurs thereby retaining the sensed data in said sequence sensing stage for the succeeding machine cycle.

4. An impulse control unit comprising a plurality of spring actuated slides, each slide adapted to transmit impulses, for controlling one or more predetermined functions; a releasing element for said slide; an impulse receiving mechanism, for actuating said releasing element; a cancelling element operable upon receipt of impulses, for disabling said receiving mechanism; a plurality of impulse transmitting elements responsive to the actuation of a slide; a further cancelling element operable upon impulse, for blocking the action of preselected ones of said transmitting elements; and a restoring bail, for restoring said slides to normal.

5. An impulse control unit comprising a spring actuated slide; a latch for holding said slide in normal ineffective position; an impulse receiving element; a floating element, actuated by said impulse receiving element and cooperating with said latch; impulse transmitting elements actuated by said slide when released; a cyclically operated bail for restoring said slide to normal position; and a pawl on said slide cooperating with said floating element when actuated to prevent said latch from holding said slide in said ineffective position when restored by said bail whereby a repeat impulse is transmitted by said slide upon the next cyclical operation of said bail.

6. An impulse control unit comprising a plurality of releasable slides; latching means engageable with said slides for preventing the release thereof; output means responsive to the release of each slide for transmitting output impulses; positive input reeciving means actuable upon receipt of impulses for disabling said latching means; cancellable input receiving means actuable upon receipt of impulse for disabling said latching means; input cancellation means actuable upon receipt of impulse for rendering said cancellable input receiving means ineffective; and output cancellation means actuable upon receipt of impulses for rendering said output means ineffective.

7. An impulse control mechanism including a slide releasable for reciprocating movement; latching means engageable with said slide and yieldably tensioned to unlatch said slide; a floating link engageable with said latching means, for retaining said latching means in effective latching position; a plurality of output means, responsive to release movement of said slide, for transmitting output impulses; individual input receiving means associated with said link and adapted, upon receipt of an impulse, to actuate said link to ineffective latching position; and individual cancellation means, one of said cancellation means adapted, upon receipt of an impulse, to render said input means ineffective, the other of said cancellation means adapted, upon receipt of an impulse, to render one of said output means ineffective.

8. An impulse control mechanism including a slide cyclically releasable for reciprocating movement; a latching means for said slide; a yieldable floating link engageable with said latching means, for rendering said latching means effective and actuable for rendering said latching means ineffective; output means responsive to the release of said slide, for delivering output impulses; input receiving means responsive to receipt of an impulse, for actuating said link; and repeat slide releasing means carried by said slide and engageable with said link when actuated by said input receiving means, for retaining said link actuated and said latching means ineffective prior to the next cyclical release of said slide.

9. An impulse control mechanism including slides releasable for reciprocating movement; latching means for each slide; output means responsive to the release of each slide, for delivering output impulses; input receiving mechanism for each of said slides, responsive to receipt of an impulse for rendering said latching means ineffective; cancellation means actuable, for rendering each of said input receiving means ineffective; and means responsive to the restoring movement of one of said slides for actuating said cancellation means associated with another of said slides.

10. An impulse control mechanism including reciprocable slides; latching means for each of said slides; output means responsive to the release of each slide, for delivering output impulses; impulse receiving means for each slide, actuable for rendering said slide latching means ineffective; cancellation means for each slide actuable, for rendering said impulse receiving means ineffective; counting means associated with one of said slides and successively advanced by consecutive restorations of said slide; means responsive to an advance of said counting means for actuating said cancellation means associated with another of said slides; and means responsive to a predetermined extent of advance of said counting means for actuating an impulse receiving means associated with a third slide.

11. An impulse control mechanism including a cyclically releasable slide; output means responsive to the release of said slide, for delivering an output impulse; latching means for said slide and yieldably tensioned in unlatching position; a yieldably suspended link engaging said latching means and actuable for rendering said latching means effective; cancellation means responsive to receipt of an impulse, for actuating said link, and repeat slide release means carried by said slide and engageable with said link upon release of said slide for retaining said link unactuated and said latch ineffective prior to the next cyclical release of said slide.

12. In a machine of the class described, a plurality of card sensing mechanism; a sequence detector associated with said sensing mechanisms and arranged to receive sensing impulses from said sensing mechanisms, said detector including stops and control members for said stops, said control members being selectively actuable for associating one of said stops with corresponding numerical and alphabetic datum sensed by said sensing mechanism, said stops being arranged in columnar numerical and alphabetic progression within a plurality of columns, each column relating to an individual component of the data sensed by one of said sensing mechanisms and paired in opposing aligned relation with a column relating to a corresponding component of the data sensed by another sensing mechanism; followers; slide means including stop abutting heads movable columnwise of and between said stops for imparting movement to the followers in either of opposite directions when said heads engage the projected stop of a pair; and an impulse selector unit conditioned by the movement of said followers for determining sequential relationship between the data represented by said projected stops.

13. In a machine of the class described, a plurality of sensing means; a sequence detector unit, comprising a pair of decoding units having sets of permutation plates, each set of said plates being disposed diametrically opposite to a matching set of permutation plates, one of said sets being actuable in accordance with a columnar pattern sensed by one of said sensing means, the other of said sets being actuable in accordance with a columnar card pattern sensed by another of said sensing means, each of said sets of permutation plates being operable for selectively releasing one of a plurality of stops in numeric and alphabetical progression; a rockable member engageable with the stops released by said opposing sets of permutation plates; reciprocating means for cyclically engaging said member with said stops so as to rock said member in either of two directions depending on the sequential relation between the columnar patterns; a follower member for each of said rockable members and shiftable in accordance with the direction of movement of said rockable member; a selector unit comprising a series of contiguously mounted pawls, each pair adapted to be displaced in one or the other direction from a neutral position by one of said follower members; a retainer for holding each pawl in a blocked position, one of each pair of pawls being in unblocked position when the other is in blocked position; and a feeler mechanism selectively reciprocable under control of the pair of pawls associated with the highest denominational order for selectively enabling the transmission of individual impulses in accordance with the sequential relation between the columnar patterns.

14. In a machine of the class described, a selector unit adapted to determine a sequence condition consisting of a plurality of sequence relations of progressively higher orders, said selector unit comprising opposed pawl latching plates; a bank of paired pawls, one pair for each sequence relation, mounted between said plates for yieldable longitudinal movement into latching engagement with one or the other of said plates in accordance with a sequence relation and adapted for individual yieldable lateral movement, said pawls being shaped to present portions for lateral compacting relation; and feelers simultaneously engageable with each pawl of the paired pawls of the highest order and individually movable in accordance with the lateral compacting action of unlatched pawls for selectively controlling a machine function in accordance with the latching position of the paired pawls of the highest order moved into engagement with one of said latching plates.

15. In a machine of the class described, a selector unit adapted to determine a sequence condition consisting of a plurality of sequence relations of progressively higher orders, said unit comprising oppositely mounted latch plates, a plurality of slides yieldably mounted in said plates for longitudinal movement; a pair of pawls mounted on each of said plates and individually yieldable laterally thereto, one of said pawls, upon longitudinal movement of said slides, being brought into blocking engagement with one of said plates in accordance with a sequence condition, said pawls being shaped to present portions for lateral compacting relation such that no movement occurs up to said blocked pawl and a relatively slight movement occurs up to the unblocked pawl; and feelers simultaneously engageable with each pawl of the pair of pawls of highest order, to sense the movement of said pawls whereby motion is transmitted for machine control.

16. In a machine of the class described, having record feeding means; a sensing unit comprising successively disposed sensing stages for sensing consecutive records fed by said feeding means; a sequence detector adapted to detect different sequence conditions between said consecutive records; a control mechanism actuable by said sequence detector and including a plurality of individually releasable impulse transmitting members, one of said members releasable in response to a wrong sequence condition detected by said sequence detector and another member releasable in response to a predetermined number of consecutive releases of said first mentioned member; and indicator actuated upon the impulse transmitted by each release of said first mentioned member; and a machine stop means actuable upon the impulse transmitted by the release of the other of said members.

17. In a machine of the class described, individual feeding means for feeding individual groups of records; means for simultaneously sensing consecutive records within each group; record receiving pockets for each of said feeding means; gates for said pockets; a pocket common to both of said feeding means; sequence detecting mechanism actuable by said sensing means for determining the sequential order between said groups and within each group of records; control mechanism responsive to said sequence detecting mechanism for selectively actuating said gates in accordance with the sequential order of consecutive records within each group and including members individually releasable for blocking an associated feeding means in accordance with the sequential order between said groups; and a set up control device manually settable to selectively disable said individually releasable members and block said individual feeding means.

18. In a machine according to claim 17, wherein said set up control device contains a key manually settable for rendering said individually releasable members ineffective for blocking the feeding means associated therewith.

19. A machine in accordance with claim 17, wherein set up control device includes a key, manually settable for rendering one of said individually releasable members ineffective for blocking the feeding means associated therewith, and for blocking the feeding means associated with the other of said individually releasable members.

20. In a machine of the class described, means for feeding two individual groups of records; a sensing unit associated with each feeding means comprising successively disposed sensing stages; retracts for each sensing stage; retract disabling mechanism for the retracts associated with one stage of each sensing unit and actuable for retaining sensed data in said one stage; sequence detector means for each sensing unit adapted to determine different sequence conditions within each group of records an additional sequence detector means adapted to determine sequence relationship between records of both groups of records; control mechanism including a member associated with each of said first mentioned sequence detector means and releasable upon receipt of impulse from an associated sequence detector means upon determining a wrong sequence condition, for actuating the retract disabling mechanism of the sensing unit associated with said sequence detector means, said control mechanism also including members individually releasable on impulses from said additional sequence detector means for blocking said individual feeding means; and an operating control associated with each feeding means each manually actuable for disabling said members releasable for actuating the associated retract disabling mechanism and blocking the associated feeding means, and enabling said member releasable for blocking the other of said feeding means.

21. In a machine of the class described, means for feeding two individual groups of records; a sensing unit associated with each feeding means comprising successively disposed sensing stages; retracts for each sensing stage; retract disabling mechanism for the retracts associated with one stage of each sensing unit and actuable for retaining sensed data in said one stage; sequence detector means for each sensing unit adapted to determine different sequence conditions within each group of records an additional sequence detector means adapted to determine sequence relationship between records of both groups of records; control mechanism including a member associated with each of said first mentioned sequence detector means and releasable upon receipt of impulse from an associated sequence detector means, upon determining a wrong sequence condition, for actuating the retract disabling mechanism of the sensing unit associated with said sequence detector means, said control mechanism also including members individually releasable on impulses from said additional sequence detector means for blocking said individual feeding means; and an operating control associated with each feeding means manually actuable for disabling said members.

22. In a machine of the class described, means for feeding separate groups of records, separate sensing means for each of said record feeding means each sensing means comprising sensing stages arranged to sense consecutive records within each of said groups of records, a plurality of pockets for receiving said records including a pocket common to the separate record feeding means, sequence detecting means associated with each of said sensing stages and arranged in separate units one unit for each separate sensing means for detecting sequence conditions of relative magnitude between consecutive records within each group of records and a further unit associated with corresponding stages of said separate sensing means for detecting the relative magnitude between a record of one group and a record of another group of said separate groups of records, and a control means operable in response to the sequence conditions detected by each of said sequence detecting means for selectively disabling said record feed means, said control means enabling the feeding of records from one of another of said group of records to said common pocket in accordance with a predetermined sequential order when the sequence condition between consecutive records within the group from which a record is fed is of the same predetermined sequential order.

23. In a machine of the class described, means for feeding separate groups of records, separate sensing means for each of said record feeding means each sensing means comprising sensing stages arranged to sense consecutive records within each of said groups of records, a plurality of pockets for receiving said records including a pocket common to the separate record feeding means, sequence detecting means associated with each of said sensing stages and arranged in separate units one unit for each separate sensing means for detecting sequence conditions of relative magnitude between consecutive records within each group of records and a further unit associated with corresponding stages of said separate sensing means for detecting the relative magnitude between a record of one group and a record of another group of said separate groups of records, and a control means operable in response to the sequence conditions detected by each of said separate sequence detecting means for selectively enabling said feeding means to feed a record from one or another of said groups of records to said common pocket in accordance with a predetermined sequential order when the sequence condition between consecutive records within each of said groups of records is of the same predetermined sequential order.

24. In a machine of the class described, means for feeding separate groups of records, a sensing unit for each of said record feeding means each comprising sensing stages arranged to sense consecutive records within each of said separate groups of records, a plurality of separate sequence detecting means associated with said stages including one for each sensing unit arranged to detect sequence conditions of relative magnitude between consecutive records within said separate groups of records and a further sequence detecting means associated with corresponding stages of said sensing units for determining the relative magnitude between a record and one group and a record of another group, pockets associated with said feeding means including a plurality of pockets individual to each separate group of records and a pocket common to said separate groups of records, selectively actuable deflector mechanisms associated with said pockets, and a control means operable in response to the sequence condition detected by each of said separate sequence detecting means for selectively actuating said deflector mechanisms and said separate feeding means to enable feed of a record from one or another group of said records to said common pocket in accordance with a predetermined sequential order, said control means actuating a deflector mechanism associated with a preselected one of the pockets individual to said separate groups of records to deflect a record into said pocket when said record bears an equality relationship with another record of the same group or with a record of another group of said records.

25. In a machine of the class described, means for feeding separate groups of records, a sensing unit for each of said record feeding means each comprising sensing stages arranged to sense consecutive records within each of said separate groups of records, a plurality of separate sequence detecting means associated with said sensing stages including one for each sensing unit arranged to detect sequence conditions of relative magnitude between consecutive records within said separate groups of records and a further sequence detecting means associated with corresponding stages of said sensing units for determining the relative magnitude between a record and one group and a record of another group, pockets associated with said feeding means including a plurality of pockets individual to each separate group of records and a pocket common to said separate groups of records, selectively actuable deflector mechanisms associated with said pockets, and a control means operable in response to the sequence condition detected by each of said separate sequence detecting means for selectively actuating said deflector mechanisms and said separate feeding means to enable feed of a record from one or another group of said records to said common pocket in accordance with a predetermined sequential order, said control means actuating the deflector mechanism associated with a preselected one of the pockets individual to said separate groups of records to deflect records of the associated group into said pocket when said records bear to each other a sequential order reverse to said predetermined sequential order.

26. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between the leading records from the respective groups and a correct sequence condition within both record groups, to render effective the member for disabling the feeding means associated with a group having the leading record of higher order and to render ineffective said members for actuating gates associated with the group having the leading record of lower order, whereby said record of lower order is distributed to said common pocket.

27. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an equal sequence condition between the leading records from the respective groups and a correct sequence condition within both record groups, to render effective said members for actuating the gate of the equal pocket for each record group and to render ineffective said members for disabling the feeding means for each record group, whereby the equal record of each group is distributed to their respective equal pockets.

28. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between the leading records of the respective groups, a correct sequence condition within the group having the leading record of lower order and an equal sequence condition within the group having the leading record of higher order, to render effective said member for disabling the means for feeding said group having the leading record of higher order and to render ineffective said members for actuating said gates associated with the group having the leading record of lower order, whereby said record of lower order is distributed to said common pocket.

29. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between the leading records of said respective groups, a correct sequence condition within the group having the leading record of higher order, and an equal sequence condition within the group having the leading record of lower order, to render effective said member releasable for disabling said group having the leading record of higher order and said member releasable for actuating the gate of the equal pocket associated with the group having the leading record of lower order, whereby said leading record of lower order is distributed to the equal pocket associated with said group.

30. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an equal sequence condition between the leading records of the respective groups, a correct sequence condition within one of said groups, and an equal sequence condition within the other of said record groups, to render ineffective said members releasable for disabling each of said feeding mechanisms and to render effective said members releasable for actuating the gates of the equal pockets associated with each feeding mechanism, whereby the leading record of each group is distributed to the equal pocket associated with each group.

31. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between the leading records of the respective groups, and an equal sequence condition within both record groups, to render effective said member releasable for disabling the means for feeding the group having the leading record of higher order and said member releasable for actuating the gate of the equal pocket associated with the group having the leading record of lower order, whereby said leading record of lower order is distributed to the respective equal pocket.

32. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an equal sequence condition between the leading records of the respective groups and an equal sequence condition within each record group, to render ineffective said members releasable for disabling each of said feeding means and to render effective said members releasable for actuating the equal pocket for each record group, whereby the leading record from each group is distributed to the respective equal pocket.

33. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective group; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between the leading records of the respective groups, a wrong sequence condition within the group having the leading record of lower order and a correct sequence condition within the group having the leading record of higher order, to render effective said member releasable for disabling the means for feeding said group having the leading record of higher order and said member releasable for actuating the gate of the reject pocket associated with the group of lower order, whereby said leading record of the group in wrong sequence is ditributed to the respective reject pocket.

34. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between the leading records of the respective groups, a wrong sequence condition within the group having the leading record of higher order and a correct sequence condition within the group having the leading record of lower order, to render effective said member releasable for disabling the means for feeding the group having the leading record of lower order and said member releasable for actuating the gate of the reject pocket associated with the group having the leading record of higher order, whereby said leading record of higher order is distributed to the respective reject pocket.

35. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an equal sequence condition between the leading records of the respective groups, a wrong sequence condition within one of said groups and a correct sequence condition within the other of said groups, to render effective said member releasable for disabling the means for feeding the group having a correct sequence condition and said member releasable for actuating the gate of the reject pocket associated with the group having the wrong sequence condition, whereby said leading record from the group having the wrong sequence condition is distributed to the respective reject pocket.

36. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between the leading records of the respective groups, a wrong sequence condition within the group having the leading record of lower order and an equal sequence condition within the group having the leading record of higher order, to render effective said member releasable for disabling the means for feeding said group having the leading record of higher order and said member releasable for actuating the gate of the reject pocket associated with the group having the leading record of lower order, whereby said leading record of lower order is distributed to the respective reject pocket.

37. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magntiude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between leading records of the respective groups, a wrong sequence condition within the group having the leading record of higher order and an equal sequence condition within the group having the leading record of lower order, to render effective said member releasable for disabling the means for feeding said group having the leading record of lower order and said member releasable for actuating the gate of the reject pocket associated with the group having the leading record of higher order, whereby said leading record of higher order is distributed to the respective reject pocket.

38. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and seletcively actuated in response to an equal sequence condition between the leading records of the respective groups, a wrong sequence condition within one of said groups, and an equal sequence condition within the other of said groups, to render effective said member releasable for disabling the means for feeding said group having an equal sequence condition and said member releasable for actuating the gate of the reject pocket associated with the other group, whereby said leading record from the group having the wrong sequence condition is distributed to the respective reject pocket.

39. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an unequal sequence condition between the leading records of the respective groups, and a wrong sequence condition within each of said groups, to render ineffective said members releasable for disabling said feeding mechanisms and to render effective said members releasable for actuating the gate of the reject pocket associated with each record group, whereby the leading records from both record groups are distributed to their respective reject pockets.

40. In a machine of the class described, two individual feeding means for feeding individual groups of records; a sensing unit associated with each feeding means each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; successively disposed pockets individual to each of said separate feeding means, one of said pockets being a reject pocket for receiving the records having a wrong sequence relation to a succeeding record, another of said pockets for receiving equal records from the respective groups; gates for each of said pockets, actuable for deflecting records into the related pocket; a pocket common to both feeding means and disposed to receive all records not deflected by said gates; a plurality of individually releasable distribution control members, one for actuating each of said gates and one for disabling each of said feeding means; input receiving elements associated with each of said members including ones for rendering an associated member effective and others for rendering an associated member ineffective, said receiving elements being operatively connected with all of said detecting means and selectively actuated in response to an equal sequence condition between the leading records of the respective groups and a wrong sequence condition within each record group, to render ineffective said members releasable for disabling the means for feeding each record group and to render effective said members releasable for actuating the gate of the reject pocket associated with each record group, whereby the leading records of both record groups are distributed to their respective reject pockets.

41. In a machine of the class described, means for feeding two separate groups of records; a sensing unit associated with each feeding means, each sensing unit including successively disposed sensing stages; a sequence detecting means associated withe each sensing unit for determining within each record group equal, wrong, or correct sequence conditions in relation to a predetermined sequential order; pockets for receiving records from each group including a common pocket for receiving records from both groups; a feed control member associated with each record group, said member being releasable for disabling the means for feeding the associated record group; a releasing element for each of said members; a cancelation element for each of said members, the releasing element for the member associated with one record group being operatively connected with the means for detecting the sequence within the other record group and responsive to a wrong sequence condition within said other record group for releasing the associated member, the cancelation element for the member associated with one record group being operatively connected with the means for detecting the sequence within the associated record group and responsive to a wrong sequence condition within said associated record group for rendering the feed disabling member for said associated group ineffective.

42. In a machine of the class described, means for feeding two individual groups of records; a sensing unit associated with each feeding means, each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; pockets for receiving records from each group including a common pocket for receiving records from both record groups; a feed disabling member associated with each record group releasable for disabling the means for feeding the associated record group, a releasing element for each of said members, said elements being operatively connected with said further sequence detecting means and selectively actuated in response to unequal sequence conditions determined by said further detecting means for releasing the member associated with the record group having the leading record of higher order; and a further releasing element associated with each of said feed disabling members, each of said further releasing elements for the member associated with one record group being operatively connected with the means for detecting a sequence within the other record group and responsive to a wrong sequence condition within said other record group for rendering said member effective for disabling the means for feeding the associated record group.

43. In a machine of the class described means for feeding two individual groups of records; a sensing unit associated with each feeding means, each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; pockets for receiving records from each group including a common pocket for receiving records from both record groups; a feed disabling member associated with each record group releasable for disabling the means for feeding the associated record group; a releasing element for each of said members, said elements being operatively connected with said further sequence detecting means and selectively actuable in accordance with an unequal sequence condition determined by said further sequence detecting means for releasing the member associated with the record group having the leading record of higher order; and a cancelation element for each of said members, said cancelation elements being operatively connected with the means for detecting the sequence within the associated record group and responsive to a wrong sequence condition for rendering the related member ineffective for disabling the means for feeding the associated record group.

44. In a machine of the class described, means for feeding two individual groups of records; a sensing unit associated with each feeding means, each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective groups; pockets for receiving records from each group including a common pocket for receiving records from both record groups; a feed disabling member associated with each record group releasable for disabling the means for feeding the associated record group; a releasing element for each of said members, said elements being operatively connected with said further sequence detecting means and selectively actuable in accordance with an unequal sequence condition determined by said further sequence detecting means for releasing the member associated with the record group having the leading record of higher order; a further releasing element for each of said members each of said further elements for the member associated with one record group being operatively connected with the means for detecting the sequence within the other record group and responsive to a wrong sequence condition within said other record group for rendering the related member effective for disabling the means for feeding the associated record group; and a cancelation element for each of said members, each of said cancelation elements for the member associated with one record group being operatively connected with the means for detecting a sequence within the associated record group and responsive to a wrong sequence condition for rendering the related member ineffective for disabling the means for feeding said associated record group.

45. In a machine of the class described, means for feeding two individual groups of records; a sensing unit associated with each feeding means, each sensing unit including successively disposed sensing stages; a sequence detecting means associated with each sensing unit for determining within each record group equal, wrong or correct sequence conditions in relation to a predetermined sequential order; a further sequence detecting means associated with both of said sensing units for determining the relative magnitude between the leading records of the respective record groups; pockets individual to each of said separate feeding means including a pocket for receiving equal records from the respective record groups; gates for each of said pockets actuable for deflecting records into the related pocket; a pocket common to both feeding means and disposed to receive records from both record groups not deflected by said gates; a feed disabling member associated with each record group, said disabling members being selectively controlled by said further sequence detecting means to disable the means for feeding the group having the leading record of higher order, and to enable both feeding mechanisms when the leading records are of equal order; a plurality of members releasable for actuating the gates of said equal pockets, one of said members being operatively associated with both of said gates, each of others of said members being operatively associated with the gate of a pocket individual to each feeding means; means responsive to an equal sequence condition within said further sequence detecting means for rendering said one member effective for actuating both of said gates; and means responsive to an equal sequence condition within either record group for rendering effective the member releasable for actuating the gate of the equal pocket for the associated record group.

46. In a machine of the class described, means for feeding two individual groups of records; a sensing unit associated with each feeding means, each sensing unit including successively disposed sensing stages; a sequence detecting means associated with each sensing unit for determining within each record group equal, wrong, or correct sequence conditions in relation to a predetermined sequential order; a further sequence detecting means associated with both of said sensing units for determining the relative magnitude between the leading records of the respective record groups; pockets individual to each of said separate feeding means including a pocket for receiving equal records from the respective record groups; gates for each of said pockets actuable for deflecting records into the related pocket; a pocket common to both feeding means and disposed to receive records from both record groups not deflected by said gates; a feed disabling member associated with each record group said disabling members being selectively controlled by said further sequence detecting means to disable the means for feeding the group having the leading record of higher order, a plurality of cyclically releasable members for actuating said gates one of said members operatively connected with the gates of both of said equal pockets, each of others of said members releasable for actuating the gate of each of said equal pocket; a repeat cycle element for each of said latter members operable upon the initial release of a member for rendering said member effective in the succeeding cycle; means responsive to an equal sequence condition within said further sequence detecting means for rendering said one member effective for actuating both of said gates; and means responsive to an equal sequence condition within either record group for rendering effective the member releasable for actuating the gate of the equal pocket for the associated record group.

References Cited in the file of this patent

UNITED STATES PATENTS

| Number | Name | Date |
| --- | --- | --- |
| 1,298,971 | Lasker | Apr. 1, 1919 |
| 1,880,413 | Campbell | Oct. 4, 1932 |
| 1,991,729 | Brougham | Feb. 19, 1935 |
| 2,044,119 | Lasker | June 16, 1936 |
| 2,160,113 | Anderson | May 30, 1939 |
| 2,260,097 | Thomas | Oct. 21, 1941 |
| 2,274,071 | Kelley | Feb. 27, 1942 |
| 2,323,816 | Lasker | July 6, 1943 |
| 2,359,670 | Page | Oct. 3, 1944 |
| 2,379,828 | Rubidge | July 3, 1945 |
| 2,434,512 | Page | Jan. 13, 1948 |
| 2,496,124 | Ferry | Jan. 31, 1950 |

FOREIGN PATENTS

| Number | Country | Date |
| --- | --- | --- |
| 401,012 | Great Britain | Nov. 9, 1933 |